US012801454B2

(12) United States Patent
Murphy et al.

(10) Patent No.: US 12,801,454 B2
(45) Date of Patent: Nov. 17, 2026

(54) THREAT MITIGATION SYSTEM AND METHOD

(71) Applicant: ReliaQuest Holdings, LLC, Tampa, FL (US)

(72) Inventors: Brian P. Murphy, Tampa, FL (US); Joe Partlow, Tampa, FL (US); Colin O'Connor, Tampa, FL (US); Jason Pfeiffer, Tampa, FL (US); Brian Philip Murphy, St. Petersburg, FL (US); Jonathan R. Echavarria, Tampa, FL (US); Marcus Carey, Austin, TX (US)

(73) Assignee: RELIAQUEST HOLDINGS, LLC, Tampa, FL (US)

(*) Notice: Subject to any disclaimer, the term of this patent is extended or adjusted under 35 U.S.C. 154(b) by 0 days.

(21) Appl. No.: 19/272,225

(22) Filed: Jul. 17, 2025

(65) Prior Publication Data

US 2026/0025436 A1 Jan. 22, 2026

Related U.S. Application Data

(60) Provisional application No. 63/704,800, filed on Oct. 8, 2024, provisional application No. 63/678,750, filed (Continued)

(51) Int. Cl.

| | |
|---|---|
| ***G06F 15/16*** | (2006.01) |
| ***G06F 9/50*** | (2006.01) |
| ***G06Q 10/0631*** | (2023.01) |
| ***H04L 9/40*** | (2022.01) |
| ***H04L 41/0631*** | (2022.01) |

(Continued)

(52) U.S. Cl.

CPC .......... *G06F 9/5072* (2013.01); *G06F 9/5044* (2013.01); *G06Q 10/06316* (2013.01); *H04L 41/0631* (2013.01); *H04L 41/16* (2013.01); *H04L 43/08* (2013.01); *H04L 63/104* (2013.01); *H04L 63/1416* (2013.01); *H04L 63/1433* (2013.01); *H04L 63/1441* (2013.01); *H04L 63/1466* (2013.01); *H04L 67/141* (2013.01);

(Continued)

(58) Field of Classification Search

CPC .............................. H04L 67/141; H04L 43/08

See application file for complete search history.

(56) References Cited

U.S. PATENT DOCUMENTS

| | | | |
|---|---|---|---|
| 7,225,249 | B1 | 5/2007 | Barry et al. |
| 7,269,851 | B2 | 9/2007 | Ackroyd |

(Continued)

FOREIGN PATENT DOCUMENTS

| | | | |
|---|---|---|---|
| EP | 3188439 | A1 | 7/2017 |
| WO | 2009/020611 | A2 | 2/2009 |

OTHER PUBLICATIONS

Azure Sentinel Best Practices Strategies for success in data ingestion and incident response, 2019.

(Continued)

*Primary Examiner* — Yves Dalencourt

(74) *Attorney, Agent, or Firm* — Brian J. Colandreo; Jeffrey T. Placker; Holland & Knight LLP

(57) ABSTRACT

A computer-implemented method, computer program product and computing system for accessing interface rules for a remote resource; generating a connector interface based, at least in part, upon the interface rules; and accessing the remote resource via the connector interface.

21 Claims, 61 Drawing Sheets

10

Related U.S. Application Data on Aug. 2, 2024, provisional application No. 63/672,606, filed on Jul. 17, 2024, provisional application No. 63/672,611, filed on Jul. 17, 2024, provisional application No. 63/672,571, filed on Jul. 17, 2024.

(51) Int. Cl.
*H04L 41/16* (2022.01)
*H04L 43/08* (2022.01)
*H04L 67/141* (2022.01)

(52) U.S. Cl.
CPC .............................. *G06F 2209/501* (2013.01); *G06F 2209/5011* (2013.01); *G06F 2209/503* (2013.01)

(56) References Cited

U.S. PATENT DOCUMENTS

| | | | |
|---|---|---|---|
| 8,904,531 | B1 | 12/2014 | Saklikar et al. |
| 9,967,264 | B2 | 5/2018 | Harris et al. |
| 10,305,922 | B2 | 5/2019 | Devi et al. |
| 10,382,459 | B2 | 8/2019 | Harris et al. |
| 10,410,158 | B1 | 9/2019 | Yumer et al. |
| 10,491,621 | B2 | 11/2019 | Ground et al. |
| 10,778,725 | B2 | 9/2020 | Ray et al. |
| 11,636,206 | B2 | 4/2023 | Kenyon et al. |
| 11,743,271 | B2 | 8/2023 | Venter et al. |
| 12,008,332 | B1 | 6/2024 | Gardner et al. |
| 12,105,746 | B1 | 10/2024 | Wu et al. |
| 12,190,141 | B2 | 1/2025 | Marzorati et al. |
| 12,248,501 | B1 | 3/2025 | Wu et al. |
| 12,395,521 | B2 | 8/2025 | Murphy et al. |
| 12,488,134 | B2 | 12/2025 | Pasumarthi et al. |
| 12,493,772 | B1 | 12/2025 | Cameron et al. |
| 2010/0125900 | A1 | 5/2010 | Dennerline et al. |
| 2012/0210434 | A1 | 8/2012 | Curtis et al. |
| 2014/0207802 | A1 | 7/2014 | Raghavan et al. |
| 2014/0331326 | A1 | 11/2014 | Thakur |
| 2015/0278902 | A1 | 10/2015 | Warren et al. |
| 2015/0379072 | A1 | 12/2015 | Dirac et al. |
| 2016/0080420 | A1 | 3/2016 | Ray et al. |
| 2016/0259742 | A1 | 9/2016 | Faulkner et al. |
| 2017/0063912 | A1 | 3/2017 | Muddu et al. |
| 2017/0193173 | A1 | 7/2017 | Miller |
| 2017/0286864 | A1 | 10/2017 | Fiedel et al. |
| 2018/0123864 | A1 | 5/2018 | Tucker et al. |
| 2018/0324220 | A1 | 11/2018 | Ray et al. |
| 2019/0052479 | A1 | 2/2019 | Piaskowski et al. |
| 2019/0081851 | A1 | 3/2019 | Farrell et al. |
| 2019/0130098 | A1 | 5/2019 | Sims et al. |
| 2019/0230129 | A1 | 7/2019 | Digiambattista et al. |
| 2020/0042419 | A1 | 2/2020 | Wei et al. |
| 2020/0137097 | A1 | 4/2020 | Zimmermann et al. |
| 2020/0195673 | A1 | 6/2020 | Lee |
| 2020/0236120 | A1 | 7/2020 | Monteil et al. |
| 2020/0287929 | A1 | 9/2020 | Biever et al. |
| 2020/0327431 | A1 | 10/2020 | Woo |
| 2020/0389482 | A1 | 12/2020 | Engle et al. |
| 2021/0006991 | A1 | 1/2021 | Rucker et al. |
| 2021/0014256 | A1 | 1/2021 | Malhotra |
| 2021/0160271 | A1 | 5/2021 | Garcarz et al. |
| 2021/0234885 | A1 | 7/2021 | Campbell |
| 2022/0004546 | A1 | 1/2022 | Rogers et al. |
| 2022/0053013 | A1 | 2/2022 | Crabtree et al. |
| 2022/0060497 | A1 | 2/2022 | Crabtree et al. |
| 2022/0070194 | A1 | 3/2022 | Pon et al. |
| 2022/0108025 | A1 | 4/2022 | Lo et al. |
| 2022/0141188 | A1 | 5/2022 | Apger et al. |
| 2022/0166770 | A1 | 5/2022 | Wright |
| 2022/0222242 | A1 | 7/2022 | Spranger et al. |
| 2022/0277076 | A1 | 9/2022 | Murphy et al. |
| 2023/0033317 | A1 | 2/2023 | Lin et al. |
| 2023/0205664 | A1 | 6/2023 | Higginson et al. |
| 2023/0206192 | A1 | 6/2023 | Deshpande |
| 2023/0208869 | A1 | 6/2023 | Bisht et al. |
| 2023/0274289 | A1 | 8/2023 | Kurian et al. |
| 2023/0300164 | A1 | 9/2023 | Crabtree et al. |
| 2023/0305903 | A1 | 9/2023 | Lee et al. |
| 2023/0319073 | A1 | 10/2023 | Murphy et al. |
| 2023/0359903 | A1 | 11/2023 | Cefalu et al. |
| 2023/0370490 | A1 | 11/2023 | Crabtree et al. |
| 2023/0385085 | A1 | 11/2023 | Singh |
| 2023/0412620 | A1 | 12/2023 | Crabtree et al. |
| 2024/0028003 | A1* | 1/2024 | Strinden .......... G05B 19/41835 |
| 2024/0045990 | A1 | 2/2024 | Boyer et al. |
| 2024/0053966 | A1* | 2/2024 | Prajapat .................... G06F 8/34 |
| 2024/0121125 | A1 | 4/2024 | Blair et al. |
| 2024/0281472 | A1 | 8/2024 | Larhette et al. |
| 2024/0289464 | A1 | 8/2024 | Tishbi et al. |
| 2024/0289535 | A1 | 8/2024 | Murphy et al. |
| 2024/0291833 | A1 | 8/2024 | Murphy et al. |
| 2024/0296177 | A1 | 9/2024 | Gardner et al. |
| 2024/0296279 | A1 | 9/2024 | Gardner |
| 2024/0354503 | A1 | 10/2024 | Baruch et al. |
| 2024/0362465 | A1 | 10/2024 | Munguia et al. |
| 2024/0403710 | A1 | 12/2024 | Licato et al. |
| 2024/0404687 | A1 | 12/2024 | Bell et al. |
| 2024/0406195 | A1 | 12/2024 | Sansom et al. |
| 2024/0411891 | A1 | 12/2024 | Lange et al. |
| 2024/0428260 | A1 | 12/2024 | Mico et al. |
| 2025/0039067 | A1 | 1/2025 | Crabtree et al. |
| 2025/0039070 | A1 | 1/2025 | Sawal et al. |
| 2025/0055867 | A1 | 2/2025 | Ahmed et al. |
| 2025/0055871 | A1 | 2/2025 | Shaked |
| 2025/0061397 | A1 | 2/2025 | Saxena et al. |
| 2025/0077655 | A1 | 3/2025 | Schindel et al. |
| 2025/0094619 | A1 | 3/2025 | Pasumarthi et al. |
| 2025/0138490 | A1 | 5/2025 | Sullivan |
| 2025/0156233 | A1* | 5/2025 | Colgrove .............. G06F 3/0688 |
| 2025/0190449 | A1 | 6/2025 | Zhang et al. |
| 2025/0209200 | A1 | 6/2025 | Paes et al. |
| 2025/0225401 | A1 | 7/2025 | Durvasula et al. |
| 2025/0233884 | A1 | 7/2025 | Sherr et al. |
| 2025/0238427 | A1 | 7/2025 | Curran et al. |
| 2025/0238511 | A1 | 7/2025 | Pickman et al. |
| 2025/0244964 | A1 | 7/2025 | Mystetskyi et al. |
| 2025/0252376 | A1 | 8/2025 | Singh et al. |
| 2025/0274469 | A1 | 8/2025 | Bar et al. |
| 2025/0342184 | A1 | 11/2025 | Wu et al. |
| 2025/0342323 | A1 | 11/2025 | Spiteri et al. |
| 2025/0350628 | A1 | 11/2025 | Murphy et al. |
| 2025/0356187 | A1 | 11/2025 | Papancea et al. |
| 2025/0371317 | A1 | 12/2025 | Thompson et al. |
| 2025/0373487 | A1 | 12/2025 | Ehrlich et al. |
| 2025/0378177 | A1 | 12/2025 | Conikee |
| 2025/0379885 | A1 | 12/2025 | Murphy et al. |
| 2026/0024038 | A1 | 1/2026 | Iyer et al. |
| 2026/0025393 | A1 | 1/2026 | Murphy et al. |

OTHER PUBLICATIONS

International Search Report and Written Opinion issued in related Application Serial No. PCT/US2025/037919 on Sep. 17, 2025.

Non-Final Office Action issued in related U.S. Appl. No. 19/270,906 on Sep. 19, 2025.

Non-Final Office Action issued in related U.S. Appl. No. 19/272,063 on Sep. 8, 2025.

International Search Report and Written Opinion issued in related Application Serial No. PCT/US2025/037907 on Sep. 29, 2025.

International Search Report and Written Opinion issued in related Application Serial No. PCT/US2025/038008 on Sep. 29, 2025.

International Search Report and Written Opinion issued in related Application Serial No. PCT/US2025/038013 on Issue Sep. 29, 2025.

International Search Report and Written Opinion issued in related Application Serial No. PCT/US2025/038019 on Sep. 26, 2025.

International Search Report and Written Opinion issued in related Application Serial No. PCT/US25/37866 on Oct. 1, 2025.

Nolan, "Network Security through Signature-Based Intrusion Detection Systems: A Comprehensive Approach", Jan. 2025, Granja Journal, pp. 21-24 (Year: 2025).

Non-Final Office Action issued in related U.S. Appl. No. 19/270,776 on Sep. 30, 2025.

(56) References Cited

OTHER PUBLICATIONS

Non-Final Office Action issued in related U.S. Appl. No. 19/271,029 on Oct. 2, 2025.
Non-Final Office Action issued in related U.S. Appl. No. 19/272,109 on Oct. 1, 2025.
Non-Final Office Action issued in related U.S. Appl. No. 19/272,168 on Oct. 6, 2025.
Final Office Action issued in related U.S. Appl. No. 19/270,776 on Feb. 5, 2026.
Final Office Action issued in related U.S. Appl. No. 19/271,029 on Feb. 9, 2026.
Final Office Action issued in related U.S. Appl. No. 19/272,109 on Feb. 18, 2026.
Final Office Action issued in related U.S. Appl. No. 19/272,168 on Feb. 25, 2026.
Ma et al., "LLMs with User-defined Prompts as Generic Data Operators for Reliable Data Processing", Dec. 2023, IEEE International Conference on Big Data, pp. 3144-3148 (Year: 2023).
Notice of Allowance issued in related U.S. Appl. No. 19/271,081 on Mar. 31, 2026.
Notice of Allowance issued in related U.S. Appl. No. 19/271,199 on Mar. 13, 2026.
Notice of Allowance issued in related U.S. Appl. No. 19/271,081 on Apr. 16, 2026.
Non-Final Office Action issued in related U.S. Appl. No. 19/270,776 on May 26, 2026.
Non-Final Office Action issued in related U.S. Appl. No. 19/271,029 on May 18, 2026.
Notice of Allowance issued in related U.S. Appl. No. 19/271,199 on May 8, 2026.
Notice of Allowance issued in related U.S. Appl. No. 19/270,906 on Jun. 8, 2026.
Notice of Allowance issued in related U.S. Appl. No. 19/271,081 on Jun. 24, 2026.
Final Office Action issued in related U.S. Appl. No. 19/270,906 on Jan. 27, 2026.
Final Office Action issued in related U.S. Appl. No. 19/272,063 on Dec. 23, 2025.
Non-Final Office Action issued in related U.S. Appl. No. 19/272,168 on Jun. 25, 2026.
Non-Final Office Action issued in related U.S. Appl. No. 19/271,081 on Nov. 17, 2025.
Non-Final Office Action issued in related U.S. Appl. No. 19/271,199 on Oct. 16, 2025.
Non-Final Office Action issued in related U.S. Appl. No. 19/272,063 on Aug. 17, 2026.
Non-Final Office Action issued in related U.S. Appl. No. 19/272,109 on Sep. 10, 2026.
Notice of Allowance issued in related U.S. Appl. No. 19/271,081 on Jul. 6, 2026.
Notice of Allowance issued in related U.S. Appl. No. 19/271,081 on Sep. 9, 2026.
Notice of Allowance issued in related U.S. Appl. No. 19/271,199 on Jul. 13, 2026.
Notice of Allowance issued in related U.S. Appl. No. 19/271, 199 on Sep. 3, 2026.

* cited by examiner

10

350

10

352

352

10

1258

10

10

10

2900

10

10

THREAT MITIGATION SYSTEM AND METHOD

RELATED APPLICATION(S)

This application claims the benefit of U.S. Provisional Patent Application Nos.: 63/672,571 filed on 17 Jul. 2024, 63/672,606 filed on 17 Jul. 2024, 63/672,611 filed on 17 Jul. 2024, 63/678,750 filed on 2 Aug. 2024, and 63/704,800 filed on 8 Oct. 2024; the entire contents of which are herein incorporated by reference.

TECHNICAL FIELD

This disclosure relates to threat mitigation systems and, more particularly, to threat mitigation systems that monitor activity across multiple computing systems and subsystems.

BACKGROUND

In the computer world, there is a constant battle occurring between bad actors that want to attack computing platforms and good actors who try to prevent the same. Unfortunately, the complexity of such computer attacks in constantly increasing, so technology needs to be employed that understands the complexity of these attacks and is capable of addressing the same.

Threat mitigation systems may utilize and/or communicate with a plurality of security-relevant subsystems, wherein these security-relevant subsystems may gather information concerning such computer attacks.

SUMMARY OF DISCLOSURE

Flex #3

In one implementation, a computer-implemented method is executed on a computing device and includes: accessing interface rules for a remote resource; generating a connector interface based, at least in part, upon the interface rules; and accessing the remote resource via the connector interface.

One or more of the following features may be included. The connector interface may be a bidirectional connector interface. The bidirectional connector interface may enable bidirectional communication between the remote resource and a local resource. Generating a connector interface based, at least in part, upon the interface rules may include: generating a connector interface based, at least in part, upon the interface rules and a best practice guidelines. Generating a connector interface based, at least in part, upon the interface rules includes: generating a connector interface based, at least in part, upon the interface rules and a previously-generated connector interfaces. The connector interface may be validated. Validating the connector interface may include: establishing communication between a local resource and the remote resource via the connector interface. Validating the connector interface may further include: effectuating a communication test between the local resource and the remote resource to define a test result. Validating the connector interface may further include: comparing the test result to an anticipated result to define an accuracy score. Validating the connector interface may further include: revising the connector interface based, at least in part, upon the test result if the accuracy score is below a defined accuracy threshold.

In another implementation, a computer program product resides on a computer readable medium and has a plurality of instructions stored on it. When executed by a processor, the instructions cause the processor to perform operations including: accessing interface rules for a remote resource; generating a connector interface based, at least in part, upon the interface rules; and accessing the remote resource via the connector interface.

One or more of the following features may be included. The connector interface may be a bidirectional connector interface. The bidirectional connector interface may enable bidirectional communication between the remote resource and a local resource. Generating a connector interface based, at least in part, upon the interface rules may include: generating a connector interface based, at least in part, upon the interface rules and a best practice guidelines. Generating a connector interface based, at least in part, upon the interface rules includes: generating a connector interface based, at least in part, upon the interface rules and a previously-generated connector interfaces. The connector interface may be validated. Validating the connector interface may include: establishing communication between a local resource and the remote resource via the connector interface. Validating the connector interface may further include: effectuating a communication test between the local resource and the remote resource to define a test result. Validating the connector interface may further include: comparing the test result to an anticipated result to define an accuracy score. Validating the connector interface may further include: revising the connector interface based, at least in part, upon the test result if the accuracy score is below a defined accuracy threshold.

In another implementation, a computing system including a processor and memory is configured to perform operations including: accessing interface rules for a remote resource; generating a connector interface based, at least in part, upon the interface rules; and accessing the remote resource via the connector interface.

One or more of the following features may be included. The connector interface may be a bidirectional connector interface. The bidirectional connector interface may enable bidirectional communication between the remote resource and a local resource. Generating a connector interface based, at least in part, upon the interface rules may include: generating a connector interface based, at least in part, upon the interface rules and a best practice guidelines. Generating a connector interface based, at least in part, upon the interface rules includes: generating a connector interface based, at least in part, upon the interface rules and a previously-generated connector interfaces. The connector interface may be validated. Validating the connector interface may include: establishing communication between a local resource and the remote resource via the connector interface. Validating the connector interface may further include: effectuating a communication test between the local resource and the remote resource to define a test result. Validating the connector interface may further include: comparing the test result to an anticipated result to define an accuracy score. Validating the connector interface may further include: revising the connector interface based, at least in part, upon the test result if the accuracy score is below a defined accuracy threshold.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
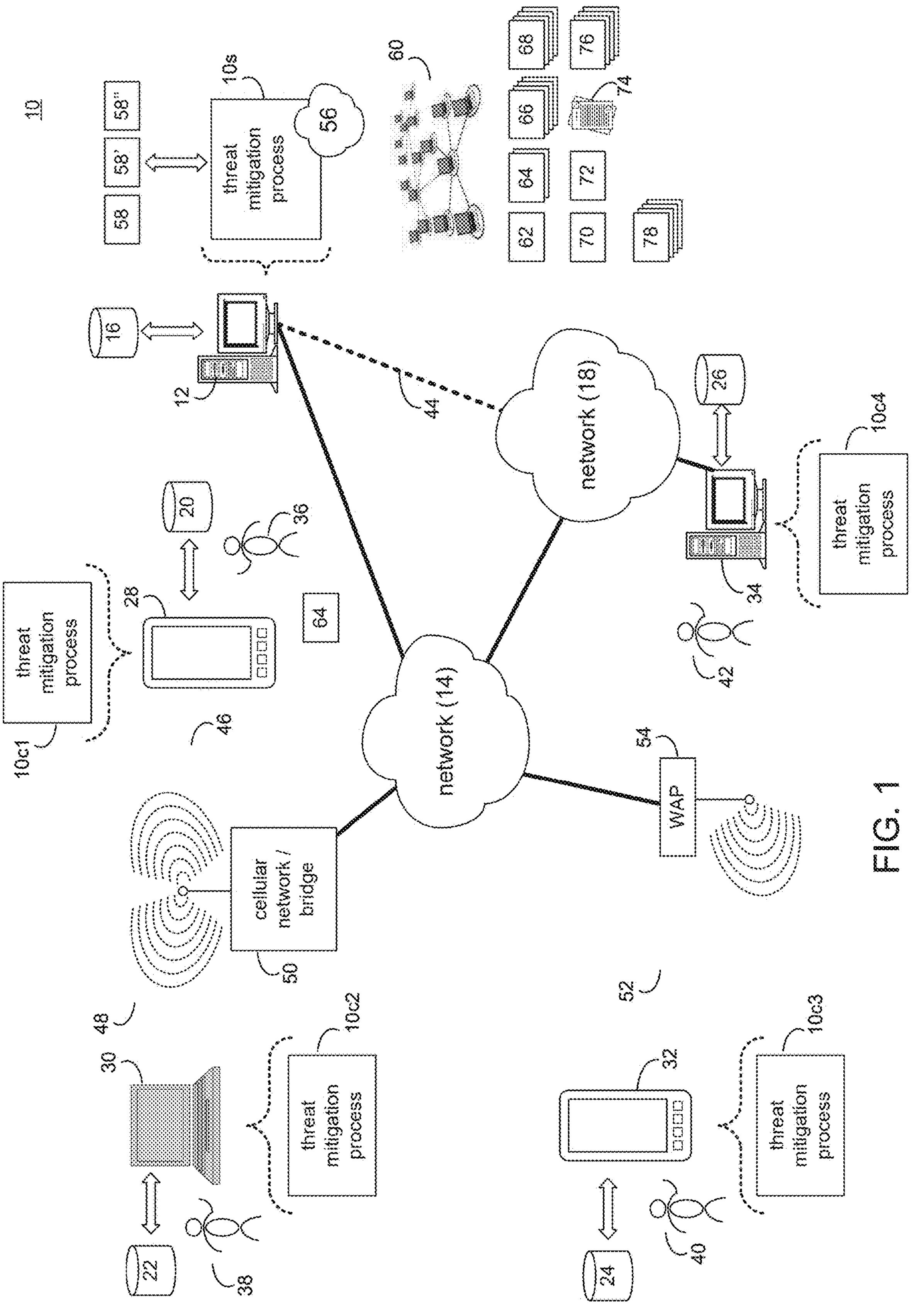
FIG. 1 is a diagrammatic view of a distributed computing network including a computing device that executes a threat mitigation process according to an embodiment of the present disclosure.
Figure 2:
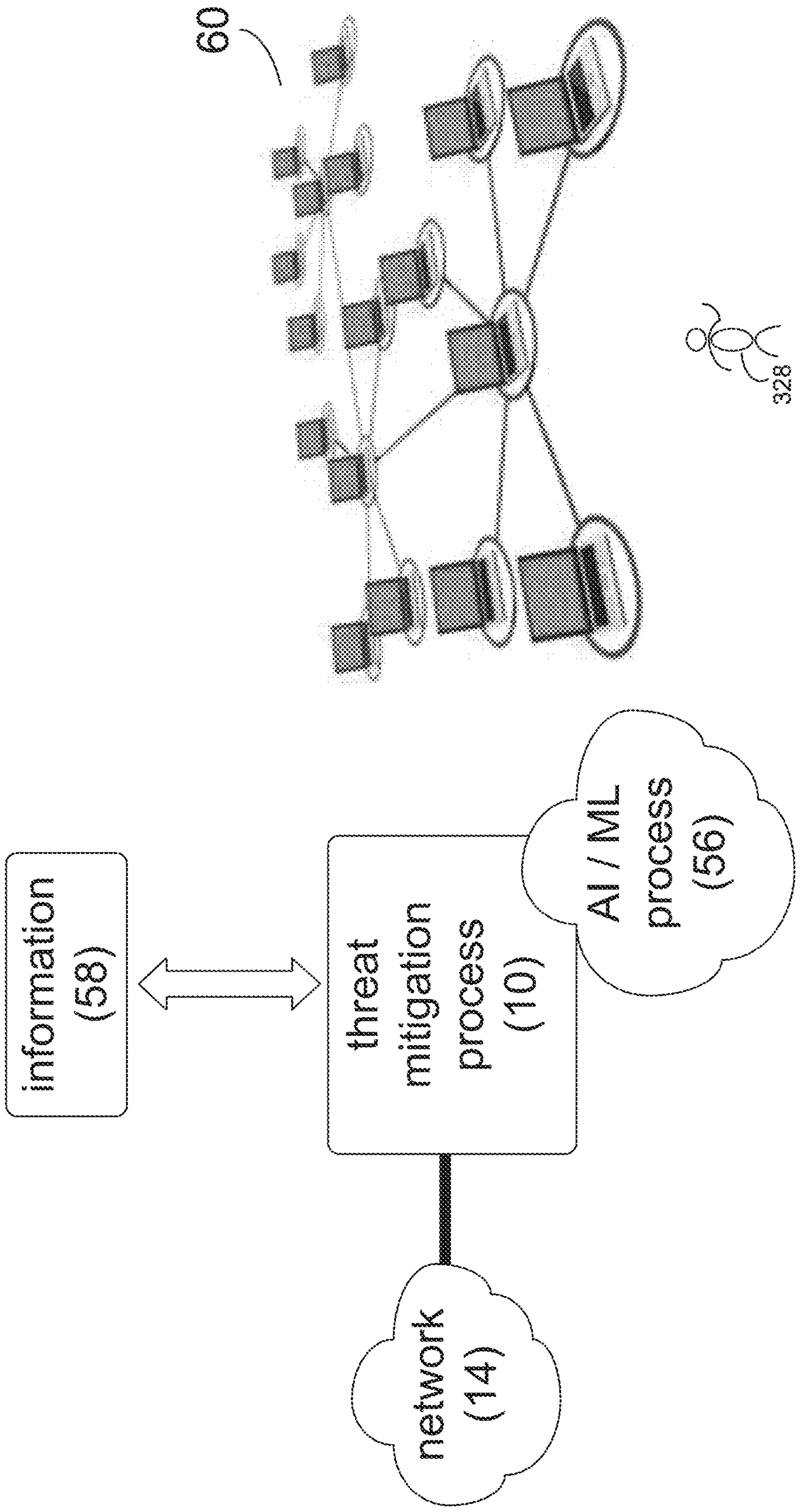
FIG. 2 is a diagrammatic view of an exemplary AI/ML process of the threat mitigation process of FIG. 1 according to an embodiment of the present disclosure.

Referring to FIGS. 1-2, there is shown threat mitigation process 10. Threat mitigation process 10 may be implemented as a server-side process, a client-side process, or a hybrid server-side/client-side process. For example, threat mitigation process 10 may be implemented as a purely server-side process via threat mitigation process 10*s*. Alternatively, threat mitigation process 10 may be implemented as a purely client-side process via one or more of threat mitigation process 10*c*1, threat mitigation process 10*c*2, threat mitigation process 10*c*3, and threat mitigation process 10*c*4. Alternatively still, threat mitigation process 10 may be implemented as a hybrid server-side/client-side process via threat mitigation process 10*s* in combination with one or more of threat mitigation process 10*c*1, threat mitigation process 10*c*2, threat mitigation process 10*c*3, and threat mitigation process 10*c*4. Accordingly, threat mitigation process 10 as used in this disclosure may include any combination of threat mitigation process 10*s*, threat mitigation process 10*c*1, threat mitigation process 10*c*2, threat mitigation process, and threat mitigation process 10*c*4.

Threat mitigation process 10*s* may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a cloud-based computing network.

The instruction sets and subroutines of threat mitigation process 10*s*, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of threat mitigation processes 10*c*1, 10*c*2, 10*c*3, 10*c*4 may include but are not limited to a client application, a web browser, a game console user interface, or a specialized application (e.g., an application running on e.g., the Android tm platform or the iOS tm platform). The instruction sets and subroutines of threat mitigation processes 10*c*1, 10*c*2, 10*c*3, 10*c*4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage device 16 may include but are not limited to: a hard disk drive; a RAID device; a random-access memory (RAM); a read-only memory (ROM); and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows tm, Android tm, WebOS tm, iOS tm, Redhat Linux tm, or a custom operating system.

Users 36, 38, 40, 42 may access threat mitigation process 10 directly through network 14 or through secondary network 18. Further, threat mitigation process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Artificial Intelligence/Machines Learning Overview:

Assume for illustrative purposes that threat mitigation process 10 includes AI/ML process 56 (e.g., an artificial intelligence/machine learning process) that is configured to process information (e.g., information 58). As will be discussed below in greater detail, examples of information 58 may include but are not limited to platform information being scanned to detect security events (e.g., access auditing; anomalies; authentication; denial of services; exploitation; malware; phishing; spamming; reconnaissance; and/or web attack) within a monitored computing platform (e.g., computing platform 60).

Generally speaking, AI/ML process 56 (e.g., an artificial intelligence/machine learning process) may significantly enhance the ability to detect and respond to security events within computer networks. Traditional security methods often rely on predefined rules or signature-based detection, which can be limited in their ability to identify new, evolving, or sophisticated threats. In contrast, AI/ML process 56 may be designed to learn from data and adapt over time, making them highly effective at identifying unusual patterns and behaviors that may indicate a security events.

Such an AI/ML process (e.g., AI/ML process 56) may begin with the collection of vast amounts of data from multiple sources within the computer network. This may include logs from firewalls, intrusion detection and prevention systems (IDS/IPS), endpoints, applications, servers, and user activity. This raw data may then be preprocessed to clean and normalize it, followed by feature extraction, wherein relevant characteristics may be identified (e.g., access times, login frequencies, the volume and destination of data transfers, protocol usage, and command sequences).

Machine learning models may be trained using this structured data. In supervised learning, the system is fed labeled data that indicates which actions are benign and which are malicious, allowing AI/ML process 56 to learn how to distinguish between them. Unsupervised learning, on the other hand, doesn't rely on labeled data but instead identifies deviations from established patterns, which could suggest novel or previously unseen threats. Reinforcement learning may also be used in more dynamic systems, where the model learns optimal responses through trial and error in simulated or real environments.

Once deployed, these AI/ML models may operate continuously to monitor network activity. They can identify a wide range of security events, such as attempts at unauthorized access, insider threats, phishing attacks, data exfiltration, lateral movement within the network, and signs of malware or ransomware. For instance, an AI/ML model may detect that a user is accessing files at unusual hours or transferring unusually large amounts of data to an external server, which is a behavior that might be missed by traditional tools.

When a potential threat is detected, AI/ML process 56 may generate an alert for cybersecurity analysts to investigate further or, in more advanced setups, trigger automated responses. These could include isolating compromised devices, blocking suspicious IP addresses, or throttling data transfers to prevent data loss. Furthermore, feedback from these events (e.g., whether a detection was accurate or a false positive) may be used to retrain and improve AI/ML models over time, enhancing its precision and adaptability.

The Threat Mitigation Process

As discussed above, threat mitigation process 10 may include AI/ML process 56 (e.g., an artificial intelligence/machine learning process) that may be configured to process information (e.g., information 58), wherein examples of information 58 may include but are not limited to platform information (e.g., structured or unstructured content) that may be scanned to detect security events (e.g., access auditing; anomalies; authentication; denial of services; exploitation; malware; phishing; spamming; reconnaissance; and/or web attack) within a monitored computing platform (e.g., computing platform 60).

Figure 3:
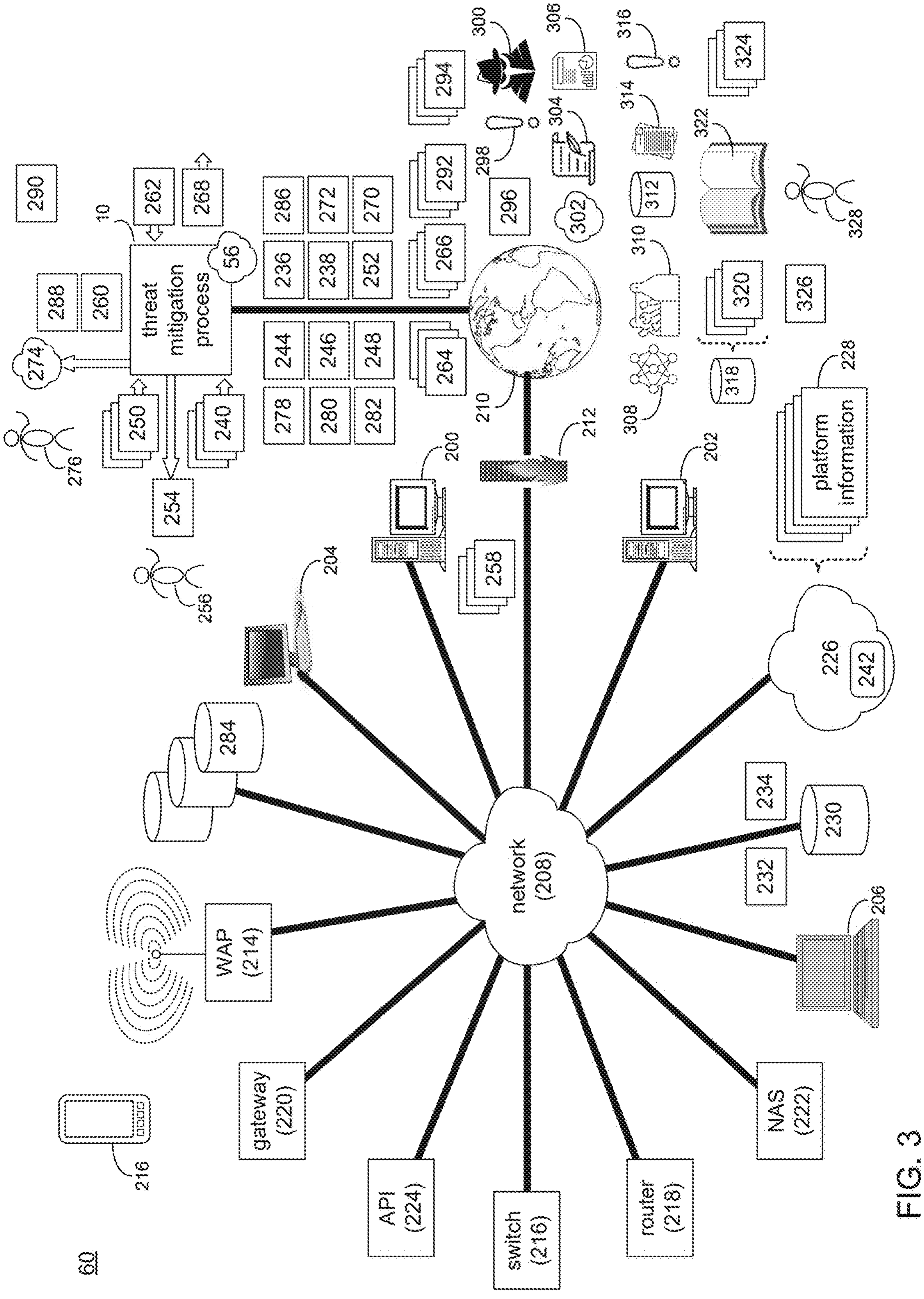
FIG. 3 is a diagrammatic view of the computing platform of FIG. 1 according to an embodiment of the present disclosure.

Referring also to FIG. 3, the monitored computing platform (e.g., computing platform 60) utilized by business today may be a highly complex, multi-location computing system/network that may span multiple buildings/locations/countries. For this illustrative example, the monitored computing platform (e.g., computing platform 60) is shown to include many discrete computing devices, examples of which may include but are not limited to: server computers (e.g., server computers 200, 202), desktop computers (e.g., desktop computer 204), and laptop computers (e.g., laptop computer 206), all of which may be coupled together via a network (e.g., network 208), such as an Ethernet network. Computing platform 60 may be coupled to an external network (e.g., Internet 210) through WAF (i.e., Web Application Firewall) 212. A wireless access point (e.g., WAP 214) may be configured to allow wireless devices (e.g., smartphone 216) to access computing platform 60. Computing platform 60 may include various connectivity devices that enable the coupling of devices within computing platform 60, examples of which may include but are not limited to: switch 216, router 218 and gateway 220. Computing platform 60 may also include various storage devices (e.g., NAS 222), as well as functionality (e.g., API Gateway 224) that allows software applications to gain access to one or more resources within computing platform 60.

In addition to the devices and functionality discussed above, other technology (e.g., security-relevant subsystems 226) may be deployed within computing platform 60 to monitor the operation of (and the activity within) computing platform 60. Examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Each of security-relevant subsystems 226 may monitor and log their activity with respect to computing platform 60, resulting in the generation of platform information 228. For example, platform information 228 associated with a client-defined MDM (i.e., Mobile Device Management) system may monitor and log the mobile devices that were allowed access to computing platform 60.

Further, SEIM (i.e., Security Information and Event Management) system 230 may be deployed within computing platform 60. As is known in the art, SIEM system 230 is an approach to security management that combines SIM (security information management) functionality and SEM (security event management) functionality into one security management system. The underlying principles of a SIEM system is to aggregate relevant data from multiple sources, identify deviations from the norm and take appropriate action. For example, when a security event is detected, SIEM system 230 might log additional information, generate an alert and instruct other security controls to mitigate the security event. Accordingly, SIEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

Computing Platform Analysis & Reporting

As will be discussed below in greater detail, threat mitigation process 10 may be configured to e.g., analyze computing platform 60 and provide reports to third-parties concerning the same. Further and since security-relevant subsystems 226 may monitor and log activity with respect to computing platform 60 and computing platform 60 may include a wide range of computing devices (e.g., server computers 200, 202, desktop computer 204, laptop computer 206, network 208, web application firewall 212, wireless access point 214, switch 216, router 218, gateway 220, NAS 222, and API Gateway 224), threat mitigation process 10 may provide holistic monitoring of the entirety of computing platform 60 (e.g., both central devices and end point devices), generally referred to as XDR (extended detection and response) functionality. As defined by analyst firm Gartner, Extended Detection and Response (XDR) is "a SaaS-based, vendor-specific, security threat detection and incident response tool that natively integrates multiple security products into a cohesive security operations system that unifies all licensed components."

Figure 4:
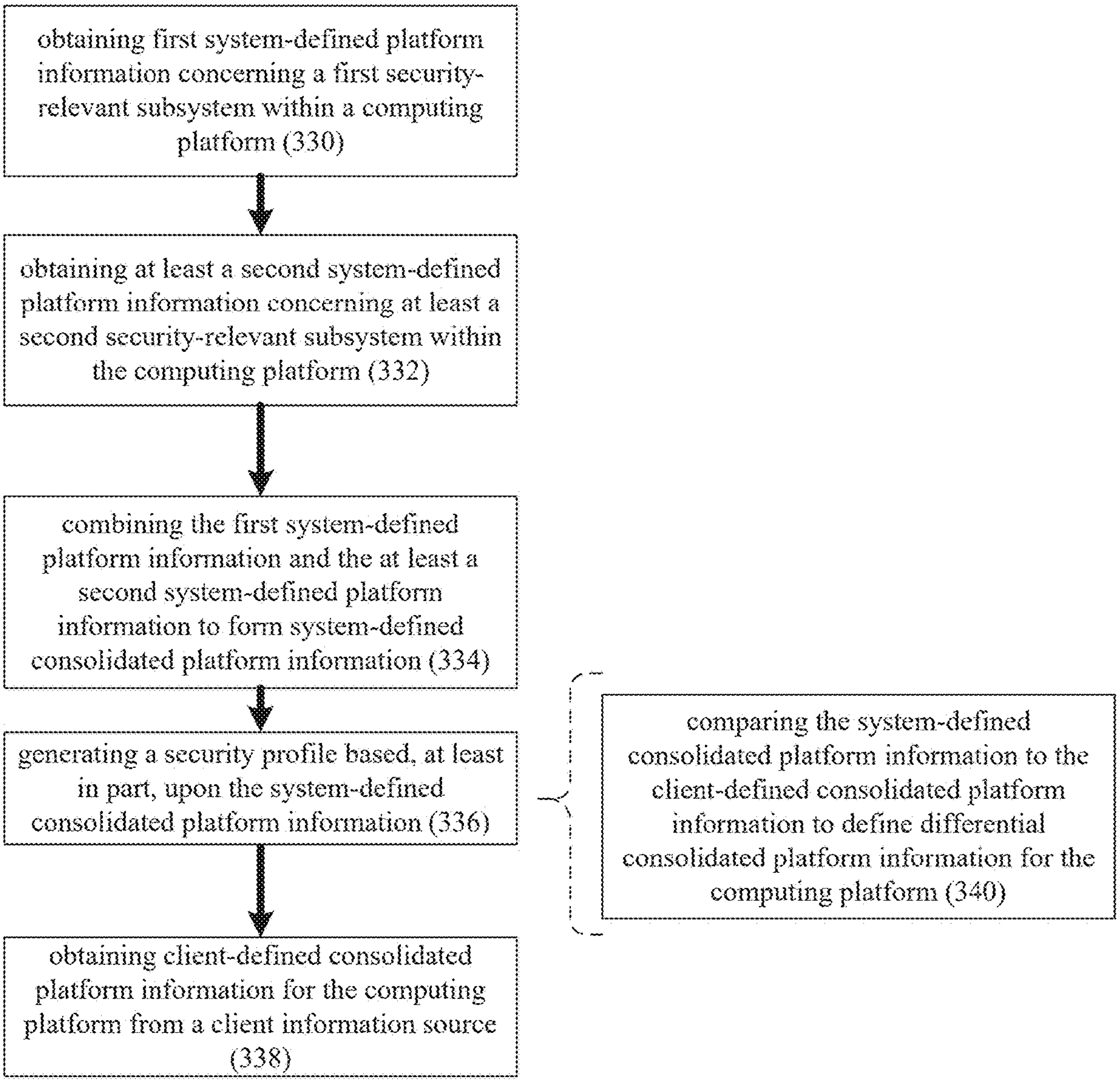
FIG. 4 is a flowchart of an implementation of the threat mitigation process of FIG. 1 according to an embodiment of the present disclosure.
Figure 5:
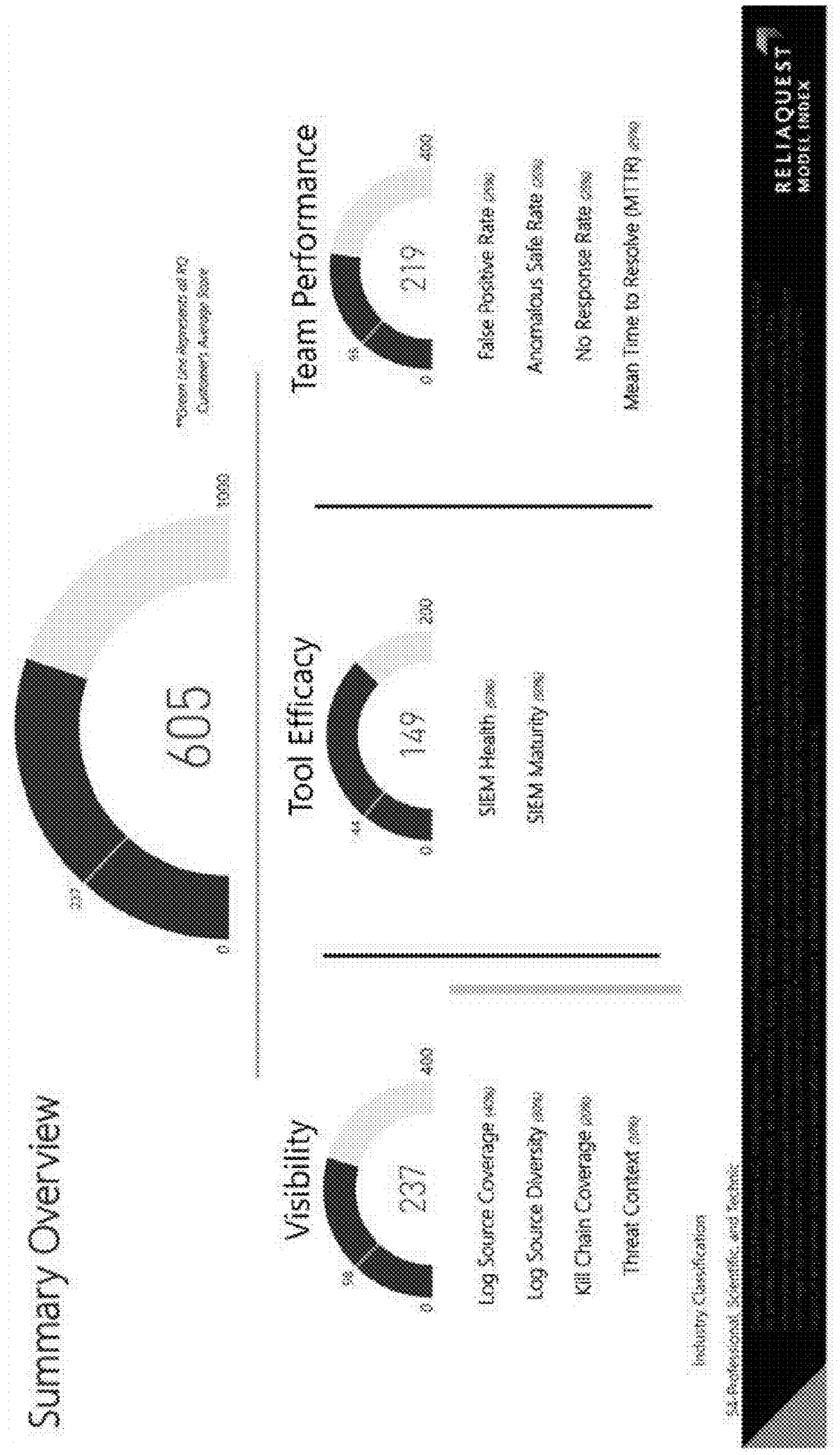
FIGS. 5-6 are diagrammatic views of screens rendered by the threat mitigation process of FIG. 1 according to an embodiment of the present disclosure.
Figure 6:
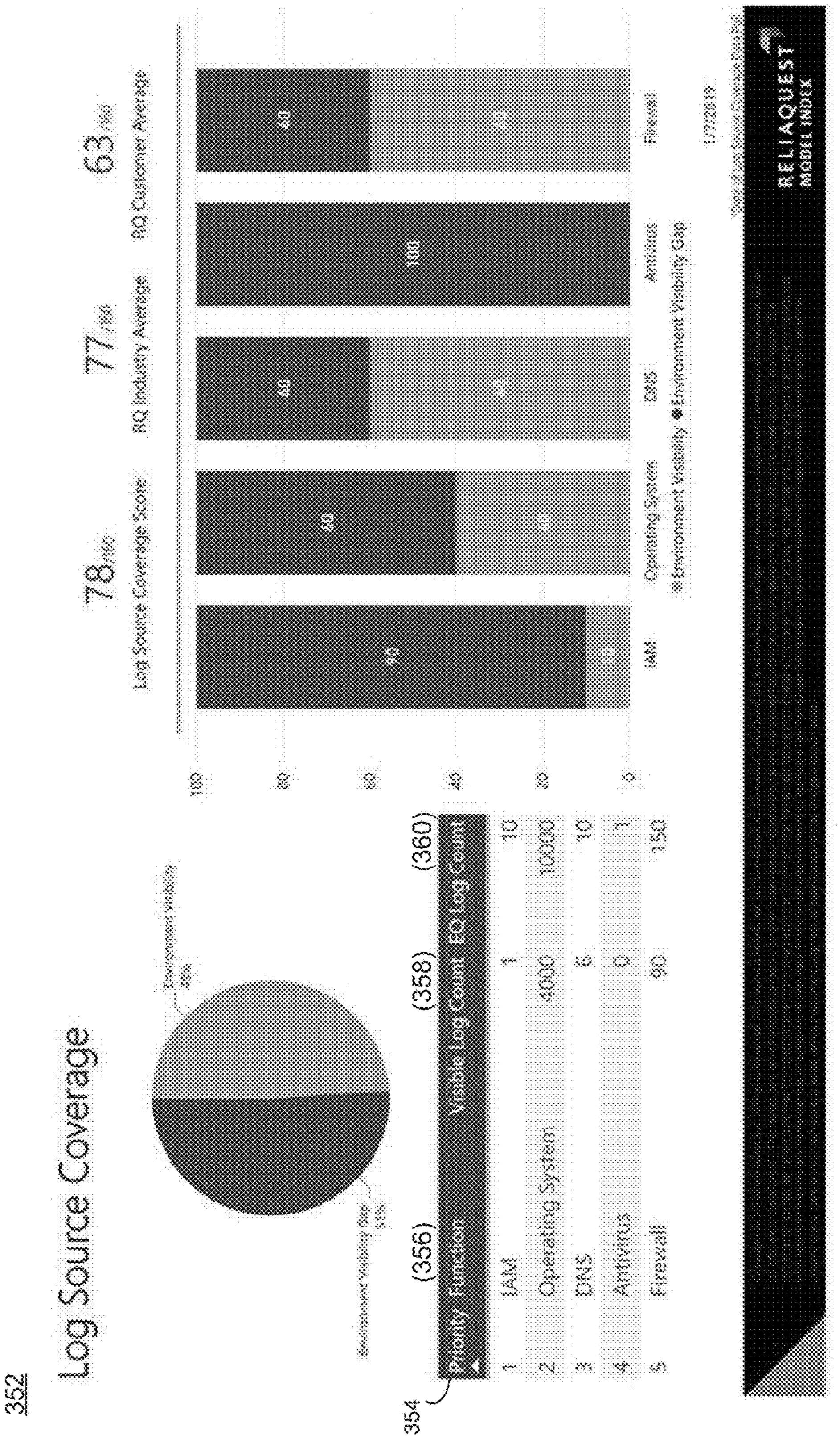

Referring also to FIGS. 4-6, threat mitigation process 10 may be configured to obtain and combine information from multiple security-relevant subsystem to generate a security profile for computing platform 60. For example, threat mitigation process 10 may obtain 330 first system-defined platform information (e.g., system-defined platform information 232) concerning a first security-relevant subsystem (e.g., the number of operating systems deployed) within computing platform 60 and may obtain 332 at least a second system-defined platform information (e.g., system-defined platform information 234) concerning at least a second security-relevant subsystem (e.g., the number of antivirus systems deployed) within computing platform 60.

The first system-defined platform information (e.g., system-defined platform information 232) and the at least a second system-defined platform information (e.g., system-defined platform information 234) may be obtained from one or more log files defined for computing platform 60.

Specifically, system-defined platform information 232 and/or system-defined platform information 234 may be obtained from SIEM system 230, wherein (and as discussed above) SIEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

Alternatively, the first system-defined platform information (e.g., system-defined platform information 232) and the at least a second system-defined platform information (e.g., system-defined platform information 234) may be obtained from the first security-relevant subsystem (e.g., the operating systems themselves) and the at least a second security-relevant subsystem (e.g., the antivirus systems themselves). Specifically, system-defined platform information 232 and/or system-defined platform information 234 may be obtained directly from the security-relevant subsystems (e.g., the operating systems and/or the antivirus systems), which (as discussed above) may be configured to self-document their activity.

Threat mitigation process 10 may combine 334 the first system-defined platform information (e.g., system-defined platform information 232) and the at least a second system-defined platform information (e.g., system-defined platform information 234) to form system-defined consolidated platform information 236. Accordingly and in this example, system-defined consolidated platform information 236 may independently define the security-relevant subsystems (e.g., security-relevant subsystems 226) present on computing platform 60.

Threat mitigation process 10 may generate 336 a security profile (e.g., security profile 350) based, at least in part, upon system-defined consolidated platform information 236. Through the use of security profile (e.g., security profile 350), the user/owner/operator of computing platform 60 may be able to see that e.g., they have a security score of 605 out of a possible score of 1,000, wherein the average customer has a security score of 237. While security profile 350 in shown in the example to include several indicators that may enable a user to compare (in this example) computing platform 60 to other computing platforms, this is for illustrative purposes only and is not intended to be a limitation of this disclosure, as it is understood that other configurations are possible and are considered to be within the scope of this disclosure.

Naturally, the format, appearance and content of security profile 350 may be varied greatly depending upon the design criteria and anticipated performance/use of threat mitigation process 10. Accordingly, the appearance, format, completeness and content of security profile 350 is for illustrative purposes only and is not intended to be a limitation of this disclosure, as other configurations are possible and are considered to be within the scope of this disclosure. For example, content may be added to security profile 350, removed from security profile 350, and/or reformatted within security profile 350.

Additionally, threat mitigation process 10 may obtain 338 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate STEM functionality). Accordingly and in this example, client-defined consolidated platform information 238 may define the security-relevant subsystems (e.g., security-relevant subsystems 226) that the client believes are present on computing platform 60.

When generating 336 a security profile (e.g., security profile 350) based, at least in part, upon system-defined consolidated platform information 236, threat mitigation process 10 may compare 340 the system-defined consolidated platform information (e.g., system-defined consolidated platform information 236) to the client-defined consolidated platform information (e.g., client-defined consolidated platform information 238) to define differential consolidated platform information 352 for computing platform 60.

Differential consolidated platform information 352 may include comparison table 354 that e.g., compares computing platform 60 to other computing platforms. For example and in this particular implementation of differential consolidated platform information 352, comparison table 354 is shown to include three columns, namely: security-relevant subsystem column 356 (that identifies the security-relevant subsystems in question); system-defined consolidated platform information column 358 (that is based upon system-defined consolidated platform information 236 and independently defines what security-relevant subsystems are present on computing platform 60); and client-defined consolidated platform column 360 (that is based upon client-defined platform information 238 and defines what security-relevant subsystems the client believes are present on computing platform 60). As shown within comparison table 354, there are considerable differences between that is actually present on computing platform 60 and what is believed to be present on computing platform 60 (e.g., 1 IAM system vs. 10 IAM systems; 4,000 operating systems vs. 10,000 operating systems, 6 DNS systems vs. 10 DNS systems; 0 antivirus systems vs. 1 antivirus system, and 90 firewalls vs. 150 firewalls).

Naturally, the format, appearance and content of differential consolidated platform information 352 may be varied greatly depending upon the design criteria and anticipated performance/use of threat mitigation process 10. Accordingly, the appearance, format, completeness and content of differential consolidated platform information 352 is for illustrative purposes only and is not intended to be a limitation of this disclosure, as other configurations are possible and are considered to be within the scope of this disclosure. For example, content may be added to differential consolidated platform information 352, removed from differential consolidated platform information 352, and/or reformatted within differential consolidated platform information 352.

Figure 7:
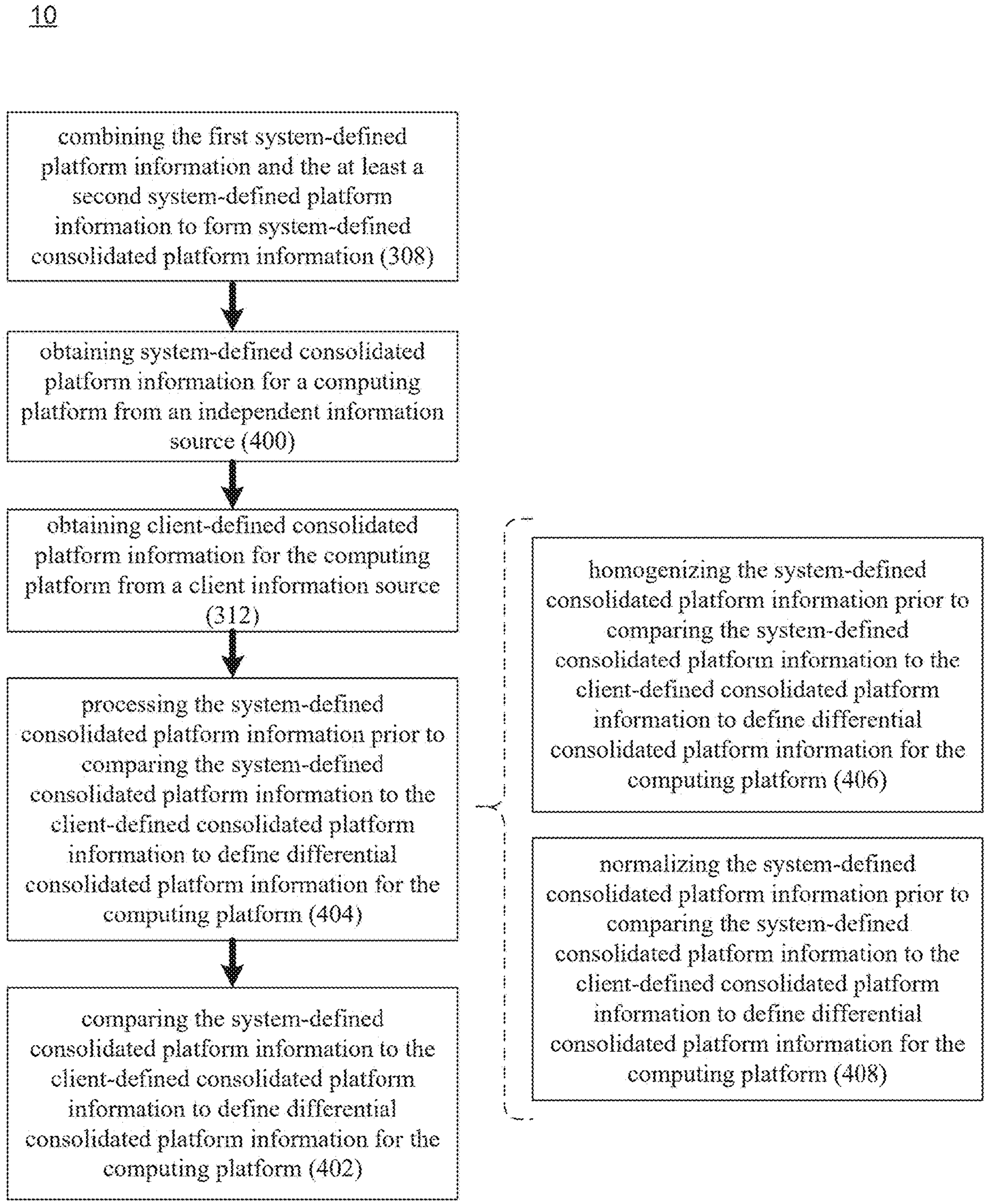
FIGS. 7-9 are flowcharts of other implementations of the threat mitigation process of FIG. 1 according to an embodiment of the present disclosure.

Referring also to FIG. 7, threat mitigation process 10 may be configured to compare what security relevant subsystems are actually included within computing platform 60 versus what security relevant subsystems were believed to be included within computing platform 60. As discussed above, threat mitigation process 10 may combine 334 the first system-defined platform information (e.g., system-defined platform information 232) and the at least a second system-defined platform information (e.g., system-defined platform information 234) to form system-defined consolidated platform information 236.

Threat mitigation process 10 may obtain 400 system-defined consolidated platform information 236 for computing platform 60 from an independent information source, examples of which may include but are not limited to: one or more log files defined for computing platform 60 (e.g., such as those maintained by STEM system 230); and two or more security-relevant subsystems (e.g., directly from the operating system security-relevant subsystem and the antivirus security-relevant subsystem) deployed within computing platform 60.

Further and as discussed above, threat mitigation process 10 may obtain 338 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate SIEM functionality).

Additionally and as discussed above, threat mitigation process 10 may compare 402 system-defined consolidated platform information 236 to client-defined consolidated platform information 238 to define differential consolidated platform information 352 for computing platform 60, wherein differential consolidated platform information 352 may include comparison table 354 that e.g., compares computing platform 60 to other computing platforms.

Threat mitigation process 10 may process 404 system-defined consolidated platform information 236 prior to comparing 402 system-defined consolidated platform information 236 to client-defined consolidated platform information 238 to define differential consolidated platform information 352 for computing platform 60. Specifically, threat mitigation process 10 may process 404 system-defined consolidated platform information 236 so that it is comparable to client-defined consolidated platform information 238.

For example and when processing 404 system-defined consolidated platform information 236, threat mitigation process 10 may homogenize 406 system-defined consolidated platform information 236 prior to comparing 402 system-defined consolidated platform information 236 to client-defined consolidated platform information 238 to define differential consolidated platform information 352 for computing platform 60. Such homogenization 406 may result in system-defined consolidated platform information 236 and client-defined consolidated platform information 238 being comparable to each other (e.g., to accommodate for differing data nomenclatures/headers).

Further and when processing 404 system-defined consolidated platform information 236, threat mitigation process 10 may normalize 408 system-defined consolidated platform information 236 prior to comparing 402 system-defined consolidated platform information 236 to client-defined consolidated platform information 238 to define differential consolidated platform information 352 for computing platform 60 (e.g., to accommodate for data differing scales/ranges).

Figure 8:
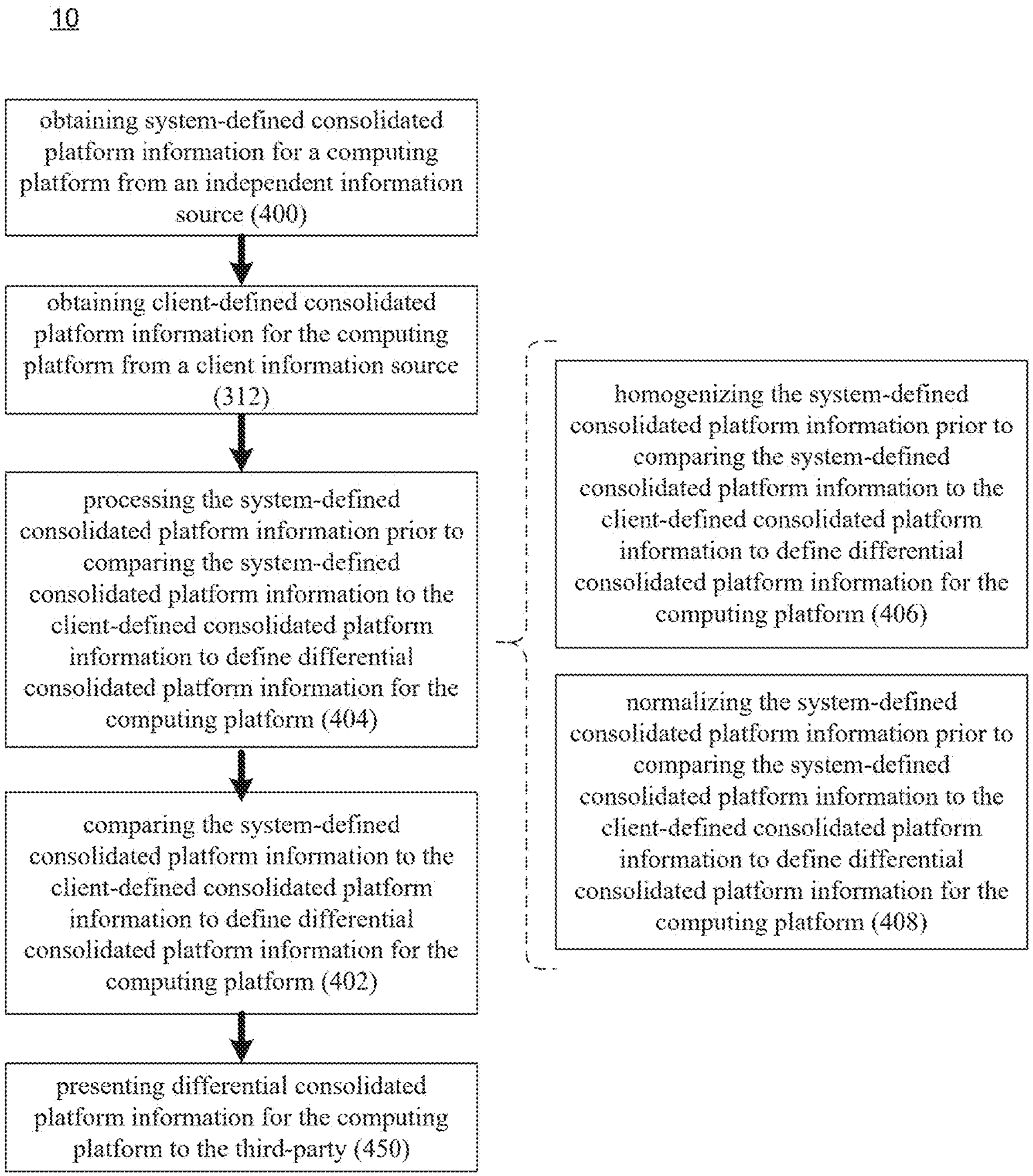

Referring also to FIG. 8, threat mitigation process 10 may be configured to compare what security relevant subsystems are actually included within computing platform 60 versus what security relevant subsystems were believed to be included within computing platform 60.

As discussed above, threat mitigation process 10 may obtain 400 system-defined consolidated platform information 236 for computing platform 60 from an independent information source, examples of which may include but are not limited to: one or more log files defined for computing platform 60 (e.g., such as those maintained by SIEM system 230); and two or more security-relevant subsystems (e.g., directly from the operating system security-relevant subsystem and the antivirus security-relevant subsystem) deployed within computing platform 60

Further and as discussed above, threat mitigation process 10 may obtain 338 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate STEM functionality).

Threat mitigation process 10 may present 450 differential consolidated platform information 352 for computing platform 60 to a third-party, examples of which may include but are not limited to the user/owner/operator of computing platform 60.

Additionally and as discussed above, threat mitigation process 10 may compare 402 system-defined consolidated platform information 236 to client-defined consolidated platform information 238 to define differential consolidated platform information 352 for computing platform 60, wherein differential consolidated platform information 352 may include comparison table 354 that e.g., compares computing platform 60 to other computing platforms, wherein (and as discussed above) threat mitigation process 10 may process 404 (e.g., via homogenizing 406 and/or normalizing 408) system-defined consolidated platform information 236 prior to comparing 402 system-defined consolidated platform information 236 to client-defined consolidated platform information 236 to define differential consolidated platform information 352 for computing platform 60.

Computing Platform Analysis & Recommendation

As will be discussed below in greater detail, threat mitigation process 10 may be configured to e.g., analyze & display the vulnerabilities of computing platform 60.

Figure 9:
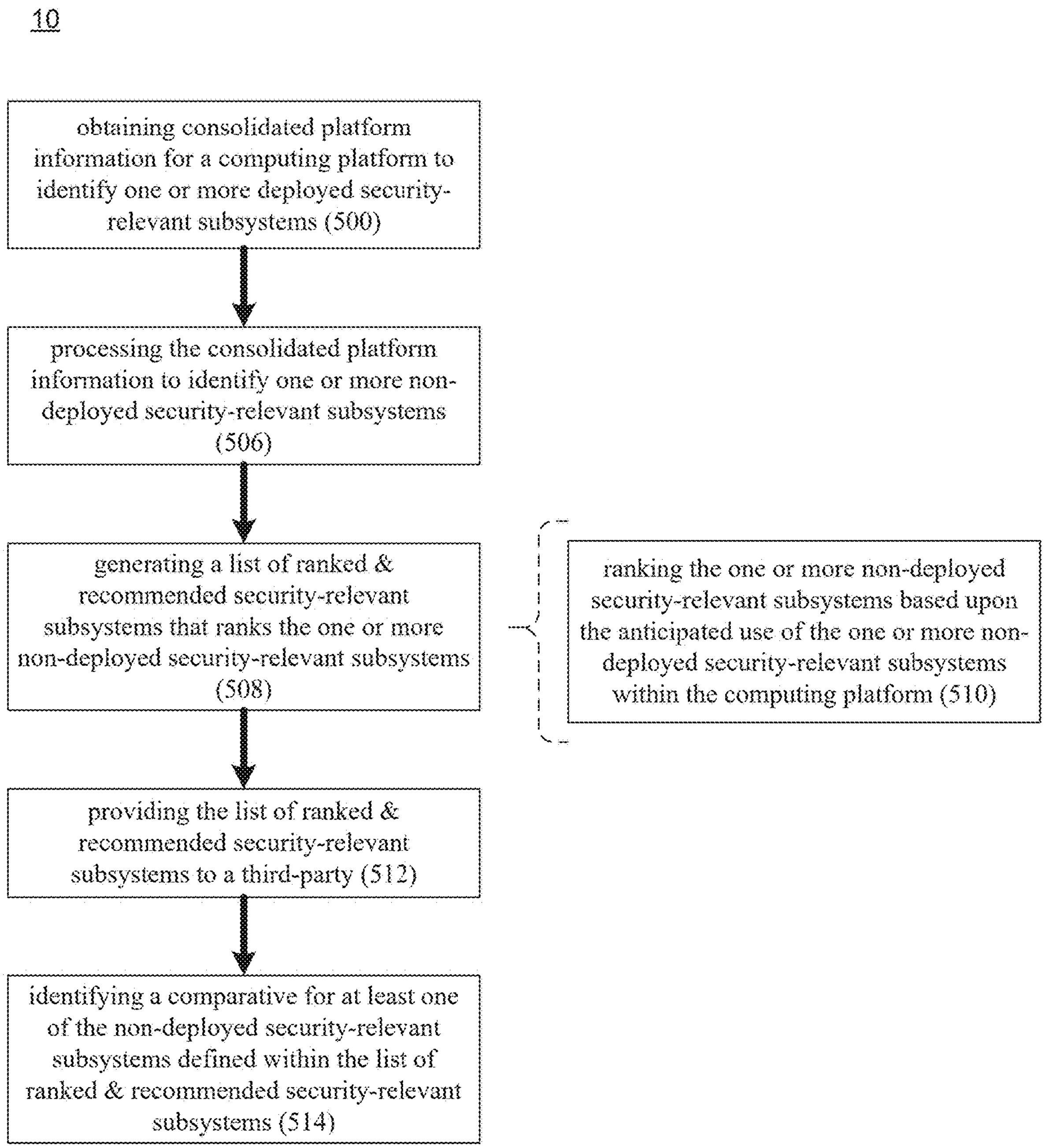

Referring also to FIG. 9, threat mitigation process 10 may be configured to make recommendations concerning security relevant subsystems that are missing from computing platform 60. As discussed above, threat mitigation process 10 may obtain 500 consolidated platform information for computing platform 60 to identify one or more deployed security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform). This consolidated platform information may be obtained from an independent information source (e.g., such as SIEM system 230 that may provide system-defined consolidated platform information 236) and/or may be obtained from a client information source (e.g., such as questionnaires 240 that may provide client-defined consolidated platform information 238).

Figure 10:
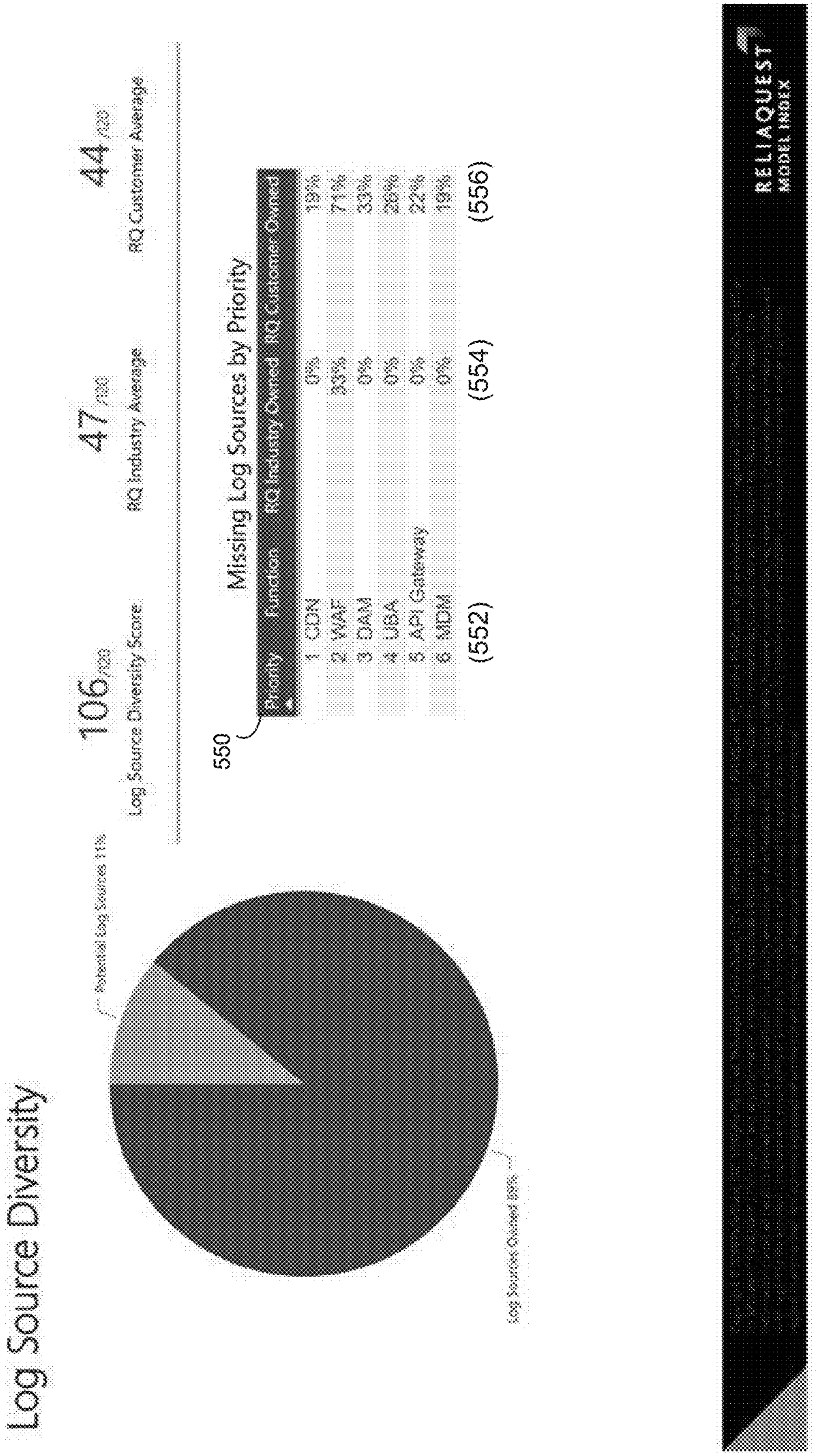
FIG. 10 is a diagrammatic view of a screen rendered by the threat mitigation process of FIG. 1 according to an embodiment of the present disclosure.

Referring also to FIG. 10, threat mitigation process 10 may process 506 the consolidated platform information (e.g., system-defined consolidated platform information 236 and/or client-defined consolidated platform information 238) to identify one or more non-deployed security-relevant subsystems (within computing platform 60) and may then generate 508 a list of ranked & recommended security-relevant subsystems (e.g., non-deployed security-relevant subsystem list 550) that ranks the one or more non-deployed security-relevant subsystems.

For this particular illustrative example, non-deployed security-relevant subsystem list 550 is shown to include column 552 that identifies six non-deployed security-relevant subsystems, namely: a CDN subsystem, a WAF subsystem, a DAM subsystem; a UBA subsystem; an API subsystem, and an MDM subsystem.

When generating 508 a list of ranked & recommended security-relevant subsystems (e.g., non-deployed security-relevant subsystem list 550) that ranks the one or more non-deployed security-relevant subsystems, threat mitigation process 10 may rank 510 the one or more non-deployed security-relevant subsystems (e.g., a CDN subsystem, a WAF subsystem, a DAM subsystem; a UBA subsystem; a API subsystem, and an MDM subsystem) based upon the anticipated use of the one or more non-deployed security-relevant subsystems within computing platform 60. This ranking 510 of the non-deployed security-relevant subsystems (e.g., a CDN subsystem, a WAF subsystem, a DAM subsystem; a UBA subsystem; a API subsystem, and an MDM subsystem) may be agnostic in nature and may be based on the functionality/effectiveness of the non-deployed security-relevant subsystems and the anticipated manner in which their implementation may impact the functionality/security of computing platform 60.

Threat mitigation process 10 may provide 512 the list of ranked & recommended security-relevant subsystems (e.g., non-deployed security-relevant subsystem list 550) to a third-party, examples of which may include but are not limited to a user/owner/operator of computing platform 60.

Additionally, threat mitigation process 10 may identify 514 a comparative for at least one of the non-deployed security-relevant subsystems (e.g., a CDN subsystem, a WAF subsystem, a DAM subsystem; a UBA subsystem; an API subsystem, and an MDM subsystem) defined within the list of ranked & recommended security-relevant subsystems (e.g., non-deployed security-relevant subsystem list 550). This comparative may include vendor customers in a specific industry comparative and/or vendor customers in any industry comparative.

For example and in addition to column 552, non-deployed security-relevant subsystem list 550 may include columns 554, 556 for defining the comparatives for the six non-deployed security-relevant subsystems, namely: a CDN subsystem, a WAF subsystem, a DAM subsystem; a UBA subsystem; an API subsystem, and an MDM subsystem. Specifically, column 554 is shown to define comparatives concerning vendor customers that own the non-deployed security-relevant subsystems in a specific industry (i.e., the same industry as the user/owner/operator of computing platform 60). Additionally, column 556 is shown to define comparatives concerning vendor customers that own the non-deployed security-relevant subsystems in any industry (i.e., not necessarily the same industry as the user/owner/operator of computing platform 60). For example and concerning the comparatives of the WAF subsystem: 33% of the vendor customers in the same industry as the user/owner/operator of computing platform 60 deploy a WAF subsystem; while 71% of the vendor customers in any industry deploy a WAF subsystem.

Naturally, the format, appearance and content of non-deployed security-relevant subsystem list 550 may be varied greatly depending upon the design criteria and anticipated performance/use of threat mitigation process 10. Accordingly, the appearance, format, completeness and content of non-deployed security-relevant subsystem list 550 is for illustrative purposes only and is not intended to be a limitation of this disclosure, as other configurations are possible and are considered to be within the scope of this disclosure. For example, content may be added to non-deployed security-relevant subsystem list 550, removed from non-deployed security-relevant subsystem list 550, and/or reformatted within non-deployed security-relevant subsystem list 550.

Figure 11:
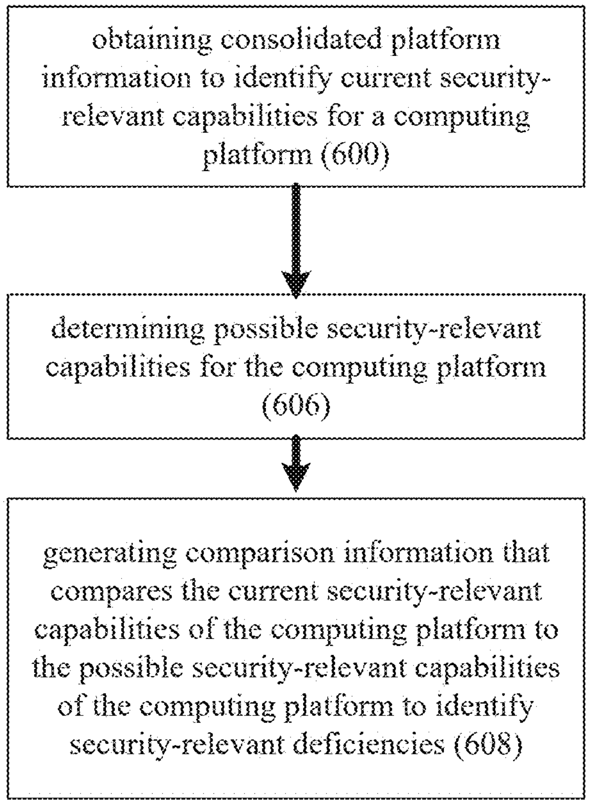
FIG. 11 is a flowchart of another implementation of the threat mitigation process of FIG. 1 according to an embodiment of the present disclosure.

Referring also to FIG. 11, threat mitigation process 10 may be configured to compare the current capabilities to the possible capabilities of computing platform 60. As discussed above, threat mitigation process 10 may obtain 600 consolidated platform information to identify current security-relevant capabilities for computing platform 60. This consolidated platform information may be obtained from an independent information source (e.g., such as STEM system 230 that may provide system-defined consolidated platform information 236) and/or may be obtained from a client information source (e.g., such as questionnaires 240 that may provide client-defined consolidated platform information 238. Threat mitigation process 10 may then determine 606 possible security-relevant capabilities for computing platform 60 (i.e., the difference between the current security-relevant capabilities of computing platform 60 and the possible security-relevant capabilities of computing platform 60. For example, the possible security-relevant capabilities may concern the possible security-relevant capabilities of computing platform 60 using the currently-deployed security-relevant subsystems. Additionally/alternatively, the possible security-relevant capabilities may concern the possible security-relevant capabilities of computing platform 60 using one or more supplemental security-relevant subsystems.

Figure 12:
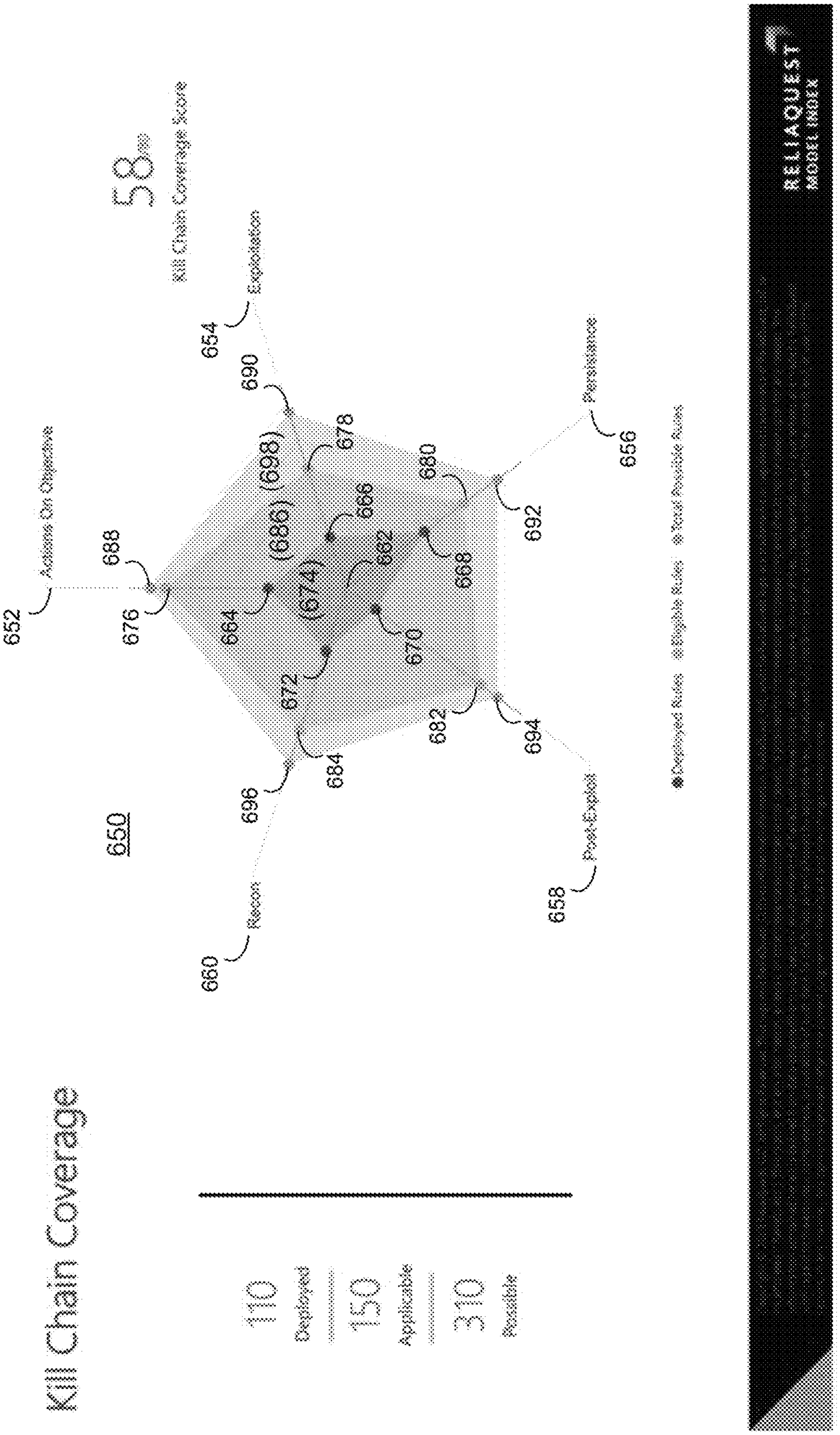
FIG. 12 is a diagrammatic view of a screen rendered by the threat mitigation process of FIG. 1 according to an embodiment of the present disclosure.

Referring also to FIG. 12 and as will be explained below, threat mitigation process 10 may generate 608 comparison information 650 that compares the current security-relevant capabilities of computing platform 60 to the possible security-relevant capabilities of computing platform 60 to identify security-relevant deficiencies. Comparison information 650 may include graphical comparison information, such as multi-axial graphical comparison information that simultaneously illustrates a plurality of security-relevant deficiencies.

For example, comparison information 650 may define (in this particular illustrative example) graphical comparison information that include five axes (e.g. axes 652, 654, 656, 658, 660) that correspond to five particular types of computer threats. Comparison information 650 includes origin 662, the point at which computing platform 60 has no protection with respect to any of the five types of computer threats that correspond to axes 652, 654, 656, 658, 660. Accordingly, as the capabilities of computing platform 60 are increased to counter a particular type of computer threat, the data point along the corresponding axis is proportionately displaced from origin 652.

As discussed above, threat mitigation process 10 may obtain 600 consolidated platform information to identify current security-relevant capabilities for computing platform 60. Concerning such current security-relevant capabilities for computing platform 60, these current security-relevant capabilities are defined by data points 664, 666, 668, 670, 672, the combination of which define bounded area 674. Bounded area 674 (in this example) defines the current security-relevant capabilities of computing platform 60.

Further and as discussed above, threat mitigation process 10 may determine 606 possible security-relevant capabilities for computing platform 60 (i.e., the difference between the current security-relevant capabilities of computing platform 60 and the possible security-relevant capabilities of computing platform 60.

As discussed above, the possible security-relevant capabilities may concern the possible security-relevant capabilities of computing platform 60 using the currently-deployed security-relevant subsystems. For example, assume that the currently-deployed security relevant subsystems are not currently being utilized to their full potential. Accordingly, certain currently-deployed security relevant subsystems may have certain features that are available but are not utilized and/or disabled. Further, certain currently-deployed security relevant subsystems may have expanded features available if additional licensing fees are paid. Therefore and concerning such possible security-relevant capabilities of computing platform 60 using the currently-deployed security-relevant subsystems, data points 676, 678, 680, 682, 684 may define bounded area 686 (which represents the full capabilities of the currently-deployed security-relevant subsystems within computing platform 60).

Further and as discussed above, the possible security-relevant capabilities may concern the possible security-relevant capabilities of computing platform 60 using one or more supplemental security-relevant subsystems. For example, assume that supplemental security-relevant subsystems are available for the deployment within computing platform 60. Therefore and concerning such possible security-relevant capabilities of computing platform 60 using such supplemental security-relevant subsystems, data points 688, 690, 692, 694, 696 may define bounded area 698 (which represents the total capabilities of computing platform 60 when utilizing the full capabilities of the currently-deployed security-relevant subsystems and any supplemental security-relevant subsystems).

Naturally, the format, appearance and content of comparison information 650 may be varied greatly depending upon the design criteria and anticipated performance/use of threat mitigation process 10. Accordingly, the appearance, format, completeness and content of comparison information 650 is for illustrative purposes only and is not intended to be a limitation of this disclosure, as other configurations are possible and are considered to be within the scope of this disclosure. For example, content may be added to comparison information 650, removed from comparison information 650, and/or reformatted within comparison information 650.

Figure 13:
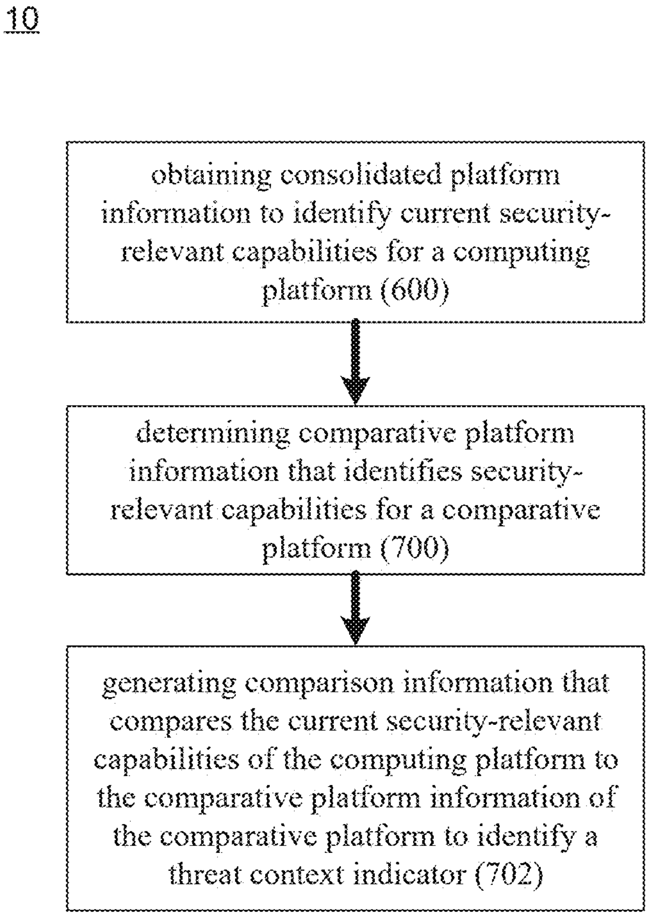
FIG. 13 is a flowchart of another implementation of the threat mitigation process of FIG. 1 according to an embodiment of the present disclosure.

Referring also to FIG. 13, threat mitigation process 10 may be configured to generate a threat context score for computing platform 60. As discussed above, threat mitigation process 10 may obtain 600 consolidated platform information to identify current security-relevant capabilities for computing platform 60. This consolidated platform information may be obtained from an independent information source (e.g., such as SIEM system 230 that may provide system-defined consolidated platform information 236) and/or may be obtained from a client information source (e.g., such as questionnaires 240 that may provide client-defined consolidated platform information 238. As will be discussed below in greater detail, threat mitigation process 10 may determine 700 comparative platform information that identifies security-relevant capabilities for a comparative platform, wherein this comparative platform information may concern vendor customers in a specific industry (i.e., the same industry as the user/owner/operator of computing platform 60) and/or vendor customers in any industry (i.e., not necessarily the same industry as the user/owner/operator of computing platform 60).

Figure 14:
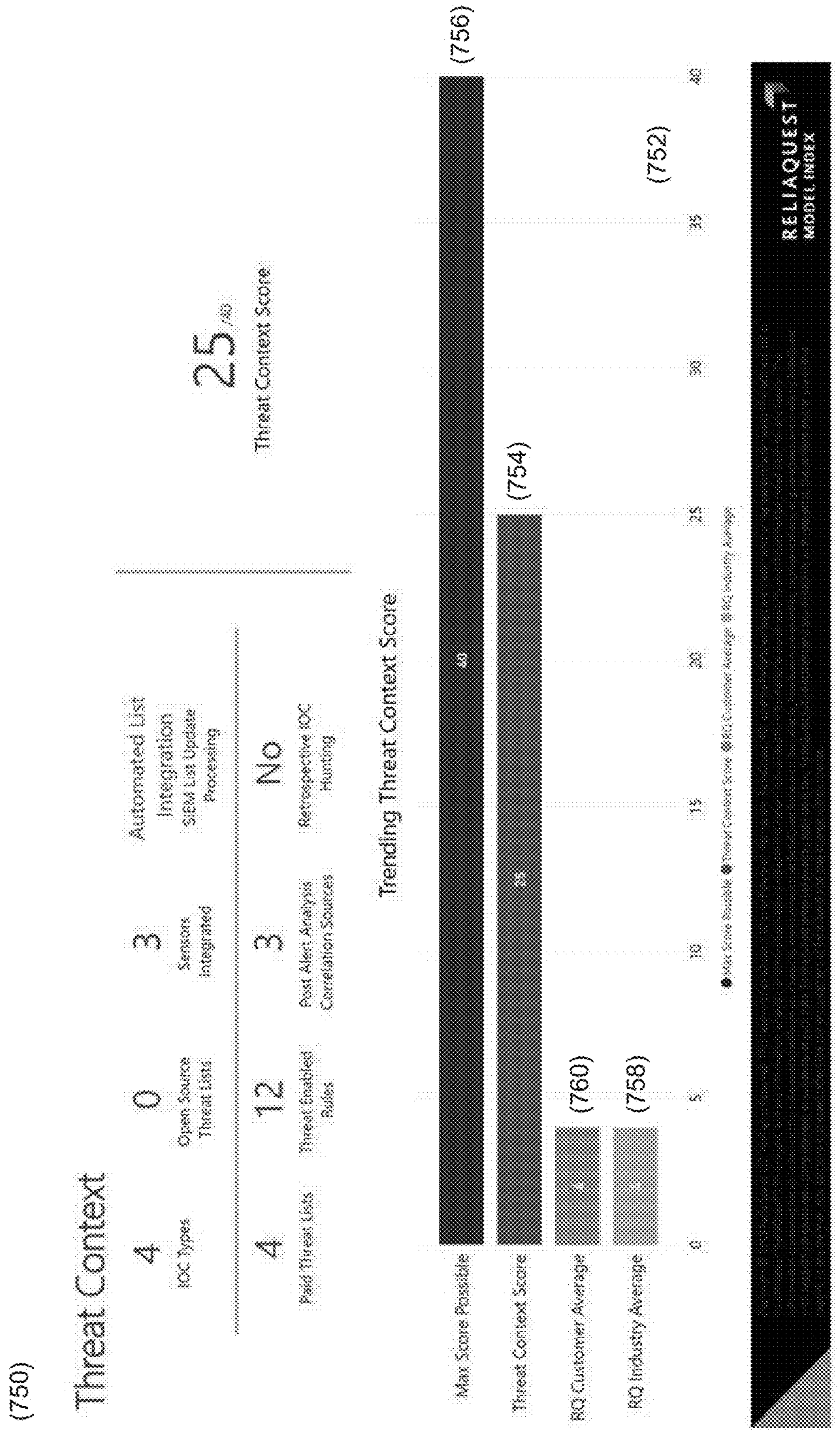
FIG. 14 is a diagrammatic view of a screen rendered by the threat mitigation process of FIG. 1 according to an embodiment of the present disclosure.

Referring also to FIG. 14 and as will be discussed below, threat mitigation process 10 may generate 702 comparison information 750 that compares the current security-relevant capabilities of computing platform 60 to the comparative platform information determined 700 for the comparative platform to identify a threat context indicator for computing platform 60, wherein comparison information 750 may include graphical comparison information 752.

Graphical comparison information 752 (which in this particular example is a bar chart) may identify one or more of: a current threat context score 754 for a client (e.g., the user/owner/operator of computing platform 60); a maximum possible threat context score 756 for the client (e.g., the user/owner/operator of computing platform 60); a threat context score 758 for one or more vendor customers in a specific industry (i.e., the same industry as the user/owner/operator of computing platform 60); and a threat context score 760 for one or more vendor customers in any industry (i.e., not necessarily the same industry as the user/owner/operator of computing platform 60).

Naturally, the format, appearance and content of comparison information 750 may be varied greatly depending upon the design criteria and anticipated performance/use of threat mitigation process 10. Accordingly, the appearance, format, completeness and content of comparison information 750 is for illustrative purposes only and is not intended to be a limitation of this disclosure, as other configurations are possible and are considered to be within the scope of this disclosure. For example, content may be added to comparison information 750, removed from comparison information 750, and/or reformatted within comparison information 750.

Computing Platform Monitoring & Mitigation

As will be discussed below in greater detail, threat mitigation process 10 may be configured to e.g., monitor the operation and performance of computing platform 60.

Figure 15:
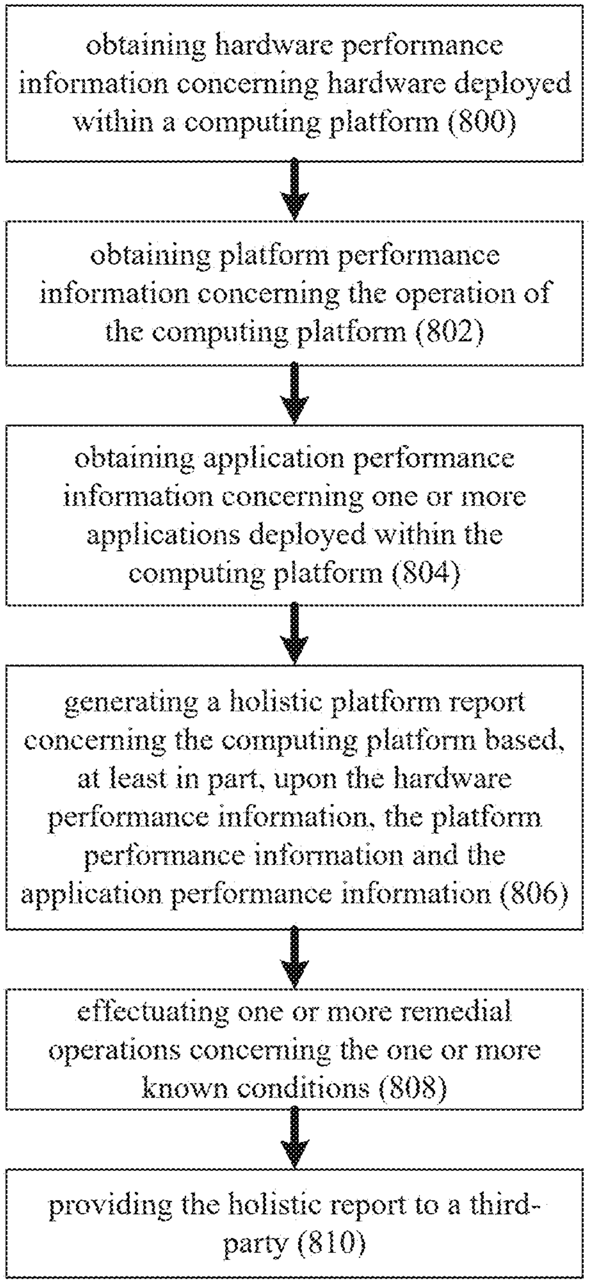
FIG. 15 is a flowchart of another implementation of the threat mitigation process of FIG. 1 according to an embodiment of the present disclosure.

Referring also to FIG. 15, threat mitigation process 10 may be configured to monitor the health of computing platform 60 and provide feedback to a third-party concerning the same. Threat mitigation process 10 may obtain 800 hardware performance information 244 concerning hardware (e.g., server computers, desktop computers, laptop computers, switches, firewalls, routers, gateways, WAPs, and NASs), deployed within computing platform 60. Hardware performance information 244 may concern the operation and/or functionality of one or more hardware systems (e.g., server computers, desktop computers, laptop computers, switches, firewalls, routers, gateways, WAPs, and NASs) deployed within computing platform 60.

Threat mitigation process 10 may obtain 802 platform performance information 246 concerning the operation of computing platform 60. Platform performance information 246 may concern the operation and/or functionality of computing platform 60.

When obtaining 802 platform performance information concerning the operation of computing platform 60, threat mitigation process 10 may (as discussed above): obtain 400 system-defined consolidated platform information 236 for computing platform 60 from an independent information source (e.g., STEM system 230); obtain 338 client-defined consolidated platform information 238 for computing platform 60 from a client information (e.g., questionnaires 240); and present 450 differential consolidated platform information 352 for computing platform 60 to a third-party, examples of which may include but are not limited to the user/owner/operator of computing platform 60.

When obtaining 802 platform performance information concerning the operation of computing platform 60, threat mitigation process 10 may (as discussed above): obtain 500 consolidated platform information for computing platform 60 to identify one or more deployed security-relevant subsystems 226 (e.g., CDN (i.e., Content Delivery Network) systems; DAM (i.e., Database Activity Monitoring) systems; UBA (i.e., User BehaviorAnalytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform); process 506 the consolidated platform information (e.g., system-defined consolidated platform information 236 and/or client-defined consolidated platform information 238) to identify one or more non-deployed security-relevant subsystems (within computing platform 60); generate 508 a list of ranked & recommended security-relevant subsystems (e.g., non-deployed security-relevant subsystem list 550) that ranks the one or more non-deployed security-relevant subsystems; and provide 514 the list of ranked & recommended security-relevant subsystems (e.g., non-deployed security-relevant subsystem list 550) to a third-party, examples of which may include but are not limited to a user/owner/operator of computing platform 60.

When obtaining 802 platform performance information concerning the operation of computing platform 60, threat mitigation process 10 may (as discussed above): obtain 600 consolidated platform information to identify current security-relevant capabilities for the computing platform; determine 606 possible security-relevant capabilities for computing platform 60; and generate 608 comparison information 650 that compares the current security-relevant capabilities of computing platform 60 to the possible security-relevant capabilities of computing platform 60 to identify security-relevant deficiencies.

When obtaining 802 platform performance information concerning the operation of computing platform 60, threat mitigation process 10 may (as discussed above): obtain 600 consolidated platform information to identify current security-relevant capabilities for computing platform 60; determine 700 comparative platform information that identifies security-relevant capabilities for a comparative platform; and generate 702 comparison information 750 that compares the current security-relevant capabilities of computing platform 60 to the comparative platform information determined 700 for the comparative platform to identify a threat context indicator for computing platform 60.

Threat mitigation process 10 may obtain 804 application performance information 248 concerning one or more applications (e.g., operating systems, user applications, security application, and utility application) deployed within computing platform 60. Application performance information 248 may concern the operation and/or functionality of one or more software applications (e.g., operating systems, user applications, security application, and utility application) deployed within computing platform 60.

Figure 16:
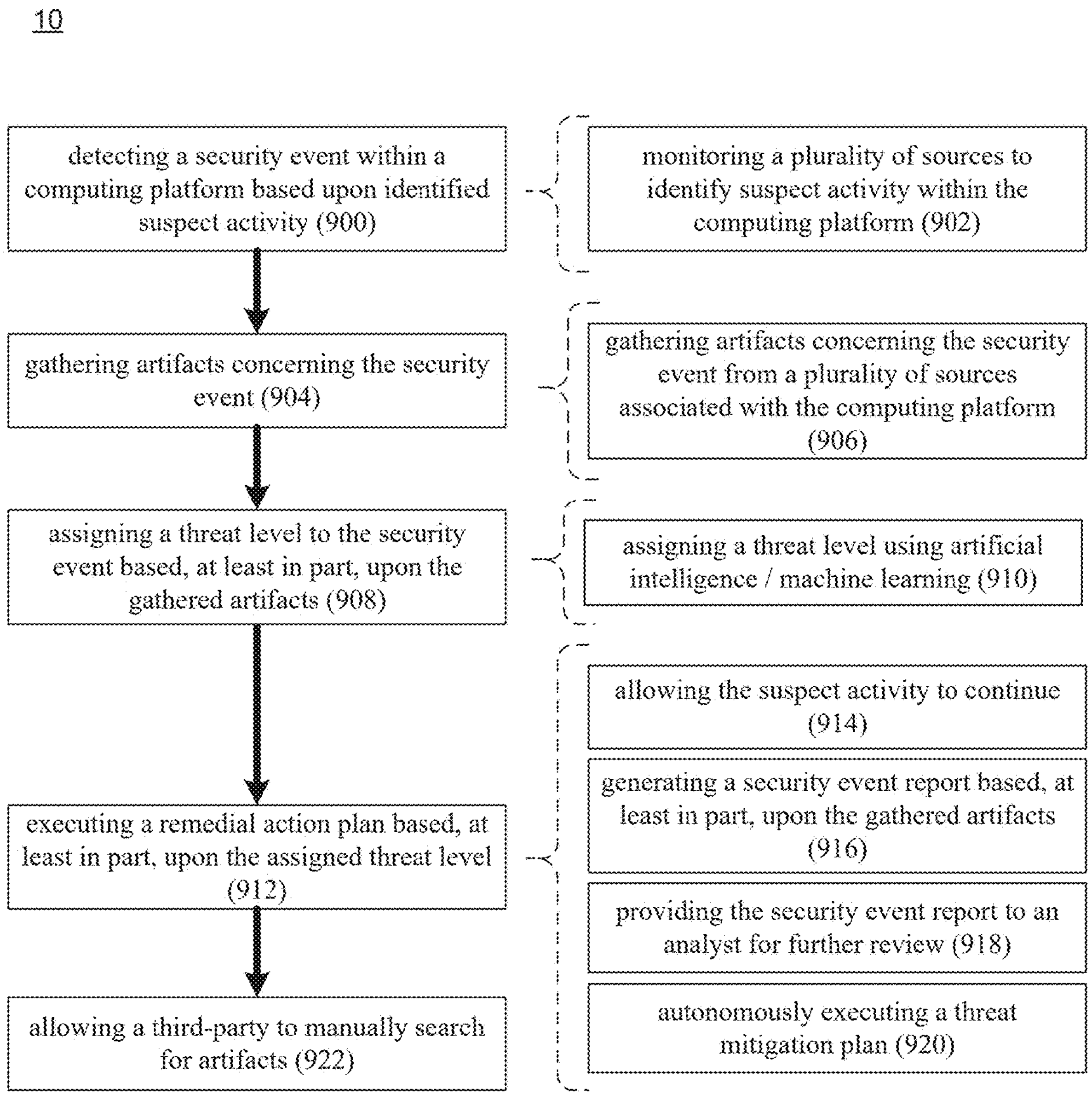
FIG. 16 is a diagrammatic view of screens rendered by the threat mitigation process of FIG. 1 according to an embodiment of the present disclosure.

Referring also to FIG. 16, threat mitigation process 10 may generate 806 holistic platform report (e.g., holistic platform reports 850, 852) concerning computing platform 60 based, at least in part, upon hardware performance information 244, platform performance information 246 and application performance information 248. Threat mitigation process 10 may be configured to receive e.g., hardware performance information 244, platform performance information 246 and application performance information 248 at regular intervals (e.g., continuously, every minute, every ten minutes, etc.).

As illustrated, holistic platform reports 850, 852 may include various pieces of content such as e.g., thought clouds that identity topics/issues with respect to computing platform 60, system logs that memorialize identified issues within computing platform 60, data sources providing information to computing system 60, and so on. The holistic platform report (e.g., holistic platform reports 850, 852) may identify one or more known conditions concerning the computing platform; and threat mitigation process 10 may effectuate 808 one or more remedial operations concerning the one or more known conditions.

For example, assume that the holistic platform report (e.g., holistic platform reports 850, 852) identifies that computing platform 60 is under a DoS (i.e., Denial of Services) attack. In computing, a denial-of-service attack (DoS attack) is a cyber-attack in which the perpetrator seeks to make a machine or network resource unavailable to its intended users by temporarily or indefinitely disrupting services of a host connected to the Internet. Denial of service is typically accomplished by flooding the targeted machine or resource with superfluous requests in an attempt to overload systems and prevent some or all legitimate requests from being fulfilled.

In response to detecting such a DoS attack, threat mitigation process 10 may effectuate 808 one or more remedial operations. For example and with respect to such a DoS attack, threat mitigation process 10 may effectuate 808 e.g., a remedial operation that instructs WAF (i.e., Web Application Firewall) 212 to deny all incoming traffic from the identified attacker based upon e.g., protocols, ports or the originating IP addresses.

Threat mitigation process 10 may also provide 810 the holistic report (e.g., holistic platform reports 850, 852) to a third-party, examples of which may include but are not limited to a user/owner/operator of computing platform 60.

Naturally, the format, appearance and content of the holistic platform report (e.g., holistic platform reports 850, 852) may be varied greatly depending upon the design criteria and anticipated performance/use of threat mitigation process 10. Accordingly, the appearance, format, completeness and content of the holistic platform report (e.g., holistic platform reports 850, 852) is for illustrative purposes only and is not intended to be a limitation of this disclosure, as other configurations are possible and are considered to be within the scope of this disclosure. For example, content may be added to the holistic platform report (e.g., holistic platform reports 850, 852), removed from the holistic platform report (e.g., holistic platform reports 850, 852), and/or reformatted within the holistic platform report (e.g., holistic platform reports 850, 852).

Figure 17:
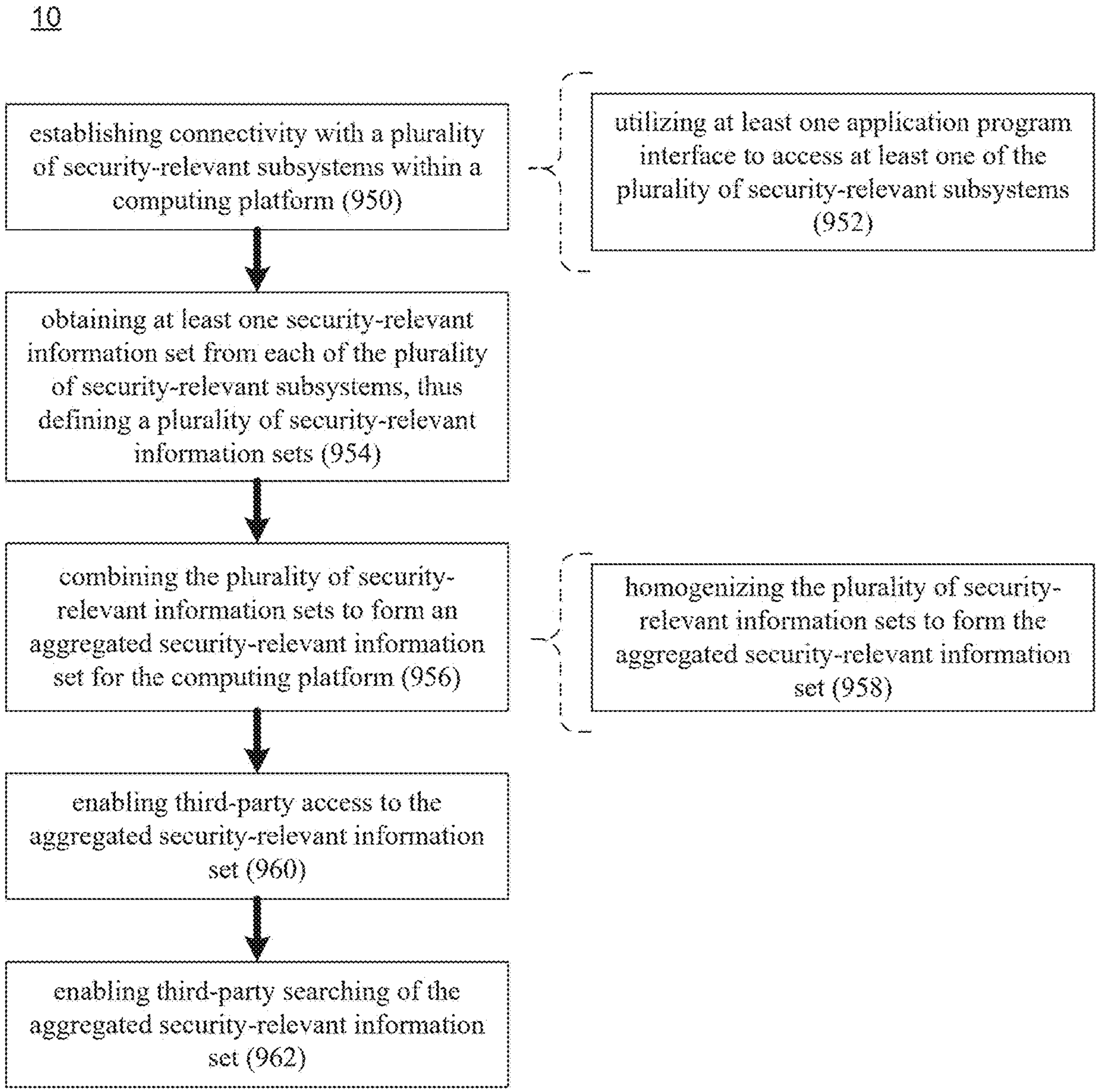
FIGS. 17-23 are flowcharts of other implementations of the threat mitigation process of FIG. 1 according to an embodiment of the present disclosure.

Referring also to FIG. 17, threat mitigation process 10 may be configured to monitor computing platform 60 for the occurrence of a security event and (in the event of such an occurrence) gather artifacts concerning the same. For example, threat mitigation process 10 may detect 900 a security event within computing platform 60 based upon identified suspect activity. Examples of such security events may include but are not limited to: DDoS events, DoS events, phishing events, spamming events, malware events, web attacks, and exploitation events.

When detecting 900 a security event (e.g., DDoS events, DoS events, phishing events, spamming events, malware events, web attacks, and exploitation events) within computing platform 60 based upon identified suspect activity, threat mitigation process 10 may monitor 902 a plurality of sources to identify suspect activity within computing platform 60.

For example, assume that threat mitigation process 10 detects 900 a security event within computing platform 60. Specifically, assume that threat mitigation process 10 is monitoring 902 a plurality of sources (e.g., the various log files maintained by STEM system 230). And by monitoring 902 such sources, assume that threat mitigation process 10 detects 900 the receipt of inbound content (via an API) from a device having an IP address located in Uzbekistan; the subsequent opening of a port within WAF (i.e., Web Application Firewall) 212; and the streaming of content from a computing device within computing platform 60 through that recently-opened port in WAF (i.e., Web Application Firewall) 212 and to a device having an IP address located in Moldova.

Upon detecting 900 such a security event within computing platform 60, threat mitigation process 10 may gather 904 artifacts (e.g., artifacts 250) concerning the above-described security event. When gathering 904 artifacts (e.g., artifacts 250) concerning the above-described security event, threat mitigation process 10 may gather 906 artifacts concerning the security event from a plurality of sources associated with the computing platform, wherein examples of such plurality of sources may include but are not limited to the various log files maintained by SIEM system 230, and the various log files directly maintained by the security-relevant subsystems.

Once the appropriate artifacts (e.g., artifacts 250) are gathered 904, threat mitigation process 10 may assign 908 a threat level to the above-described security event based, at least in part, upon the artifacts (e.g., artifacts 250) gathered 904.

When assigning 908 a threat level to the above-described security event, threat mitigation process 10 may assign 910 a threat level using artificial intelligence/machine learning.

Once assigned 910 a threat level, threat mitigation process 10 may execute 912 a remedial action plan (e., remedial action plan 252) based, at least in part, upon the assigned threat level.

For example and when executing 912 a remedial action plan, threat mitigation process 10 may allow 914 the above-described suspect activity to continue when e.g., threat mitigation process 10 assigns 908 a "low" threat level to the above-described security event (e.g., assuming that it is determined that the user of the local computing device is streaming video of his daughter's graduation to his parents in Moldova).

Further and when executing 912 a remedial action plan, threat mitigation process 10 may generate 916 a security event report (e.g., security event report 254) based, at least in part, upon the artifacts (e.g., artifacts 250) gathered 904; and provide 918 the security event report (e.g., security event report 254) to an analyst (e.g., analyst 256) for further review when e.g., threat mitigation process 10 assigns 908 a "moderate" threat level to the above-described security event (e.g., assuming that it is determined that while the streaming of the content is concerning, the content is low value and the recipient is not a known bad actor).

Further and when executing 912 a remedial action plan, threat mitigation process 10 may autonomously execute 920 a threat mitigation plan (shutting down the stream and closing the port) when e.g., threat mitigation process 10 assigns 908 a "severe" threat level to the above-described security event (e.g., assuming that it is determined that the streaming of the content is very concerning, as the content is high value and the recipient is a known bad actor).

Additionally, threat mitigation process 10 may allow 922 a third-party (e.g., the user/owner/operator of computing platform 60) to manually search for artifacts within computing platform 60. For example, the third-party (e.g., the user/owner/operator of computing platform 60) may be able to search the various information resources include within computing platform 60, examples of which may include but are not limited to the various log files maintained by STEM system 230, and the various log files directly maintained by the security-relevant subsystems within computing platform 60.

Computing Platform Aggregation & Searching

As will be discussed below in greater detail, threat mitigation process 10 may be configured to e.g., aggregate data sets and allow for unified search of those data sets.

Figure 18:
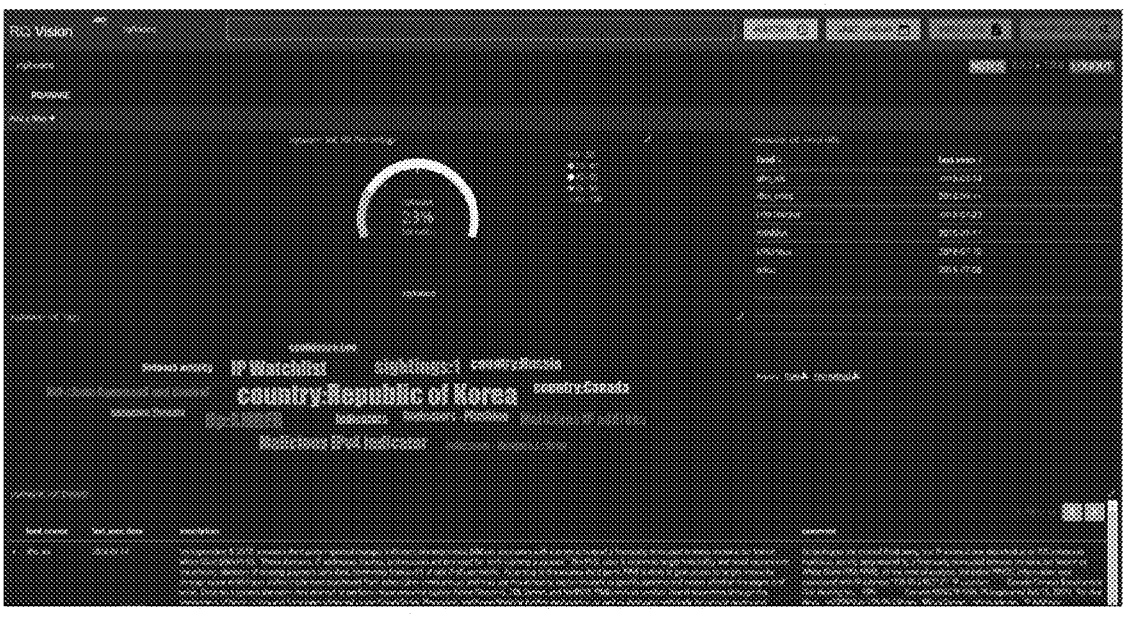
Figure 18:
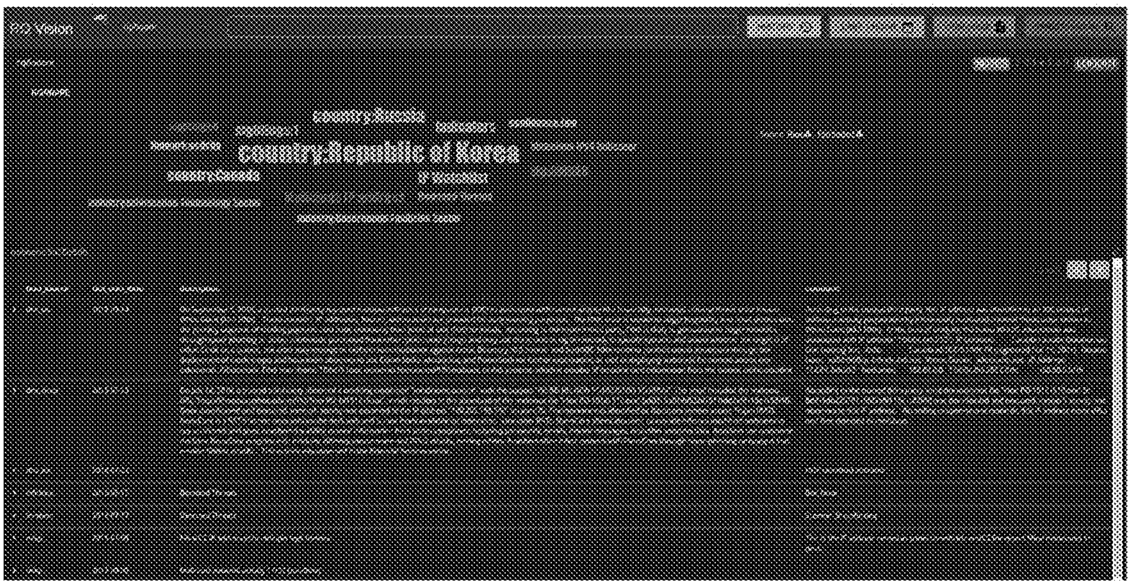

Referring also to FIG. 18, threat mitigation process 10 may be configured to consolidate multiple separate and discrete data sets to form a single, aggregated data set. For example, threat mitigation process 10 may establish 950 connectivity with a plurality of security-relevant subsystems (e.g., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 950 connectivity with a plurality of security-relevant subsystems, threat mitigation process 10 may utilize 952 at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

Threat mitigation process 10 may obtain 954 at least one security-relevant information set (e.g., a log file) from each of the plurality of security-relevant subsystems (e.g., CDN system; DAM system; UBA system; MDM system; IAM system; and DNS system), thus defining plurality of security-relevant information sets 258. As would be expected, plurality of security-relevant information sets 258 may utilize a plurality of different formats and/or a plurality of different nomenclatures. Accordingly, threat mitigation process 10 may combine 956 plurality of security-relevant information sets 258 to form an aggregated security-relevant information set 260 for computing platform 60.

When combining 956 plurality of security-relevant information sets 258 to form aggregated security-relevant information set 260, threat mitigation process 10 may homogenize 958 plurality of security-relevant information sets 258 to form aggregated security-relevant information set 260. For example, threat mitigation process 10 may process one or more of security-relevant information sets 258 so that they all have a common format, a common nomenclature, and/or a common structure.

Once threat mitigation process 10 combines 956 plurality of security-relevant information sets 258 to form an aggregated security-relevant information set 260 for computing platform 60, threat mitigation process 10 may enable 960 a third-party (e.g., the user/owner/operator of computing platform 60) to access aggregated security-relevant information set 260 and/or enable 962 a third-party (e.g., the user/owner/operator of computing platform 60) to search aggregated security-relevant information set 260.

Figure 19:
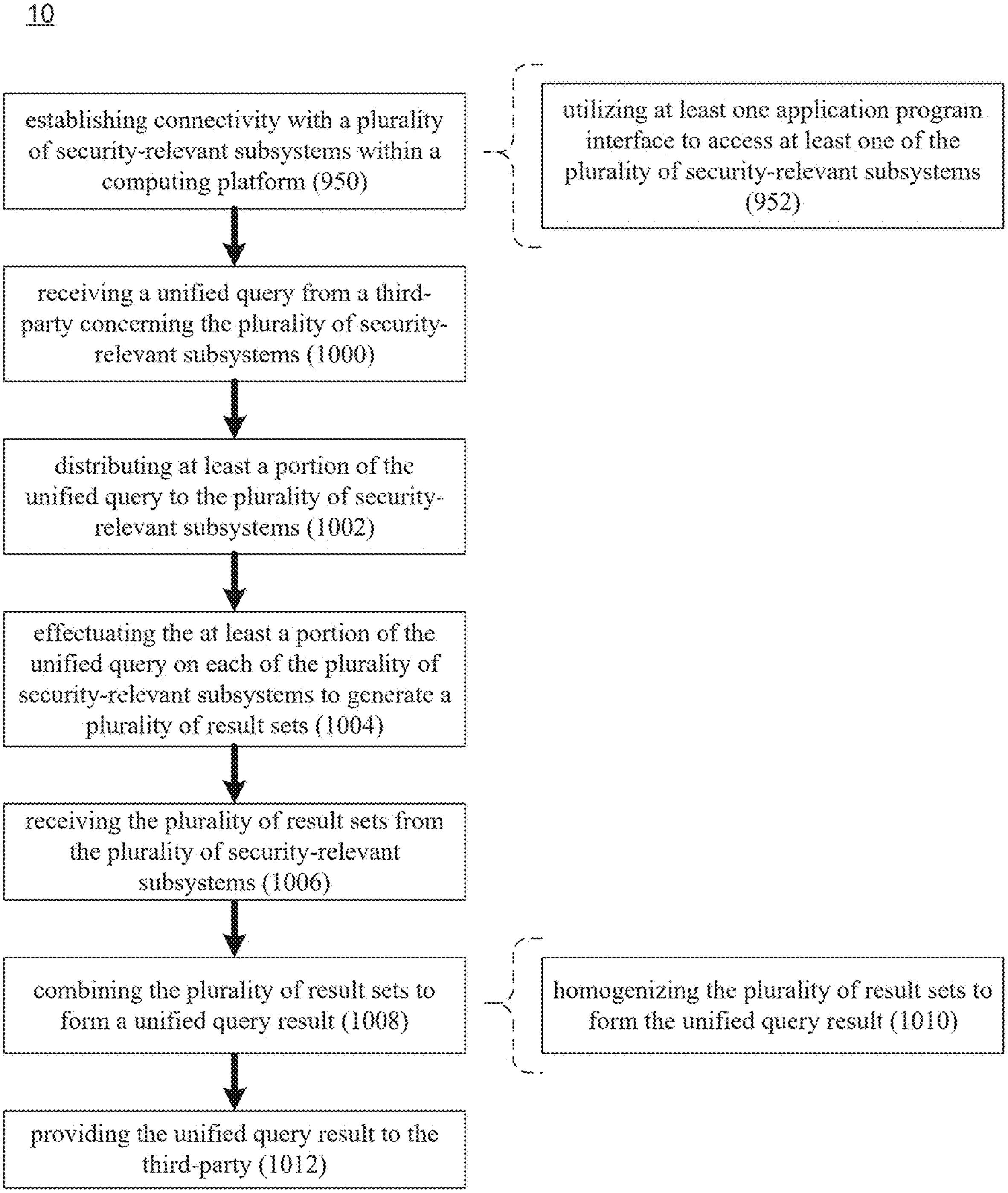

Referring also to FIG. 19, threat mitigation process 10 may be configured to enable the searching of multiple separate and discrete data sets using a single search operation. For example and as discussed above, threat mitigation process 10 may establish 950 connectivity with a plurality of security-relevant subsystems (e., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User BehaviorAnalytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 950 connectivity with a plurality of security-relevant subsystems, threat mitigation process 10 may utilize 952 at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

Threat mitigation process 10 may receive 1000 unified query 262 from a third-party (e.g., the user/owner/operator of computing platform 60) concerning the plurality of security-relevant subsystems. As discussed above, examples of security-relevant subsystems 226 may include but are not limited to: CDN (i.e., Content Delivery Network) systems; DAM (i.e., Database Activity Monitoring) systems; UBA (i.e., User BehaviorAnalytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

Threat mitigation process 10 may distribute 1002 at least a portion of unified query 262 to the plurality of security-relevant subsystems, resulting in the distribution of plurality of queries 264 to the plurality of security-relevant subsystems. For example, assume that a third-party (e.g., the user/owner/operator of computing platform 60) wishes to execute a search concerning the activity of a specific employee. Accordingly, the third-party (e.g., the user/owner/operator of computing platform 60) may formulate the appropriate unified query (e.g., unified query 262) that defines the employee name, the computing device(s) of the employee, and the date range of interest. Unified query 262 may then be parsed to form plurality of queries 264, wherein a specific query (within plurality of queries 264) may be defined for each of the plurality of security-relevant subsystems and provided to the appropriate security-relevant subsystems. For example, a 1st query may be included within plurality of queries 264 and provided to CDN (i.e., Content Delivery Network) system; a 2nd query may be included within plurality of queries 264 and provided to DAM (i.e., Database Activity Monitoring) system; a 3rd query may be included within plurality of queries 264 and provided to UBA (i.e., User Behavior Analytics) system; a 4th query may be included within plurality of queries 264 and provided to MDM (i.e., Mobile Device Management) system; a 5th query may be included within plurality of queries 264 and provided to IAM (i.e., Identity and Access Management) system; and a 6th query may be included within plurality of queries 264 and provided to DNS (i.e., Domain Name Server) system.

Threat mitigation process 10 may effectuate 1004 at least a portion of unified query 262 on each of the plurality of security-relevant subsystems to generate plurality of result sets 266. For example, the 1st query may be executed on CDN (i.e., Content Delivery Network) system to produce a 1st result set; the 2nd query may be executed on DAM (i.e., Database Activity Monitoring) system to produce a 2nd result set; the 3rd query may be executed on UBA (i.e., User Behavior Analytics) system to produce a 3rd result set; the 4th query may be executed on MDM (i.e., Mobile Device Management) system to produce a 4th result set; the 5th query may be executed on IAM (i.e., Identity and Access Management) system to produce a 5th result set; and the 6th query may executed on DNS (i.e., Domain Name Server) system to produce a 6th result set.

Threat mitigation process 10 may receive 1006 plurality of result sets 266 from the plurality of security-relevant subsystems. Threat mitigation process 10 may then combine 1008 plurality of result sets 266 to form unified query result 268. When combining 1008 plurality of result sets 266 to form unified query result 268, threat mitigation process 10 may homogenize 1010 plurality of result sets 266 to form unified query result 268. For example, threat mitigation process 10 may process one or more discrete result sets included within plurality of result sets 266 so that the discrete result sets within plurality of result sets 266 all have a common format, a common nomenclature, and/or a common structure. Threat mitigation process 10 may then provide 1012 unified query result 268 to the third-party (e.g., the user/owner/operator of computing platform 60).

Figure 20:
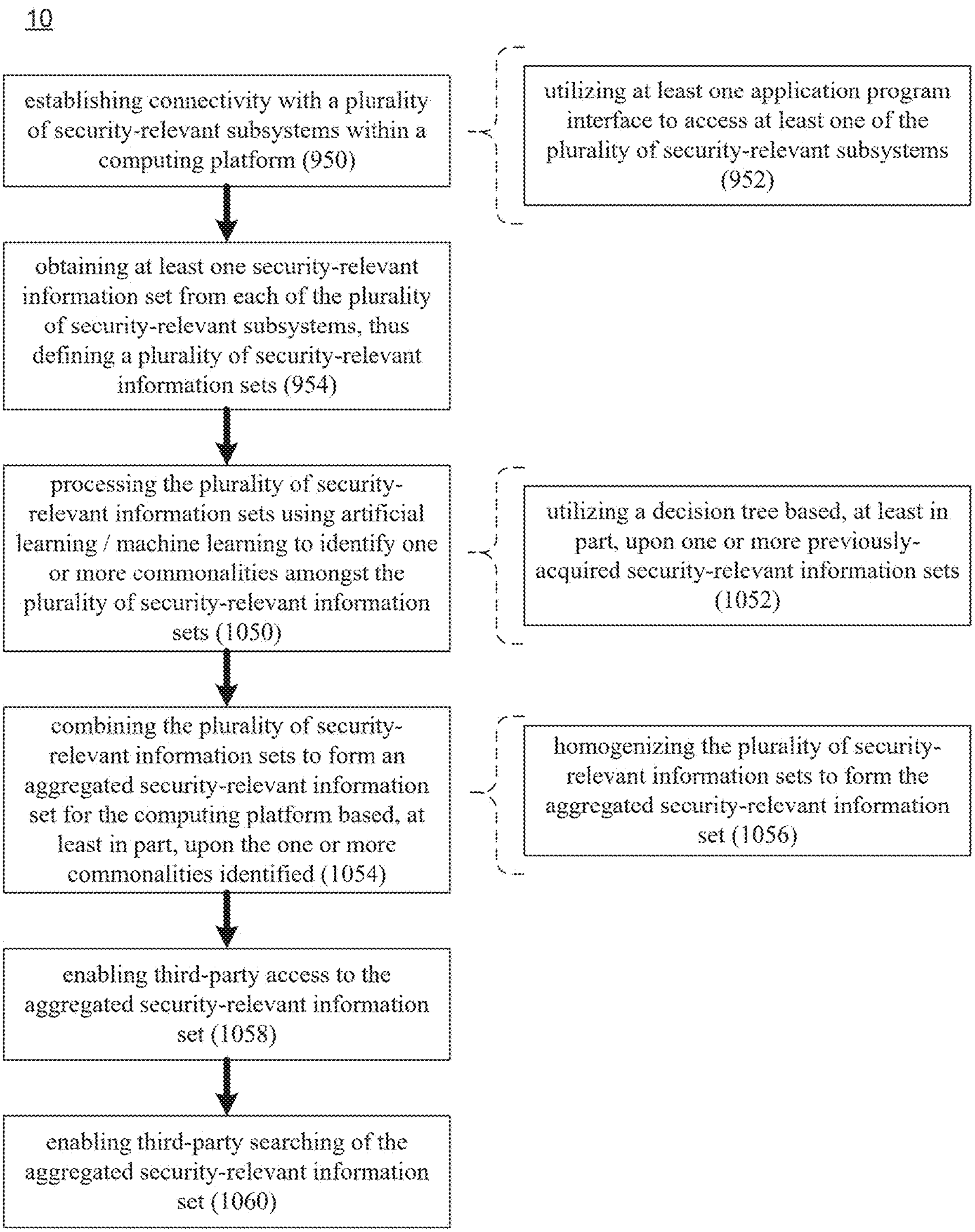

Referring also to FIG. 20, threat mitigation process 10 may be configured to utilize artificial intelligence/machine learning to automatically consolidate multiple separate and discrete data sets to form a single, aggregated data set. For example and as discussed above, threat mitigation process 10 may establish 950 connectivity with a plurality of security-relevant subsystems (e.g., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

As discussed above and when establishing 950 connectivity with a plurality of security-relevant subsystems, threat mitigation process 10 may utilize 952 at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

As discussed above, threat mitigation process 10 may obtain 954 at least one security-relevant information set (e.g., a log file) from each of the plurality of security-relevant subsystems (e.g., CDN system; DAM system; UBA system; MDM system; IAM system; and DNS system), thus defining plurality of security-relevant information sets 258. As would be expected, plurality of security-relevant information sets 258 may utilize a plurality of different formats and/or a plurality of different nomenclatures.

Threat mitigation process 10 may process 1050 plurality of security-relevant information sets 258 using artificial learning/machine learning to identify one or more commonalities amongst plurality of security-relevant information sets 258.

Threat mitigation process 10 may combine 1054 plurality of security-relevant information sets 258 to form aggregated security-relevant information set 260 for computing platform 60 based, at least in part, upon the one or more commonalities identified.

When combining 1054 plurality of security-relevant information sets 258 to form aggregated security-relevant information set 260 for computing platform 60 based, at least in part, upon the one or more commonalities identified, threat mitigation process 10 may homogenize 1056 plurality of security-relevant information sets 258 to form aggregated security-relevant information set 260. For example, threat mitigation process 10 may process one or more of security-relevant information sets 258 so that they all have a common format, a common nomenclature, and/or a common structure.

Once threat mitigation process 10 combines 1054 plurality of security-relevant information sets 258 to form an aggregated security-relevant information set 260 for computing platform 60, threat mitigation process 10 may enable 1058 a third-party (e.g., the user/owner/operator of computing platform 60) to access aggregated security-relevant information set 260 and/or enable 1060 a third-party (e.g., the user/owner/operator of computing platform 60) to search aggregated security-relevant information set 260.

Threat Event Information Updating

As will be discussed below in greater detail, threat mitigation process 10 may be configured to be updated concerning threat event information.

Figure 21:
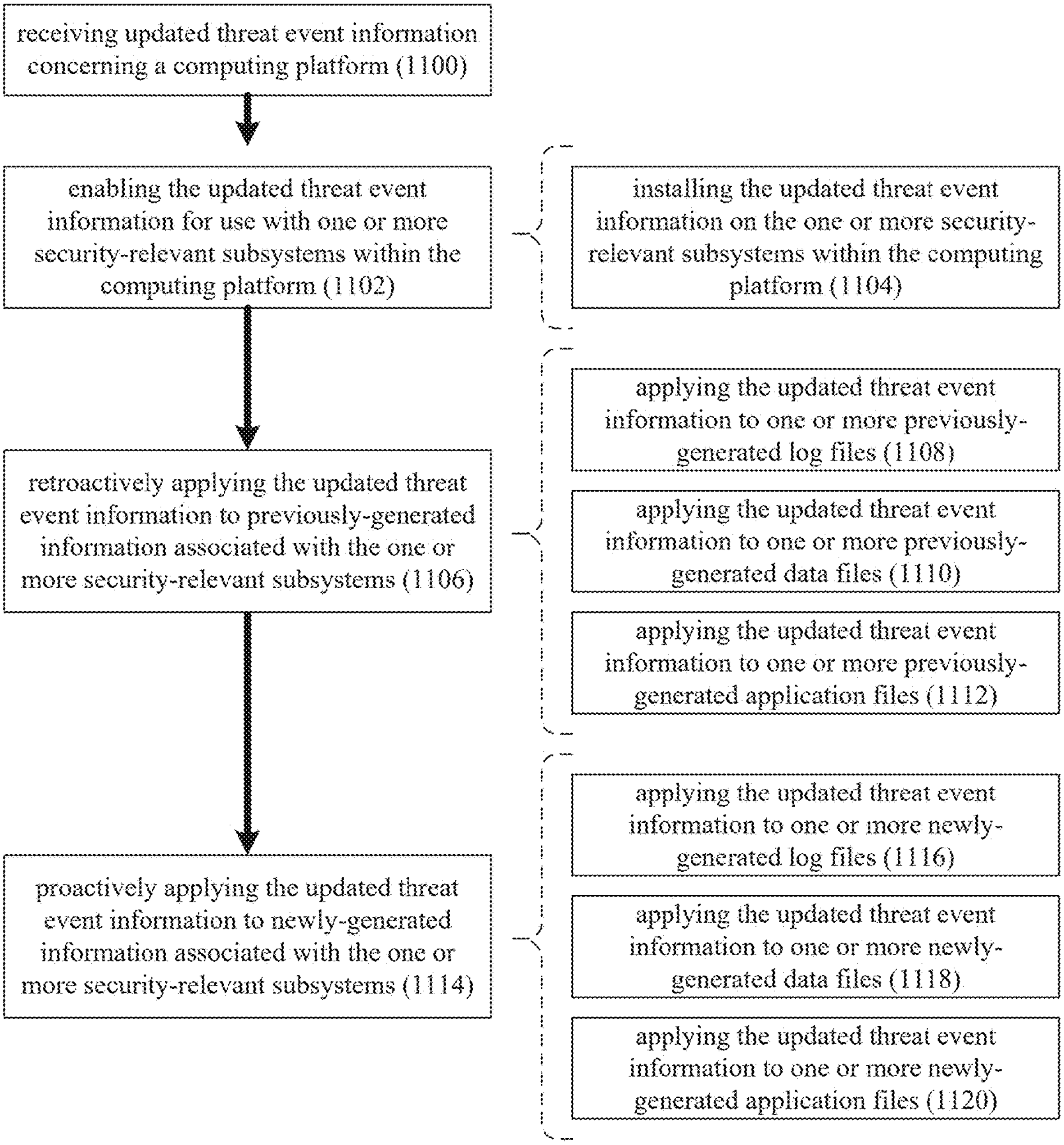

Referring also to FIG. 21, threat mitigation process 10 may be configured to receive updated threat event information for security-relevant subsystems 226. For example, threat mitigation process 10 may receive 1100 updated threat event information 270 concerning computing platform 60, wherein updated threat event information 270 may define one or more of: updated threat listings; updated threat definitions; updated threat methodologies; updated threat sources; and updated threat strategies. Threat mitigation process 10 may enable 1102 updated threat event information 270 for use with one or more security-relevant subsystems 226 within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When enabling 1102 updated threat event information 270 for use with one or more security-relevant subsystems 226 within computing platform 60, threat mitigation process 10 may install 1104 updated threat event information 270 on one or more security-relevant subsystems 226 within computing platform 60.

Threat mitigation process 10 may retroactively apply 1106 updated threat event information 270 to previously-generated information associated with one or more security-relevant subsystems 226.

When retroactively apply 1106 updated threat event information 270 to previously-generated information associated with one or more security-relevant subsystems 226, threat mitigation process 10 may: apply 1108 updated threat event information 270 to one or more previously-generated log files (not shown) associated with one or more security-relevant subsystems 226; apply 1110 updated threat event information 270 to one or more previously-generated data files (not shown) associated with one or more security-relevant subsystems 226; and apply 1112 updated threat event information 270 to one or more previously-generated application files (not shown) associated with one or more security-relevant subsystems 226.

Additionally, /alternatively, threat mitigation process 10 may proactively apply 1114 updated threat event information 270 to newly-generated information associated with one or more security-relevant subsystems 226.

When proactively applying 1114 updated threat event information 270 to newly-generated information associated with one or more security-relevant subsystems 226, threat mitigation process 10 may: apply 1116 updated threat event information 270 to one or more newly-generated log files (not shown) associated with one or more security-relevant subsystems 226; apply 1118 updated threat event information 270 to one or more newly-generated data files (not shown) associated with one or more security-relevant subsystems 226; and apply 1120 updated threat event information 270 to one or more newly-generated application files (not shown) associated with one or more security-relevant subsystems 226.

Figure 22:
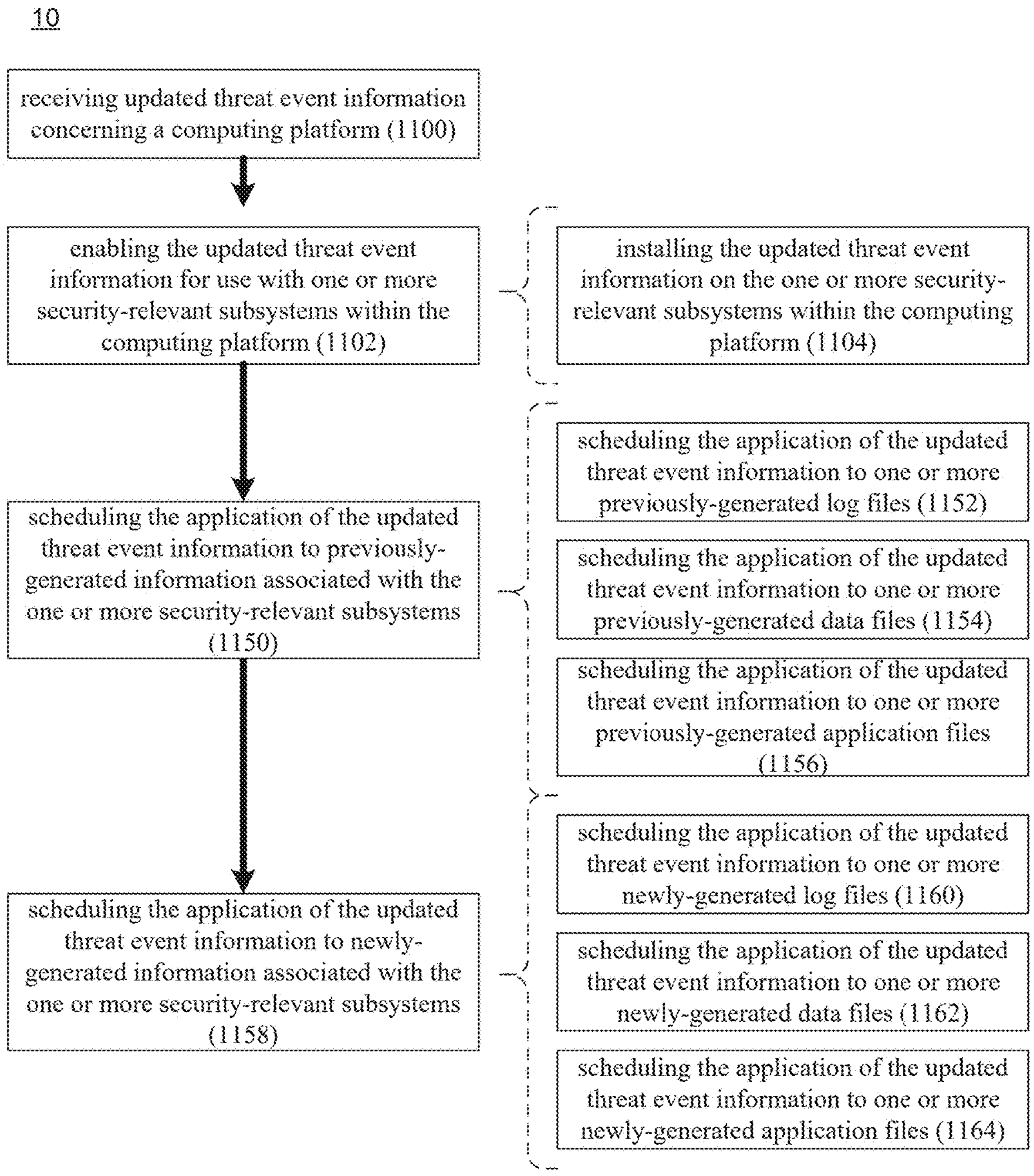

Referring also to FIG. 22, threat mitigation process 10 may be configured to receive updated threat event information 270 for security-relevant subsystems 226. For example and as discussed above, threat mitigation process 10 may receive 1100 updated threat event information 270 concerning computing platform 60, wherein updated threat event information 270 may define one or more of: updated threat listings; updated threat definitions; updated threat methodologies; updated threat sources; and updated threat strategies. Further and as discussed above, threat mitigation process 10 may enable 1102 updated threat event information 270 for use with one or more security-relevant subsystems 226 within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

As discussed above and when enabling 1102 updated threat event information 270 for use with one or more security-relevant subsystems 226 within computing platform 60, threat mitigation process 10 may install 1104 updated threat event information 270 on one or more security-relevant subsystems 226 within computing platform 60.

Sometimes, it may not be convenient and/or efficient to immediately apply updated threat event information 270 to security-relevant subsystems 226. Accordingly, threat mitigation process 10 may schedule 1150 the application of updated threat event information 270 to previously-generated information associated with one or more security-relevant subsystems 226.

When scheduling 1150 the application of updated threat event information 270 to previously-generated information associated with one or more security-relevant subsystems 226, threat mitigation process 10 may: schedule 1152 the application of updated threat event information 270 to one or more previously-generated log files (not shown) associated with one or more security-relevant subsystems 226; schedule 1154 the application of updated threat event information 270 to one or more previously-generated data files (not shown) associated with one or more security-relevant subsystems 226; and schedule 1156 the application of updated threat event information 270 to one or more previously-generated application files (not shown) associated with one or more security-relevant subsystems 226.

Additionally, /alternatively, threat mitigation process 10 may schedule 1158 the application of the updated threat event information to newly-generated information associated with the one or more security-relevant subsystems.

When scheduling 1158 the application of updated threat event information 270 to newly-generated information associated with one or more security-relevant subsystems 226, threat mitigation process 10 may: schedule 1160 the application of updated threat event information 270 to one or more newly-generated log files (not shown) associated with one or more security-relevant subsystems 226; schedule 1162 the application of updated threat event information 270 to one or more newly-generated data files (not shown) associated with one or more security-relevant subsystems 226; and schedule 1164 the application of updated threat event information 270 to one or more newly-generated application files (not shown) associated with one or more security-relevant subsystems 226.

Figure 23:
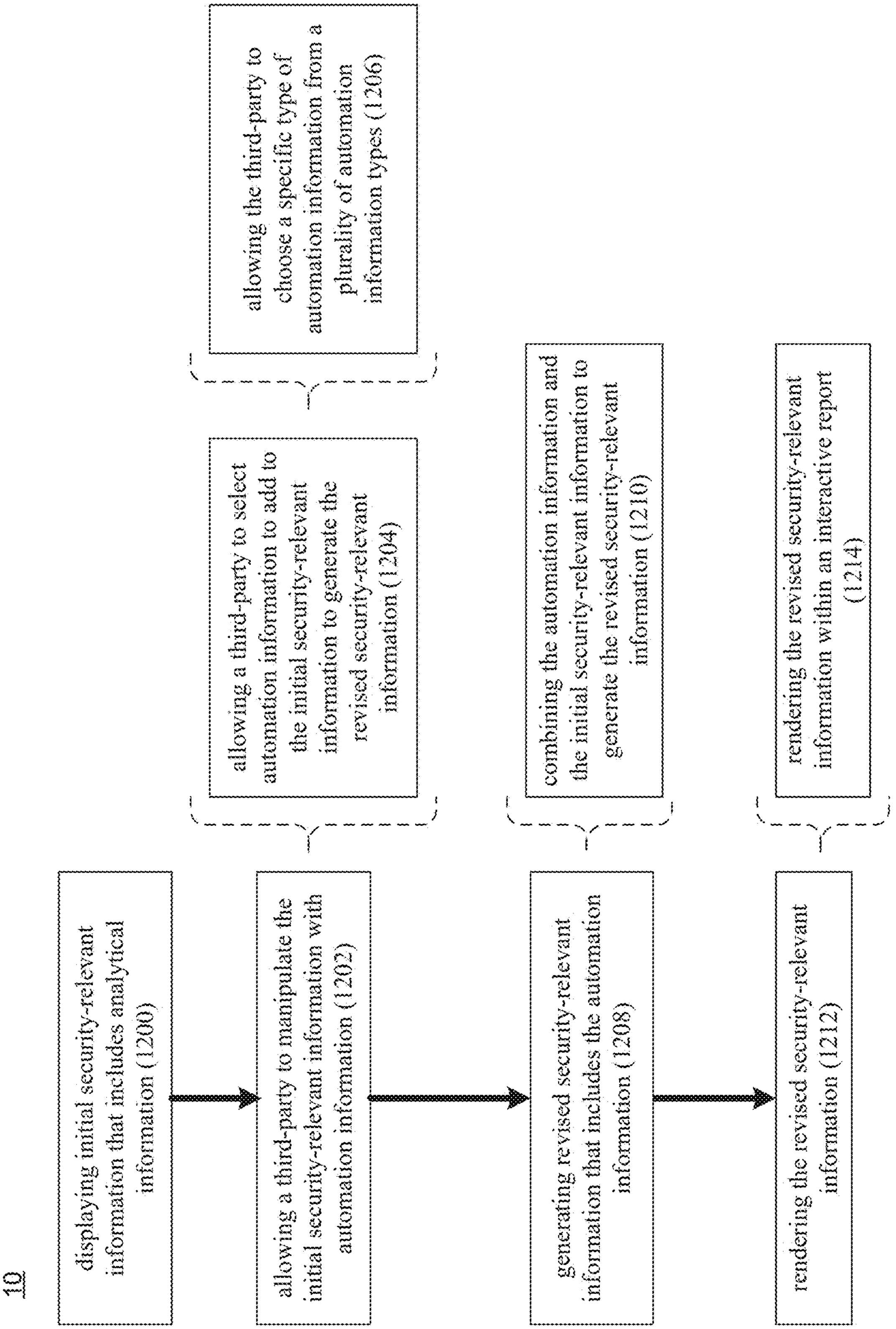
Figure 24:
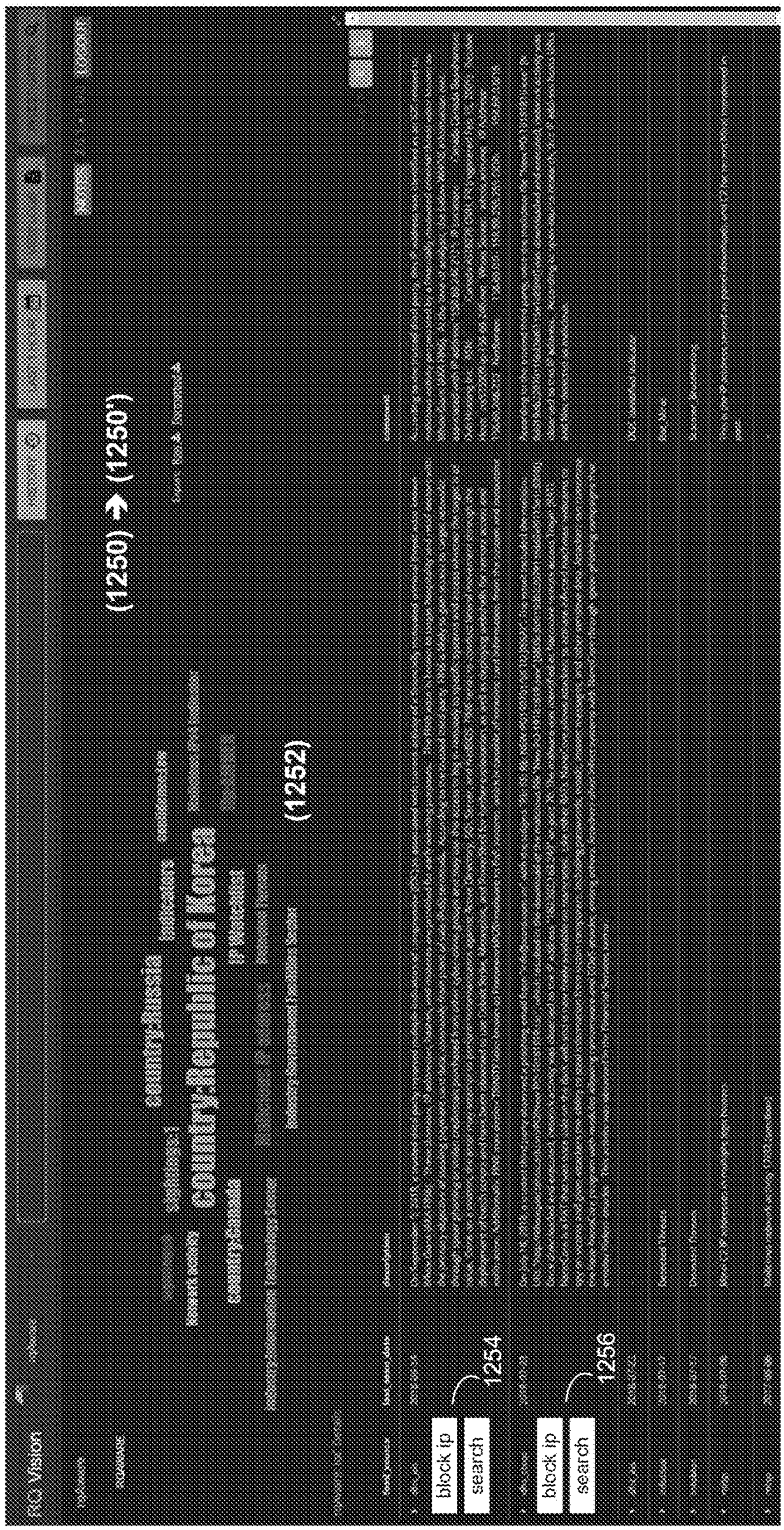
FIG. 24 is a diagrammatic view of a screen rendered by the threat mitigation process of FIG. 1 according to an embodiment of the present disclosure.

Referring also to FIGS. 23-24, threat mitigation process 10 may be configured to initially display analytical data, which may then be manipulated/updated to include automation data. For example, threat mitigation process 10 may display 1200 initial security-relevant information 1250 that includes analytical information (e.g., thought cloud 1252). Examples of such analytical information may include but is not limited to one or more of: investigative information; and hunting information.

Investigative Information (a portion of analytical information): Unified searching and/or automated searching, such as e.g., a security event occurring and searches being performed to gather artifacts concerning that security event.

Hunt Information (a portion of analytical information): Targeted searching/investigations, such as the monitoring and cataloging of the videos that an employee has watched or downloaded over the past 30 days.

Threat mitigation process 10 may allow 1202 a third-party (e.g., the user/owner/operator of computing platform 60) to manipulate initial security-relevant information 1250 with automation information.

Automate Information (a portion of automation): The execution of a single (and possibly simple) action one time, such as the blocking an IP address from accessing computing platform 60 whenever such an attempt is made.

Orchestrate Information (a portion of automation): The execution of a more complex batch (or series) of tasks, such as sensing an unauthorized download via an API and a) shutting down the API, adding the requesting IP address to a blacklist, and closing any ports opened for the requestor.

When allowing 1202 a third-party (e.g., the user/owner/operator of computing platform 60) to manipulate initial security-relevant information 1250 with automation information, threat mitigation process 10 may allow 1204 a third-party (e.g., the user/owner/operator of computing platform 60) to select the automation information to add to initial security-relevant information 1250 to generate revised security-relevant information 1250'. For example and when allowing 1204 a third-party (e.g., the user/owner/operator of computing platform 60) to select the automation information to add to initial security-relevant information 1250 to generate revised security-relevant information 1250', threat mitigation process 10 may allow 1206 the third-party (e.g., the user/owner/operator of computing platform 60) to choose a specific type of automation information from a plurality of automation information types.

For example, the third-party (e.g., the user/owner/operator of computing platform 60) may choose to add/initiate the automation information to generate revised security-relevant information 1250'. Accordingly, threat mitigation process 10 may render selectable options (e.g., selectable buttons 1254, 1256) that the third-party (e.g., the user/owner/operator of computing platform 60) may select to manipulate initial security-relevant information 1250 with automation information to generate revised security-relevant information 1250'. For this particular example, the third-party (e.g., the user/owner/operator of computing platform 60) may choose two different options to manipulate initial security-relevant information 1250, namely: "block ip" or "search", both of which will result in threat mitigation process 10 generating 1208 revised security-relevant information 1250' (that includes the above-described automation information).

When generating 1208 revised security-relevant information 1250' (that includes the above-described automation information), threat mitigation process 10 may combine 1210 the automation information (that results from selecting "block IP" or "search") and initial security-relevant information 1250 to generate and render 1212 revised security-relevant information 1250'.

When rendering 1212 revised security-relevant information 1250', threat mitigation process 10 may render 1214 revised security-relevant information 1250' within interactive report 1258.

Training Routine Generation and Execution

As will be discussed below in greater detail, threat mitigation process 10 may be configured to allow for the manual or automatic generation of training routines, as well as the execution of the same.

Figure 25:
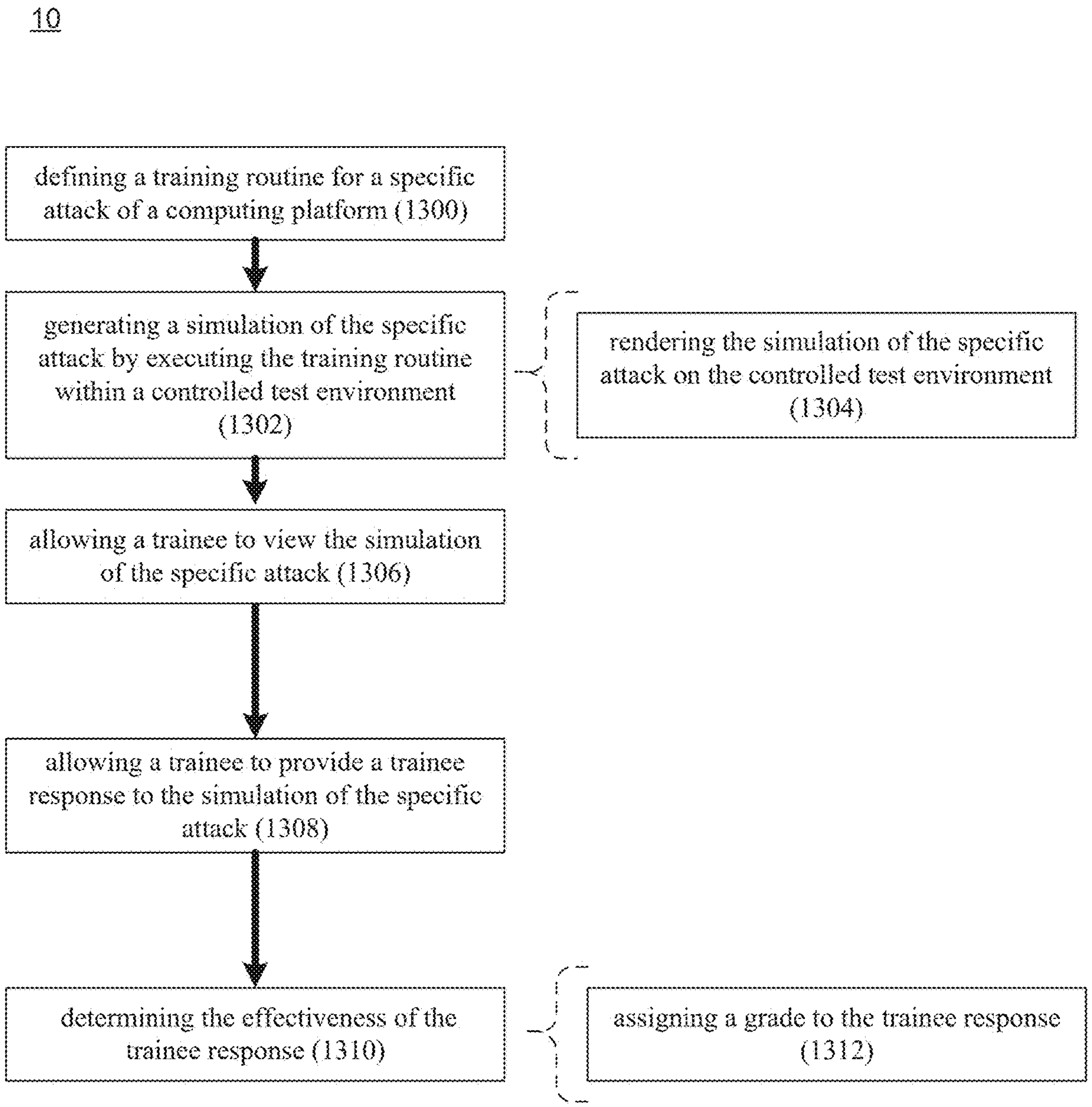
FIGS. 25-31 are flowcharts of other implementations of the threat mitigation process of FIG. 1 according to an embodiment of the present disclosure.

Referring also to FIG. 25, threat mitigation process 10 may be configured to allow for the manual generation of testing routine 272. For example, threat mitigation process 10 may define 1300 training routine 272 for a specific attack (e.g., a Denial of Services attack) of computing platform 60. Specifically, threat mitigation process 10 may generate 1302 a simulation of the specific attack (e.g., a Denial of Services attack) by executing training routine 272 within a controlled test environment, an example of which may include but is not limited to virtual machine 274 executed on a computing device (e.g., computing device 12).

When generating 1302 a simulation of the specific attack (e.g., a Denial of Services attack) by executing training routine 272 within the controlled test environment (e.g., virtual machine 274), threat mitigation process 10 may render 1304 the simulation of the specific attack (e.g., a Denial of Services attack) on the controlled test environment (e.g., virtual machine 274).

Threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

Figure 26:
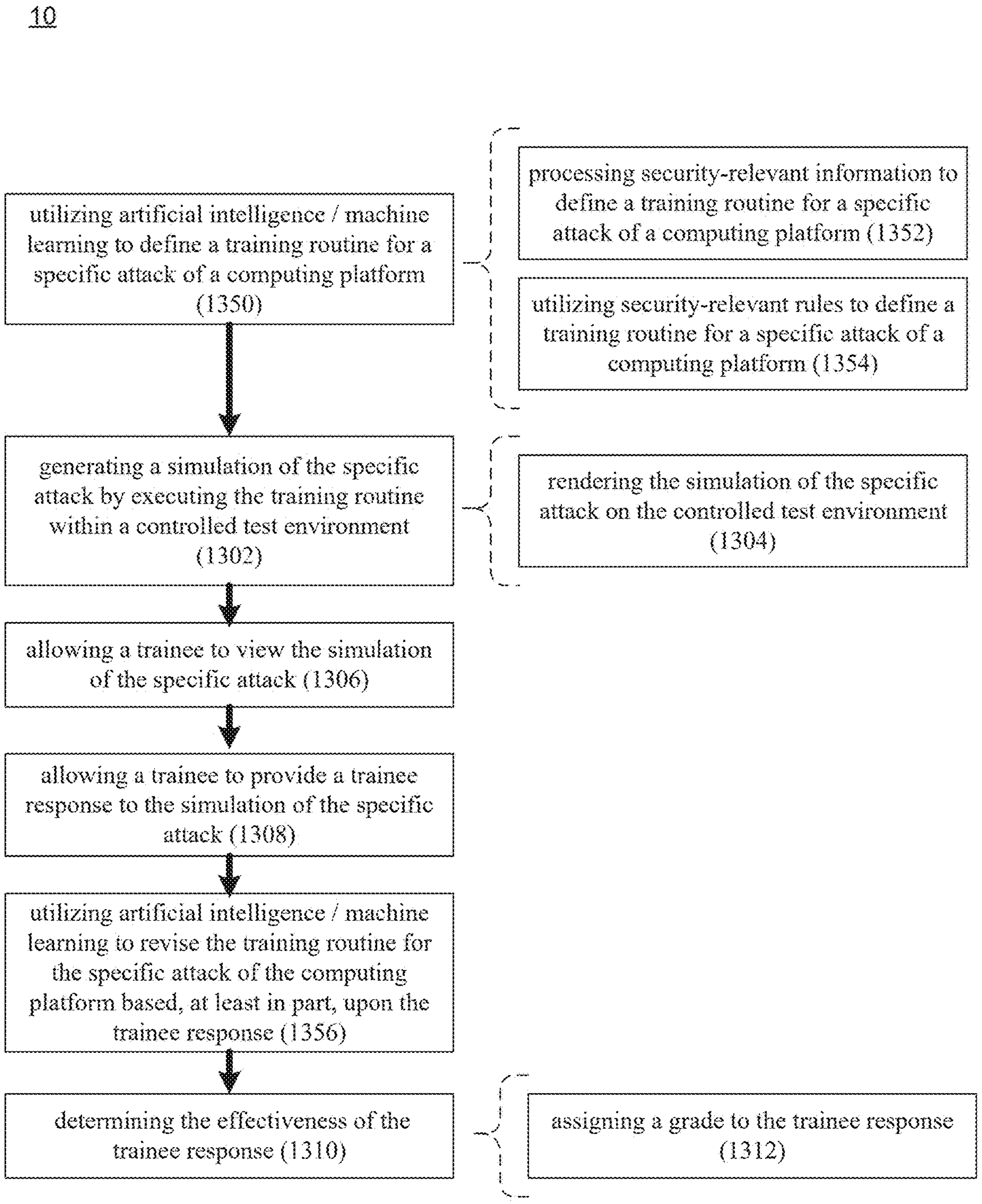

Referring also to FIG. 26, threat mitigation process 10 may be configured to allow for the automatic generation of testing routine 272. For example, threat mitigation process 10 may utilize 1350 artificial intelligence/machine learning to define training routine 272 for a specific attack (e.g., a Denial of Services attack) of computing platform 60.

When using 1350 artificial intelligence/machine learning to define training routine 272 for a specific attack (e.g., a Denial of Services attack) of computing platform 60, threat mitigation process 10 may process 1352 security-relevant information to define training routine 272 for specific attack (e.g., a Denial of Services attack) of computing platform 60. Further and when using 1350 artificial intelligence/machine learning to define training routine 272 for a specific attack (e.g., a Denial of Services attack) of computing platform 60, threat mitigation process 10 may utilize 1354 security-relevant rules to define training routine 272 for a specific attack (e.g., a Denial of Services attack) of computing platform 60. Accordingly, security-relevant information that e.g., defines the symptoms of e.g., a Denial of Services attack and security-relevant rules that define the behavior of e.g., a Denial of Services attack may be utilized by threat mitigation process 10 when defining training routine 272.

As discussed above, threat mitigation process 10 may generate 1302 a simulation of the specific attack (e.g., a Denial of Services attack) by executing training routine 272 within a controlled test environment, an example of which may include but is not limited to virtual machine 274 executed on a computing device (e.g., computing device 12).

Further and as discussed above, when generating 1302 a simulation of the specific attack (e.g., a Denial of Services attack) by executing training routine 272 within the controlled test environment (e.g., virtual machine 274), threat mitigation process 10 may render 1304 the simulation of the specific attack (e.g., a Denial of Services attack) on the controlled test environment (e.g., virtual machine 274).

Threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Threat mitigation process 10 may utilize 1356 artificial intelligence/machine learning to revise training routine 272 for the specific attack (e.g., a Denial of Services attack) of computing platform 60 based, at least in part, upon trainee response 278.

As discussed above, threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

Figure 27:
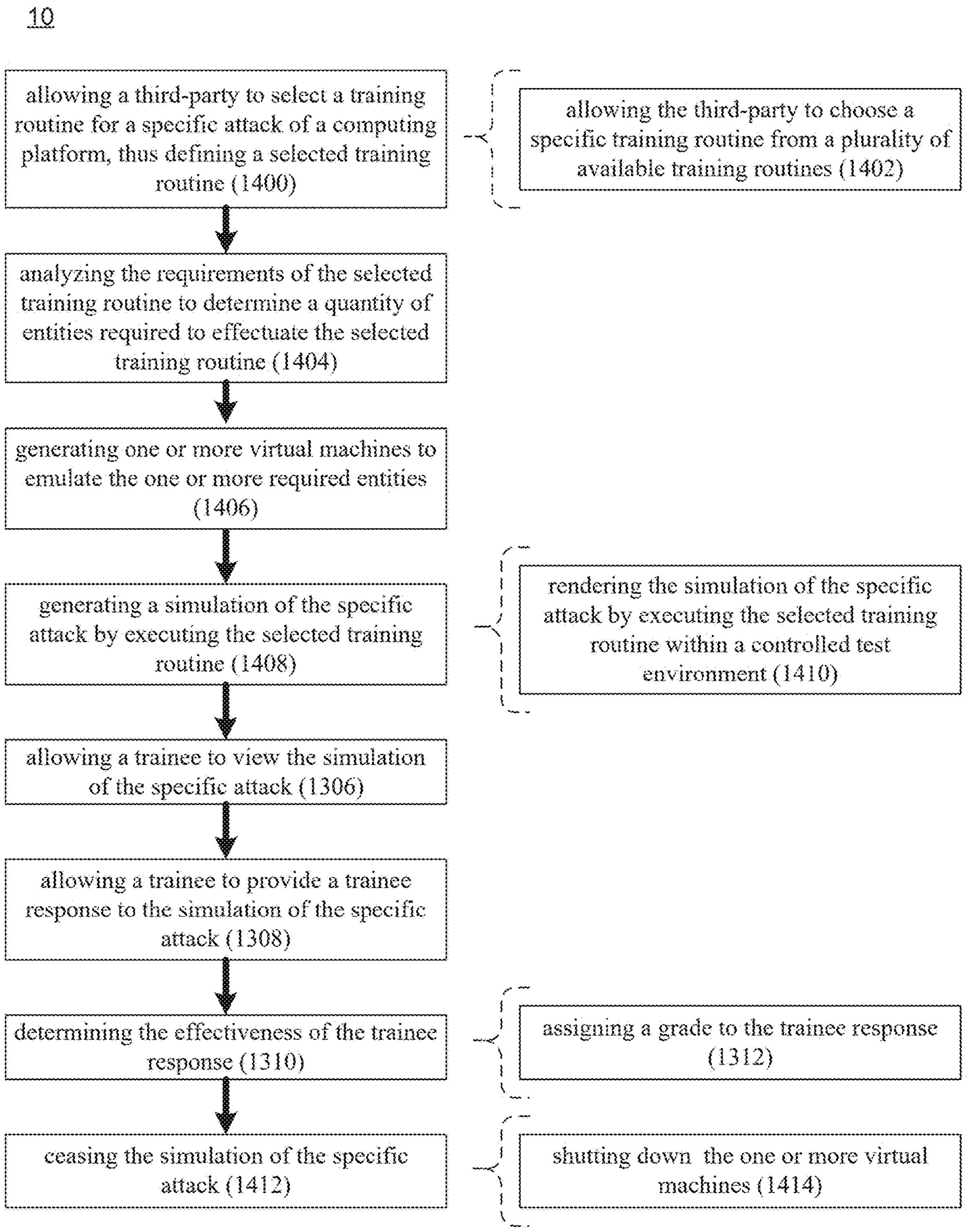

Referring also to FIG. 27, threat mitigation process 10 may be configured to allow a trainee to choose their training routine. For example mitigation process 10 may allow 1400 a third-party (e.g., the user/owner/operator of computing platform 60) to select a training routine for a specific attack (e.g., a Denial of Services attack) of computing platform 60, thus defining a selected training routine. When allowing 1400 a third-party (e.g., the user/owner/operator of computing platform 60) to select a training routine for a specific attack (e.g., a Denial of Services attack) of computing platform 60, threat mitigation process 10 may allow 1402 the third-party (e.g., the user/owner/operator of computing platform 60) to choose a specific training routine from a plurality of available training routines. For example, the third-party (e.g., the user/owner/operator of computing platform 60) may be able to select a specific type of attack (e.g., DDoS events, DoS events, phishing events, spamming events, malware events, web attacks, and exploitation events) and/or select a specific training routine (that may or may not disclose the specific type of attack).

Once selected, threat mitigation process 10 may analyze 1404 the requirements of the selected training routine (e.g., training routine 272) to determine a quantity of entities required to effectuate the selected training routine (e.g., training routine 272), thus defining one or more required entities. For example, assume that training routine 272 has three required entities (e.g., an attacked device and two attacking devices). According, threat mitigation process 10 may generate 1406 one or more virtual machines (e.g., such as virtual machine 274) to emulate the one or more required entities. In this particular example, threat mitigation process 10 may generate 1406 three virtual machines, a first VM for the attacked device, a second VM for the first attacking device and a third VM for the second attacking device. As is known in the art, a virtual machine (VM) is a virtual emulation of a physical computing system. Virtual machines may be based on computer architectures and may provide the functionality of a physical computer, wherein their implementations may involve specialized hardware, software, or a combination thereof.

Threat mitigation process 10 may generate 1408 a simulation of the specific attack (e.g., a Denial of Services attack) by executing the selected training routine (e.g., training routine 272). When generating 1408 the simulation of the specific attack (e.g., a Denial of Services attack) by executing the selected training routine (e.g., training routine 272), threat mitigation process 10 may render 1410 the simulation of the specific attack (e.g., a Denial of Services attack) by executing the selected training routine (e.g., training routine 272) within a controlled test environment (e.g., such as virtual machine 274).

As discussed above, threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Further and as discussed above, threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

When training is complete, threat mitigation process 10 may cease 1412 the simulation of the specific attack (e.g., a Denial of Services attack), wherein ceasing 1412 the simulation of the specific attack (e.g., a Denial of Services attack) may include threat mitigation process 10 shutting down 1414 the one or more virtual machines (e.g., the first VM for the attacked device, the second VM for the first attacking device and the third VM for the second attacking device).

Information Routing

As will be discussed below in greater detail, threat mitigation process 10 may be configured to route information based upon whether the information is more threat-pertinent or less threat-pertinent.

Figure 28:
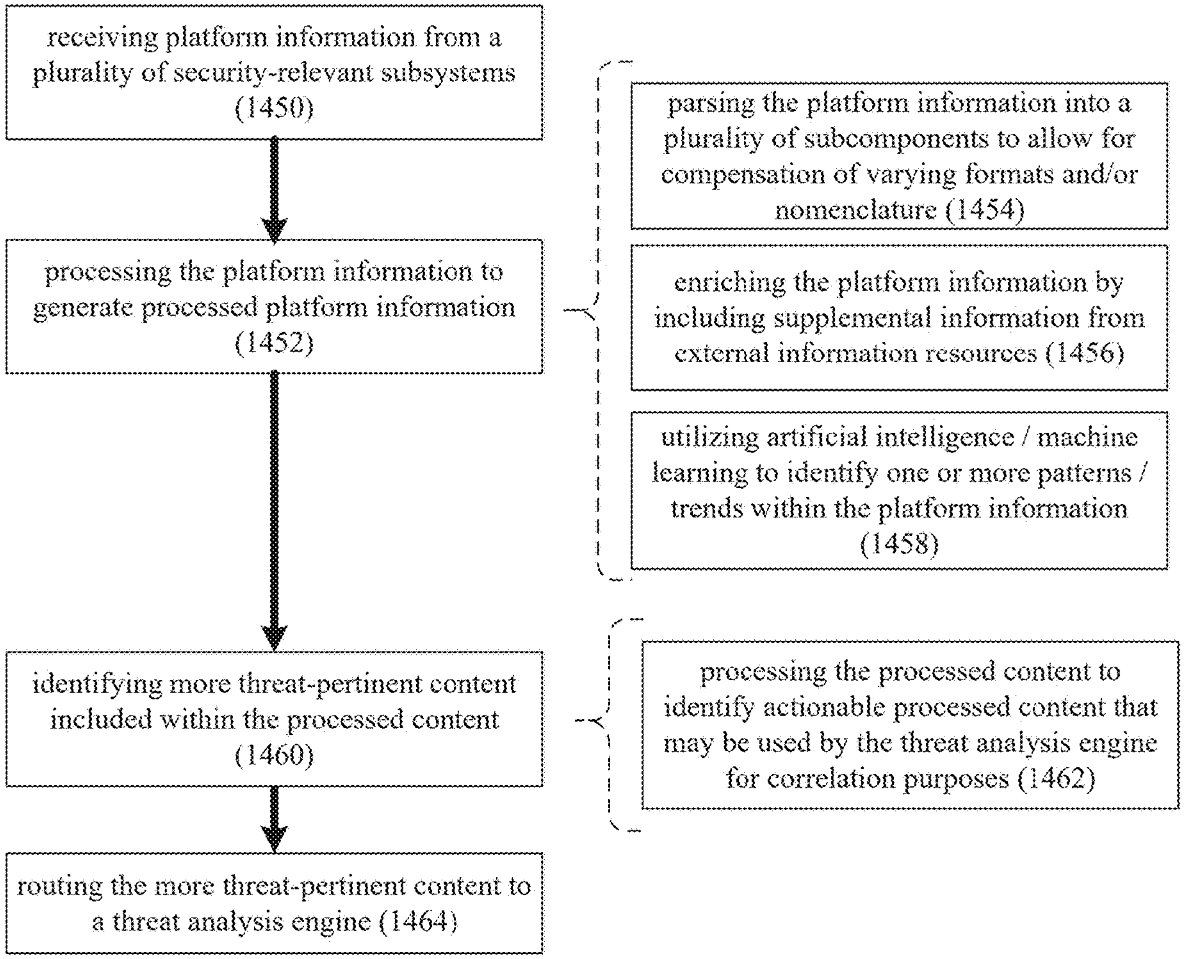

Referring also to FIG. 28, threat mitigation process 10 may be configured to route more threat-pertinent content in a specific manner. For example, threat mitigation process 10 may receive 1450 platform information (e.g., log files) from a plurality of security-relevant subsystems (e.g., security-relevant subsystems 226). As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

Threat mitigation process 10 may process 1452 this platform information (e.g., log files) to generate processed platform information. And when processing 1452 this platform information (e.g., log files) to generate processed platform information, threat mitigation process 10 may: parse 1454 the platform information (e.g., log files) into a plurality of subcomponents (e.g., columns, rows, etc.) to allow for compensation of varying formats and/or nomenclature; enrich 1456 the platform information (e.g., log files) by including supplemental information from external information resources; and/or utilize 1458 artificial intelligence/machine learning (in the manner described above) to identify one or more patterns/trends within the platform information (e.g., log files).

Threat mitigation process 10 may identify 1460 more threat-pertinent content 280 included within the processed content, wherein identifying 1460 more threat-pertinent content 280 included within the processed content may include processing 1462 the processed content to identify actionable processed content that may be used by a threat analysis engine (e.g., SIEM system 230) for correlation purposes. Threat mitigation process 10 may route 1464 more threat-pertinent content 280 to this threat analysis engine (e.g., SIEM system 230).

Figure 29:
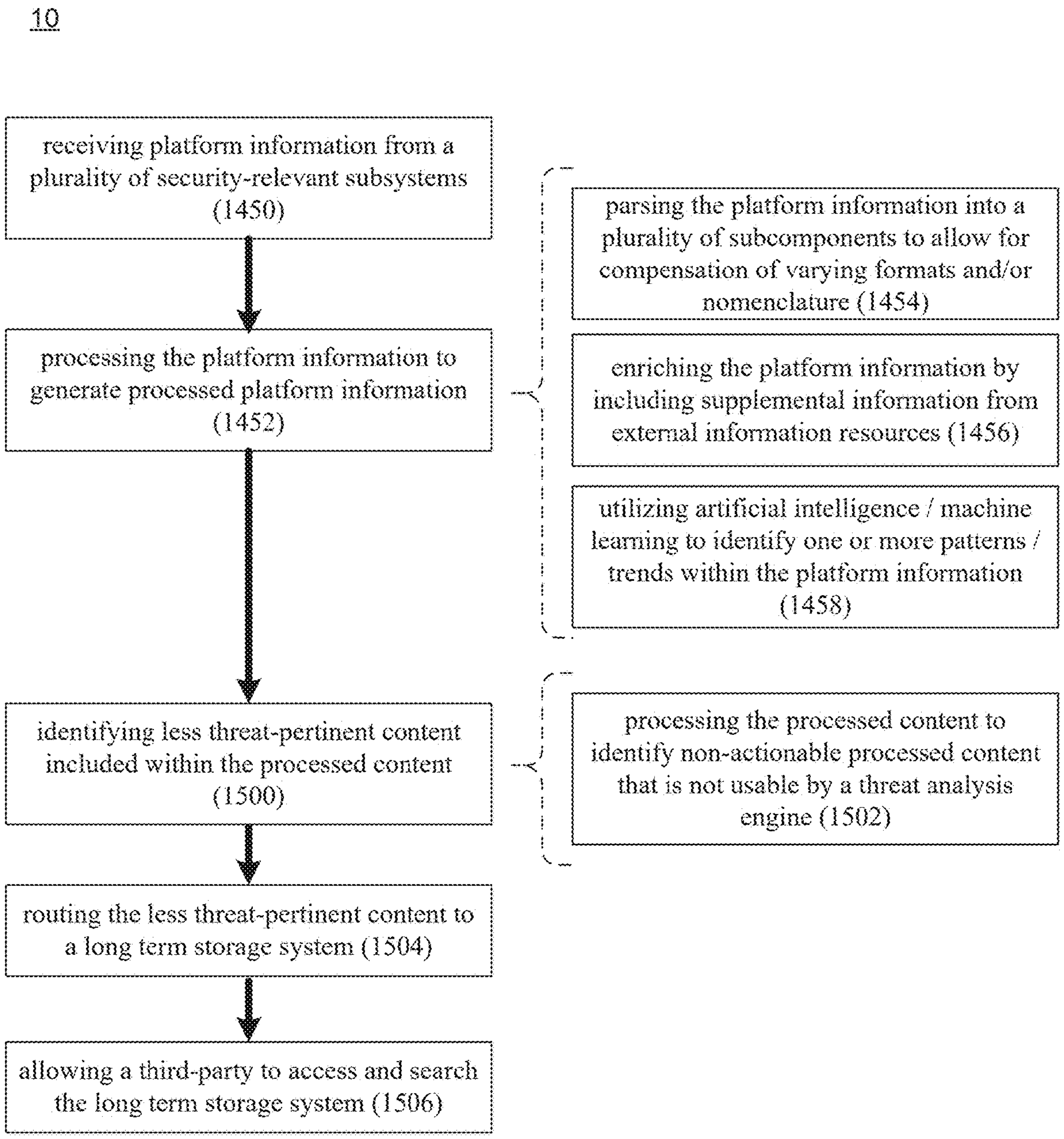

Referring also to FIG. 29, threat mitigation process 10 may be configured to route less threat-pertinent content in a specific manner. For example and as discussed above, threat mitigation process 10 may receive 1450 platform information (e.g., log files) from a plurality of security-relevant subsystems (e.g., security-relevant subsystems 226). As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform Further and as discussed above, threat mitigation process 10 may process 1452 this platform information (e.g., log files) to generate processed platform information. And when processing 1452 this platform information (e.g., log files) to generate processed platform information, threat mitigation process 10 may: parse 1454 the platform information (e.g., log files) into a plurality of subcomponents (e.g., columns, rows, etc.) to allow for compensation of varying formats and/or nomenclature; enrich 1456 the platform information (e.g., log files) by including supplemental information from external information resources; and/or utilize 1458 artificial intelligence/machine learning (in the manner described above) to identify one or more patterns/trends within the platform information (e.g., log files).

Threat mitigation process 10 may identify 1500 less threat-pertinent content 282 included within the processed content, wherein identifying 1500 less threat-pertinent content 282 included within the processed content may include processing 1502 the processed content to identify non-actionable processed content that is not usable by a threat analysis engine (e.g., SIEM system 230) for correlation purposes. Threat mitigation process 10 may route 1504 less threat-pertinent content 282 to a long-term storage system (e.g., long term storage system 284). Further, threat mitigation process 10 may be configured to allow 1506 a third-party (e.g., the user/owner/operator of computing platform 60) to access and search long term storage system 284.

Automated Analysis

As will be discussed below in greater detail, threat mitigation process 10 may be configured to automatically analyze a detected security event.

Figure 30:
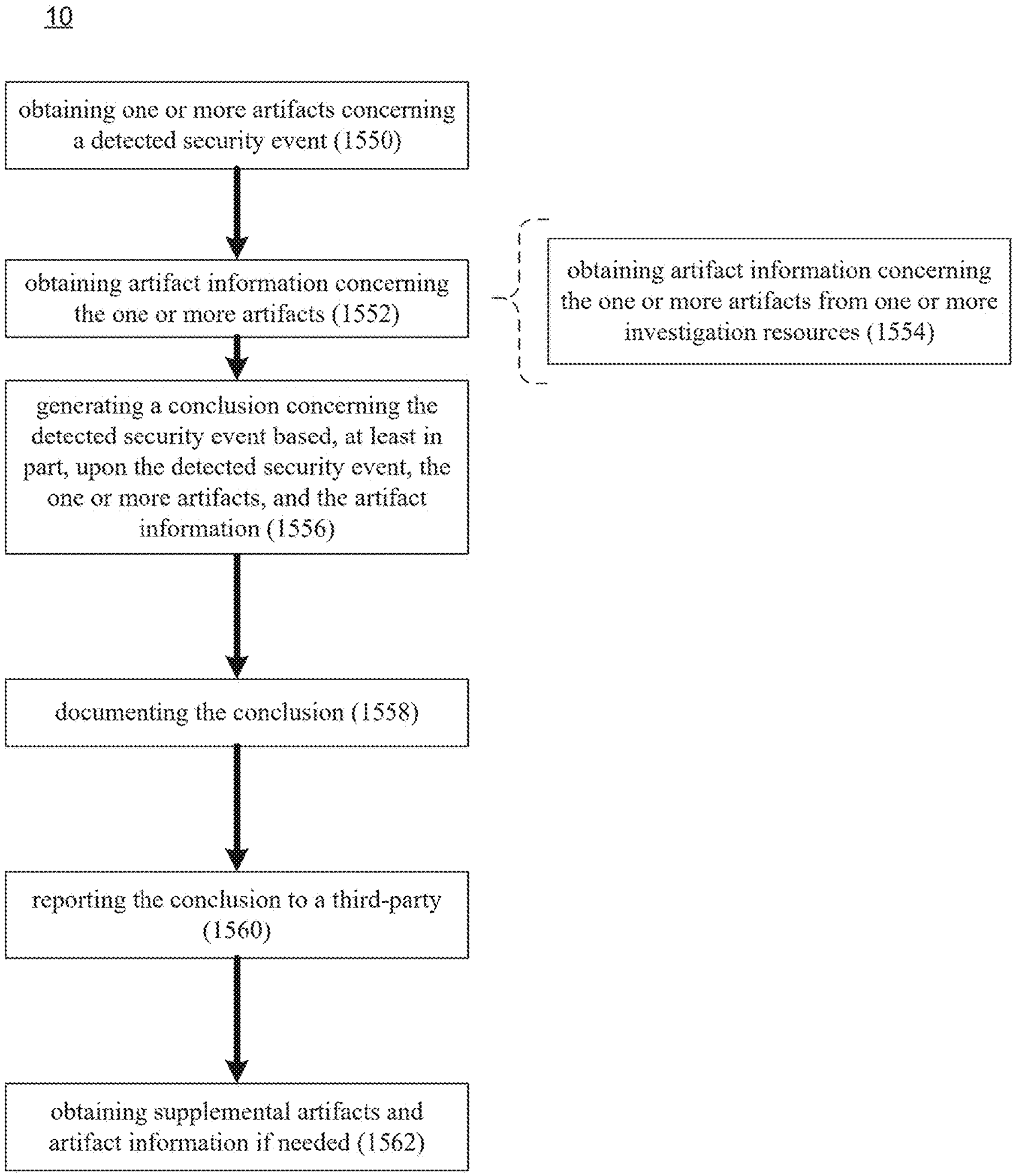

Referring also to FIG. 30, threat mitigation process 10 may be configured to automatically classify and investigate a detected security event. As discussed above and in response to a security event being detected, threat mitigation process 10 may obtain 1550 one or more artifacts (e.g., artifacts 250) concerning the detected security event. Examples of such a detected security event may include but are not limited to one or more of: access auditing; anomalies; authentication; denial of services; exploitation; malware; phishing; spamming; reconnaissance; and web attack. These artifacts (e.g., artifacts 250) may be obtained 1550 from a plurality of sources associated with the computing platform, wherein examples of such plurality of sources may include but are not limited to the various log files maintained by STEM system 230, and the various log files directly maintained by the security-relevant subsystems Threat mitigation process 10 may obtain 1552 artifact information (e.g., artifact information 286) concerning the one or more artifacts (e.g., artifacts 250), wherein artifact information 286 may be obtained from information resources include within (or external to) computing platform 60.

For example and when obtaining 1552 artifact information 286 concerning the one or more artifacts (e.g., artifacts 250), threat mitigation process 10 may obtain 1554 artifact information 286 concerning the one or more artifacts (e.g., artifacts 250) from one or more investigation resources (such as third-party resources that may e.g., provide information on known bad actors).

Once the investigation is complete, threat mitigation process 10 may generate 1556 a conclusion (e.g., conclusion 288) concerning the detected security event (e.g., a Denial of Services attack) based, at least in part, upon the detected security event (e.g., a Denial of Services attack), the one or more artifacts (e.g., artifacts 250), and artifact information 286. Threat mitigation process 10 may document 1558 the conclusion (e.g., conclusion 288), report 1560 the conclusion (e.g., conclusion 288) to a third-party (e.g., the user/owner/operator of computing platform 60). Further, threat mitigation process 10 may obtain 1562 supplemental artifacts and artifact information (if needed to further the investigation).

While the system is described above as being computer-implemented, this is for illustrative purposes only and is not intended to be a limitation of this disclosure, as other configurations are possible and are considered to be within the scope of this disclosure. For example, some or all of the above-described system may be implemented by a human being.

Unified Searching

As discussed above, threat mitigation process 10 may be configured to e.g., analyze a monitored computing platform (e.g., computing platform 60) and provide information to third-parties concerning the same. Further and as discussed above, such a monitored computing platform (e.g., computing platform 60) may be a highly complex, multi-location computing system/network that may span multiple buildings/locations/countries.

For this illustrative example, the monitored computing platform (e.g., computing platform 60) is shown to include many discrete computing devices, examples of which may include but are not limited to: server computers (e.g., server computers 200, 202), desktop computers (e.g., desktop computer 204), and laptop computers (e.g., laptop computer 206), all of which may be coupled together via a network (e.g., network 208), such as an Ethernet network. Computing platform 60 may be coupled to an external network (e.g., Internet 210) through WAF (i.e., Web Application Firewall) 212. A wireless access point (e.g., WAP 214) may be configured to allow wireless devices (e.g., smartphone 216) to access computing platform 60. Computing platform 60 may include various connectivity devices that enable the coupling of devices within computing platform 60, examples of which may include but are not limited to: switch 216, router 218 and gateway 220. Computing platform 60 may also include various storage devices (e.g., NAS 222), as well as functionality (e.g., API Gateway 224) that allows software applications to gain access to one or more resources within computing platform 60.

In addition to the devices and functionality discussed above, other technology (e.g., security-relevant subsystems 226) may be deployed within computing platform 60 to monitor the operation of (and the activity within) computing platform 60. Examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform. Each of security-relevant subsystems 226 may monitor and log their activity with respect to computing platform 60, resulting in the generation of platform information 228. For example, platform information 228 associated with a client-defined MDM (i.e., Mobile Device Management) system may monitor and log the mobile devices that were allowed access to computing platform 60.

Further, SEIM (i.e., Security Information and Event Management) system 230 may be deployed within computing platform 60. As is known in the art, SIEM system 230 is an approach to security management that combines SIM (security information management) functionality and SEM (security event management) functionality into one security management system. The underlying principles of a SIEM system is to aggregate relevant data from multiple sources, identify deviations from the norm and take appropriate action. For example, when a security event is detected, SIEM system 230 might log additional information, generate an alert and instruct other security controls to mitigate the security event. Accordingly, SIEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

Figure 31:
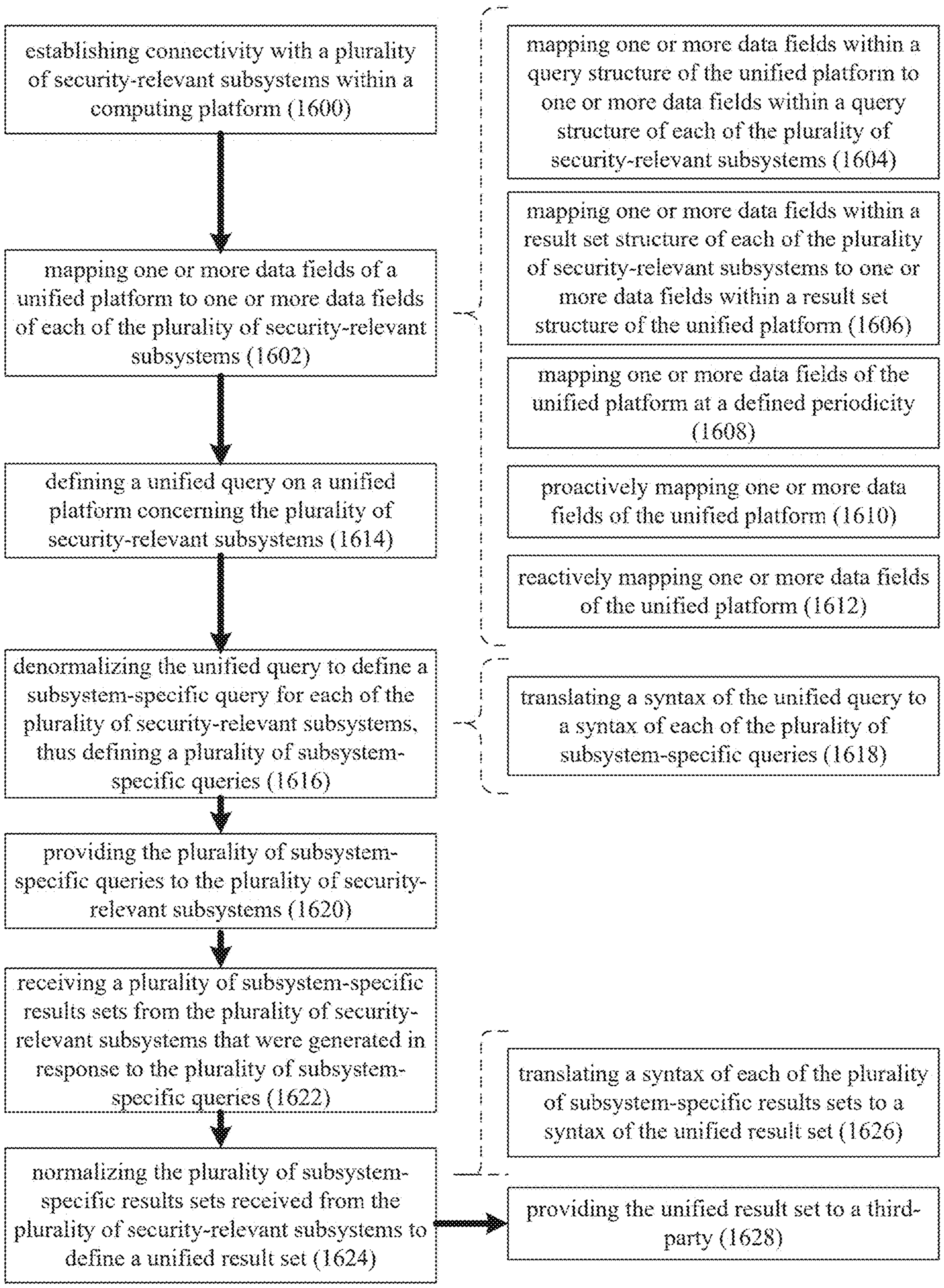
Figure 32:
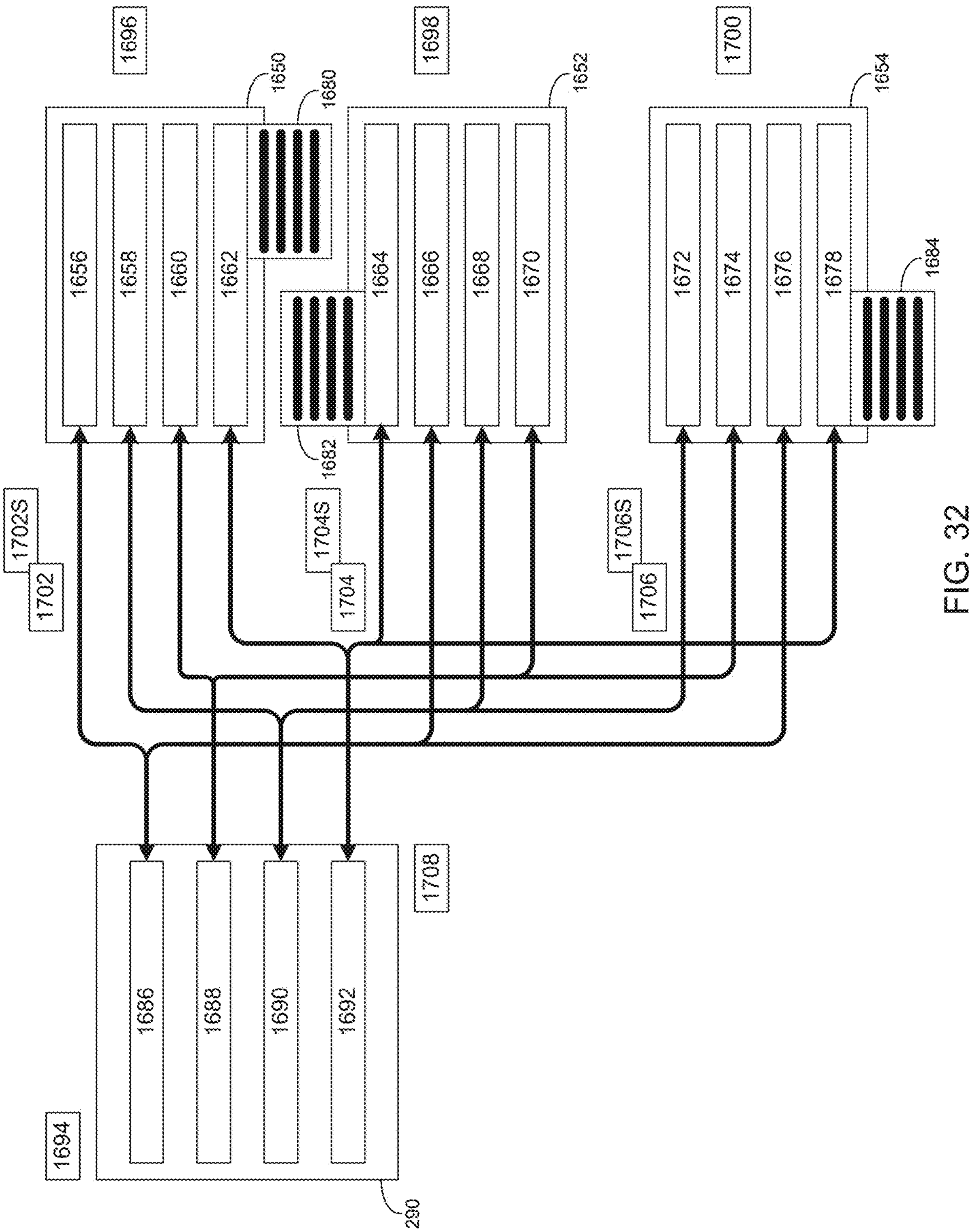
FIG. 32 is a diagrammatic view of data field mapping according to an embodiment of the present disclosure.

Referring also to FIGS. 31-32, threat mitigation process 10 may be configured to enable the querying of multiple separate and discrete subsystems (e.g., security-relevant subsystems 226) using a single query operation. For example, threat mitigation process 10 may establish 1600 connectivity with a plurality of security-relevant subsystems (e.g., security-relevant subsystems 226) within computing platform 60.

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 1600 connectivity with a plurality of security-relevant subsystems (e.g., security-relevant subsystems 226), threat mitigation process 10 may utilize at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

In order to enable the querying of multiple separate and discrete subsystems (e.g., security-relevant subsystems 226) using a single query operation, threat mitigation process 10 may map 1602 one or more data fields of unified platform 290 (e.g., a platform effectuated by threat mitigation process 10) to one or more data fields of each of the plurality of security-relevant subsystems (e.g., security-relevant subsystems 226).

For example, unified platform 290 may be a platform that enables a third-party (e.g., the user/owner/operator of computing platform 60) to query multiple security-relevant subsystems (within security-relevant subsystems 226), such as security-relevant subsystem 1650, security-relevant subsystem 1652 and security-relevant subsystem 1654. As discussed above, examples of such security-relevant subsystem (e.g., security-relevant subsystem 1650, security-relevant subsystem 1652 and security-relevant subsystem 1654) may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Each of these security-relevant subsystem (e.g., security-relevant subsystem 1650, security-relevant subsystem 1652 and security-relevant subsystem 1654) may include a plurality of data fields that enable the third-party (e.g., the user/owner/operator of computing platform 60) to search for and obtain information from these security-relevant subsystems (e.g., security-relevant subsystem 1650, security-relevant subsystem 1652 and security-relevant subsystem 1654). For example: security-relevant subsystem 1650 is shown to include data fields 1656, 1658, 1660, 1662; security-relevant subsystem 1652 is shown to include data fields 1664, 1666, 1668, 1670; and security-relevant subsystem 1654 is shown to include data fields 1672, 1674, 1676, 1678.

These data fields (e.g., data fields 1656, 1658, 1660, 1662, 1664, 1666, 1668, 1670, 1672, 1674, 1676, 1678) may be populatable by the third-party (e.g., the user/owner/operator of computing platform 60) to enable such searching. For example, the third-party (e.g., the user/owner/operator of computing platform 60) may populate these data fields by typing information into some of these data fields (e.g., data fields 1656, 1658, 1660, 1666, 1668, 1670, 1672, 1674, 1676). Additionally/alternatively, the third-party (e.g., the user/owner/operator of computing platform 60) may populate these data fields via a drop-down menu available within some of these data fields (e.g., data fields 1662, 1664, 1678). For example, data field 1662 is shown to be populatable via drop down menu 1680, data field 1664 is shown to be populatable via drop down menu 1682, and data field 1678 is shown to be populatable via drop down menu 1684.

Through the use of such data fields, the third-party (e.g., the user/owner/operator of computing platform 60) may populate one of more of these data fields to define a query that may be effectuated on the information contained/available within these security-relevant subsystems (e.g., security-relevant subsystem 1650, security-relevant subsystem 1652 and security-relevant subsystem 1654) so that the pertinent information may be obtained.

Naturally, the subject matter of these individual data fields may vary depending upon the type of information available via these security-relevant subsystems (e.g., security-relevant subsystem 1650, security-relevant subsystem 1652 and security-relevant subsystem 1654). As (in this example) these are security-relevant subsystems, the information available from these security-relevant subsystems concerns the security of computing platform 60 and/or any security events (e.g., access auditing; anomalies; authentication; denial of services; exploitation; malware; phishing; spamming; reconnaissance; and/or web attack) occurring therein. For example, some of these data fields may concern e.g., user names, user IDs, device locations, device types, device IP addresses, source IP addresses, destination IP addresses, port addresses, deployed operating systems, utilized bandwidth, etc.

As discussed above, in order to enable the querying of multiple separate and discrete subsystems (e.g., security-relevant subsystem 1650, security-relevant subsystem 1652 and security-relevant subsystem 1654) using a single query operation, threat mitigation process 10 may map 1602 one or more data fields of unified platform 290 (e.g., a platform effectuated by threat mitigation process 10) to one or more data fields of each of the plurality of security-relevant subsystems (e.g., security-relevant subsystem 1650, security-relevant subsystem 1652 and security-relevant subsystem 1654).

In this particular example, unified platform 290 (e.g., a platform effectuated by threat mitigation process 10) is shown to include four data fields (e.g., data fields 1686, 1688, 1690, 1692), wherein:

- data field 1686 within unified platform 290 concerns a user ID (and is entitled USER_ID);
- data field 1688 within unified platform 290 concerns a device IP address (and is entitled DEVICE_IP);
- data field 1690 within unified platform 290 concerns a destination IP address (and is entitled DESTINATION_IP); and
- data field 1692 within unified platform 290 concerns a query result set (and is entitled QUERY_RESULT).

When mapping 1602 data fields within unified platform 290 (e.g., a platform effectuated by threat mitigation process 10) to data fields within each of the plurality of security-relevant subsystems (e.g., security-relevant subsystem 1650, security-relevant subsystem 1652 and security-relevant subsystem 1654), threat mitigation process 10 may only map 1602 data fields that are related with respect to subject matter.

As discussed above, data field 1686 within unified platform 290 (e.g., a platform effectuated by threat mitigation process 10) concerns a user ID (and is entitled USER_ID). For this example, assume that:

- data field 1656 within security-relevant subsystem 1650 also concerns a user ID and is entitled USER;
- data field 1666 within security-relevant subsystem 1652 also concerns a user ID and is entitled ID; and
- data field 1676 within security-relevant subsystem 1654 also concerns a user ID and is entitled USR_ID.

Accordingly, threat mitigation process 10 may map 1602 data field 1686 of unified platform 290 (e.g., a platform effectuated by threat mitigation process 10) to:

- data field 1656 of security-relevant subsystem 1650;
- data field 1666 of security-relevant subsystem 1652; and
- data field 1676 of security-relevant subsystem 1654.

As discussed above, data field 1688 within unified platform 290 (e.g., a platform effectuated by threat mitigation process 10) concerns a device IP address (and is entitled DEVICE_IP). For this example, assume that:

- data field 1660 within security-relevant subsystem 1650 also concerns a device IP address and is entitled DEV_IP;
- data field 1670 within security-relevant subsystem 1652 also concerns a device IP address and is entitled IP_DEVICE; and
- data field 1674 within security-relevant subsystem 1654 also concerns a device IP address and is entitled IP_DEV Accordingly, threat mitigation process 10 may map 1602 data field 1688 of unified platform 290 (e.g., a platform effectuated by threat mitigation process 10) to:

- data field 1660 of security-relevant subsystem 1650;
- data field 1670 of security-relevant subsystem 1652; and
- data field 1674 of security-relevant subsystem 1654.

As discussed above, data field 1690 within unified platform 290 (e.g., a platform effectuated by threat mitigation process 10) concerns a destination IP address (and is entitled DESTINATION_IP). For this example, assume that:

- data field 1658 within security-relevant subsystem 1650 also concerns a destination IP address and is entitled DEST_IP;
- data field 1668 within security-relevant subsystem 1652 also concerns a destination IP address and is entitled IP_DEST; and
- data field 1672 within security-relevant subsystem 1654 also concerns a destination IP address and is entitled IP_DES.

Accordingly, threat mitigation process 10 may map 1602 data field 1690 of unified platform 290 (e.g., a platform effectuated by threat mitigation process 10) to:

- data field 1658 of security-relevant subsystem 1650;
- data field 1668 of security-relevant subsystem 1652; and
- data field 1672 of security-relevant subsystem 1654.

As discussed above, data field 1692 within unified platform 290 (e.g., a platform effectuated by threat mitigation process 10) concerns a query result (and is entitled QUERY_RESULT). For this example, assume that:

- data field 1662 within security-relevant subsystem 1650 also concerns a query result and is entitled RESULT;
- data field 1664 within security-relevant subsystem 1652 also concerns a query result and is entitled Q_RESULT; and
- data field 1678 within security-relevant subsystem 1654 also concerns a query result and is entitled RESULT_Q.

Accordingly, threat mitigation process 10 may map 1602 data field 1692 of unified platform 290 (e.g., a platform effectuated by threat mitigation process 10) to:

- data field 1662 of security-relevant subsystem 1650;
- data field 1664 of security-relevant subsystem 1652; and
- data field 1678 of security-relevant subsystem 1654.

Through the use of threat mitigation process 10, a query (e.g., query 1694) may be defined within one or more of data fields 1686, 1688, 1690 of unified platform 290 (e.g., a platform effectuated by threat mitigation process 10), wherein this query (e.g., query 1694) may be provided (via the above-described mappings) to the appropriate data fields within the security-relevant subsystems (e.g., security-relevant subsystem 1650, security-relevant subsystem 1652 and security-relevant subsystem 1654).

Accordingly and when mapping 1602 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), threat mitigation process 10 may map 1604 one or more data fields within a query structure of the unified platform (e.g., unified platform 290) to one or more data fields within a query structure of each of the plurality of security-relevant subsystems (e.g., security-relevant subsystem 1650, security-relevant subsystem 1652 and security-relevant subsystem 1654).

Therefore, if a query (e.g., query 1694) was defined on unified platform 290 (e.g., a platform effectuated by threat mitigation process 10) that specified a user ID within data field 1686, a device IP address within data field 1688, and a destination IP address within data field 1690; by mapping 1604 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), this structured query (e.g., query 1694) may be provided to the plurality of security-relevant subsystems (e.g., security-relevant subsystem 1650, security-relevant subsystem 1652 and security-relevant subsystem 1654) in a fashion that enables the plurality of security-relevant subsystems (e.g., security-relevant subsystem 1650, security-relevant subsystem 1652 and security-relevant subsystem 1654) to effectuate the structured query (e.g., query 1694).

Upon effectuating such a structured query (e.g., query 1694), the plurality of security-relevant subsystems (e.g., security-relevant subsystem 1650, security-relevant subsystem 1652 and security-relevant subsystem 1654) may each generate a subsystem-specific result set. For example, security-relevant subsystem 1650 may generate subsystem-specific result set 1696, security-relevant subsystem 1652 may generate subsystem-specific result set 1698, and security-relevant subsystem 1654 may generate subsystem-specific result set 1700.

Through the use of threat mitigation process 10, subsystem-specific result sets (e.g., subsystem-specific result sets 1696, 1698, 1700) may be defined within one or more of data fields (e.g., data fields 1662, 1664, 1678) of the plurality of security-relevant subsystems (e.g., security-relevant subsystem 1650, security-relevant subsystem 1652 and security-relevant subsystem 1654), wherein these subsystem-specific result sets (e.g., subsystem-specific result sets 1696, 1698, 1700) may be provided (via the above-described mappings) to the appropriate data fields within the unified platform (e.g., unified platform 290).

Accordingly and when mapping 1602 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), threat mitigation process 10 may map 1606 one or more data fields within a result set structure of each of the plurality of security-relevant subsystems (e.g., security-relevant subsystem 1650, security-relevant subsystem 1652 and security-relevant subsystem 1654) to one or more data fields within a result set structure of the unified platform (e.g., unified platform 290).

Therefore, by mapping 1606 one or more data fields within a result set structure of each of the plurality of security-relevant subsystems (e.g., security-relevant subsystem 1650, security-relevant subsystem 1652 and security-relevant subsystem 1654) to one or more data fields within a result set structure of the unified platform (e.g., unified platform 290), these subsystem-specific result sets (e.g., subsystem-specific result sets 1696, 1698, 1700) may be provided to the unified platform (e.g., unified platform 290) in a fashion that enables the unified platform (e.g., unified platform 290) to properly process these subsystem-specific result sets (e.g., subsystem-specific result sets 1696, 1698, 1700).

It is foreseeable that over time, the data fields within the plurality of security-relevant subsystems (e.g., security-relevant subsystem 1650, security-relevant subsystem 1652 and security-relevant subsystem 1654) may change. For example, additional data fields may be added to and/or certain data fields may be deleted from the plurality of security-relevant subsystems. Accordingly and in order to ensure that the above-described mapping remain current and accurate, such mappings may be periodically refreshed.

Accordingly and when mapping 1602 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), threat mitigation process 10 may map 1608 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654) at a defined periodicity.

Therefore, at a certain frequency (e.g., every few minutes, every few hours, every few days, every few weeks or every few months), the above-describe mapping process may be reperformed to ensure that the above-described mappings are up to date.

Further and when mapping 1602 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), threat mitigation process 10 may proactively map 1610 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654).

For example, the above-described mapping process may be proactively done, wherein threat mitigation process 10 actively monitors the security-relevant subsystems within computing platform 60 so that the data fields within these security-relevant subsystems may be proactively mapped 1610 prior to a third-party (e.g., the user/owner/operator of computing platform 60) defining a query within unified platform 290.

Additionally and when mapping 1602 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), threat mitigation process 10 may reactively map 1612 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654).

For example, the above-described mapping process may be reactively performed, wherein threat mitigation process 10 may not actively monitor the security-relevant subsystems within computing platform 60 and the data fields within these security-relevant subsystems may be reactively mapped 1612 after a third-party (e.g., the user/owner/operator of computing platform 60) defines a query within unified platform 290.

As discussed above, threat mitigation process 10 may allow a third-party (e.g., the user/owner/operator of computing platform 60) to define 1614 a unified query (e.g., query 1694) on a unified platform (e.g., unified platform 290) concerning security-relevant subsystems 226 (e.g., security-relevant subsystem 1650, security-relevant subsystem 1652 and security-relevant subsystem 1654).

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

Threat mitigation process 10 may denormalize 1616 the unified query (e.g., query 1694) to define a subsystem-specific query for each of the plurality of security-relevant subsystems (e.g., security-relevant subsystem 1650, security-relevant subsystem 1652 and security-relevant subsystem 1654), thus defining a plurality of subsystem-specific queries (e.g., subsystem-specific queries 1702, 1704, 1706).

As discussed above, unified platform 290 (e.g., a platform effectuated by threat mitigation process 10) is shown to include four data fields (e.g., data fields 1686, 1688, 1690, 1692), wherein a third-party (e.g., the user/owner/operator of computing platform 60) may utilize these data fields to define the unified query (e.g., query 1694). As this unified query (e.g., query 1694) may be used as the basis to search for pertinent information on (in this example) three entirely separate and discrete subsystems (e.g., security-relevant subsystem 1650, security-relevant subsystem 1652 and security-relevant subsystem 1654), it is foreseeable that these subsystems (e.g., security-relevant subsystem 1650, security-relevant subsystem 1652 and security-relevant subsystem 1654) may require queries to be structured differently.

Accordingly and when denormalizing 1616 the unified query (e.g., query 1694) to define a subsystem-specific query for each of the plurality of security-relevant subsystems (e.g., security-relevant subsystem 1650, security-relevant subsystem 1652 and security-relevant subsystem 1654), thus defining a plurality of subsystem-specific queries (e.g., subsystem-specific queries 1702, 1704, 1706), threat mitigation process 10 may translate 1618 a syntax of the unified query (e.g., query 1694) to a syntax of each of the plurality of subsystem-specific queries (e.g., subsystem-specific queries 1702, 1704, 1706). For example:

- security-relevant subsystem 1650 may only be capable of processing queries having a first structure and/or utilizing a first nomenclature;
- security-relevant subsystem 1652 may only be capable of processing queries having a second structure and/or utilizing a second nomenclature; and
- security-relevant subsystem 1654 may only be capable of processing queries having a third structure and/or utilizing a third nomenclature.

Accordingly and when denormalizing 1616 the unified query (e.g., query 1694) to define a plurality of subsystem-specific queries (e.g., subsystem-specific queries 1702, 1704, 1706), threat mitigation process 10 may translate 1618 the syntax of the unified query (e.g., query 1694) so that:

- subsystem-specific query 1702 has a first structure and/or utilizes a first nomenclature;
- subsystem-specific query 1704 has a second structure and/or utilizes a second nomenclature;
- subsystem-specific query 1706 has a third structure and/or utilizes a third nomenclature.

Threat mitigation process 10 may provide 1620 the plurality of subsystem-specific queries (e.g., subsystem-specific queries 1702, 1704, 1706) to the plurality of security-relevant subsystems (e.g., security-relevant subsystem 1650, security-relevant subsystem 1652 and security-relevant subsystem 1654).

The plurality of subsystem-specific queries (e.g., subsystem-specific queries 1702, 1704, 1706) may be effectuated on the appropriate security-relevant subsystem. For example, subsystem-specific query 1702 may be effectuated on security-relevant subsystem 1650, subsystem-specific query 1704 may be effectuated on security-relevant subsystem 1652, and subsystem-specific query 1706 may be effectuated on security-relevant subsystem 1654; resulting in the generation of subsystem-specific result sets. For example, security-relevant subsystem 1650 may generate subsystem-specific result set 1696, security-relevant subsystem 1652 may generate subsystem-specific result set 1698, and security-relevant subsystem 1654 may generate subsystem-specific result set 1700.

Threat mitigation process 10 may receive 1622 a plurality of subsystem-specific results sets (e.g., subsystem-specific result sets 1696, 1698, 1700) from the plurality of security-relevant subsystems (e.g., security-relevant subsystem 1650, security-relevant subsystem 1652 and security-relevant subsystem 1654, respectively) that were generated in response to the plurality of subsystem-specific queries (e.g., subsystem-specific queries 1702, 1704, 1706).

Threat mitigation process 10 may normalize 1624 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708). For example, threat mitigation process 10 may process the plurality of subsystem-specific results sets (e.g., subsystem-specific result sets 1696, 1698, 1700) so that the subsystem-specific results sets all have a common format, a common nomenclature, and/or a common structure.

Accordingly and when normalizing 1624 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708), threat mitigation process 10 may translate 1626 a syntax of each of the plurality of subsystem-specific results sets (e.g., subsystem-specific result sets 1696, 1698, 1700) to a syntax of the unified result set (e.g., unified result set 1708).

As discussed above:

- security-relevant subsystem 1650 may only be capable of processing queries having a first structure and/or utilizing a first nomenclature;
- security-relevant subsystem 1652 may only be capable of processing queries having a second structure and/or utilizing a second nomenclature; and
- security-relevant subsystem 1654 may only be capable of processing queries having a third structure and/or utilizing a third nomenclature.

Accordingly and when producing a result set:

- security-relevant subsystem 1650 may only be capable producing a result set (e.g., subsystem-specific result set 1696) having a first structure and/or utilizing a first nomenclature;
- security-relevant subsystem 1652 may only be capable producing a result set (e.g., subsystem-specific result set 1698) having a second structure and/or utilizing a second nomenclature; and
- security-relevant subsystem 1654 may only be capable producing a result set (e.g., subsystem-specific result set 1700) having a third structure and/or utilizing a third nomenclature.

Accordingly and when normalizing 1624 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708), threat mitigation process 10 may translate 1626 the syntax of:

subsystem-specific result set 1696 from a first structure/first nomenclature to a unified syntax of the unified result set (e.g., unified result set 1708);

subsystem-specific result set 1698 from a second structure/second nomenclature to the unified syntax of the unified result set (e.g., unified result set 1708);

subsystem-specific result set 1700 from a third structure/third nomenclature to a unified syntax of the unified result set (e.g., unified result set 1708).

Once normalized 1624, 1626, threat mitigation process 10 may combine the subsystem-specific results sets (e.g., subsystem-specific result sets 1696, 1698, 1700) to form the unified result set (e.g., unified result set 1708), wherein threat mitigation process 10 may then provide 1628 the unified result set (e.g., unified result set 1708) to a third-party (e.g., the user/owner/operator of computing platform 60).

Threat Hunting

Figure 33:
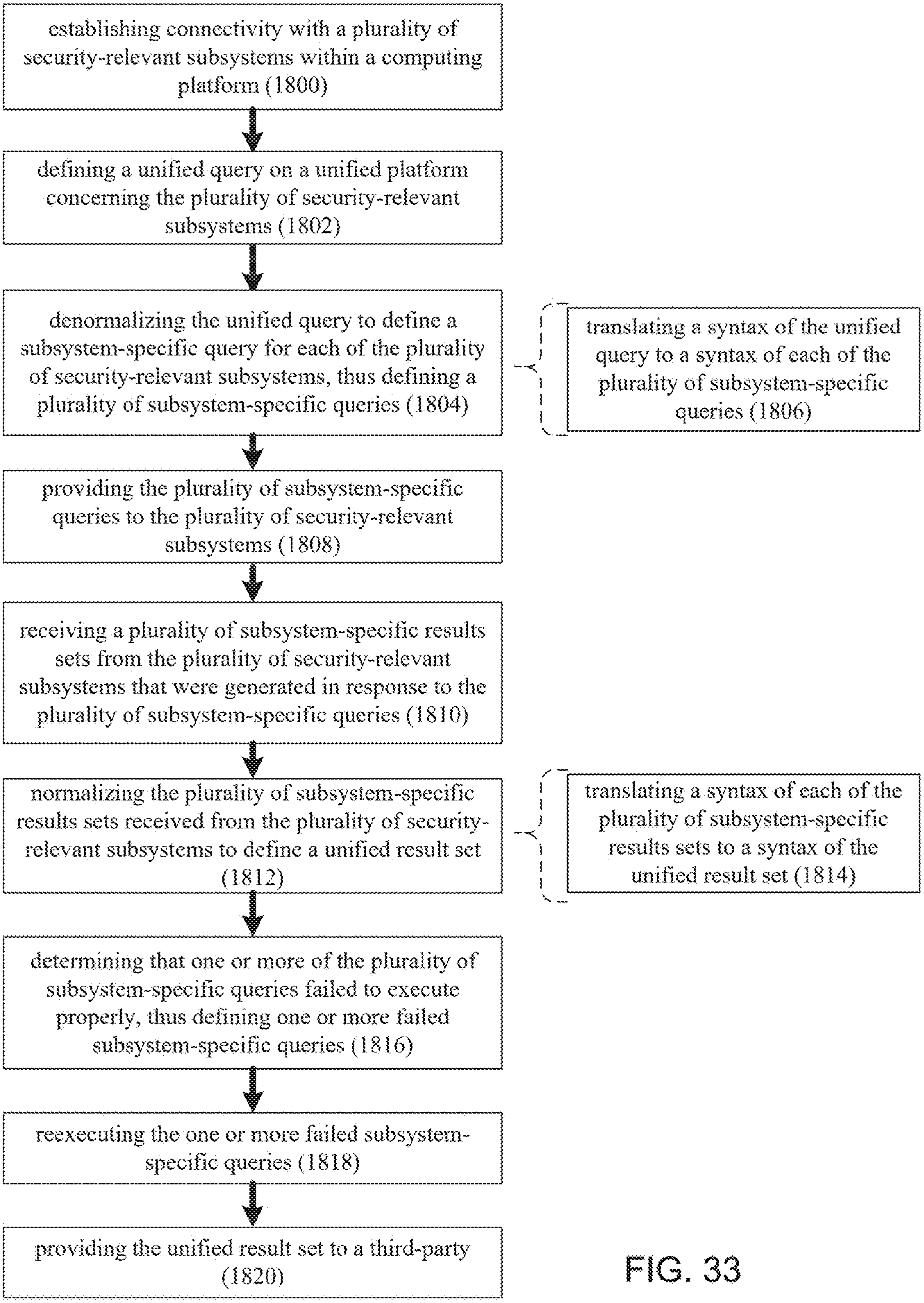
FIG. 33 is a flowchart of another implementation of the threat mitigation process of FIG. 1 according to an embodiment of the present disclosure.

Referring also to FIG. 33, threat mitigation process 10 may establish 1800 connectivity with a plurality of security-relevant subsystems (e.g., security-relevant subsystems 226) within computing platform 60, wherein examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 1800 connectivity with a plurality of security-relevant subsystems (e.g., security-relevant subsystems 226), threat mitigation process 10 may utilize at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

As discussed above, threat mitigation process 10 may allow a third-party (e.g., the user/owner/operator of computing platform 60) to define 1802 a unified query (e.g., query 1694) on a unified platform (e.g., unified platform 290) concerning security-relevant subsystems 226 (e.g., security-relevant subsystem 1650, security-relevant subsystem 1652 and security-relevant subsystem 1654). In order to enable the querying of these separate and discrete subsystems (e.g., security-relevant subsystem 1650, security-relevant subsystem 1652 and security-relevant subsystem 1654 within security-relevant subsystems 226) using a single query operation, threat mitigation process 10 may map (in the manner discussed above) one or more data fields of unified platform 290 (e.g., a platform effectuated by threat mitigation process 10) to one or more data fields of each of the plurality of security-relevant subsystems (e.g., e.g., security-relevant subsystem 1650, security-relevant subsystem 1652 and security-relevant subsystem 1654 within security-relevant subsystems 226).

Threat mitigation process 10 may denormalize 1804 the unified query (e.g., query 1694) to define a subsystem-specific query for each of the plurality of security-relevant subsystems (e.g., security-relevant subsystem 1650, security-relevant subsystem 1652 and security-relevant subsystem 1654), thus defining a plurality of subsystem-specific queries (e.g., subsystem-specific queries 1702, 1704, 1706).

One or more of the plurality of subsystem-specific queries (e.g., subsystem-specific queries 1702, 1704, 1706) may have a defined execution schedule (e.g., defined execution schedule 1702S for subsystem-specific query 1702, defined execution schedule 1704S for subsystem-specific query 1704, and defined execution schedule 1706S for subsystem-specific query 1706). The defined execution schedule (e.g., defined execution schedule 1702S. 1704S, 1706S) may include one or more of: a defined execution time; a defined execution date; a defined execution frequency; and a defined execution scope.

Defined Execution Time: The defined execution schedule (e.g., defined execution schedule 1702S. 1704S, 1706S) may define a particular time that a task is performed. For example, the defined execution schedule (e.g., defined execution schedule 1702S. 1704S, 1706S) may define that an MDM (i.e., Mobile Device Management) system provide a device access report at midnight (local time) every day.

Defined Execution Date: The defined execution schedule (e.g., defined execution schedule 1702S. 1704S, 1706S) may define a particular date that a task is performed. For example, the defined execution schedule (e.g., defined execution schedule 1702S. 1704S, 1706S) may define that a router provide a port opening report at COB every Friday (local time).

Defined Execution Frequency: The defined execution schedule (e.g., defined execution schedule 1702S. 1704S, 1706S) may define a particular frequency that a task is performed. For example, the defined execution schedule (e.g., defined execution schedule 1702S. 1704S, 1706S) may define that a CDN (i.e., Content Delivery Network) system provide a quantity delivered report every hour.

Defined Execution Scope: The defined execution schedule (e.g., defined execution schedule 1702S. 1704S, 1706S) may define a particular scope for a task being performed. For example, the defined execution schedule (e.g., defined execution schedule 1702S. 1704S, 1706S) may define that a switch provide an activity report for a specific port within the switch.

These defined execution schedules (e.g., defined execution schedule 1702S. 1704S, 1706S) may be a default execution schedule that is configured to be revisable by a third-party (e.g., the user/owner/operator of computing platform 60). For example and with respect to these defined execution schedules (e.g., defined execution schedule 1702S, 1704S, 1706S):

the default time may be midnight, which may be revisable by the third-party (e.g., the user/owner/operator of computing platform 60);

the default date may be the 1$^{st}$ of the month, which may be revisable by the third-party (e.g., the user/owner/operator of computing platform 60);

the default frequency may be once, which may be revisable by the third-party (e.g., the user/owner/operator of computing platform 60); and the default scope may be a narrower scope, which may be revisable by the third-party (e.g., the user/owner/operator of computing platform 60).

As discussed above, unified platform 290 (e.g., a platform effectuated by threat mitigation process 10) is shown to include four data fields (e.g., data fields 1686, 1688, 1690, 1692), wherein a third-party (e.g., the user/owner/operator of computing platform 60) may utilize these data fields to define the unified query (e.g., query 1694). As this unified query (e.g., query 1694) may be used as the basis to search for pertinent information on (in this example) three entirely separate and discrete subsystems (e.g., security-relevant subsystem 1650, security-relevant subsystem 1652 and security-relevant subsystem 1654), it is foreseeable that these subsystems (e.g., security-relevant subsystem 1650, security-relevant subsystem 1652 and security-relevant subsystem 1654) may require queries to be structured differently.

Accordingly and when denormalizing 1804 the unified query (e.g., query 1694) to define a subsystem-specific query for each of the plurality of security-relevant subsystems (e.g., security-relevant subsystem 1650, security-relevant subsystem 1652 and security-relevant subsystem 1654), thus defining a plurality of subsystem-specific queries (e.g., subsystem-specific queries 1702, 1704, 1706), threat mitigation process 10 may translate 1806 a syntax of the unified query (e.g., query 1694) to a syntax of each of the plurality of subsystem-specific queries (e.g., subsystem-specific queries 1702, 1704, 1706). For example:

- security-relevant subsystem 1650 may only be capable of processing queries having a first structure and/or utilizing a first nomenclature;
- security-relevant subsystem 1652 may only be capable of processing queries having a second structure and/or utilizing a second nomenclature; and
- security-relevant subsystem 1654 may only be capable of processing queries having a third structure and/or utilizing a third nomenclature.

Accordingly and when denormalizing 1804 the unified query (e.g., query 1694) to define a plurality of subsystem-specific queries (e.g., subsystem-specific queries 1702, 1704, 1706), threat mitigation process 10 may translate 1806 the syntax of the unified query (e.g., query 1694) so that:

- subsystem-specific query 1702 has a first structure and/or utilizes a first nomenclature;
- subsystem-specific query 1704 has a second structure and/or utilizes a second nomenclature;
- subsystem-specific query 1706 has a third structure and/or utilizes a third nomenclature.

Threat mitigation process 10 may provide 1808 the plurality of subsystem-specific queries (e.g., subsystem-specific queries 1702, 1704, 1706) to the plurality of security-relevant subsystems (e.g., security-relevant subsystem 1650, security-relevant subsystem 1652 and security-relevant subsystem 1654).

The plurality of subsystem-specific queries (e.g., subsystem-specific queries 1702, 1704, 1706) may be effectuated on the appropriate security-relevant subsystem. For example, subsystem-specific query 1702 may be effectuated on security-relevant subsystem 1650, subsystem-specific query 1704 may be effectuated on security-relevant subsystem 1652, and subsystem-specific query 1706 may be effectuated on security-relevant subsystem 1654; resulting in the generation of subsystem-specific result sets. For example, security-relevant subsystem 1650 may generate subsystem-specific result set 1696, security-relevant subsystem 1652 may generate subsystem-specific result set 1698, and security-relevant subsystem 1654 may generate subsystem-specific result set 1700.

Threat mitigation process 10 may receive 1810 a plurality of subsystem-specific results sets (e.g., subsystem-specific result sets 1696, 1698, 1700) from the plurality of security-relevant subsystems (e.g., security-relevant subsystem 1650, security-relevant subsystem 1652 and security-relevant subsystem 1654, respectively) that were generated in response to the plurality of subsystem-specific queries (e.g., subsystem-specific queries 1702, 1704, 1706).

And by mapping (in the manner discussed above) one or more data fields within a result set structure of each of the plurality of security-relevant subsystems (e.g., security-relevant subsystem 1650, security-relevant subsystem 1652 and security-relevant subsystem 1654) to one or more data fields within a result set structure of the unified platform (e.g., unified platform 290), these subsystem-specific result sets (e.g., subsystem-specific result sets 1696, 1698, 1700) may be provided to the unified platform (e.g., unified platform 290) in a fashion that enables the unified platform (e.g., unified platform 290) to properly process these subsystem-specific result sets (e.g., subsystem-specific result sets 1696, 1698, 1700).

Threat mitigation process 10 may normalize 1812 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708). For example, threat mitigation process 10 may process the plurality of subsystem-specific results sets (e.g., subsystem-specific result sets 1696, 1698, 1700) so that the subsystem-specific results sets all have a common format, a common nomenclature, and/or a common structure.

Accordingly and when normalizing 1812 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708), threat mitigation process 10 may translate 1814 a syntax of each of the plurality of subsystem-specific results sets (e.g., subsystem-specific result sets 1696, 1698, 1700) to a syntax of the unified result set (e.g., unified result set 1708).

As discussed above:

- security-relevant subsystem 1650 may only be capable of processing queries having a first structure and/or utilizing a first nomenclature;
- security-relevant subsystem 1652 may only be capable of processing queries having a second structure and/or utilizing a second nomenclature; and
- security-relevant subsystem 1654 may only be capable of processing queries having a third structure and/or utilizing a third nomenclature.

Accordingly and when producing a result set:

- security-relevant subsystem 1650 may only be capable producing a result set (e.g., subsystem-specific result set 1696) having a first structure and/or utilizing a first nomenclature;
- security-relevant subsystem 1652 may only be capable producing a result set (e.g., subsystem-specific result set 1698) having a second structure and/or utilizing a second nomenclature; and
- security-relevant subsystem 1654 may only be capable producing a result set (e.g., subsystem-specific result set 1700) having a third structure and/or utilizing a third nomenclature.

Accordingly and when normalizing 1812 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708), threat mitigation process 10 may translate 1814 the syntax of:

- subsystem-specific result set 1696 from a first structure/first nomenclature to a unified syntax of the unified result set (e.g., unified result set 1708);
- subsystem-specific result set 1698 from a second structure/second nomenclature to the unified syntax of the unified result set (e.g., unified result set 1708);
- subsystem-specific result set 1700 from a third structure/third nomenclature to a unified syntax of the unified result set (e.g., unified result set 1708).

As could be imagined, it is foreseeable that e.g., one or more of security-relevant subsystems 226 may be offline when asked to perform a task (or go offline while performing a task). Therefore, one or more of subsystem-specific result sets 1696, 1698, 1700 may be missing/incomplete/defective. Accordingly, threat mitigation process 10 may be configured to determine 1816 whether one or more of the plurality of subsystem-specific queries (e.g., subsystem-specific queries 1702, 1704, 1706) failed to execute properly, thus defining one or more failed subsystem-specific queries. And if one or more of the plurality of subsystem-specific queries (e.g., subsystem-specific queries 1702, 1704, 1706) failed to execute properly, threat mitigation process 10 may reexecute 1818 the one or more failed subsystem-specific queries.

As discussed above and in this example, threat mitigation process 10 provides 1808 subsystem-specific query 1702 to security-relevant subsystem 1650; subsystem-specific query 1704 to security-relevant subsystem 1652; and subsystem-specific query 1706 to security-relevant subsystem 1654.

Assume for this example that security-relevant subsystem 1650 went offline while executing subsystem-specific query 1702 and has since come back online. However, upon threat mitigation process 10 examining subsystem-specific result set 1696, it is determined that subsystem-specific result set 1696 only contains 53,246 pieces of data (but is supposed to contain 100,000 pieces of data). Accordingly, threat mitigation process 10 may determine 1816 that subsystem-specific query 1702 failed to execute properly, thus defining subsystem-specific query 1702 as a failed subsystem-specific query. Accordingly, threat mitigation process 10 may reexecute 1818 the failed subsystem-specific query (e.g., subsystem-specific query 1702) so the requested 100,000 pieces of data may be obtained from security-relevant subsystem 1650 (and the previously-obtained 53,246 pieces of data may be deleted).

Once the plurality of subsystem-specific results sets (e.g., subsystem-specific result sets 1696, 1698, 1700) are normalized 1812, threat mitigation process 10 may combine the subsystem-specific results sets (e.g., subsystem-specific result sets 1696, 1698, 1700) to form the unified result set (e.g., unified result set 1708), wherein threat mitigation process 10 may then provide 1820 the unified result set (e.g., unified result set 1708) to a third-party (e.g., the user/owner/operator of computing platform 60).

Generative AI/Large Language Model Utilization

Threat mitigation process 10 may be configured to harness the power of Generative AI and Large Language Models (LLM). Generative AI models (e.g., AI/ML process 56), as part of the broader artificial intelligence and machine learning landscape, are beginning to play a crucial role in enhancing network threat detection systems. Unlike traditional, discriminative models that classify input data into predefined categories (e.g., malicious or benign), generative models can learn to generate new data samples that are similar to the training data.

Here's how these capabilities are being harnessed for network threat detection:

- Anomaly Detection: Generative models, such as Generative Adversarial Networks (GANs), can be trained on normal network traffic data to understand what typical network behavior looks like. Once trained, these models can generate new network traffic data that is expected to be similar to the "normal" traffic. By comparing real network traffic to these generated patterns, anomalies that could indicate potential threats, such as DDoS attacks or unauthorized access, can be detected more efficiently. Anomalies stand out because they deviate significantly from the generated "normal" patterns.
- Synthetic Data Generation: One of the challenges in training effective network threat detection systems is the scarcity of labeled data, especially for new and emerging threats. Generative AI models can help by creating large volumes of synthetic network traffic data, including both normal operations and various types of attack scenarios. This synthetic data can help in training more robust discriminative models (such as deep learning-based classifiers) by providing a richer, more varied dataset that covers a wider range of possible threats.
- Improving Data Privacy: In some contexts, using real network traffic data to train threat detection models can raise privacy concerns, especially if the data contains sensitive information. Generative models can be used to create synthetic data that mimics real network traffic without containing any actual user or proprietary information. This approach allows for the development and testing of threat detection systems in a manner that is respectful of privacy concerns.
- Evolving Threat Simulation: Cyber threats are constantly evolving, and keeping threat detection systems up to date can be challenging. Generative models can be used to simulate how threats might evolve over time, generating new, unseen threat patterns for testing the resilience of network systems. This proactive approach helps in identifying potential vulnerabilities before they are exploited in the wild.
- Training and Testing Environments: Generative models can create realistic network environments for training cybersecurity professionals. By simulating various attack scenarios, these models provide a dynamic and challenging environment for cybersecurity training, allowing professionals to experience and respond to a range of threats in a controlled, risk-free setting.
- Limitations and Challenges: While generative AI models offer promising capabilities for network threat detection, there are also limitations and challenges. These include the complexity of training these models, the risk of generating misleading data, and the computational resources required.

Additionally, as attackers also leverage AI, there's a continuous arms race between threat actors and defenders.

Generally speaking, generative AI models are increasingly being explored for their potential to revolutionize network threat detection systems. By enhancing anomaly detection, enabling the generation of synthetic data, and simulating evolving threats, these models can significantly improve the ability of organizations to detect and respond to cyber threats more effectively and efficiently.

As is known in the art, a large language model is an artificial intelligence system that is trained on massive amounts of text data to generate human-like responses to natural language inputs. These models use complex algorithms and neural networks to learn patterns and relationships in language data, enabling them to understand and generate responses to human language.

The primary use of large language models is to improve natural language processing in a wide range of applications (e.g., virtual assistants, chatbots, search engines, and language translation tools). These models have made significant advances in recent years, and are now able to generate highly convincing and accurate responses to complex human language inputs.

Large language models can be used to generate text in a variety of formats, including spoken language, written language, and code. They can also be used to summarize text, generate creative writing, and even create music or art. As the technology continues to improve, large language models are expected to play an increasingly important role in a wide range of industries, including healthcare, finance, and entertainment.

Automated Generation of a Human-Readable Report

Figure 34:
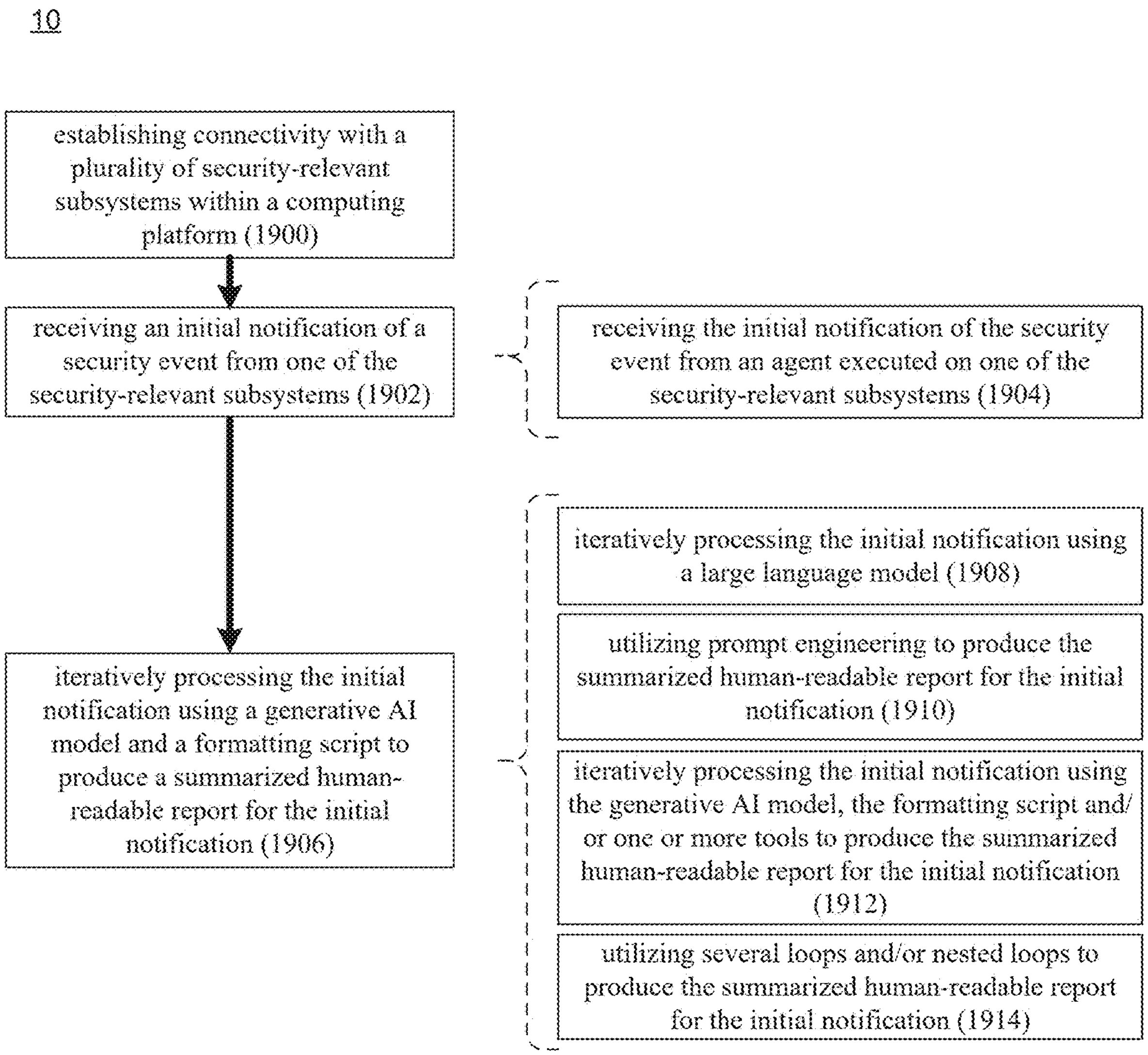
FIG. 34 is a flowchart of another implementation of the threat mitigation process of FIG. 1 according to an embodiment of the present disclosure.

Referring also to FIG. 34, threat mitigation process 10 may establish 1900 connectivity with a plurality of security-relevant subsystems (e.g., security-relevant subsystems 226) within a computing platform (e.g., computing platform 60).

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

In a computing platform (e.g., computing platform 60), establishing connectivity between security-relevant subsystems (e.g., security-relevant subsystems 226)—such as firewalls, intrusion detection systems, intrusion prevention systems, and security information and event management systems—may require a multifaceted approach that encompasses network configuration, secure communication protocols, authentication, authorization mechanisms, and centralized management. Initially, each subsystem may be assigned a unique IP address, either statically or via DHCP, for identification and is often segmented into subnets to enhance both performance and security, with dedicated security subnets for these critical components.

Secure communication among these subsystems may be paramount, utilizing protocols such as TLS/SSL for encryption, VPNs for creating secure connections over potentially insecure networks, and SSH for secure administrative actions and file transfers. The integrity and confidentiality of communications may be further ensured through the use of digital certificates within a Public Key Infrastructure, Access Control Lists, and Role-Based Access Control, which collectively authenticate devices and authorize only permitted interactions.

The backbone of inter-subsystem connectivity may lie in network protocols like IPSec for securing IP communications and SNMPv3 for secure network management. These subsystems are typically managed through centralized consoles, allowing for uniform policy distribution and configuration across the network. Monitoring and logging may play crucial roles, with tools like Syslog and STEM systems aggregating and analyzing log data for real-time security alerting.

Moreover, network segmentation and the implementation of demilitarized zones (DMZs) may be strategies employed to further delineate and secure the network infrastructure. Firewalls may be meticulously configured to control traffic between these segments, enforcing security policies that dictate allowed and blocked communications based on established rules.

Through this comprehensive approach-integrating secure communication channels, robust authentication and authorization, and vigilant monitoring-security-relevant subsystems within a computer network can establish secure and efficient connectivity. This interconnectedness may be vital for the detection, prevention, and response to security threats, ensuring the overarching protection of information systems and data within an organization.

Threat mitigation process 10 may receive 1902 an initial notification (e.g., initial notification 298) of a security event from one of the security-relevant subsystems (e.g., security-relevant subsystems 226). As discussed above, examples of such security events may include but are not limited to access auditing; anomalies; authentication; denial of services; exploitation; malware; phishing; spamming; reconnaissance; and/or web attack within a monitored computing platform (e.g., computing platform 60).

The initial notification (e.g., initial notification 298) may include a computer-readable language portion that defines one or more specifics of the security event. An example of the computer-readable language portion (e.g., within initial notification 298 of the security event) may include but is not limited to a JSON portion.

When receiving 1902 an initial notification (e.g., initial notification 298) of a security event from one of the security-relevant subsystems (e.g., security-relevant subsystems 226), threat mitigation process 10 may receive 1904 the initial notification (e.g., initial notification 298) of the security event from an agent (e.g., agent 300) executed on one of the security-relevant subsystems (e.g., security-relevant subsystems 226).

In the context of a threat mitigation process 10, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

Functions of Agents (e.g., agent 300):

- Monitoring Network Traffic: Agents may continuously monitor network traffic for signs of unusual or suspicious behavior. This includes analyzing packets, inspecting protocols, and scrutinizing port activity, among other things.
- Detection of Anomalies: Agents may use predefined rules or sophisticated algorithms (including machine learning models) to identify deviations from normal network behavior, which could indicate an intrusion or an attempt at one.
- Log Activity: Agents may log network activity, providing a detailed record of traffic patterns, access attempts, and potentially malicious activities. This information is crucial for forensic analysis and understanding the nature of any attack.

- Alert Generation: Upon detecting suspicious activities, agents may generate alerts. These alerts can be configured according to severity levels and are sent to administrators or a central monitoring system for further action.

Types of Agents (e.g., agent 300):

- Passive Agents: These agents monitor and analyze network traffic in real-time without interfering with the network's operation. They passively watch for signs of intrusion and report findings to a central system or administrator.
- Active Agents: In addition to monitoring, active agents can take predefined actions when a threat is detected, such as blocking traffic, isolating affected network segments, or directly interacting with the threat to mitigate its impact.

Deployment Strategies for Agent (e.g., agent 300):

- Host-based Agents: These are installed on individual hosts or devices within the network. They monitor incoming and outgoing traffic from the device, along with system logs and operations, to detect potential intrusions.
- Network-based Agents: Deployed at strategic points within the network, such as at gateways or along backbone connections, these agents may monitor the flow of data across the network to identify suspicious patterns or anomalies.

Significance of Agents (e.g., agent 300):

- Scalability: Agents may allow a NIDS to scale effectively. By distributing the monitoring load across multiple points in the network, the system can handle large volumes of traffic without significant bottlenecks.
- Real-time Detection: The real-time monitoring capability of agents enables immediate detection of potential threats, allowing for quicker responses to mitigate damage.
- Comprehensive Coverage: Deploying agents across different parts of a network ensures that both internal and external traffic is monitored, providing a more comprehensive defense mechanism against intrusions.
- Flexibility: Agents may be tailored to specific network environments and requirements. This includes customizing the detection algorithms, adjusting sensitivity levels, and defining appropriate responses to detected threats.

Generally speaking, agents (e.g., agent 300) may function as the eyes and ears of threat mitigation process 10, providing the essential capabilities needed for the early detection of and response to cybersecurity threats. Their deployment and management may help maintain the integrity and security of networked systems.

Threat mitigation process 10 may iteratively process 1906 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298).

The summarized human-readable report (e.g., summarized human-readable report 306) may define recommended next steps, recommended actions and/or disclaimers. For example and in response to a security event that is based upon suspicious activity occurring on computing platform 60:

- Recommended Next Steps may provide examples of additional investigations that may be implemented (e.g., port analysis/domain owner identification/perpetrator analysis) to further analyze the security event to gauge the risk/severity of the same.
- Recommended Actions may provide examples of responsive actions that may be implemented (e.g., port blocking/stream shutdown/perpetrator account disablement) to mitigate the negative impact of the security event.
- Disclaimers may provide explanations for why the suspicious activity of the security event may be benign and occurring for a legitimate (i.e., non-threatening) reason (e.g., such port traffic may occur during weekly backups, the person performing this operation is the president.

As discussed above, a generative AI model (e.g., generative AI model 302) is a type of artificial intelligence system designed to generate new, synthetic data that resembles its training data. It learns the patterns, features, and distributions of the input data and can produce novel outputs, such as images, text, or sound, that mimic the original dataset. These models are widely used for applications including content creation, data augmentation, and simulation. Examples include Generative Adversarial Networks (GANs) and Variational Autoencoders (VAEs), which have become foundational in fields requiring realistic and diverse data generation.

A formatting script (e.g., formatting script 304) may include a set of instructions or codes configured to structure, preprocess, or format data (input or output) in a way that's optimal for interaction with or processing by a large language model. This can include tasks like cleaning data, structuring prompts, or formatting the model's outputs for specific applications. The exact nature of formatting script 304 can vary widely depending on the requirements of the task at hand and the specifics of the model's interface.

For example, in a web application that uses a large language model to generate content based on user inputs, a formatting script might:

- Preprocess User Inputs: Clean and structure user queries into a format that the model can more effectively understand and process. This could involve correcting typos, removing unnecessary punctuation, or structuring the input into a more coherent prompt.
- Format Model Prompts: Tailor prompts to fit specific use cases or to elicit more accurate responses from the model. This might include adding specific instructions or context to the prompt that guides the model in generating the desired output.
- Post-Process Model Outputs: Clean or format the text generated by the model to meet user expectations or application requirements. This could involve correcting grammar, structuring the output into a specific format (e.g., HTML, JSON), or truncating responses to fit length constraints.
- Handle Special Formatting: For certain applications, such as code generation or creating structured data from unstructured text, the script might include rules or templates to format the output in a specific syntax or schema.

These formatting scripts (e.g., formatting script 304) may help integrate large language models into broader applications or workflows, ensuring that the interaction between human users and the AI is as seamless and effective as possible. Formatting scripts (e.g., formatting script 304) may be implemented in various programming languages, depending on the environment in which the large language model is being deployed (e.g., Python scripts for a server-side application or JavaScript for client-side processing in a web application).

Accordingly and when iteratively processing 1906 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 1908 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

Large language model (e.g., large language model 308) are a specific subset of generative AI models that focus on understanding, generating, and manipulating natural language text. The relationship between large language models (e.g., large language model 308) and generative AI models (e.g., generative AI model 302) can be seen in terms of their foundational technologies, objectives, and the principles they employ to generate new data.

Large language models (e.g., large language model 308) relate to the broader category of generative AI models (e.g., generative AI model 302) as follows:

Shared Foundation in Generative Techniques

- Generative Principle: At their core, both LLMs and generative AI models are designed to generate new data samples that mimic the distribution of their training data. For generative AI models, this might mean creating new images, music, or text that resemble the original dataset. LLMs specifically focus on generating text that is coherent, contextually relevant, and stylistically similar to the text they were trained on.
- Modeling Data Distributions: Both LLMs and other generative AI models aim to model the underlying probability distribution of their training data. For LLMs, this involves predicting the likelihood of a sequence of words or tokens based on the vast corpus of text they were trained on. Other generative models, like Generative Adversarial Networks (GANs) or Variational Autoencoders (VAEs), learn to generate data in their respective domains (e.g., images) by modeling the distribution of the training data in those domains.

Use of Deep Learning Architectures

- Neural Network Architectures: Both LLMs and generative AI models leverage advanced neural network architectures to learn from their training data. Transformers, a type of neural network architecture, have proven particularly effective for LLMs due to their ability to handle long-range dependencies in text. Similarly, GANs utilize a duo of neural networks (generator and discriminator) to generate new data, while VAEs use encoder-decoder architectures for generating data.
- Advancements in AI: The development and refinement of these neural network architectures have propelled advancements in both fields. Innovations in training techniques, model architecture, and computational efficiency benefit both LLMs and generative AI models across different domains.

Specificity vs. Generality

- Domain-Specific vs. Domain-Generality: LLMs are domain-specific in that they are tailored for natural language processing tasks. In contrast, the term "generative AI models" encompasses a broader range of models designed for various types of data, including but not limited to text. This generality vs. specificity distinction highlights how LLMs fit within the larger ecosystem of generative AI by applying its principles to the specific domain of language.

Application and Impact

- Versatile Applications: Both LLMs and generative AI models have wide-ranging applications across industries. LLMs are particularly influential in areas requiring natural language understanding and generation, such as chatbots, content creation, and automated customer service. Other generative AI models find their applications in creating synthetic datasets, enhancing creative design processes, and even drug discovery.
- Enhancing Human Creativity and Efficiency: Both sets of technologies augment human capabilities by automating creative processes, generating new content, and providing tools for decision-making and analysis.

In conclusion, LLMs are a specialized form of generative AI models with a focus on natural language. They share the foundational approach of learning to generate new data that resembles their training input but apply these principles specifically to the domain of text. This relationship underscores the versatility and breadth of generative AI technologies and their profound impact on both specific industries and broader societal contexts.

Accordingly and when iteratively processing 1906 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 1910 prompt engineering to produce the summarized human-readable report (e.g., summarized human-readable report 306) for the initial notification (e.g., initial notification 298).

As is also known in the art, prompt engineering is an essential aspect of working with large language models (e.g., large language model 308), as it provides a way to guide the AI model's responses and ensure that they are accurate, relevant, and appropriate for the intended application.

In general, prompt engineering involves designing and fine-tuning prompts (e.g., formatting script 304) that may be used to train or fine-tune a large language model, such as OpenAI's GPT-3. The prompts (e.g., formatting script 304) can take a variety of forms, including natural language queries, prompts with specific keywords or phrases, or a combination of both.

The goal of prompt engineering is to create a set of prompts (e.g., formatting script 304) that are tailored to the specific use case or application, such as generating conversational responses, answering specific questions, or generating creative writing. By designing prompts (e.g., formatting script 304) that are closely aligned with the intended use case, developers can improve the accuracy and relevance of the model's responses, resulting in more effective and engaging interactions.

Once the prompts (e.g., formatting script 304) have been designed and fine-tuned, they are used to train or fine-tune the large language model. During the training process, the model is exposed to the prompts (e.g., formatting script 304) and learns to generate responses that are consistent with the patterns and relationships in the training data. As the model is fine-tuned with additional prompts, its performance improves, allowing it to generate more natural and effective responses over time.

Overall, prompt engineering is an essential aspect of working with large language models (e.g., large language model 308), as it enables developers to create more accurate and effective natural language processing applications.

When iteratively processing 1906 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 1912 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

The one or more tools (e.g., tools 310) may include one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

In the context of managing and responding to security events within a computing platform (e.g., computing platform 60), decoding tools, decompression tools, and identification tools serve distinct yet complementary purposes. These tools are part of the arsenal used by cybersecurity professionals to analyze, understand, and mitigate security incidents.

Below is an explanation of each tool's purpose:

- Decoding Tool: Decoding tools are designed to convert data from a coded form into its original form. In the context of a security event, initial notification (e.g., initial notification 298) may be encoded in a format (e.g., Base64) that is unreadable by threat mitigation process 10 in its native form. Accordingly, threat mitigation process 10 may utilize such a decoding tool to decode such an encoded initial notification.
- Decompression Tool: Decompression tools are used to expand compressed files back into their original form. In the context of a security event, initial notification (e.g., initial notification 298) may be compressed in a format (e.g., ZIP, RAR, or custom compression algorithms) that is unreadable by threat mitigation process 10 in its native form. Accordingly, threat mitigation process 10 may utilize such a decompression tool to decompress such an encoded initial notification.
- Identification Tool: Identification tools concerning domain ownership are utilized to determine the registrants or owners of domains involved in a security event. This can include tools like WHOIS lookups, DNS query tools, or specialized software designed to trace domain affiliations and histories. When a security event involves network communication with suspicious or malicious domains (e.g., for data exfiltration, C2 communication, or phishing), understanding who owns these domains can provide crucial clues about the attackers. This information can help in assessing the credibility and intent behind the domains, tracking the source of the attack, and potentially identifying the attackers or their affiliations. Moreover, it aids in blacklisting domains, strengthening domain reputation checks, and enhancing overall network security posture.

In summary, decoding and decompression tools help cybersecurity teams understand and analyze the content and nature of the threat by revealing the true form of data and files involved in a security event. Identification tools concerning domain ownership extend this analysis by providing insights into the actors behind the threats, enabling more targeted and effective responses. Together, these tools are essential for diagnosing, understanding, and mitigating security incidents in a computer platform (e.g., computing platform 60).

When iteratively processing 1906 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 1914 several loops (not shown) and/or nested loops (not shown) to produce the summarized human-readable report (e.g., summarized human-readable report 306) for the initial notification (e.g., initial notification 298).

In the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

For instance, in the detection of security incidents such as distributed denial-of-service (DDoS) attacks, an outer loop could iterate over specific time intervals, scrutinizing traffic data to spot abnormalities in volume that unfold over time. Within each identified time frame, an inner loop could delve deeper, examining individual data packets or sessions for more direct signs of compromise, such as suspicious request frequencies or known malware signatures. This dual-level approach, with an outer loop assessing broader temporal patterns and an inner loop focusing on granular data points, exemplifies the nuanced analysis possible with nested loops.

Such a methodology not only enhances the thoroughness of the security assessment but also significantly accelerates the detection process. By automating the scrutiny of terabytes of network data, AI systems equipped with loop-based algorithms can identify threats with a precision and speed unattainable through manual analysis. The adaptability of loops and nested loops to various levels of data granularity ensures that complex, layered security events are effectively uncovered and addressed. Consequently, the use of iterative loops in AI-driven security event investigation stands as a cornerstone technique in bolstering the defense mechanisms of computer networks against an ever-evolving landscape of cyber threats.

Intelligent Agent

Figure 35:
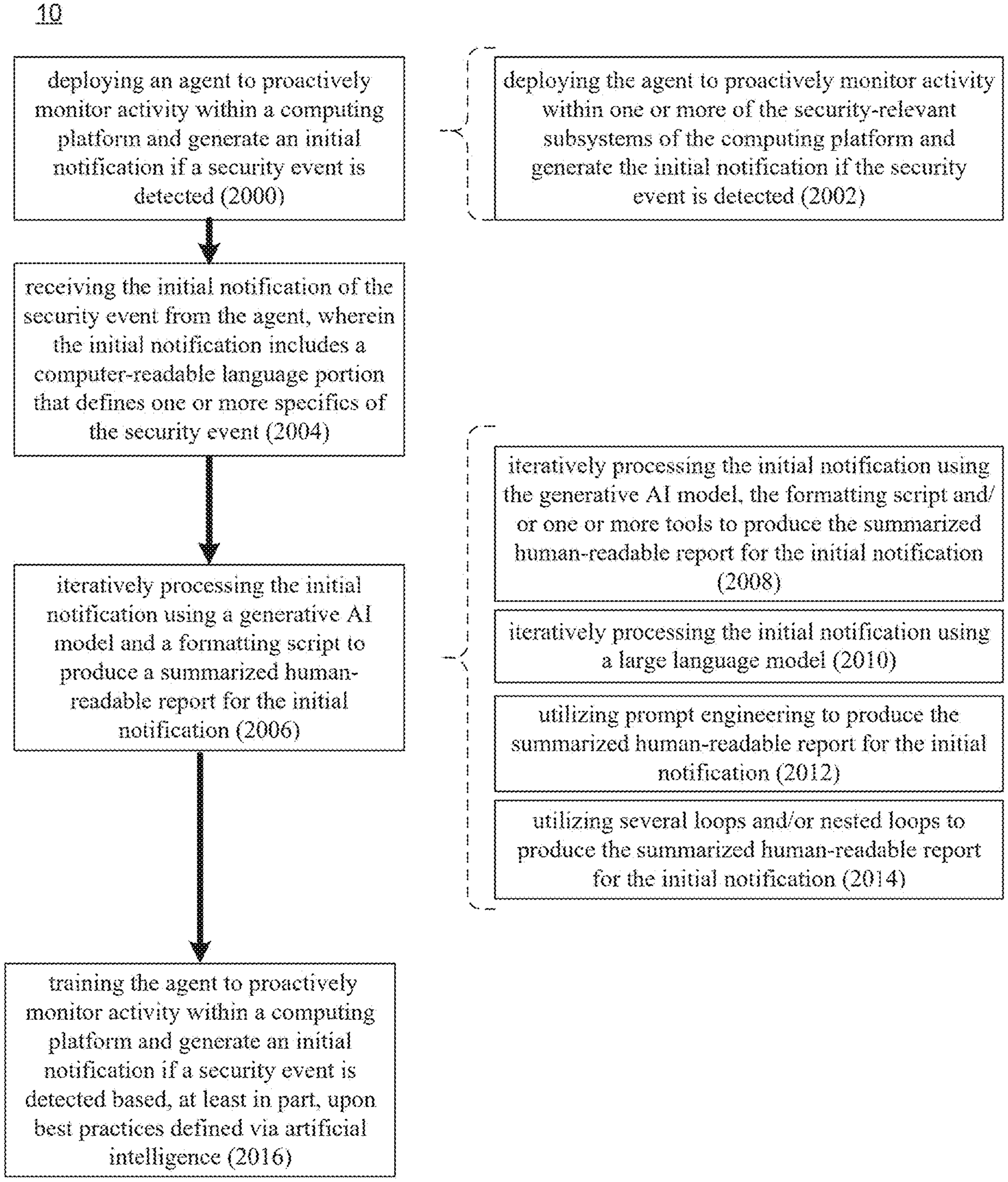
FIG. 35 is a flowchart of another implementation of the threat mitigation process of FIG. 1 according to an embodiment of the present disclosure.

Referring also to FIG. 35, threat mitigation process 10 may deploy 2000 an agent (e.g., agent 300) to proactively monitor activity within a computing platform (e.g., computing platform 60) and generate an initial notification (e.g., initial notification 298) if a security event is detected.

As discussed above, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

As discussed above, the computing platform (e.g., computing platform 60) may include a plurality of security-relevant subsystems (e.g., security-relevant subsystems 226). Accordingly and when deploying 2000 an agent (e.g., agent 300) to proactively monitor activity within a computing platform (e.g., computing platform 60) and generate an initial notification (e.g., initial notification 298) if a security event is detected, threat mitigation process 10 may deploy 2002 the agent (e.g., agent 300) to proactively monitor activity within one or more of the security-relevant subsystems (e.g., security-relevant subsystems 226) of the computing platform (e.g., computing platform 60) and generate the initial notification (e.g., initial notification 298) if the security event is detected.

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Threat mitigation process 10 may receive 2004 the initial notification (e.g., initial notification 298) of the security event from the agent (e.g., agent 300), wherein the initial notification (e.g., initial notification 298) includes a computer-readable language portion that defines one or more specifics of the security event, As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

In the manner discussed above, threat mitigation process 10 may iteratively process 2006 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298).

As discussed above, the summarized human-readable report (e.g., summarized human-readable report 306) may define recommended next steps, recommended actions and/or disclaimers. For example and in response to a security event that is based upon suspicious activity occurring on computing platform 60:

- Recommended Next Steps may provide examples of additional investigations that may be implemented (e.g., port analysis/domain owner identification/perpetrator analysis) to further analyze the security event to gauge the risk/severity of the same.
- Recommended Actions may provide examples of responsive actions that may be implemented (e.g., port blocking/stream shutdown/perpetrator account disablement) to mitigate the negative impact of the security event.
- Disclaimers may provide explanations for why the suspicious activity of the security event may be benign and occurring for a legitimate (i.e., non-threatening) reason (e.g., such port traffic may occur during weekly backups, the person performing this operation is the president.

When iteratively processing 2006 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2008 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) may include one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When iteratively processing 2006 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2010 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When iteratively processing 2006 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2012 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

As discussed above and when iteratively processing 2006 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2014 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Threat mitigation process 10 may train 2016 the agent (e.g., agent 300) to proactively monitor activity within a computing platform (e.g., computing platform 60) and generate an initial notification (e.g., initial notification 298) if a security event is detected based, at least in part, upon best practices defined via artificial intelligence (e.g., AI/ML process 56). For example and during the operation of threat mitigation process 10, data may be archived concerning activities that occurred within the computing platform (e.g., computing platform 60). So over time, threat mitigation process 10 may build a data repository (e.g., data repository 312) that identifies various examples of "concerning" activities within the computing platform (e.g., computing platform 60) and whether those activities resulted in an actual security event or were simply false alarms. Accordingly, threat mitigation process 10 may train 2016 the agent (e.g., agent 300) to proactively monitor activity within a computing platform (e.g., computing platform 60) and generate an initial notification (e.g., initial notification 298) if a security event is detected based, at least in part, upon the information contained within the data repository (e.g., data repository 312). Additionally/alternatively, threat mitigation process 10 may train 2016 the agent (e.g., agent 300) to proactively monitor activity within a computing platform (e.g., computing platform 60) and generate an initial notification (e.g., initial notification 298) if a security event is detected based, at least in part, upon supplemental information (e.g., supplemental information 314) obtained from e.g., technical bulletins released by software houses, antivirus providers, hardware manufactures, etc.).

Prompt Engineering

Figure 36:
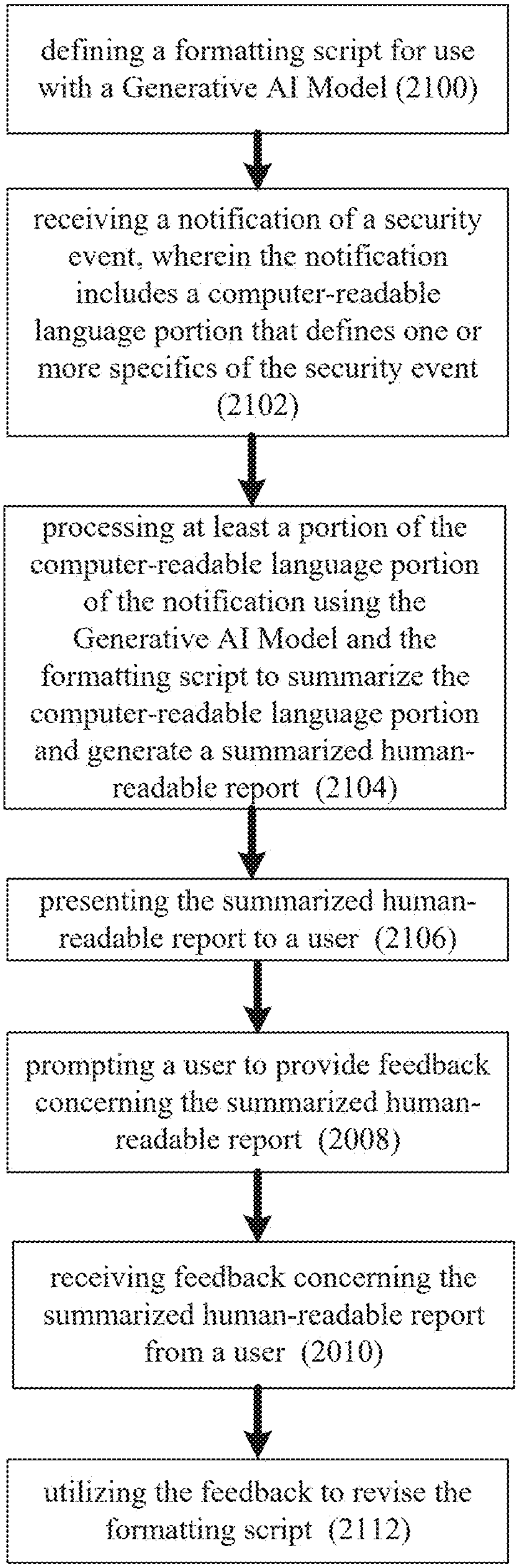
FIG. 36 is a flowchart of another implementation of the threat mitigation process of FIG. 1 according to an embodiment of the present disclosure.

Referring also to FIG. 36, threat mitigation process 10 may define 2100 a formatting script (e.g., formatting script 304) for use with a Generative AI model (e.g., generative AI model 302). An example of such a formatting script (e.g., formatting script 304) may include but is not limited to a group of one or more prompts that are tailored to the specific use case or application for which the Generative AI model (e.g., generative AI model 302) is deployed. Specifically, the formatting script (e.g., formatting script 304) may include one or more discrete instructions for the Generative AI model (e.g., generative AI model 302) and/or the large language model (e.g., large language model 308). Such instructions for the Generative AI model (e.g., generative AI model 302) and/or the large language model (e.g., large language model 308) may include: formatting instructions and/or content instructions.

As discussed above, these formatting scripts (e.g., formatting script 304) may help integrate large language models into broader applications or workflows, ensuring that the interaction between human users and the AI is as seamless and effective as possible. Formatting scripts (e.g., formatting script 304) may be implemented in various programming languages, depending on the environment in which the large language model is being deployed (e.g., Python scripts for a server-side application or JavaScript for client-side processing in a web application).

Threat mitigation process 10 may receive 2102 a notification of a security event, wherein the notification includes a computer-readable language portion that defines one or more specifics of the security event. As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

Below is an example of such a JSON portion:

```
{
  "timestamp": 1676573073400,
  "formatVersion": 1,
  "webaclId": "arn:aws:wafv2::051480436342:icnifuhtyzwa-SharedServices-Policy1606244930846/5a071c76-4c57-4971-9326-5c0c8a649b1c",
  "terminatingRuleId": "IP-Whitelist-606244930846",
  "terminatingRuleType": "GROUP",
  "action": "ALLOW",
  "terminatingRuleMatchDetails": [ ],
  "httpSourceName": "ALB",
  "httpSourceId": "223275863938-app/k8s-toolskon-f53b6065de/888885884d9c7626",
  "ruleGroupList": [
  {
  "ruleGroupId": "arn:aws:wafv2::132154534106:nywk0s0jgn37-IP-Whitelist/6f83906e-e4c9-4b9e-b4ce-a83633520409",
  "terminatingRule": {
```

-continued

"ruleId": "Public-IP-Whitelist",
"action": "ALLOW",
"ruleMatchDetails": null
},
"nonTerminatingMatchingRules": [ ],
"excludedRules": null,
"customerConfig": null
}
],
"rateBasedRuleList": [ ],
"nonTerminatingMatchingRules": [ ],
"requestHeadersInserted": null,
"responseCodeSent": null,
"httpRequest": {
"clientIp": "10.142.82.58",
"country": "US",
"headers": [
{
"name": "host",
"value": "site.example.com"
},
{
"name": "content-encoding",
"value": "snappy"
},
{
"name": "content-type",
"value": "application/x-protobuf"
},
{
"name": "user-agent",
"value": "GrafanaAgent/v0.26.1"
},
{
"name": "x-scope-orgid",
"value": "prod"
},
{
"name": "content-length",
"value": "40792"
}
],
"uri": "/api/v1/push",
"args": "",
"httpVersion": "HTTP/2.0",
"httpMethod": "POST",
"requestId": "1-63ee7991-4fb3b76547a55ccd5badf00d"
},
"oversizeFields": [
"REQUEST_BODY"
]
}

Threat mitigation process 10 may process 2104 at least a portion of the computer-readable language portion of the notification using the large language model (e.g., large language model 308) and the formatting script (e.g., formatting script 304) to summarize the computer-readable language portion and generate a summarized human-readable report (e.g., summarized human-readable report 306).

Below is an example of such a summarized human-readable report (e.g., summarized human-readable report 306):

Summary & Analysis: At timestamp 1676573073400, the web ACL (arn:aws:wafv2::051480436342:icnifuhtyzwa-SharedServices-Policy1606244930846/5a071c76-4c57-4971-9326-5c0c8a649b1c) allowed an HTTP POST request from external IP 10.142.82.58 (hostname site.example.com, US) to URI '/api/v1/push'. This event could indicate malicious activity as the request includes an API key and the request body is over the size limit.

Suggested Legitimate Activity:

- Multiple requests sent in a burst
- Sending information that is larger than average
- Use of an API key -continued

```
Next Steps:
- Analyze the source IP address using public resources to identify the owner and location.
- Analyze the request body to identify any suspicious or malicious activity, such as attempts to gain access
to
sensitive information.
- Check the headers to verify that the user-agent is legitimate and that the content-type is appropriate for the
request.
```

Threat mitigation process 10 may present 2106 the (above-illustrated) summarized human-readable report (e.g., summarized human-readable report 306) to a user (e.g., analyst 256).

Through the use of the above-described formatting script (e.g., formatting script 304), the above-illustrated summarized human-readable report (e.g., summarized human-readable report 306) may be concise and easily digestible by the user (e.g., analyst 256). For example and if the above-illustrated JSON portion was provided to the above-described Generative AI model (e.g., generative AI model 302) without the above-described formatting script (e.g., formatting script 304), the result produced would be much less concise and generally less readable.

Below is an example of such a less-concise & less-readable summarized human-readable report (e.g., summarized human-readable report 306):

```
#### Human Readable Output
###                                                                        WebACL
|timestamp|webaclId|terminatingRuleId|terminatingRuleType|action|httpSourceName|httpSourceId|        |---
|---|---|---|---|---|---|  |  1676573073400  |  arn:aws:wafv2::051480436342:icnifuhtyzwa-SharedServices-
Policy1606244930846/5a071c76-4c57-4971-9326-5c0c8a649b1c                                           |
arn:aws:wafv2::132154534106:nywk0s0jgn37-IP-Whitelist/6f83906e-e4c9-4b9e-b4ce-a83633520409         |
GROUP | ALLOW | ALB | 223275863938-app/k8s-kong-toolskon-f53b6065de/888885884d9c7626 |
### Rule Group
|ruleGroupId|
|---|
| arn:aws:wafv2::132154534106:nywk0s0jgn37-IP-Whitelist/6f83906e-e4c9-4b9e-b4ce-a83633520409 |
### Terminating Rule
|ruleId|action|
|---|---|
|SNOW-Public-IP-Whitelist|ALLOW|
### HTTP Request |clientIp|country|uri|args|httpVersion|httpMethod|requestId|
|---|---|---|---|---|---|---|
| 10.142.82.58|US|/api/v1/push|
|HTTP/2.0|POST|1-63ee7991-4fb3b76547a55ccd5badf00d |
### Headers
|name|value|
|---|---|
|host|site.example.com|
|content-encoding|snappy|
|content-type|application/x-protobuf|
|user-agent|GrafanaAgent/v0.26.1|
|x-prometheus-remote-write-version|0.1.0|
|x-scope-orgid|prod|
|content-length|40792|
```

Threat mitigation process 10 may prompt 2108 a user (e.g., analyst 256) to provide feedback concerning the (above-illustrated) summarized human-readable report (e.g., summarized human-readable report 306). And (if provided), threat mitigation process 10 may receive 2110 feedback concerning the summarized human-readable report (e.g., summarized human-readable report 306) from a user (e.g., analyst 256). For example, the user (e.g., analyst 256) may be asked to give "thumbs-up/thumbs-down" feedback concerning the quality of the (above-illustrated) summarized human-readable report (e.g., summarized human-readable report 306). In the event that the feedback provided is e.g., marginal or poor, threat mitigation process 10 may ask the user (e.g., analyst 256) to provide additional commentary, examples of which may include but are not limited to: "the summary is too long", "the summary is too short", "I would appreciate a more detailed roadmap for remediation", "more concise language would be helpful", etc. And (if feedback is provided), threat mitigation process 10 may utilize 2112 the feedback to revise the above-described formatting script (e.g., formatting script 304) so that the (above-illustrated) summarized human-readable report (e.g., summarized human-readable report 306) may be tailored based upon such feedback.

Chunking and Recombining to Overcome Token Limits

Figure 37:
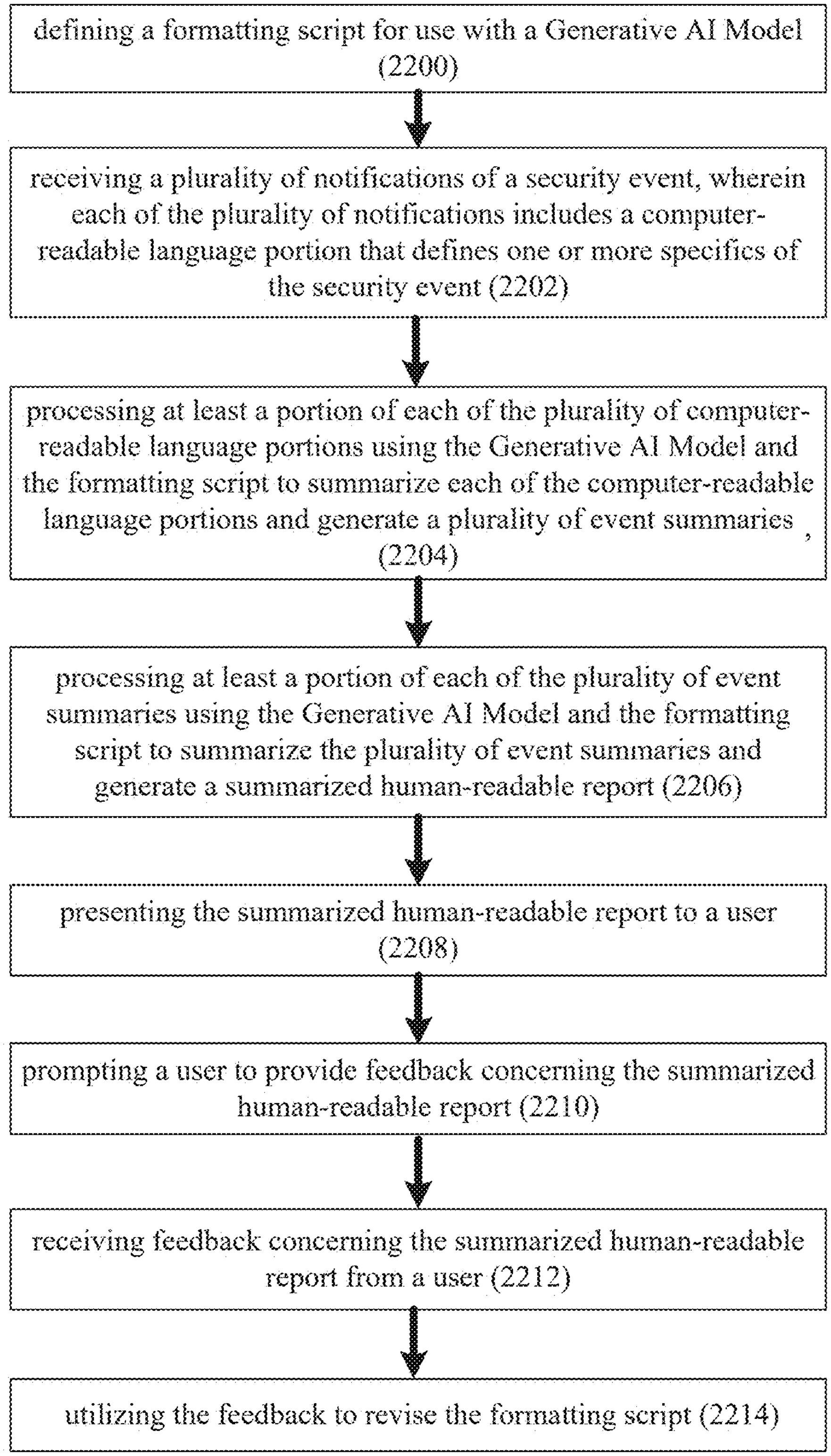
FIG. 37 is a flowchart of another implementation of the threat mitigation process of FIG. 1 according to an embodiment of the present disclosure.

Referring also to FIG. 37 and as is known in the art, the inputs to (and outputs from) a Generative AI model (e.g., generative AI model 302) may be limited in scope. Accordingly and if multiple notifications (concerning security events) are received, it is often not practical to have those events simultaneously summarized by such a Generative AI model (e.g., generative AI model 302). Specifically, large language models (e.g., large language model 308) often specify such limits based upon a maximum number of tokens.

As is known in the art, the token limits of a large language model (e.g., large language model 308) refer to the maximum number of words or tokens that the model can process in a single input sequence. The specific token limit of a large language model depends on the architecture and specifications of the model. Depending on the model used, requests can use up to 4097 tokens shared between prompt and completion. If your prompt is 4000 tokens, your completion can be 97 tokens at most. The limit is currently a technical limitation, but there are often creative ways to solve problems within the limit, e.g., condensing your prompt, breaking the text into smaller pieces, etc.

When an input sequence exceeds the token limit of a language model, it needs to be broken up into smaller segments or "chunks" that can be processed separately. This process is known as "chunking" or "windowing". The chunks are then fed into the model sequentially, and the output from each chunk is combined to produce the final result. Chunking can introduce some challenges, as it requires careful management of the context and flow of the input sequence. In some cases, the output of a previous chunk may need to be taken into account when processing the next chunk, in order to maintain continuity and coherence.

Overall, the token limits of large language models (e.g., large language model 308) are an important consideration for developers and researchers working with natural language processing applications. By carefully managing the input sequence and chunking appropriately, it is possible to create highly effective and accurate language models that can process very large amounts of text data.

As discussed above, threat mitigation process 10 may define 2200 a formatting script (e.g., formatting script 304) for use with a Generative AI model (e.g., generative AI model 302).

As discussed above, these formatting scripts (e.g., formatting script 304) may help integrate large language models into broader applications or workflows, ensuring that the interaction between human users and the AI is as seamless and effective as possible. Formatting scripts (e.g., formatting script 304) may be implemented in various programming languages, depending on the environment in which the large language model is being deployed (e.g., Python scripts for a server-side application or JavaScript for client-side processing in a web application).

Threat mitigation process 10 may receive 2202 a plurality of notifications (e.g., initial notification 298 and additional notification 316) of a security event, wherein each of the plurality of notifications (e.g., initial notification 298 and additional notification 316) includes a computer-readable language portion that defines one or more specifics of the security event, thus defining a plurality of computer-readable language portions.

As discussed above, examples of such the security events may include but are not limited to access auditing; anomalies; authentication; denial of services; exploitation; malware; phishing; spamming; reconnaissance; and/or web attack within a monitored computing platform (e.g., computing platform 60). As further discussed above, an example of the computer-readable language portions (e.g., within the notification of the security event) may include but is not limited to a JSON portion.

Assume for the following example that threat mitigation process 10 receives two notifications of a security event.

Below is an example of such a JSON portion for EVENT #1:

```
{
  "eventVersion": "1.08",
  "userIdentity": {
  "type": "AssumedRole",
  "principalId": "AYEDVBV3CPSALNLBYZTE6:q5btsdo6lhqv@uyf0bn1fk303.com",
  "arn": "arn:aws:sts::996966753428:assumed-role/DevOps/q5btsdo6lhqv@uyf0bn1fk303.com",
  "accountId": "896966753408",
  "accessKeyId": "ASIA5B4444444FTJIUG",
  "sessionContext": {
  "sessionIssuer": {
  "type": "Role",
  "principalId": "AROA5BV3CPAAAAABYZTE6",
  "arn": "arn:aws:iam::896966753408:role/DevOps",
  "accountId": "123966753123",
  "userName": "DevOps"
  },
  "webIdFederationData": { },
  "attributes": {
  "creationDate": "2023-01-24T15:47:29Z",
  "mfaAuthenticated": "false"
  }
  },
  "invokedBy": "amplifybackend.amazonaws.com"
  },
  "eventTime": "2023-01-24T16:53:14Z",
  "eventSource": "iam.amazonaws.com",
  "eventName": "CreateRole",
  "awsRegion": "us-east-1",
  "sourceIPAddress": "amplifybackend.amazonaws.com",
  "userAgent": "amplifybackend.amazonaws.com",
  "requestParameters": {
  "roleName": "us-east-1__F4tKzs0rl",
  "assumeRolePolicyDocument":                                   "{\"Version\":\"2012-10-
17\",\"Statement\":[{\"Sid\":\"CognitoAssumeRolePolicy\",\"Effect\":\"Allow\",\"Principal\":{\"Federated\":
\"cognito-
identity.amazonaws.com\"},\"Action\":\"sts:AssumeRoleWithWebIdentity\",\"Condition\":{\"StringEquals\":
{\"cognito-identity.amazonaws.com:aud\":\"us-east-1:62444912-9f39-4eca-f00d-
5ab4de99b55b\"},\"ForAnyValue:StringLike\":{\"cognito-
identity.amazonaws.com:amr\":\"authenticated\"}}}]}"
  },
  "responseElements": {
  "role": {
  "path": "/",
  "roleName": "us-east-1__G8tKzs0rl__Manage-only",
```

-continued

"roleId": "AROA5BV3CPSAMOFIYG2AT",
"arn": "arn:aws:iam::896966753408:role/us-east-1_G8tKzs0rl_Manage-only",
"createDate": "Jan 24, 2023 4:53:14 PM",
"assumeRolePolicyDocument": "%7B%22Version%22%3A%222012-10-17%22%2C%22Statement%22%3A%5B%7B%22Sid%22%3A%22CognitoAssumeRolePolicy%22%2C%22Effect%22%3A%22Allow%22%2C%22Principal%22%3A%7B%22Federated%22%3A%22cognito-identity.amazonaws.com%22%7D%2C%22Action%22%3A%22sts%3AAssumeRoleWithWebIdentity%22%2C%22Condition%22%3A%7B%22StringEquals%22%3A%7B%22cognito-identity.amazonaws.com%3Aaud%22%3A%22us-east-1%3A62444912-9f39-4eca-f00d-5ab4de99b55b%22%7D%2C%22ForAnyValue%3AStringLike%22%3A%7B%22cognito-identity.amazonaws.com%3Aamr%22%3A%22authenticated%22%7D%7D%7D%5D%7D"
}
},
"requestID": "01dce44c-e2cb-447f-b4df-00d4a3547842",
"eventID": "aaafe757-bb5e-45cf-9f1c-6a64f4ee35d2",
"readOnly": "false",
"eventType": "AwsApiCall",
"managementEvent": "true",
"recipientAccountId": "896966755608",
"eventCategory": "Management",
"sessionCredentialFromConsole": "true"
}

Below is an example of such a JSON portion for EVENT #2:

{
"eventVersion": "1.08",
"userIdentity": {
"type": "AssumedRole",
"principalId": "AYEDVBV3CPSALNLBYZTE6:q5btsdo6lhqv@uyf0bn1fk303.com",
"arn": "arn:aws:sts::996966753428:assumed-role/DevOps/q5btsdo6lhqv@uyf0bn1fk303.com",
"accountId": "896966753408",
"accessKeyId": "ASIA5B4444444FTJIUG",
"sessionContext": {
"sessionIssuer": {
"type": "Role",
"principalId": "AROA5BV3CPAAAAABYZTE6",
"arn": "arn:aws:iam::896966753408:role/DevOps",
"accountId": "123966753123",
"userName": "DevOps"
},
"webIdFederationData": { },
"attributes": {
"creationDate": "2023-01-24T15:47:29Z",
"mfaAuthenticated": "false"
}
},
"invokedBy": "amplifybackend.amazonaws.com"
},
"eventTime": "2023-01-24T16:53:14Z",
"eventSource": "iam.amazonaws.com",
"eventName": "CreateRole",
"awsRegion": "us-east-1",
"sourceIPAddress": "amplifybackend.amazonaws.com",
"userAgent": "amplifybackend.amazonaws.com",
"requestParameters": {
"roleName": "us-east-1_F4tKzs0rl",
"assumeRolePolicyDocument": "{\"Version\":\"2012-10-17\",\"Statement\":[{\"Sid\":\"CognitoAssumeRolePolicy\",\"Effect\":\"Allow\",\"Principal\":{\"Federated\": \"cognito-identity.amazonaws.com\"},\"Action\":\"sts:AssumeRoleWithWebIdentity\",\"Condition\":{\"StringEquals\": {\"cognito-identity.amazonaws.com:aud\":\"us-east-1:62444912-9f39-4eca-f00d-5ab4de99b55b\"},\"ForAnyValue:StringLike\":{\"cognito-identity.amazonaws.com:amr\":\"authenticated\"}}}]}"
},
"responseElements": {
"role": {
"path": "/",
"roleName": "us-east-1_G8tKzs0rl_Manage-only",
"roleId": "AROA5BV3CPSAMOFIYG2AT",
"arn": "arn:aws:iam::896966753408:role/us-east-1_G8tKzs0rl_Manage-only",
"createDate": "Jan 24, 2023 4:53:14 PM",
"assumeRolePolicyDocument": "%7B%22Version%22%3A%222012-10-17%22%2C%22Statement%22%3A%5B%7B%22Sid%22%3A%22CognitoAssumeRolePolicy%22%2C%22Effect%22%3A%22Allow%22%2C%22Principal%22%3A%7B%22Federated%22%3A%22cognito- -continued identity.amazonaws.com%22%7D%2C%22Action%22%3A%22sts%3AAssumeRoleWithWebIdentity%22%2C
%22Condition%22%3A%7B%22StringEquals%22%3A%7B%22cognito-
identity.amazonaws.com%3Aaud%22%3A%22us-east-1%3A62444912-9f39-4eca-f00d-
5ab4de99b55b%22%7D%2C%22ForAnyValue%3AStringLike%22%3A%7B%22cognito-
identity.amazonaws.com%3Aamr%22%3A%22authenticated%22%7D%7D%7D%5D%7D”
}
},
“requestID”: “01dce44c-e2cb-447f-b4df-00d4a3547842”,
“eventID”: “aaafe757-bb5e-45cf-9f1c-6a64f4ee35d2”,
“readOnly”: “false”,
“eventType”: “AwsApiCall”,
“managementEvent”: “true”,
“recipientAccountId”: “896966755608”,
“eventCategory”: “Management”,
“sessionCredentialFromConsole”: “true”
}

Threat mitigation process 10 may process 2204 at least a portion of each of the plurality of computer-readable language portions (as illustrated above) using the Generative AI model (e.g., generative AI model 302) and the (above-described) formatting script (e.g., formatting script 304) to summarize each of the (two in this example) computer-readable language portions and generate a plurality of event summaries.

Below is an example of such an event summary for EVENT #1:

At 16:53:14 on Jan 24, 2023, user q5btsdo6lhqv@uyf0bn1fk303.com, authenticated through the ARN arn:aws:sts::996966753428:assumed-role/DevOps/q5btsdo6lhqv@uyf0bn1fk303.com and the IP address amplifybackend.amazonaws.com, created a role called “ us-east-1__F4tKzs0rl ” in the US East region. This event indicates the creation of a role in AWS by an authenticated user, which could potentially be misused.
Suggested Legitimate Activity:
- Provisioning a role for an application
- Creating a role for a specific user Next Steps:
- Review the account history for the user who created the role to determine if this is normal behavior.
- Check whether the role was created with a policy or inline policies that allow excessive permissions.
- Identify any external IP addresses associated with the user activity to determine the geographical location of the activity and the potential owner of the IP address.
- Review the environment for any suspicious activity by leveraging tools such as IDS/IPS and Security Information and Event Management (SIEM) to identify any malicious network traffic.

Below is an example of such an event summary for EVENT #2:

Summary & Analysis: At 16:52:58 on 01/24/2023, an assumed role " AYEDVBV3CPSALNLBYZTE6:q5btsdo6lhqv@uyf0bn1fk303.com " was used to create a role with the name " us-east-1__F4tKzs0rl" using the IP address "amplifybackend.amazonaws.com" and the user agent "amplifybackend.amazonaws.com". This could indicate the creation of a malicious role to gain unauthorized access to resources, or a legitimate role created for a new user or application.
Suggested Legitimate Activity:
- Creating a role for a new user or application
- Creating a role for access to a 3rd party service
- Adding a role to an existing user or application Next Steps:
- Check the user and IP address to verify the user and origin of the request
- Verify the user identity type and origin by checking the ‘userIdentity.type‘ and ‘userIdentity.invokedBy‘ fields.
- Check the IP address and user agent in the ‘sourceIPAddress‘ and ‘userAgent‘ fields to verify whether the request originated from a trusted source.
- Check the role name and policy document in the ‘requestParameters‘ section to verify what permission was granted:
- Check the ‘roleName‘ field to verify the name of the role that was created.
- Check the ‘assumeRolePolicyDocument‘ field to review the permissions that were granted to the role.
- Check for suspicious activity and malicious behavior:
- Look for any suspicious activity from the user or IP address that could indicate malicious intent, such as creating multiple roles with similar names or granting permissions beyond what is necessary.
- Check for any malicious behavior from the user or IP address, such as granting excessive permissions to a role or creating multiple roles with suspicious names.

Once the plurality of notifications (e.g., initial notification 298 and additional notification 316) of a security event are summarized (as shown above), threat mitigation process 10 may process 2206 at least a portion of each of the plurality of event summaries (illustrated above) using the Generative AI model (e.g., generative AI model 302) and the above-described formatting script (e.g., formatting script 304) to summarize the plurality of event summaries and generate a summarized human-readable report (e.g., summarized human-readable report 306).

Below is an example of such a summarized human-readable report (e.g., summarized human-readable report 306) for EVENTS 1-2:

---

Summary:
1. On Jan 24th, 2023 at 16:52:58Z, a role was created with the name us-east-1__F4tKzs0rl by user q5btsdo6lhqv@uyf0bn1fk303.com with the IP address amplifybackend.amazonaws.com.
2. At 16:53:14 on 2023-01-24, the user with accessKeyId 'ASIA5BV3CPSAPAFTJIUG' and assumed role AROA5BV3CPSALNLBYZTE6 attempted to PutRolePolicy for a role called 'us-east-1__G8tKzs0rl__Manage-only' from the source IP Address 'amplifybackend.amazonaws.com'.

Impact on the Organization:
The events indicate that a user is attempting to modify a role in the AWS IAM service, which could potentially grant additional privileges to the user and associated IP address. This could lead to unauthorized access to sensitive resources or data, or privilege escalation, resulting in financial loss or other damage to the organization.

Relevant Artifacts:
- User: q5btsdo6lhqv@uyf0bn1fk303.com
- Access Key ID: ASIA5B4444444FTJIUG
- Assumed Role: AYEDVBV3CPSALNLBYZTE6
- IP Address: amplifybackend.amazonaws.com
- Role Name: us-east-1__G8tKzs0rl-authRole and us-east-1__G8tKzs0rl-only
- Account ID: 896966753408
- Location of External IP: Unknown Potential Security Threats Indicated by Events:
The events indicate that a user is attempting to modify a role in the AWS IAM service, which could potentially grant additional privileges to the user and associated IP address. This could lead to unauthorized access to sensitive resources or data, or privilege escalation, resulting in financial loss or other damage to the organization.

Indicators of Compromise (IOCs):
- User identity associated with accessKeyId ' ASIA5B4444444FTJIUG '
- Policy document attempted to be applied to role
- IP address amplifybackend.amazonaws.com
- Unusually high API usage or unsuccessful authentication attempts from user or IP address
- Attempts to access sensitive data or modifications to existing policies from user or IP address Legitimate Activity Contributing to False Positives:
- Creation of a new role for a legitimate user
- Creation of a new role for an application
- Creation of a new role for an automated process
- Updating the policy on an existing role to allow access to certain resources
- Modifying an existing user's permissions
- Creating new users or groups
- Modifying existing groups or users Next Steps for Further Investigation:
- Review the user identity associated with the event and look for suspicious activity that may be associated with the user.
- Check for any changes in the IAM role that was created to ensure that it does not provide more access than intended.
- Verify that the IP address associated with the event is a trusted source and that no suspicious activity has been observed from that IP in the past.
- Look for any other events associated with the user or IP address that may indicate malicious or suspicious activity.
- Confirm the identity of the user associated with the accessKeyId 'ASIA5B4444444FTJIUG' by checking the IAM user records.
- Analyze the policy document to ensure that the new policy does not grant more access than is necessary for the role.
- Investigate any suspicious activity that could be associated with the user, such as unusually high API usage or unsuccessful authentication attempts.
- Investigate any malicious activity that could be associated with the user, such as attempts to access sensitive data or modifications to existing policies.

Recommend Actions:
- Selective shutdown / suspension of user account(s).
- Selective shutdown of impacted ports.
- Selective shutdown of suspicious streams.
- Quarantining of inbound file(s).

---

As discussed above, threat mitigation process 10 may present 2208 the (above-illustrated) summarized human-readable report (e.g., summarized human-readable report 306) to a user (e.g., analyst 256) and may prompt 2210 the user (e.g., analyst 256) to provide feedback concerning the (above-illustrated) summarized human-readable report (e.g., summarized human-readable report 306).

Threat mitigation process 10 may receive 2212 feedback concerning the (above-illustrated) summarized human-readable report (e.g., summarized human-readable report 306) from a user (e.g., analyst 256) and may utilize 2214 the feedback to revise the above-described formatting script (e.g., formatting script 304) so that the (above-illustrated) summarized human-readable report (e.g., summarized human-readable report 306) may be tailored based upon such feedback.

Auto-Execution of Recommended Next Steps

Figure 38:
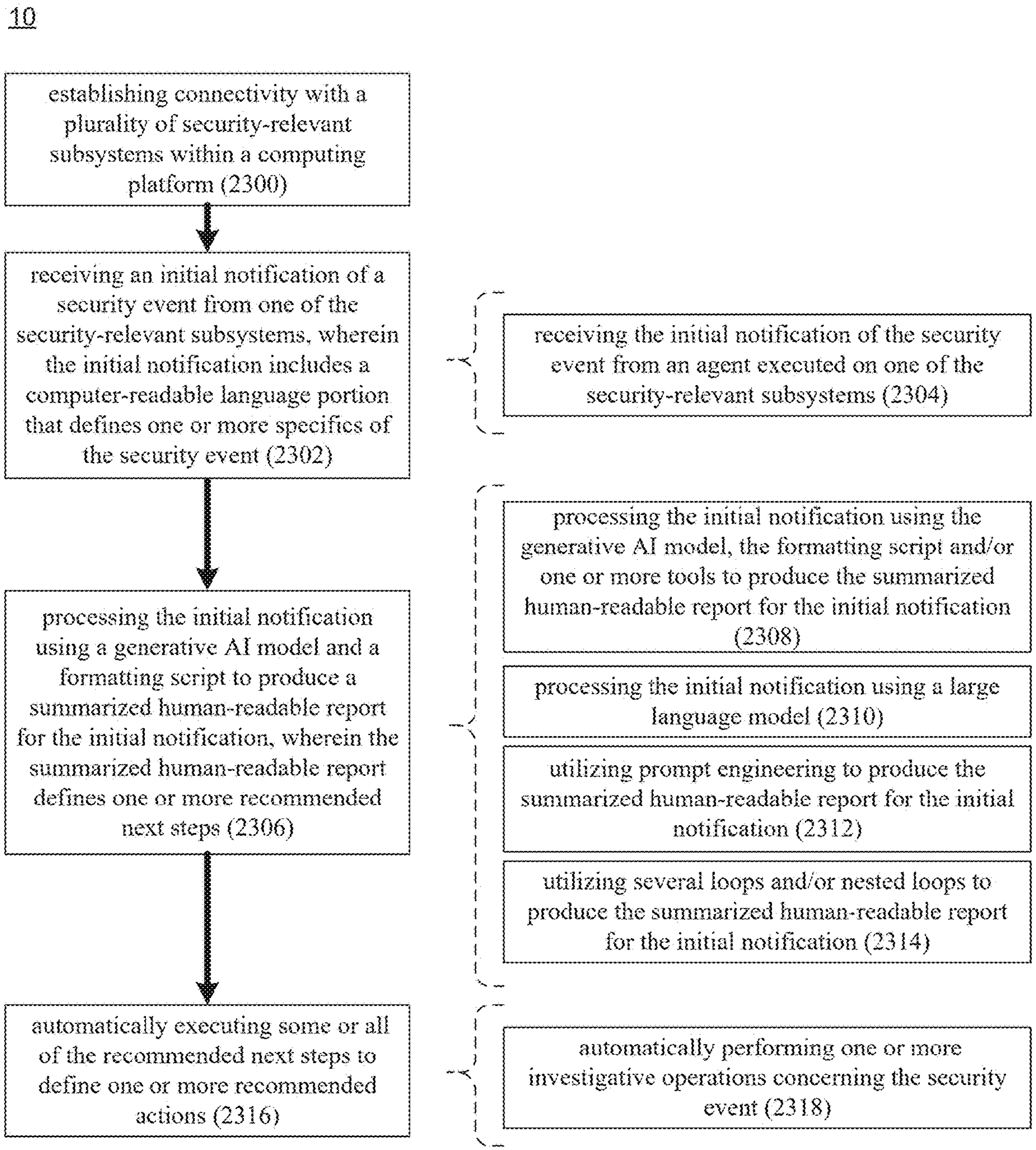
FIG. 38 is a flowchart of another implementation of the threat mitigation process of FIG. 1 according to an embodiment of the present disclosure.

Referring also to FIG. 38 and as discussed above, threat mitigation process 10 may establish 2300 connectivity with a plurality of security-relevant subsystems (e.g., security-relevant subsystems 226) within a computing platform (e.g., computing platform 60).

As discussed above, establishing connectivity between security-relevant subsystems (e.g., security-relevant subsystems 226) may require a multifaceted approach that encompasses network configuration, secure communication protocols, authentication, authorization mechanisms, and centralized management.

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Threat mitigation process 10 may receive 2302 an initial notification (e.g., initial notification 298) of a security event from one of the security-relevant subsystems (e.g., security-relevant subsystems 226), wherein the initial notification (e.g., initial notification 298) includes a computer-readable language portion that defines one or more specifics of the security event. As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

When receiving 2302 an initial notification (e.g., initial notification 298) of a security event from one of the security-relevant subsystems (e.g., security-relevant subsystems 226), threat mitigation process 10 may receive 2304 the initial notification (e.g., initial notification 298) of the security event from an agent (e.g., agent 300) executed on one of the security-relevant subsystems (e.g., security-relevant subsystems 226).

As discussed above, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

Threat mitigation process 10 may process 2306 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), wherein the summarized human-readable report (e.g., summarized human-readable report 306) defines one or more recommended next steps.

With respect to the (above-illustrated) summarized human-readable report (e.g., summarized human-readable report 306), examples of one or more recommended next steps defined therein are as follows:

Next Steps for Further Investigation:
- Review the user identity associated with the event and look for suspicious activity that may be associated with the user.
- Check for any changes in the IAM role that was created to ensure that it does not provide more access than intended.
- Verify that the IP address associated with the event is a trusted source and that no suspicious activity has been observed from that IP in the past.
- Look for any other events associated with the user or IP address that may indicate malicious or suspicious activity.
- Confirm the identity of the user associated with the accessKeyId 'ASIA5B4444444FTJIUG' by checking the IAM user records.
- Analyze the policy document to ensure that the new policy does not grant more access than is necessary for the role.
- Investigate any suspicious activity that could be associated with the user, such as unusually high API usage or unsuccessful authentication attempts.
- Investigate any malicious activity that could be associated with the user, such as attempts to access sensitive data or modifications to existing policies.

When processing 2306 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2308 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When processing 2306 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2310 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When processing 2306 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2312 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When processing 2306 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2314 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Threat mitigation process 10 may automatically execute 2316 some or all of the recommended next steps to define one or more recommended actions. Further and when automatically executing 2316 some or all of the recommended next steps to define one or more recommended actions, threat mitigation process 10 may automatically perform 2318 one or more investigative operations concerning the security event.

As discussed above and with respect to the (above-illustrated) summarized human-readable report (e.g., summarized human-readable report 306), examples of one or more recommended next steps defined therein are as follows:

Next Steps for Further Investigation:
- Review the user identity associated with the event and look for suspicious activity that may be associated with the user.
- Check for any changes in the IAM role that was created to ensure that it does not provide more access than intended.
- Verify that the IP address associated with the event is a trusted source and that no suspicious activity has been observed from that IP in the past.
- Look for any other events associated with the user or IP address that may indicate malicious or suspicious activity.
- Confirm the identity of the user associated with the accessKeyId 'ASIA5B4444444FTJIUG' by checking the IAM user records.
- Analyze the policy document to ensure that the new policy does not grant more access than is necessary for the role.
- Investigate any suspicious activity that could be associated with the user, such as unusually high API usage or unsuccessful authentication attempts.
- Investigate any malicious activity that could be associated with the user, such as attempts to access sensitive data or modifications to existing policies.

Accordingly, threat mitigation process 10 may automatically execute 2316 some or all of these recommended next steps to define one or more recommended actions. For example, threat mitigation process 10 may automatically execute 2316 this recommended next step:

- Review the user identity associated with the event and look for suspicious activity that may be associated with the user Upon executing 2316 this recommended next step, threat mitigation process 10 may determine that User X is acting in a very suspicious manner. Accordingly, threat mitigation process 10 may automatically perform 2318 one or more investigative operations concerning User X with respect to the security event. For example, threat mitigation process 10 may automatically perform 2318 one or more investigative operations concerning the network usage of User X, the background of User X, the web browsing history of User X, etc. All of this research and investigation may result in threat mitigation process 10 defining the recommended action of disabling all accounts of User X.

Auto-Execution of Recommended Actions

Figure 39:
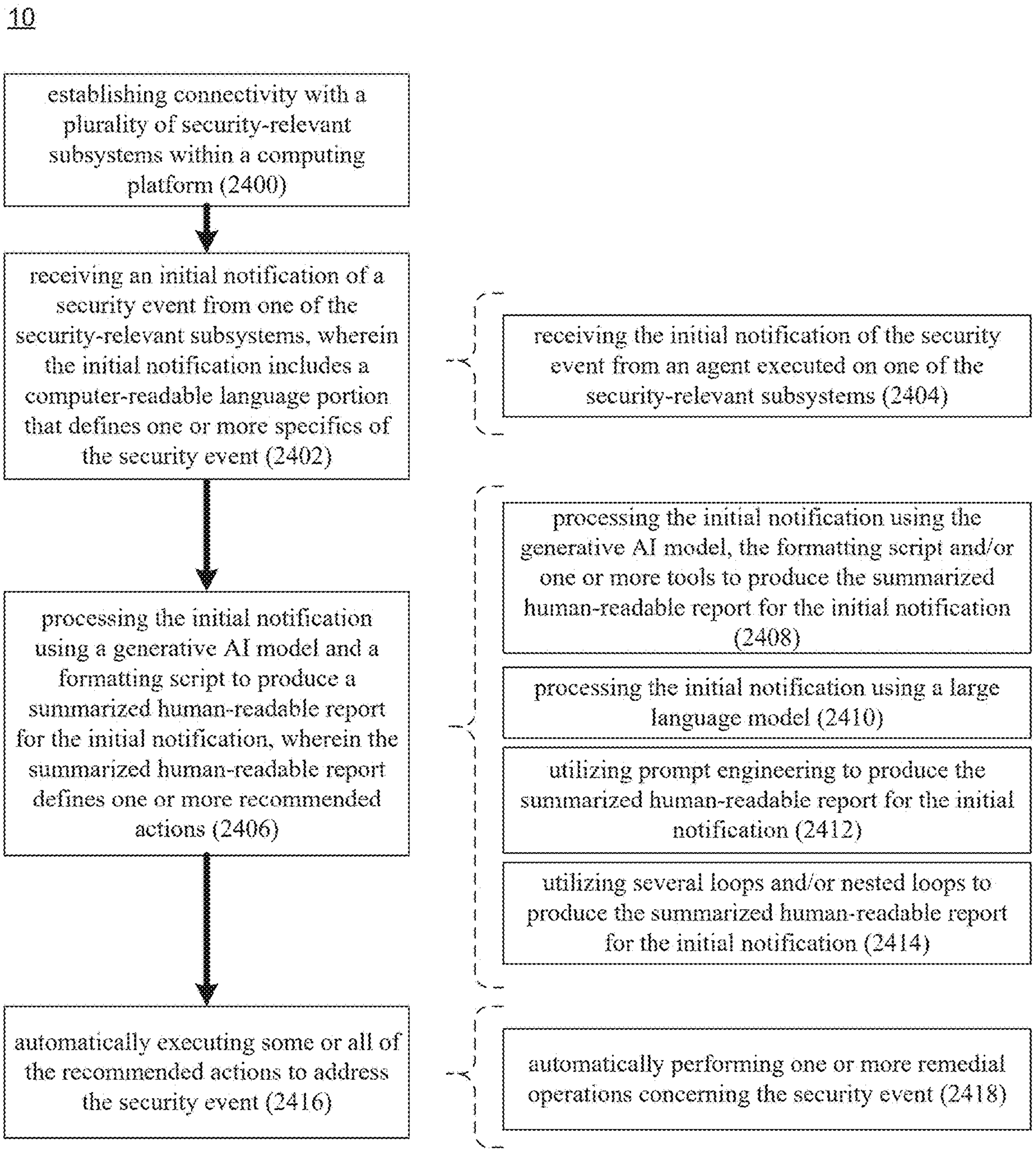
FIG. 39 is a flowchart of another implementation of the threat mitigation process of FIG. 1 according to an embodiment of the present disclosure.

Referring also to FIG. 39, threat mitigation process 10 may establish 2400 connectivity with a plurality of security-relevant subsystems (e.g., security-relevant subsystems 226) within a computing platform (e.g., computing platform 60).

As discussed above, establishing connectivity between security-relevant subsystems (e.g., security-relevant subsystems 226) may require a multifaceted approach that encompasses network configuration, secure communication protocols, authentication, authorization mechanisms, and centralized management.

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Threat mitigation process 10 may receive 2402 an initial notification (e.g., initial notification 298) of a security event from one of the security-relevant subsystems (e.g., security-relevant subsystems 226), wherein the initial notification (e.g., initial notification 298) includes a computer-readable language portion that defines one or more specifics of the security event. As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

When receiving 2402 an initial notification (e.g., initial notification 298) of a security event from one of the security-relevant subsystems (e.g., security-relevant subsystems 226), threat mitigation process 10 may receive 2404 the initial notification (e.g., initial notification 298) of the security event from an agent (e.g., agent 300) executed on one of the security-relevant subsystems (e.g., security-relevant subsystems 226).

As discussed above, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

Threat mitigation process 10 may process 2406 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), wherein the summarized human-readable report (e.g., summarized human-readable report 306) defines one or more recommended actions.

With respect to the (above-illustrated) summarized human-readable report (e.g., summarized human-readable report 306), examples of one or more recommended actions defined therein are as follows:

Recommend Actions:
- Selective shutdown / suspension of user account(s).
- Selective shutdown of impacted port(s).
- Selective shutdown of suspicious stream(s).
- Quarantining of inbound file(s).

When processing 2406 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2408 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When processing 2406 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2410 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When processing 2406 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2412 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When processing 2406 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2414 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Threat mitigation process 10 may automatically execute 2416 some or all of the recommended actions to address the security event. Further and when automatically executing 2416 some or all of the recommended actions, threat mitigation process 10 may automatically perform 2418 one or more remedial operations concerning the security event.

As discussed above and with respect to the (above-illustrated) summarized human-readable report (e.g., summarized human-readable report 306), examples of one or more recommended actions defined therein are as follows:

Recommend Actions:
- Selective shutdown / suspension of user account(s).
- Selective shutdown of impacted port(s).
- Selective shutdown of suspicious stream(s).
- Quarantining of inbound file(s).

Accordingly, threat mitigation process 10 may automatically execute 2416 some or all of these recommended actions to address the security event. For example, threat mitigation process 10 may automatically execute 2416 this recommended action:

Selective shutdown of impacted port

Upon executing 2416 this recommended action, threat mitigation process 10 may shut down Port A which is receiving data from BlackHat.RU and may shut down Port B which is providing data to BadActor.RU. Further, threat mitigation process 10 may automatically perform 2418 one or more remedial operations concerning the security event. For example, threat mitigation process 10 may automatically delete/quarantine any data that was received on Port A from BlackHat.RU.

Model Registry

Figure 40:
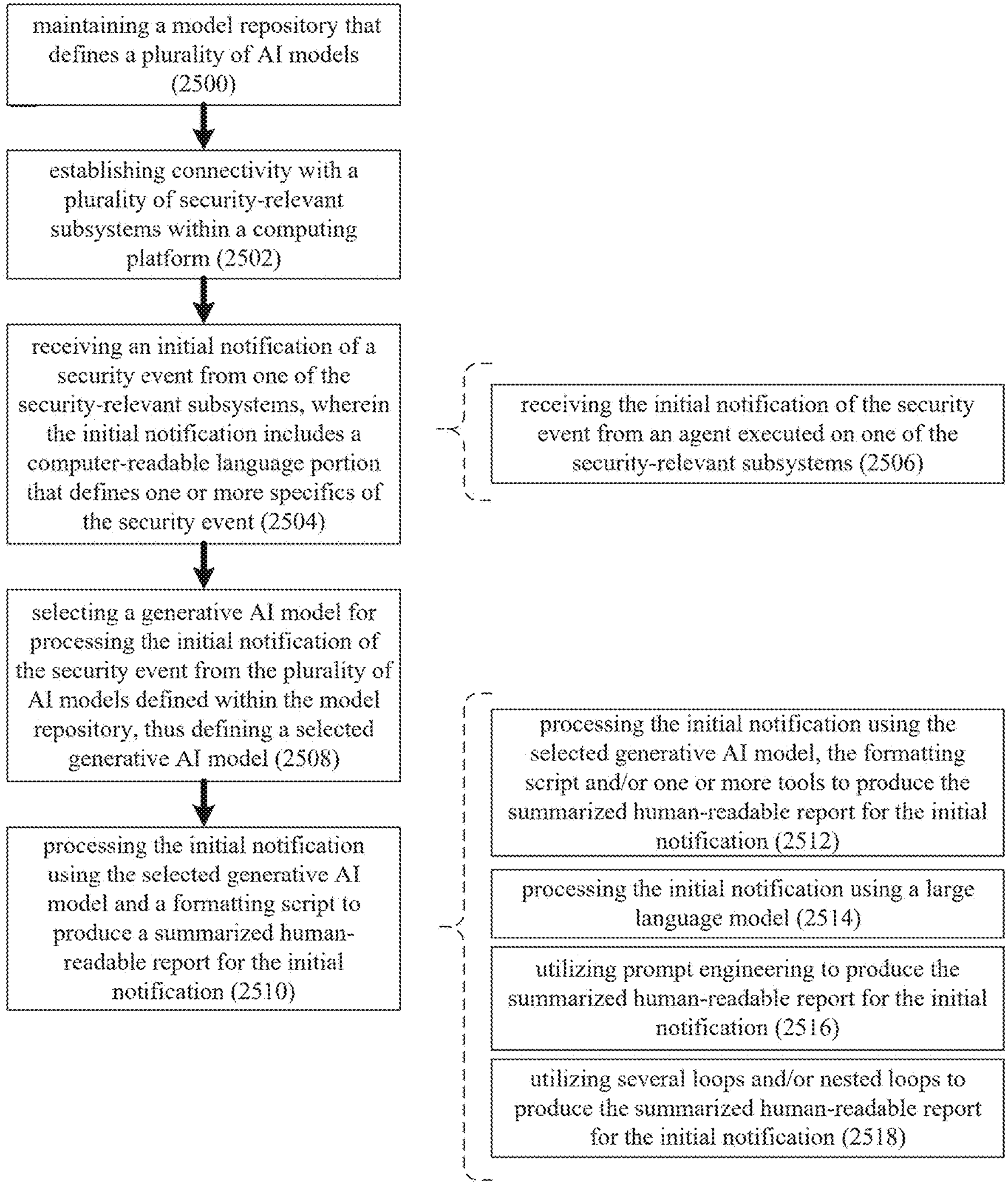
FIG. 40 is a flowchart of another implementation of the threat mitigation process of FIG. 1 according to an embodiment of the present disclosure.

Referring also to FIG. 40, threat mitigation process 10 may maintain 2500 a model repository (e.g., model repository 318) that defines a plurality of AI models (e.g., plurality of AI models 320).

Maintaining 2500 a model repository (e.g., model repository 318) for use by threat mitigation process 10 may involve several activities centered around the creation, storage, management, and updating of AI models that are designed to identify and respond to suspicious or malicious activities within a computing platform (e.g., computing platform 60). Generally speaking, Network Intrusion Detection Systems equipped with AI capabilities can significantly improve the detection of complex and evolving cyber threats.

Here's what maintaining such a repository generally entails:

Maintaining 2500 such a model repository (e.g., model repository 318) may include various different functionalities, examples of which may include but are not limited to:

- Model Development and Training: Initially, AI models are developed and trained using historical data, which includes both normal network behavior and various types of intrusions or attacks. This phase involves feature selection, choosing appropriate machine learning algorithms, and training models to recognize patterns indicative of potential security breaches.
- Model Validation and Testing: Before deployment, models are validated and tested to ensure they accurately detect intrusions while minimizing false positives and false negatives. This step might involve using separate datasets not seen by the model during the training phase to evaluate performance.
- Repository Storage: The repository (e.g., model repository 318) acts as a centralized library where these AI models are stored. It includes not only the models themselves but also metadata about the models, such as their type (e.g., decision trees, neural networks), performance metrics, intended use cases (e.g., detecting DDoS attacks, malware), and information on training datasets.
- Version Control: Similar to software development practices, maintaining a version control system for the AI models is crucial. This ensures that updates, improvements, and changes to the models are systematically managed, allowing for the rollback to previous versions if needed.
- Model Deployment: Models may be deployed into the operational environment of the NIDS so they can start analyzing network traffic and identifying potential threats. This might involve integrating models into existing NIDS frameworks or updating NIDS components to accommodate new AI capabilities.
- Monitoring and Updating: Cyber threats are constantly evolving;
- therefore, AI models require continuous monitoring and retraining to stay effective. This includes updating models with new data reflecting the latest threat patterns and re-deploying them. The repository (e.g., model repository 318) must support these iterative cycles of retraining and updating.
- Access Control and Security: Given the sensitivity of the models and the data they process, maintaining proper access control and security measures for the repository (e.g., model repository 318) is paramount. This ensures that only authorized personnel can access, modify, or deploy models.
- Compliance and Documentation: Ensuring that the repository (e.g., model repository 318) and its models comply with relevant regulations and standards, and maintaining thorough documentation for each model may be of paramount importance. This documentation should cover the model's purpose, performance characteristics, training data sources, and any limitations or biases.

By maintaining 2500 an AI model repository (e.g., model repository 318) for a Network Intrusion Detection System, organizations can systematically manage the lifecycle of AI models (e.g., plurality of AI models 320), from development to deployment, ensuring that their NIDS remains effective against the continuously changing landscape of network threats.

Threat mitigation process 10 may establish 2502 connectivity with a plurality of security-relevant subsystems (e.g., security-relevant subsystems 226) within a computing platform (e.g., computing platform 60).

As discussed above, establishing connectivity between security-relevant subsystems (e.g., security-relevant subsystems 226) may require a multifaceted approach that encompasses network configuration, secure communication protocols, authentication, authorization mechanisms, and centralized management.

Threat mitigation process 10 may receive 2504 an initial notification (e.g., initial notification 298) of a security event from one of the security-relevant subsystems (e.g., security-relevant subsystems 226), wherein the initial notification (e.g., initial notification 298) includes a computer-readable language portion that defines one or more specifics of the security event. As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

When receiving 2504 an initial notification (e.g., initial notification 298) of a security event from one of the security-relevant subsystems (e.g., security-relevant subsystems 226), threat mitigation process 10 may receive 2506 the initial notification (e.g., initial notification 298) of the security event from an agent (e.g., agent 300) executed on one of the security-relevant subsystems (e.g., security-relevant subsystems 226).

As discussed above, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

Threat mitigation process 10 may select 2508 a generative AI model (e.g., generative AI model 302) for processing the initial notification (e.g., initial notification 298) of the security event from the plurality of AI models (e.g., plurality of AI models 320) defined within the model repository (e.g., model repository 318), thus defining a selected generative AI model (e.g., generative AI model 302).

Examples of the plurality of AI models (e.g., plurality of AI models 320) defined within the model repository (e.g., model repository 318) may include but are not limited to:

- BERT (Bidirectional Encoder Representations from Transformers): Developed by Google, BERT is a powerful natural language processing model that has been influential in various NLP tasks, including question answering and sentiment analysis.
- OpenAI's GPT (Generative Pre-trained Transformer) Series: This includes GPT-2, GPT-3, GPT-4 and potentially future iterations. These models are developed by OpenAI and are known for their ability to generate human-like text across a wide range of topics.
- XLNet: Developed by Google, XLNet is a generalized autoregressive pretraining method that outperforms BERT on several NLP benchmarks.
- T5 (Text-to-Text Transfer Transformer): Also developed by Google, T5 is a versatile model capable of performing various NLP tasks by converting all tasks into a text-to-text format.
- BERT-based models from Hugging Face: Hugging Face provides pre-trained BERT-based models like RoBERTa, DistilBERT, and BERTweet, which are widely used in the NLP community.
- Microsoft's Turing Natural Language Generation (T-NLG): T-NLG is a large-scale AI language model developed by Microsoft Research, which competes in the domain of natural language generation and understanding.
- Facebook's RoBERTa (Robustly optimized BERT approach): RoBERTa is an optimized BERT model developed by Facebook AI Research, which achieves better performance on various NLP benchmarks.
- Tencent's ERNIE (Enhanced Representation through kNowledge Integration): ERNIE is a knowledge-enhanced language representation model developed by Tencent AI Lab, which integrates external knowledge for better understanding.
- Fast.ai's ULMFiT (Universal Language Model Fine-Tuning): ULMFiT is a transfer learning method developed by Fast.ai, which enables easy fine-tuning of pre-trained language models for specific tasks with limited data.
- Salesforce's CTRL (Conditional Transformer Language Model): CTRL is a large-scale autoregressive language model developed by Salesforce Research, which allows users to control the topic of the generated text.

The plurality of AI models (e.g., plurality of AI models 320) defined within the model repository (e.g., model repository 318) may include multiple versions of the same model (e.g., ChatGPT 3.0 versus ChatGPT 3.5 versus ChatGPT 4.0) . . . wherein such different versions provide different levels of performance/operating cost.

Accordingly, the plurality of AI models (e.g., plurality of AI models 320) defined within the model repository (e.g., model repository 318) may offer e.g., different features, operate on different cost structures or perform certain operations more efficiently. Therefore, threat mitigation process 10 may select 2508 a generative AI model (e.g., generative AI model 302) from the plurality of AI models (e.g., plurality of AI models 320) defined within the model repository (e.g., model repository 318) based upon operation requirements. For example, Model A may be very fast and quite expensive to operate. However, it may be very skilled at generating synthetic speech. Accordingly, threat mitigation process 10 may select 2508 Model A when realistic synthetic speech is needed. Conversely, Model B may be slower and less expensive to operate. But it may be really good at translating text between languages. Accordingly, threat mitigation process 10 may select 2508 Model B when translations are needed at a more leisurely pace.

Threat mitigation process 10 may process 2510 the initial notification (e.g., initial notification 298) using the selected generative AI model (e.g., generative AI model 302) and a formatting script (e.g., formatting script 304) to produce a summarized human-readable report (e.g., summarized human-readable report 306) for the initial notification (e.g., initial notification 298).

When processing 2510 the initial notification (e.g., initial notification 298) using the selected generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2512 the initial notification (e.g., initial notification 298) using the selected generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When processing 2510 the initial notification (e.g., initial notification 298) using the selected generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2514 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When processing 2510 the initial notification (e.g., initial notification 298) using the selected generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2516 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When processing 2510 the initial notification (e.g., initial notification 298) using the selected generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2518 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Dynamic Decision Making

Figure 41:
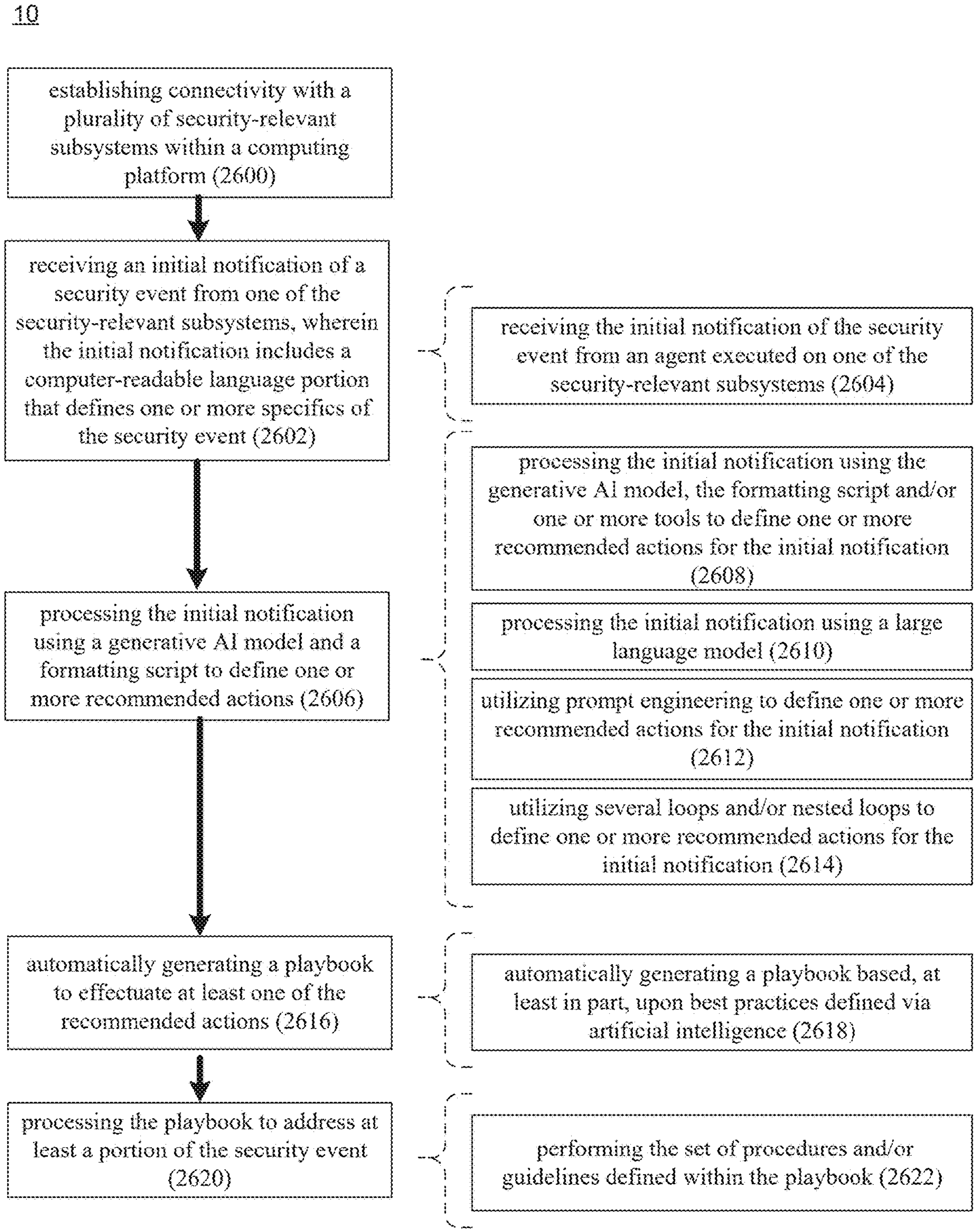
FIG. 41 is a flowchart of another implementation of the threat mitigation process of FIG. 1 according to an embodiment of the present disclosure.

Referring also to FIG. 41, threat mitigation process 10 may establish 2600 connectivity with a plurality of security-relevant subsystems (e.g., security-relevant subsystems 226) within a computing platform (e.g., computing platform 60).

As discussed above, establishing connectivity between security-relevant subsystems (e.g., security-relevant subsystems 226) may require a multifaceted approach that encompasses network configuration, secure communication protocols, authentication, authorization mechanisms, and centralized management.

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Threat mitigation process 10 may receive 2602 an initial notification (e.g., initial notification 298) of a security event from one of the security-relevant subsystems (e.g., security-relevant subsystems 226), wherein the initial notification (e.g., initial notification 298) includes a computer-readable language portion that defines one or more specifics of the security event. As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

When receiving 2602 an initial notification (e.g., initial notification 298) of a security event from one of the security-relevant subsystems (e.g., security-relevant subsystems 226), threat mitigation process 10 may receive 2604 the initial notification (e.g., initial notification 298) of the security event from an agent (e.g., agent 300) executed on one of the security-relevant subsystems (e.g., security-relevant subsystems 226).

As discussed above, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

Threat mitigation process 10 may process 2606 the initial notification (e.g., initial notification 298) using a generative AI model (e.g., generative AI model 302) and a formatting script (e.g., formatting script 304) to define one or more recommended actions.

As discussed above and with respect to the (above-illustrated) summarized human-readable report (e.g., summarized human-readable report 306), examples of one or more recommended actions defined therein are as follows:

| |
|---|
| Recommend Actions: |
| • Selective shutdown / suspension of user account(s). |
| • Selective shutdown of impacted port(s). |
| • Selective shutdown of suspicious stream(s). |
| • Quarantining of inbound file(s). |

When processing 2606 the initial notification (e.g., initial notification 298) using a generative AI model (e.g., generative AI model 302) and a formatting script (e.g., formatting script 304) to define one or more recommended actions, threat mitigation process 10 may process 2608 the initial notification (e.g., initial notification 298) using the generative AI model (e.g., generative AI model 302), the formatting script (e.g., formatting script 304) and/or one or more tools (e.g., tools 310) to define one or more recommended actions for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When processing 2606 the initial notification (e.g., initial notification 298) using a generative AI model (e.g., generative AI model 302) and a formatting script (e.g., formatting script 304) to define one or more recommended actions, threat mitigation process 10 may process 2610 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When processing 2606 the initial notification (e.g., initial notification 298) using a generative AI model (e.g., generative AI model 302) and a formatting script (e.g., formatting script 304) to define one or more recommended actions, threat mitigation process 10 may utilize 2612 prompt engineering to define one or more recommended actions for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When processing 2606 the initial notification (e.g., initial notification 298) using a generative AI model (e.g., generative AI model 302) and a formatting script (e.g., formatting script 304) to define one or more recommended actions, threat mitigation process 10 may utilize 2614 several loops and/or nested loops to define one or more recommended actions for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Threat mitigation process 10 may automatically generate 2616 a playbook (e.g., playbook 322) to effectuate at least one of the above-discussed recommended actions. The playbook (e.g., playbook 322) may define a set of procedures and/or guidelines configured to at least partially address the security event.

In the context of a Network Intrusion Detection System (NIDS) and broader cybersecurity operations, a playbook (e.g., playbook 322) refers to a predefined set of procedures or steps that are to be followed in response to specific types of alerts or indicators of compromise. These playbooks (e.g., playbook 322) may be essential for ensuring that an organization's response to potential threats is swift, effective, and consistent.

Examples of the roles and benefits of playbooks (e.g., playbook 322) in a NIDS context are as follows:

Standardizing Response Procedures: Playbooks provide a standardized method for responding to different types of security incidents. This standardization helps in minimizing errors and ensures that all necessary steps are taken to mitigate and analyze the threat.

Automating Response Actions: Many modem NIDS and Security Orchestration, Automation, and Response (SOAR) platforms allow for the automation of certain playbook actions. For example, a playbook might automatically isolate a compromised system from the network, update firewall rules to block malicious traffic, or gather additional context about an alert without human intervention.

Facilitating Quick Decision-Making: By having a set of predetermined actions, playbooks enable security analysts to make quick decisions in response to detected threats. This is crucial in minimizing the time an attacker has inside the network and reducing the potential damage they can cause.

Enhancing Incident Management: Playbooks help in organizing the workflow of incident response, from initial detection to post-incident analysis. This includes specifying roles and responsibilities, documenting actions taken, and ensuring compliance with regulatory requirements.

Improving Training and Readiness: Playbooks are also valuable training tools for security teams. They help in familiarizing new analysts with the typical response processes and can be used in tabletop exercises to simulate responses to hypothetical security incidents.

Evolving with Threat Landscape: As new types of attacks emerge and organizations' network environments change, playbooks must be regularly updated. This ensures that the response strategies remain effective against the latest threats and are aligned with the current network architecture and business processes.

In summary, playbooks (e.g., playbook 322) in a Network Intrusion Detection System context may be critical for managing and responding to security incidents efficiently. They help in minimizing the impact of attacks, ensuring compliance with regulatory standards, and maintaining the overall security posture of an organization.

When automatically generating 2616 a playbook (e.g., playbook 322) to effectuate at least one of the recommended actions, threat mitigation process 10 may automatically generate 2618 a playbook (e.g., playbook 322) based, at least in part, upon best practices defined via artificial intelligence (e.g., AI/ML process 56).

For example and during the operation of threat mitigation process 10, data may be archived concerning activities that occurred within the computing platform (e.g., computing platform 60). So over time, threat mitigation process 10 may build a data repository (e.g., data repository 312) that identifies various examples of "concerning" activities within the computing platform (e.g., computing platform 60), the procedures employed to address these "concerning" activities, and whether such procedures were successful. Accordingly, threat mitigation process 10 may automatically generate 2618 a playbook (e.g., playbook 322) based, at least in part, upon best practices extracted from data repository 312 via artificial intelligence (e.g., AI/ML process 56). Accordingly and through the use of threat mitigation process 10, playbooks need not be static and may be dynamic . . . wherein threat mitigation process 10 may automatically generate 2618 playbook 322 based, at least in part, upon best practices defined via artificial intelligence (e.g., AI/ML process 56).

Threat mitigation process 10 may process 2620 the playbook (e.g., playbook 322) to address at least a portion of the security event, wherein processing 2620 the playbook (e.g., playbook 322) to address at least a portion of the security event may include performing 2622 the set of procedures and/or guidelines defined within the playbook (e.g., playbook 322). Examples of such procedures and/or guidelines defined within the playbook (e.g., playbook 322) may include but are not limited to:

- Selective shutdown / suspension of user account(s).
- Selective shutdown of impacted port(s).
- Selective shutdown of suspicious stream(s).
- Quarantining of inbound file(s).

Adaptive Defense

Figure 42:
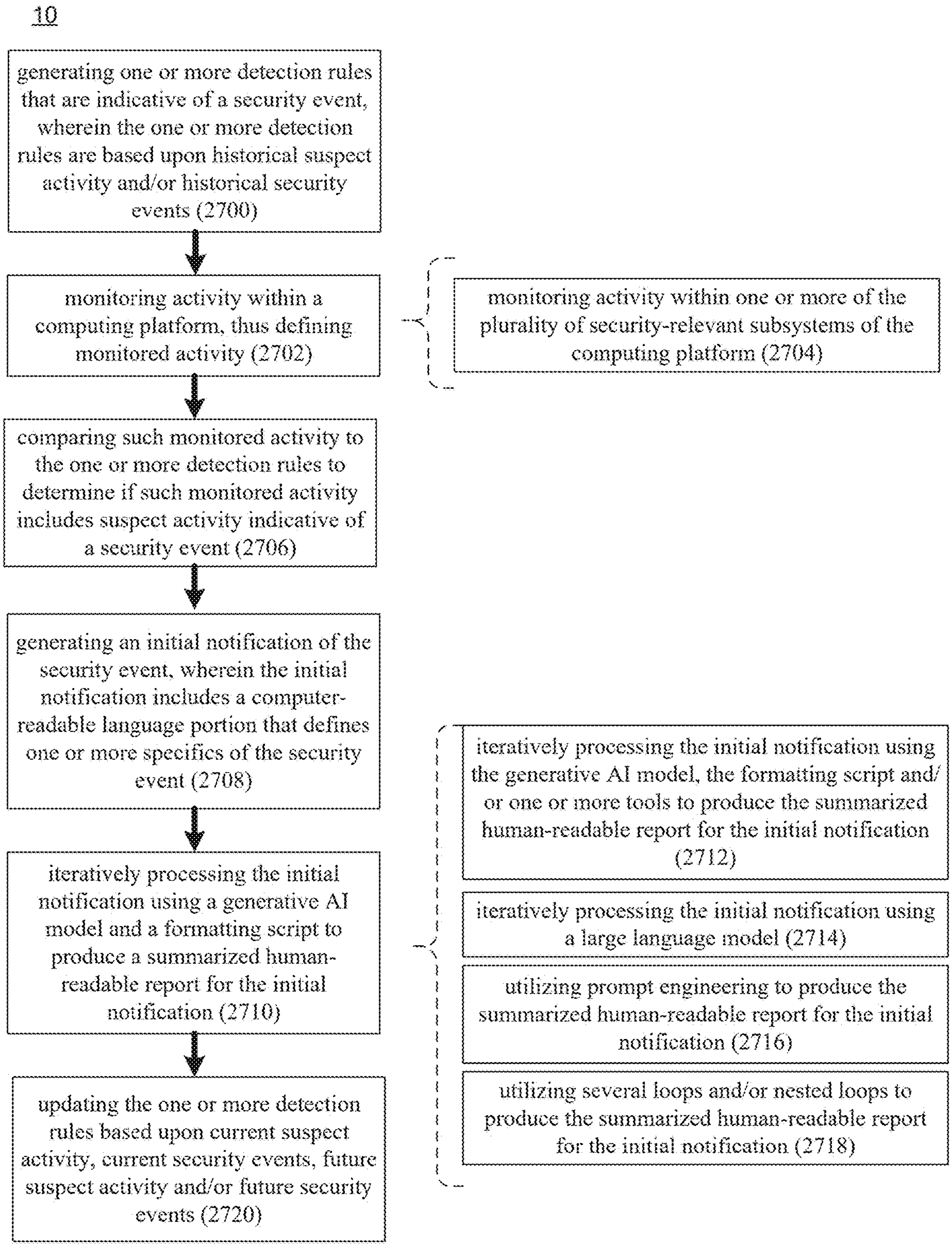
FIG. 42 is a flowchart of another implementation of the threat mitigation process of FIG. 1 according to an embodiment of the present disclosure.

Referring also to FIG. 42, threat mitigation process 10 may generate 2700 one or more detection rules (e.g., detection rules 324) that are indicative of a security event, wherein the one or more detection rules are based upon historical suspect activity and/or historical security events. As discussed above, examples of such security events may include but are not limited to access auditing; anomalies; authentication; denial of services; exploitation; malware; phishing; spamming; reconnaissance; and/or web attack within a monitored computing platform (e.g., computing platform 60).

As discussed above and during the operation of threat mitigation process 10, data may be archived concerning activities that occurred within the computing platform (e.g., computing platform 60). So over time, threat mitigation process 10 may build a data repository (e.g., data repository 312) that identifies various examples of "concerning" activities within the computing platform (e.g., computing platform 60), the procedures employed to address these "concerning" activities, and whether such procedures were successful. Accordingly, threat mitigation process 10 may generate 2700 such detection rules (e.g., detection rules 324) that are indicative of a security event based upon historical suspect activity and/or historical security events defined within data repository 312.

Threat mitigation process 10 may monitor 2702 activity within a computing platform (e.g., computing platform 60), thus defining monitored activity (e.g., monitored activity 326).

The computing platform (e.g., computing platform 60) may include a plurality of security-relevant subsystems (e.g., security-relevant subsystems 226).

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Accordingly and when monitoring 2702 activity within a computing platform (e.g., computing platform 60), threat mitigation process 10 may monitor 2704 activity within one or more of the plurality of security-relevant subsystems (e.g., security-relevant subsystems 226) of the computing platform (e.g., computing platform 60).

Threat mitigation process 10 may compare 2706 such monitored activity (e.g., monitored activity 326) to the one or more detection rules (e.g., detection rules 324) to determine if such monitored activity (e.g., monitored activity 326) includes suspect activity indicative of a security event.

As discussed above, examples of such security events may include but are not limited to access auditing; anomalies; authentication; denial of services; exploitation; malware; phishing; spamming; reconnaissance; and/or web attack within a monitored computing platform (e.g., computing platform 60).

Threat mitigation process 10 may generate 2708 an initial notification (e.g., initial notification 298) of the security event, wherein the initial notification (e.g., initial notification 298) includes a computer-readable language portion that defines one or more specifics of the security event. An example of the computer-readable language portion (e.g., within the notification of the security event) may include but is not limited to a JSON portion.

Threat mitigation process 10 may iteratively process 2710 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298).

As discussed above, the summarized human-readable report (e.g., summarized human-readable report 306) may define recommended next steps, recommended actions and/or disclaimers. For example and in response to a security event that is based upon suspicious activity occurring on computing platform 60:

Recommended Next Steps may provide examples of additional investigations that may be implemented (e.g., port analysis/domain owner identification/perpetrator analysis) to further analyze the security event to gauge the risk/severity of the same.

- Recommended Actions may provide examples of responsive actions that may be implemented (e.g., port blocking/stream shutdown/perpetrator account disablement) to mitigate the negative impact of the security event.
- Disclaimers may provide explanations for why the suspicious activity of the security event may be benign and occurring for a legitimate (i.e., non-threatening) reason (e.g., such port traffic may occur during weekly backups, the person performing this operation is the president.

When iteratively processing 2710 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2712 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When iteratively processing 2710 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2714 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When iteratively processing 2710 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2716 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When iteratively processing 2710 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2718 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Threat mitigation process 10 may update 2720 the one or more detection rules (e.g., detection rules 324) based upon current suspect activity, current security events, future suspect activity and/or future security events.

As discussed above and as threat mitigation process 10 continues to operate, data may continue to be archived concerning activities that occurred within the computing platform (e.g., computing platform 60). And as time continues to pass, threat mitigation process 10 may continue to build a data repository (e.g., data repository 312) that identifies various examples of "concerning" activities within the computing platform (e.g., computing platform 60), the procedures employed to address these "concerning" activities, and whether such procedures were successful. Accordingly, threat mitigation process 10 may update 2720 the one or more detection rules (e.g., detection rules 324) based upon current suspect activity, current security events, future suspect activity and/or future security events.

Next Generation Risk Modeling

Figure 43:
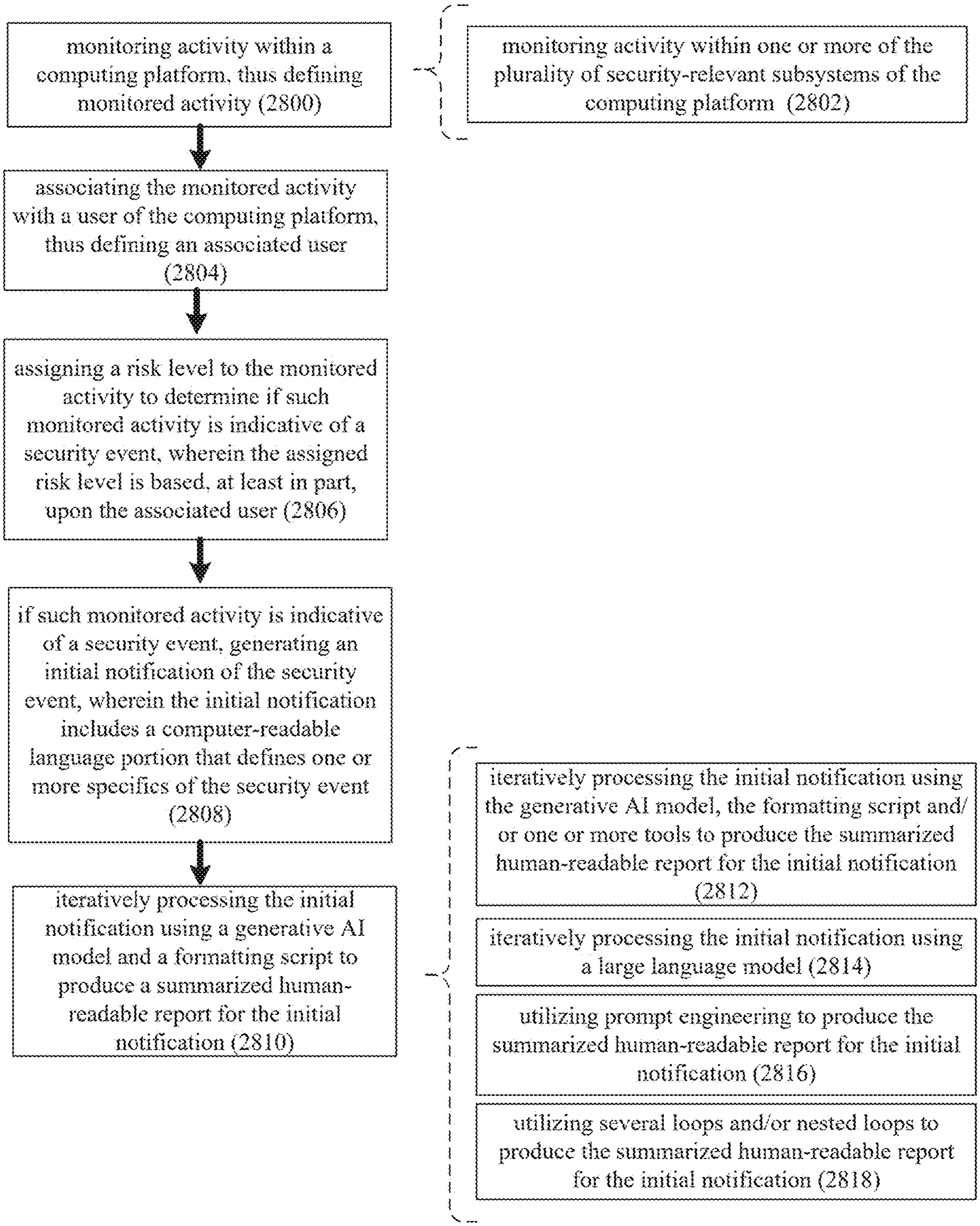
FIG. 43 is a flowchart of another implementation of the threat mitigation process of FIG. 1 according to an embodiment of the present disclosure.

Referring also to FIG. 43, threat mitigation process 10 may monitor 2800 activity within a computing platform (e.g., computing platform 60), thus defining monitored activity (e.g., monitored activity 326).

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

The computing platform (e.g., computing platform 60) may include a plurality of security-relevant subsystems (e.g., security-relevant subsystems 226).

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Accordingly and when monitoring 2800 activity within a computing platform (e.g., computing platform 60), threat mitigation process 10 may monitor 2802 activity within one or more of the plurality of security-relevant subsystems (e.g., security-relevant subsystems 226) of the computing platform (e.g., computing platform 60).

Threat mitigation process 10 may associate 2804 the monitored activity (e.g., monitored activity 326) with a user of the computing platform (e.g., computing platform 60), thus defining an associated user (e.g., user 328).

Threat mitigation process 10 may assign 2806 a risk level to the monitored activity (e.g., monitored activity 326) to determine if such monitored activity (e.g., monitored activity 326) is indicative of a security event, wherein the assigned risk level is based, at least in part, upon the associated user (e.g., user 328). Accordingly, if the associated user (e.g., user 328) is the owner of the company, the assigned risk level may be reduced due to the position of user 328. Conversely, if the associated user (e.g., user 328) is a new hire of the company (or someone who has shown questionable judgement in the past), the assigned risk level may be increased.

As discussed above, examples of such security events may include but are not limited to access auditing; anomalies; authentication; denial of services; exploitation; malware; phishing; spamming; reconnaissance; and/or web attack within a monitored computing platform (e.g., computing platform 60).

If such monitored activity (e.g., monitored activity 326) is indicative of a security event, threat mitigation process 10 may generate 2808 an initial notification (e.g., initial notification 298) of the security event, wherein the initial notification (e.g., initial notification 298) includes a computer-readable language portion that defines one or more specifics of the security event. An example of the computer-readable language portion (e.g., within the notification of the security event) may include but is not limited to a JSON portion.

Threat mitigation process 10 may iteratively process 2810 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298).

When iteratively processing 2810 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2812 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When iteratively processing 2810 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2814 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When iteratively processing 2810 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2816 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When iteratively processing 2810 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2818 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

AI-Based Threat Mitigation Platform

Figure 44:
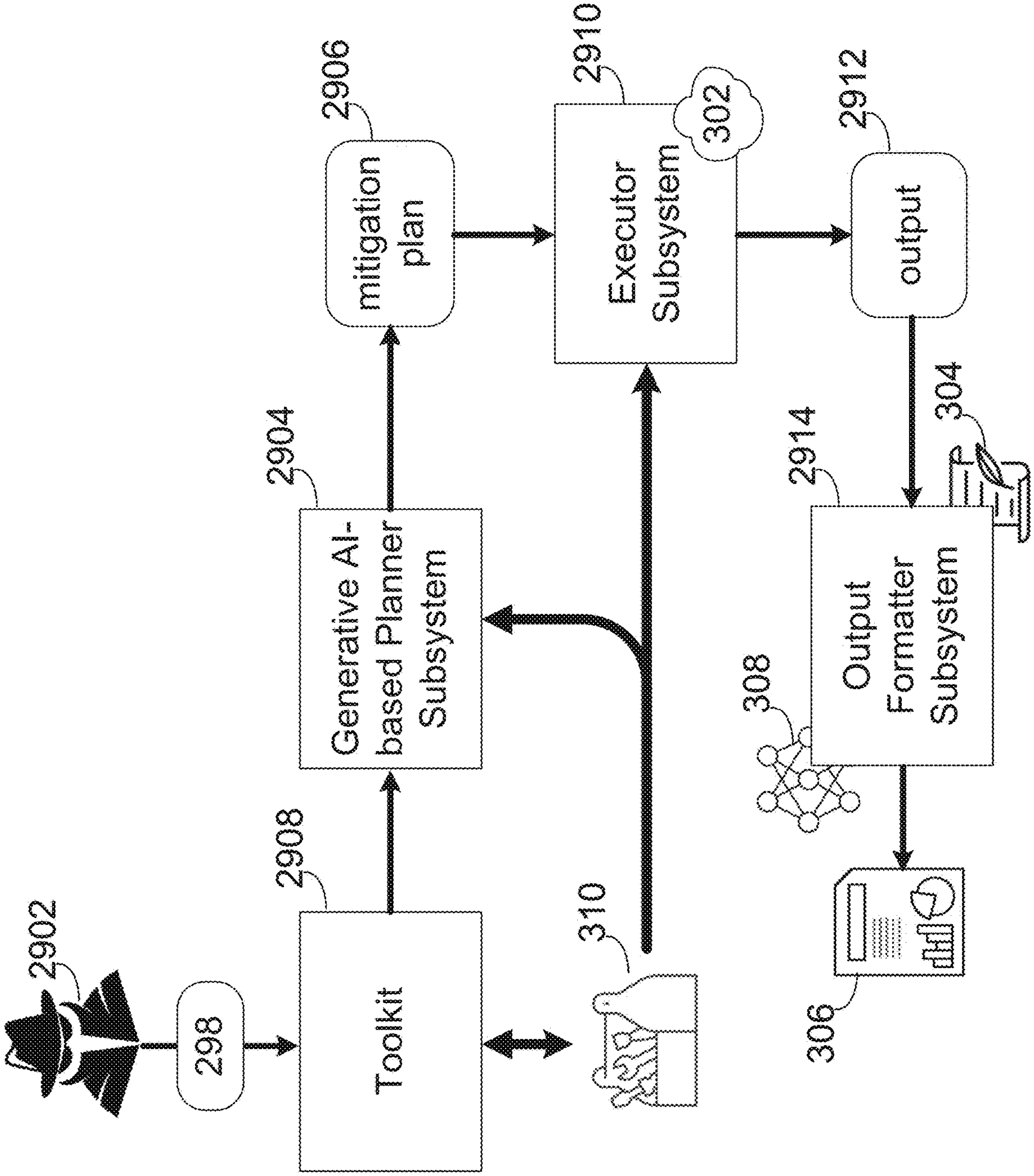
FIG. 44 is a diagrammatic view of a threat mitigation platform for effectuating the threat mitigation process of FIG. 1 according to an embodiment of the present disclosure.

Referring also to FIG. 44, there is shown threat mitigation platform 2900. Threat mitigation platform 2900 may include an agent subsystem (e.g., an agent subsystem 2902) configured to generate an initial notification (e.g., initial notification 298) concerning a security event within a computing platform (e.g., computing platform 60).

As discussed above, examples of such security events may include but are not limited to access auditing; anomalies; authentication; denial of services; exploitation; malware; phishing; spamming; reconnaissance; and/or web attack within a monitored computing platform (e.g., computing platform 60).

The threat mitigation platform (e.g., threat mitigation platform 2900) may include a generative AI-based planner subsystem (e.g., generative AI-based planner subsystem 2904) configured to receive the initial notification (e.g., initial notification 298) and generate a mitigation plan (e.g., mitigation plan 2906) to address, in whole or in part, the security event within the computing platform (e.g., computing platform 60).

The generative AI-based planner subsystem (e.g., generative AI-based planner subsystem 2904) may be configured to utilize one or more tools (e.g., tools 310) available via tool kit 2908 to process the initial notification (e.g., initial notification 298).

As discussed above, the one or more tools (e.g., tools 310) utilized by generative AI-based planner subsystem 2904 includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

The threat mitigation platform (e.g., threat mitigation platform 2900) may include an executor subsystem (e.g., executor subsystem 2910) configured to iteratively process the mitigation plan (e.g., mitigation plan 2906) using a generative AI model (e.g., generative AI model 302) to generate an output (e.g., output 2912).

The executor subsystem (e.g., executor subsystem 2910) may be configured to utilize one or more tools (e.g., tools 310) available via tool kit 2908 to process the mitigation plan (e.g., mitigation plan 2906).

As discussed above, the one or more tools (e.g., tools 310) utilized by the executor subsystem 2908 includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

The executor subsystem (e.g., executor subsystem 2910) may be configured to utilize several loops and/or nested loops to generate the output (e.g., output 2912).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

The threat mitigation platform (e.g., threat mitigation platform 2900) may include an output formatter subsystem (e.g., output formatter subsystem 2914) configured to format the output (e.g., output 2912) and generate a summarized human-readable report (e.g., summarized human-readable report 306) for the initial notification (e.g., initial notification 298).

The output formatter subsystem (e.g., output formatter subsystem 2914) may be configured to utilize a large language model (e.g., large language model 308) to generate the summarized human-readable report (e.g., summarized human-readable report 306) for the initial notification (e.g., initial notification 298).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

The output formatter subsystem (e.g., output formatter subsystem 2914) may be configured to utilize a formatting script (e.g., formatting script 304) to generate the summarized human-readable report (e.g., summarized human-readable report 306) for the initial notification (e.g., initial notification 298).

As discussed above, the summarized human-readable report (e.g., summarized human-readable report 306) may define recommended next steps, recommended actions and/or disclaimers. For example and in response to a security event that is based upon suspicious activity occurring on computing platform 60:

- Recommended Next Steps may provide examples of additional investigations that may be implemented (e.g., port analysis/domain owner identification/perpetrator analysis) to further analyze the security event to gauge the risk/severity of the same.
- Recommended Actions may provide examples of responsive actions that may be implemented (e.g., port blocking/stream shutdown/perpetrator account disablement) to mitigate the negative impact of the security event.
- Disclaimers may provide explanations for why the suspicious activity of the security event may be benign and occurring for a legitimate (i.e., non-threatening) reason (e.g., such port traffic may occur during weekly backups, the person performing this operation is the president.

CAASM #1

Figure 45:
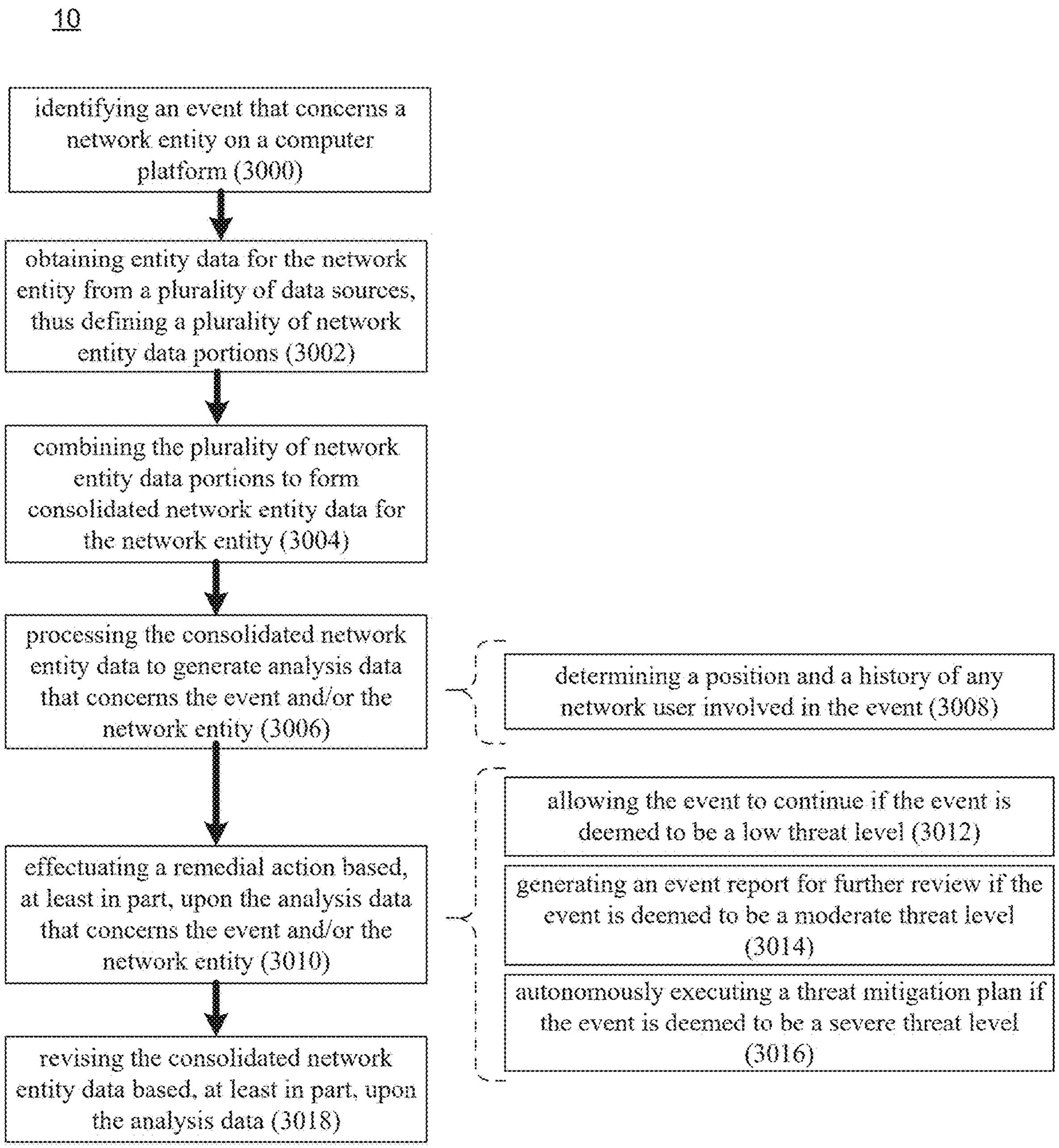
FIG. 45 is a flowchart of another implementation of the threat mitigation process of FIG. 1 according to an embodiment of the present disclosure.

Referring also to FIG. 45, the following discussion concerns the manner in which threat mitigation process 10 may take a reactive approach in response to detecting an event occurring within a computer platform (e.g., computing platform 60).

Accordingly and in accordance with this reactive approach, threat mitigation process 10 may identify 3000 an event (e.g., event 62) that concerns a network entity (e.g., one or more network entities 64) on the computer platform (e.g., computing platform 60).

In a computer network, various events (e.g., event 62) may occur as part of both normal operations and potential security incidents. Non-problematic (i.e., routine) network events (e.g., event 62) are expected and typically do not pose a threat. These include activities such as users logging into their email or cloud accounts, systems performing scheduled software updates, employees accessing shared files, internal communication between servers and databases, DNS queries to resolve domain names, and interactions with network-connected devices like printers. These events are part of the daily functioning of an organization's IT environment and usually require no intervention.

On the other hand, network security events (e.g., event 62) are actions that may indicate malicious activity or a breach. These include multiple failed login attempts, which may suggest a brute-force attack, or a user accessing the network from an unusual location or outside of normal hours, possibly indicating a compromised account. Other examples include unexpected large data transfers to external destinations, which may point to data exfiltration, and communications with known malicious servers, suggesting malware activity. Scanning the network for open ports, unauthorized attempts to access restricted services, or executing unfamiliar programs are also considered security events. Additionally, low-level attacks like ARP spoofing or MAC flooding may disrupt network communication and may be signs of potential intrusions. Distinguishing between normal and suspicious events may be essential for effective network security monitoring and intrusion detection by threat mitigation process 10.

Generally speaking, the network entity (e.g., one or more network entities 64) may include one or more of: a network device; a computing device; a network user; a service; a container; a pod; and a virtual machine. In the context of threat mitigation process 10, it's important to understand the roles of different components within a computer platform (e.g., computing platform 60). Each of the following network entities (e.g., one or more network entities 64) may either be a target of attack, a source of malicious activity, or play a role in detecting and defending against threats:

A network device may be any hardware that facilitates data communication within a computer platform (e.g., computing platform 60). Examples include routers, switches, firewalls, and wireless access points. These devices are responsible for directing traffic, connecting different segments of a network, and often enforcing security rules. In intrusion detection, they are crucial observation points where malicious traffic or abnormal behavior may be first detected, such as unusual port scanning or traffic from blacklisted IPs.

A computing device refers to any device capable of processing data and performing computations. This includes desktop computers, laptops, servers, smartphones, and tablets. In a computer platform (e.g., computing platform 60), these devices can be both targets and sources of attacks. For instance, a compromised laptop could become a foothold for an attacker to move laterally across the network. Intrusion detection systems (e.g., threat mitigation process 10) may monitor these devices for signs of unauthorized access, malware infections, or anomalous behavior.

A network user is an individual or system that accesses resources within a computer platform (e.g., computing platform 60), typically authenticated through credentials. Users interact with computing devices and network services to perform tasks. In intrusion detection, monitoring user behavior is critical. Anomalies such as accessing sensitive files outside of business hours, logging in from unusual locations, or repeated failed login attempts could indicate compromised accounts or insider threats.

A service is a software process that performs a specific function and is accessible over a computer platform (e.g., computing platform 60), such as web servers (HTTP), email servers (SMTP), or file-sharing services (FTP). Services are common targets for attackers, who may exploit vulnerabilities or misconfigurations to gain unauthorized access. Intrusion detection systems (e.g., threat mitigation process 10) monitor traffic to and from services to identify potential exploits, unauthorized access, or abuse (e.g., DDoS attacks against a web service).

A container is a lightweight, portable unit that packages an application and its dependencies into a single runtime environment. Containers run isolated from one another on a shared operating system kernel. In intrusion detection systems (e.g., threat mitigation process 10), containers may be monitored for unusual behavior, such as unexpected outbound connections or privilege escalation attempts, since they can be used to deploy and scale applications quickly, but may also be exploited if not secured properly.

A pod is the smallest deployable unit in a container orchestration platform and typically contains one or more tightly coupled containers. Pods may share resources such as storage and network interfaces. From an intrusion detection perspective, monitoring pods may be essential in cloud-native environments, as attacks may target vulnerabilities in containerized applications or the container infrastructure itself.

A virtual machine is a software-based emulation of a physical computer that runs its own operating system, wherein multiple VMs can run on a single physical host using a hypervisor. In network intrusion detection systems (e.g., threat mitigation process 10), VMs may be treated like physical hosts and may be monitored for signs of compromise. They may also be isolated and analyzed to contain threats, and are commonly used in sandboxing techniques to study malware behavior without risking real systems.

As discussed above, computing platform 60 may include many discrete computing devices, examples of which may include but are not limited to: server computers (e.g., server computers 200, 202), desktop computers (e.g., desktop computer 204), laptop computers (e.g., laptop computer 206), network devices/systems (e.g., network 208), WAFs (i.e., Web Application Firewalls 212), wireless access points (e.g., WAP 214), switches (e.g., switch 216), routers (e.g., routers 218), gateways (e.g., gateway 220) and storage devices (e.g., NAS 222); each of which may be considered a network entity (e.g., one or more network entities 64).

Threat mitigation process 10 may obtain 3002 entity data for the network entity (e.g., one or more network entities 64) from a plurality of data sources (e.g., data sources 66), thus defining a plurality of network entity data portions (e.g., network entity data portions 68).

In the context of threat mitigation process 10, various systems and technologies may play a crucial role in providing information about network events (e.g., event 62). Accordingly, examples of the plurality of data sources (e.g., data sources 66) may include but is not limited to: one or more content delivery network systems; one or more database activity monitoring systems; one or more user behavior analytics systems; one or more mobile device management systems; one or more identity and access management systems; one or more domain name server systems; one or more antivirus systems; one or more operating systems; one or more data lakes; one or more data logs; one or more security-relevant software applications; one or more security-relevant hardware systems; one or more security information and event management (SIEM) systems; and one or more resources external to the computing platform (e.g., computing platform 60), each of which may contribute different types of data or insights that help detect, analyze, and respond to potential threats across a computing platform (e.g., computing platform 60).

Content Delivery Network (CDN) Systems: CDNs may distribute content to users based on geographic location to improve performance and availability. From a security perspective, CDN systems may log unusual or malicious access patterns, such as repeated requests from the same IP address, unusual content access attempts, or DDoS (Distributed Denial of Service) traffic, providing early indicators of potential attacks targeting web-facing resources.

Database Activity Monitoring (DAM) Systems: DAM systems may track and analyze database queries and access behaviors. They may alert on suspicious activities such as unauthorized data access, abnormal query patterns, or privilege abuse. For intrusion detection, they are vital for spotting internal threats or attackers attempting to extract or manipulate sensitive data within databases.

User Behavior Analytics (UBA) Systems: UBA systems may analyze the behavior patterns of users to detect anomalies. For example, if a user typically logs in during business hours but suddenly begins accessing systems at midnight, this may indicate a compromised account. UBA systems help detect insider threats, credential misuse, and lateral movement within the network.

Mobile Device Management (MDM) Systems: MDM systems may oversee mobile devices connected to the network, enforcing security policies and tracking usage. They may provide alerts if a mobile device is jailbroken, connects from an unusual location, or attempts to access restricted resources. This is particularly useful in bring-your-own-device (BYOD) environments.

Identity and Access Management (IAM) Systems: IAM systems may control user authentication and authorization. They may log who accessed what resource, when, and under what credentials. Any anomalies, such as failed login attempts, privilege escalation, or use of stale accounts, may be crucial indicators of intrusion attempts or misuse.

Domain Name Server (DNS) Systems: DNS systems may resolve domain names to IP addresses. Malicious actors often rely on DNS to communicate with command-and-control (C2) servers or to redirect traffic. Monitoring DNS queries may reveal attempts to connect to known malicious domains or detect domain generation algorithm (DGA)-based malware.

Antivirus Systems: Antivirus solutions may scan systems for known malware signatures and behavioral indicators of malicious activity. Alerts from these systems may signal early stages of an infection, such as malware execution, unauthorized file changes, or attempts to disable security tools.

Operating Systems (OS): The OS itself may log system-level activities such as process execution, user logins, file access, and system calls. These logs may be foundational for intrusion detection, helping identify privilege escalation, unauthorized access, or suspicious script execution.

Data Lakes: Data lakes may store large volumes of structured and unstructured data from various sources. In security, they may serve as centralized repositories for log aggregation, threat intelligence, and historical analysis. Security analysts and AI/ML models may query this data to identify trends and detect long-term threats.

Data Logs: Logs from applications, systems, and network devices may record events such as connections, transactions, errors, and user actions. Analyzing these logs may be critical for spotting anomalies, investigating incidents, and correlating data across sources to understand attack vectors.

Security-Relevant Software Applications: This includes firewalls, intrusion detection/prevention systems (IDS/IPS), endpoint detection and response (EDR) tools, and encryption systems. These applications may generate alerts and logs that directly reflect attempts to breach the network, policy violations, or abnormal activity.

Security-Relevant Hardware Systems: Hardware like network firewalls, hardware security modules (HSMs), routers, and switches may provide logs and telemetry about network traffic, device configuration changes, and potential tampering. These may be valuable for identifying physical-layer attacks or network-based intrusions.

Security Information and Event Management (SIEM) Systems: SIEM systems may aggregate and analyze log data from multiple sources in real-time. They may correlate events, detect patterns, and provide alerts on potential threats. SIEM platforms may serve as the nerve center for intrusion detection efforts, providing a unified view of security across the enterprise.

Resources External to the Computing Platform: These include external threat intelligence feeds, blacklists, vulnerability databases, and industry alerts. Such resources may provide context and enrich local network data, helping identify known malicious IPs, emerging attack vectors, and exploitable vulnerabilities relevant to the organization.

Together, these systems may provide comprehensive visibility into network activity. Each contributes different types of data that, when combined and analyzed, often via a SIEM or advanced AI system, may enable organizations to detect, investigate, and respond to network intrusions with greater speed and accuracy.

Threat mitigation process 10 may combine 3004 the plurality of network entity data portions (e.g., network entity data portions 68) to form consolidated network entity data (e.g., consolidated network entity data 70) for the network entity (e.g., one or more network entities 64).

As discussed above, threat mitigation process 10 may identify 3000 an event (e.g., event 62) that concerns a network entity (e.g., one or more network entities 64) on a computer platform (e.g., computing platform 60). For this example, assume that the event (e.g., event 62) is a user (e.g., user 42) of a local computing device (e.g., personal computer 34) streaming content from their work computer to a device outside of their company.

As discussed above, the network entity (e.g., one or more network entities 64) may include one or more of: a network device; a computing device; a network user; a service; a container; a pod; and a virtual machine. Accordingly, the network entity (e.g., one or more network entities 64) in this example may be the user (e.g., user 42) . . . or the computer (e.g., personal computer 34) being used by user 42 . . . or a switch/router/gateway (e.g., switch 216, router 218, gateway 220) through which the video is being streamed. As discussed above, once identified 3000, threat mitigation process 10 may obtain 3002 entity data for the network entity (e.g., one or more network entities 64) from a plurality of data sources (e.g., data sources 66), thus defining a plurality of network entity data portions (e.g., network entity data portions 68).

Accordingly, assuming that the network entity (e.g., one or more network entities 64) is the user (e.g., user 42), threat mitigation process 10 may obtain 3002 entity data for the network entity (e.g., one or more network entities 64) from a plurality of data sources (e.g., data sources 66), wherein examples include but are not limited to: content delivery network systems; database activity monitoring systems; user behavior analytics systems; mobile device management systems; identity and access management systems; domain name server systems; antivirus systems; operating systems; data lakes; data logs; security-relevant software applications; security-relevant hardware systems; security information and event management (SIEM) systems; and resources external to the computing platform (e.g., computing platform 60).

Accordingly, threat mitigation process 10 may obtain 3002 entity data for the one or more network entities 64 (in this example, user 42) from at least two of the above-described data sources (e.g., data sources 66), thus defining a plurality of network entity data portions (e.g., network entity data portions 68).

Once obtained 3002, threat mitigation process 10 may combine 3004 the plurality of network entity data portions (e.g., network entity data portions 68) to form consolidated network entity data (e.g., consolidated network entity data 70) for one or more network entities 64 (e.g., user 42). Specifically, the consolidated network entity data (e.g., consolidated network entity data 70) for one or more network entities 64 (e.g., user 42) may provide a clear and more comprehensive picture of the one or more network entities 64 (e.g., user 42) and the activity they are currently involved in (i.e., streaming content from their work computer to a device outside of their company).

Threat mitigation process 10 may process 3006 the consolidated network entity data (e.g., consolidated network entity data 70) to generate analysis data (e.g., analysis data 72) that concerns the event (e.g., event 62) and/or the network entity (e.g., one or more network entities 64). For this example, assume that analysis data (e.g., analysis data 72) concerns one or more network entities 64 (e.g., who is user 42, what is their title, what kind of content do they have access to, how long have they been with the company, do they have any incident history. is this activity normal for them, etc.) and event 62 (e.g., what is being streamed, is it confidential/sensitive, how large is the content, where is the recipient located, is the recipient a known bad actor, etc.).

Accordingly and when processing 3006 the consolidated network entity data (e.g., consolidated network entity data 70) to generate analysis data (e.g., analysis data 72) that concerns the event (e.g., event 62) and/or the network entity (e.g., one or more network entities 64), threat mitigation process 10 may determine 3008 a position and a history of any network user (in this example, user 42) involved in the event (e.g., event 62). For example, if user 42 is a marketing executive and they are streaming the latest marketing video, that may not be concerning. However, if user 42 is a mail room employee and they are streaming the latest technical disclosure video, that may be concerning.

Once processed 3006, threat mitigation process 10 may effectuate 3010 a remedial action based, at least in part, upon the analysis data (e.g., analysis data 72) that concerns the event (e.g., event 62) and/or the network entity (e.g., one or more network entities 64).

For example and when effectuating 3010 a remedial action based, at least in part, upon the analysis data (e.g., analysis data 72) that concerns the event (e.g., event 62) and/or the network entity (e.g., one or more network entities 64), threat mitigation process 10 may allow 3012 the event (e.g., event 62) to continue if the event (e.g., event 62) is deemed to be a low threat level.

Accordingly. if event 62 (i.e., streaming content from their work computer to a device outside of their company) turns out to be the user (e.g., user 42) streaming video of his daughter's graduation to his parents in Moldova, threat mitigation process 10 may allow 3012 the event (e.g., event 62) to continue since the event (e.g., event 62) is deemed to be a low threat level.

Further and when effectuating 3010 a remedial action based, at least in part, upon the analysis data (e.g., analysis data 72) that concerns the event (e.g., event 62) and/or the network entity (e.g., one or more network entities 64), threat mitigation process 10 may generate 3014 an event report (e.g., event report 74) for further review if the event (e.g., event 62) is deemed to be a moderate threat level.

Accordingly. if event 62 (i.e., streaming content from their work computer to a device outside of their company) turns out to be the user (e.g., user 42) streaming content that is low in value to a recipient that is not a known bad actor, threat mitigation process 10 may generate 3014 an event report for further review since the event (e.g., event 62) is deemed to be a moderate threat level.

Additionally and when effectuating 3010 a remedial action based, at least in part, upon the analysis data (e.g., analysis data 72) that concerns the event (e.g., event 62) and/or the network entity (e.g., one or more network entities 64), threat mitigation process 10 may autonomously execute 3016 a threat mitigation plan if the event (e.g., event 62) is deemed to be a severe threat level.

Accordingly. if event 62 (i.e., streaming content from their work computer to a device outside of their company) turns out to be the user (e.g., user 42) streaming content that is high in value to a recipient that is a known bad actor, threat mitigation process 10 may autonomously execute 3016 a threat mitigation plan (e.g., disable the user, shut down the stream, close any utilized ports. etc.) since the event (e.g., event 62) is deemed to be a severe threat level.

Additionally, threat mitigation process 10 may revise 3018 the consolidated network entity data (e.g., consolidated network entity data 70) based, at least in part, upon the analysis data (e.g., analysis data 72). For example, the consolidated network entity data (e.g., consolidated network entity data 70) concerning the network entity (e.g., one or more network entities 64) may be updated to note that user 42 has family in Moldova.

CAASM #2

Figure 46:
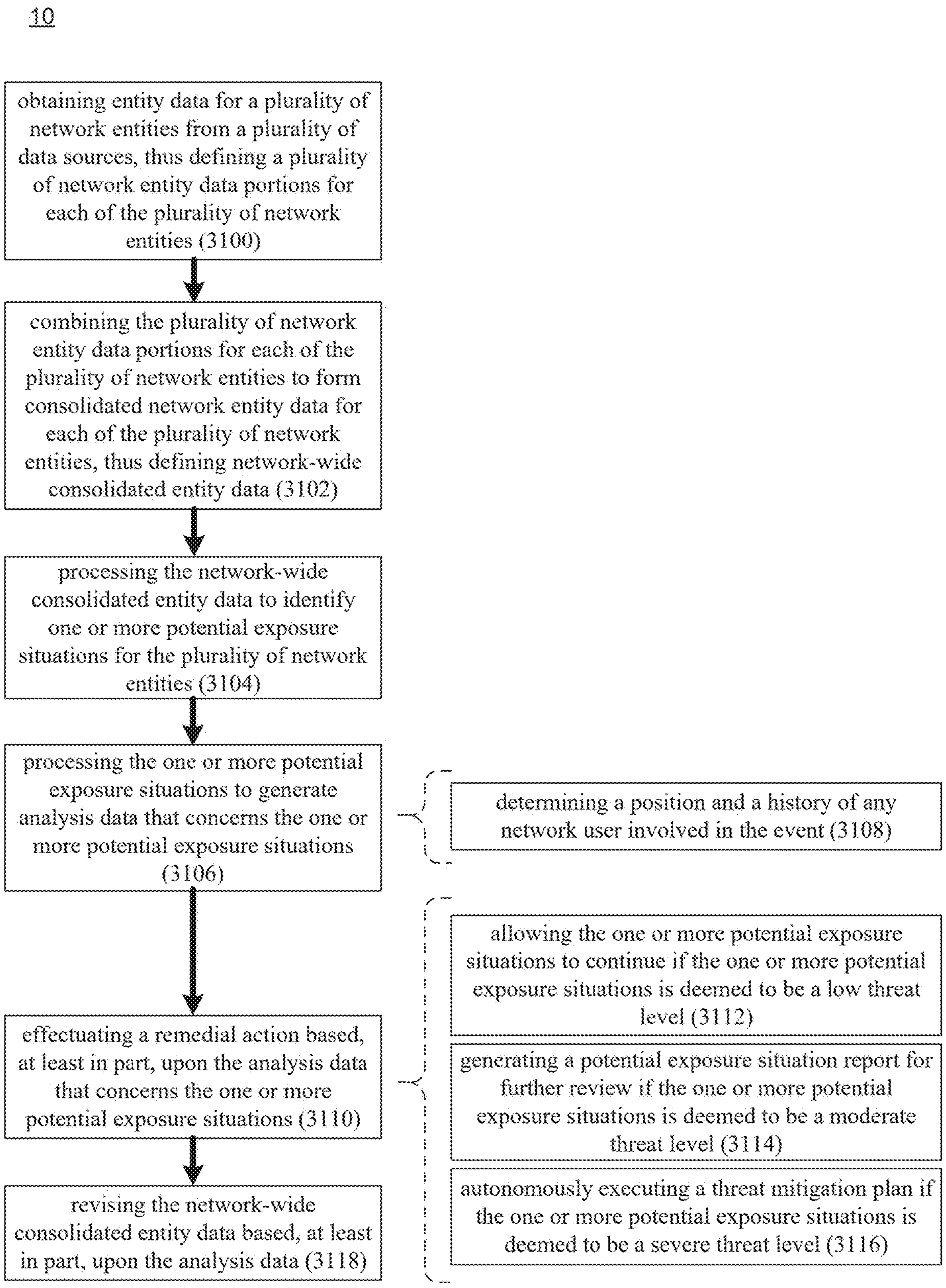
FIG. 46 is a flowchart of another implementation of the threat mitigation process of FIG. 1 according to an embodiment of the present disclosure.

Referring also to FIG. 46, the following discussion concerns the manner in which threat mitigation process 10 may take a proactive approach without needing to detect an event occurring within a computer platform (e.g., computing platform 60).

Accordingly and in accordance with this proactive approach, threat mitigation process 10 may obtain 3100 entity data for a plurality of network entities (e.g., one or more network entities 64) from a plurality of data sources (e.g., data sources 66), thus defining a plurality of network entity data portions (e.g., network entity data portions 68) for each of the plurality of network entities (e.g., one or more network entities 64).

As discussed above, the plurality of network entities may include one or more of: one or more network devices; one or more computing devices; one or more network users; one or more services; one or more containers; one or more pods; and one or more virtual machines. As discussed above, each of the following entities can either be a target of attack, a source of malicious activity, or play a role in detecting and defending against threats.

As discussed above, the plurality of data sources (e.g., data sources 66) may include but are not limited to: content delivery network systems; database activity monitoring systems; user behavior analytics systems; mobile device management systems; identity and access management systems; domain name server systems; antivirus systems; operating systems; data lakes; data logs; security-relevant software applications; security-relevant hardware systems; security information and event management (STEM) systems; and resources external to the computing platform (e.g., computing platform 60).

Once obtained 3100, threat mitigation process 10 may combine 3102 the plurality of network entity data portions (e.g., network entity data portions 68) for each of the plurality of network entities (e.g., one or more network entities 64) to form consolidated network entity data (e.g., consolidated network entity data 70) for each of the plurality of network entities (e.g., one or more network entities 64), thus defining network-wide consolidated entity data (e.g., network-wide consolidated entity data 76).

As discussed above, the consolidated network entity data (e.g., consolidated network entity data 70) for each of the plurality of network entities (e.g., one or more network entities 64) may provide a clear and more comprehensive picture of each of the plurality of network entities (e.g., one or more network entities 64).

Once network-wide consolidated entity data (e.g., network-wide consolidated entity data 76) is defined, threat mitigation process 10 may process 3104 the network-wide consolidated entity data (e.g., network-wide consolidated entity data 74) to identify one or more potential exposure situations (e.g., potential exposure situations 78) for the plurality of network entities (e.g., one or more network entities 64).

Again and for this example, assume that one of the potential exposure situations (e.g., potential exposure situations 78) identified by threat mitigation process 10 is that a user (e.g., user 42) of a local computing device (e.g., personal computer 34) is streaming content from their work computer to a device outside of their company.

Threat mitigation process 10 may then process 3106 the one or more potential exposure situations (e.g., potential exposure situations 78) to generate analysis data (e.g., analysis data 72) that concerns the one or more potential exposure situations (e.g., potential exposure situations 78). For this example, assume that analysis data (e.g., analysis data 72) concerns one or more network entities 64 (e.g., who is user 42, what is their title, what kind of content do they have access to, how long have they been with the company, do they have any incident history. is this activity normal for them, etc.) and the potential exposure situation (e.g., what is being streamed, is it confidential/sensitive, how large is the content, where is the recipient located, is the recipient a known bad actor, etc.).

When processing 3106 the one or more potential exposure situations (e.g., potential exposure situations 76) to generate analysis data (e.g., analysis data 72) that concerns the one or more potential exposure situations (e.g., potential exposure situations 78), threat mitigation process 10 may determine 3108 a position and a history of any network user involved in the event. For example, if user 42 is a marketing executive and they are streaming the latest marketing video, that may not be concerning. However, if user 42 is a mail room employee and they are streaming the latest technical disclosure video, that may be concerning.

Once processed 3106, threat mitigation process 10 may effectuate 3110 a remedial action based, at least in part, upon the analysis data (e.g., analysis data 72) that concerns the one or more potential exposure situations (e.g., potential exposure situations 78).

For example and when effectuating 3110 a remedial action based, at least in part, upon the analysis data (e.g., analysis data 72) that concerns the one or more potential exposure situations (e.g., potential exposure situations 78), threat mitigation process 10 may allow 3112 the one or more potential exposure situations (e.g., potential exposure situations 78) to continue if the one or more potential exposure situations (e.g., potential exposure situations 78) is deemed to be a low threat level.

Accordingly. if the potential exposure situation (i.e., user 42 streaming content from their work computer to a device outside of their company) turns out to be the user (e.g., user 42) streaming video of his daughter's graduation to his parents in Moldova, threat mitigation process 10 may allow 3112 the potential exposure situation to continue since the event (e.g., event 62) is deemed to be a low threat level.

When effectuating 3110 a remedial action based, at least in part, upon the analysis data (e.g., analysis data 72) that concerns the one or more potential exposure situations (e.g., potential exposure situations 78), threat mitigation process 10 may generate 3114 a potential exposure situation report (e.g., event report 74) for further review if the one or more potential exposure situations (e.g., potential exposure situations 78) is deemed to be a moderate threat level.

Accordingly. if the potential exposure situation (i.e., user 42 streaming content from their work computer to a device outside of their company) turns out to be the user (e.g., user 42) streaming content that is low in value to a recipient that is not a known bad actor, threat mitigation process 10 may generate 3114 an exposure report (e.g., event report 74) for further review since the potential exposure situation is deemed to be a moderate threat level.

When effectuating 3110 a remedial action based, at least in part, upon the analysis data (e.g., analysis data 72) that concerns the one or more potential exposure situations (e.g., potential exposure situations 78), threat mitigation process 10 may autonomously execute 3116 a threat mitigation plan if the one or more potential exposure situations (e.g., potential exposure situations 78) is deemed to be a severe threat level.

Accordingly. if the potential exposure situation (i.e., user 42 streaming content from their work computer to a device outside of their company) turns out to be the user (e.g., user 42) streaming content that is high in value to a recipient that is a known bad actor, threat mitigation process 10 may autonomously execute 3116 a threat mitigation plan (e.g., disable the user, shut down the stream, close any utilized ports. etc.) since the potential exposure situation is deemed to be a severe threat level.

Threat mitigation process 10 may revise 3118 the network-wide consolidated entity data (e.g., network-wide consolidated entity data 74) based, at least in part, upon the analysis data (e.g., analysis data 72). For example, the network-wide consolidated entity data (e.g., network-wide consolidated entity data 74) may be updated to note that user 42 has family in Moldova.

Advanced Data Mapping Conversion

Figure 47:
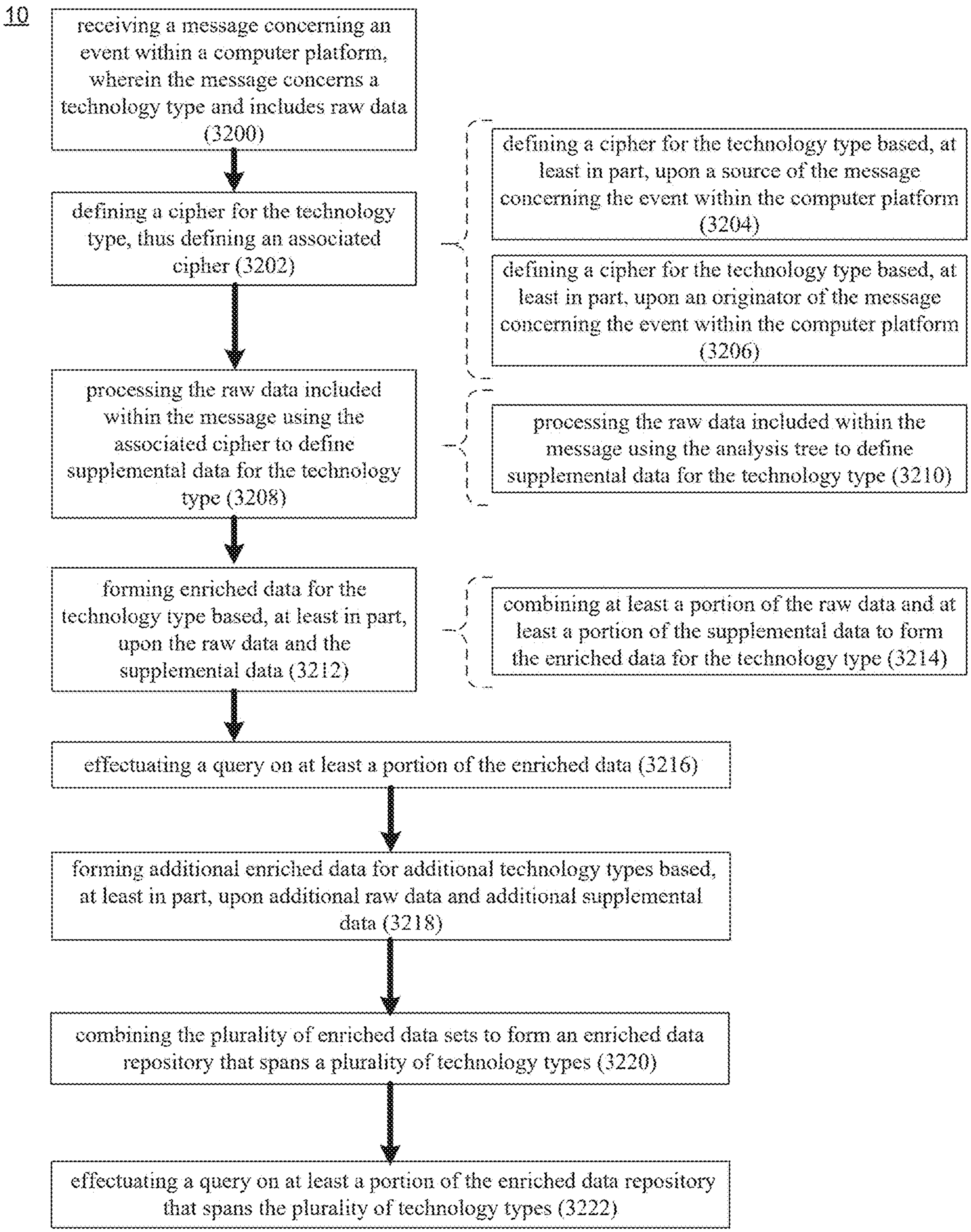
FIG. 47 is a flowchart of another implementation of the threat mitigation process of FIG. 1 according to an embodiment of the present disclosure.
Figure 48:
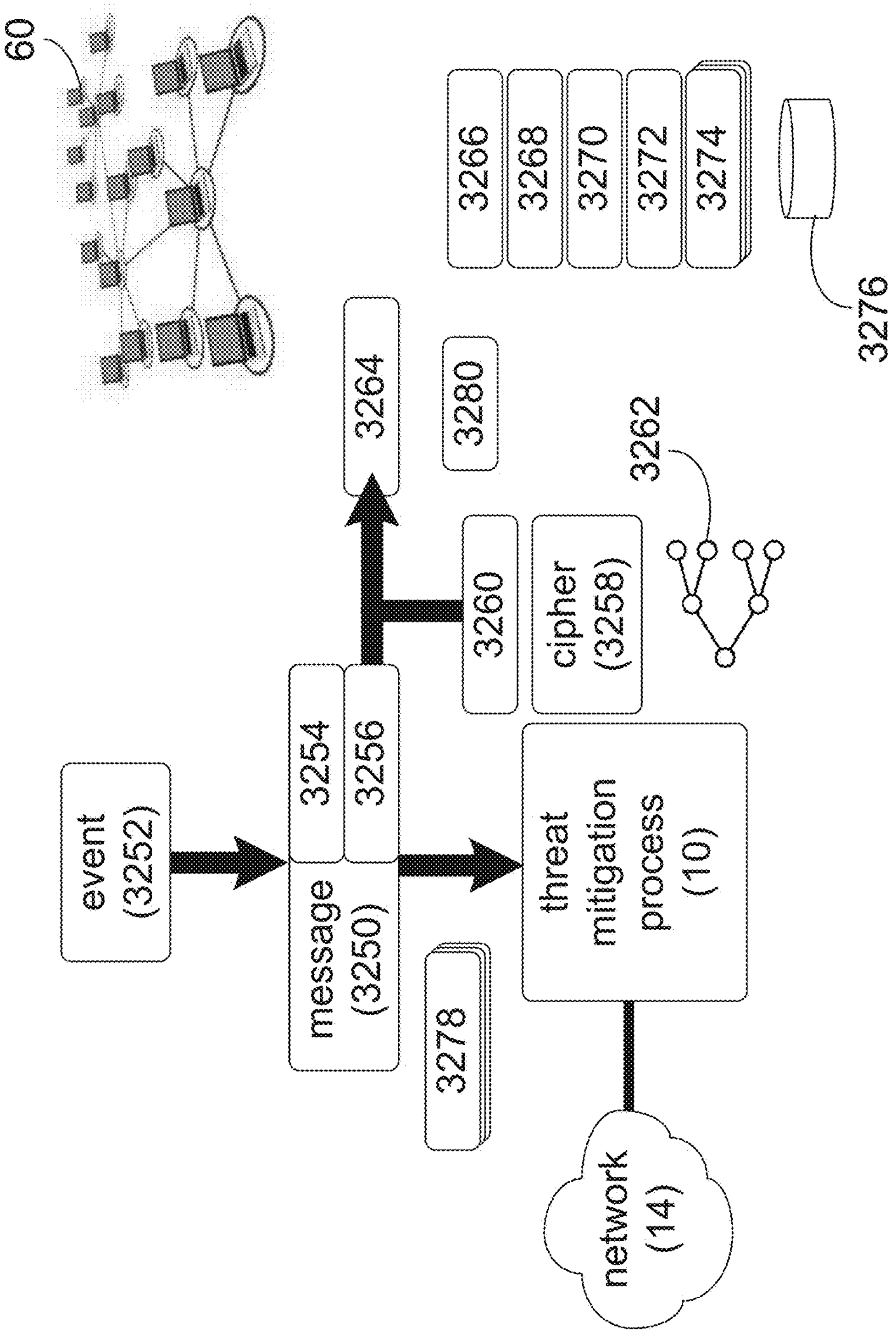
FIG. 48 is a diagrammatic view of a threat mitigation platform for effectuating the threat mitigation process of FIG. 1 according to an embodiment of the present disclosure.

Referring also to FIG. 47-48, the following discussion concerns the manner in which threat mitigation process 10 may analyze messages concerning events within a computing platform, wherein a cipher (e.g., computing platform 60) and an analysis tree is defined for analysis of future messages.

Threat mitigation process 10 may receive 3200 a message (e.g., message 3250) concerning an event (e.g., event 3252) within a computing platform (e.g., computing platform 60), wherein the message (e.g., message 3250) concerns a technology type (e.g., technology type 3254) and includes raw data (e.g., raw data 3256).

This message (e.g., message 3250) may concern any of the various operations that may occur within the monitored computing platform (e.g., computing platform 60), examples of which may include but are not limited to: a login event, a logout event, a password change event, a data copy event, a data deletion event, etc.

Generally speaking, this message (e.g., message 3250) may be considerably cryptic and sparse in nature, wherein the message (e.g., message 3250) includes only minimal information that is difficult to comprehend. An example of such a message is as follows:

Splunk: source=windlog, event=login, code=53, name=BPM

In this particular example, the technology type (e.g., technology type 3254) is "Splunk" and the raw data (e.g., raw data 3256) is "source=windlog, event=login, code=53, name=BPM".

Since these messages (e.g., message 3250) may be considerably cryptic and sparse in nature, threat mitigation process 10 may define 3202 a cipher for the technology type (e.g., technology type 3254), thus defining an associated cipher (e.g., cipher 3258).

A cipher (e.g., cipher 3258) may serve as a powerful interpretive tool when dealing with sparse, cryptic, or encoded messages (e.g., message 3250) that pertain to specific technology types (e.g., technology type 3254) and raw data (e.g., raw data 3256) related to events occurring within a computing platform (e.g., computing platform 60). These types of messages (e.g., message 3250) are often generated by systems such as intrusion detection systems (IDS), security information and event management systems (STEM), network monitoring tools, or autonomous computing components. In such environments, messages (e.g., message 3250) may be highly condensed for performance, bandwidth, or security reasons. As a result, these messages (e.g., message 3250) may use a combination of shorthand, encoded identifiers, or symbolic references, often without human-readable explanation.

For example, a message like:

EVT_TRIG 0x3F|PRCS:4210|LNK_EVT@2F1|SEV:H may contain several critical indicators of a security or operational event but would appear incomprehensible without a decoding mechanism.

A cipher (e.g., cipher 3258) may take the form of a decoding schema, rule-based logic, a cryptographic key, or algorithmic mapping that transforms these message fragments included within message 3250 into readable and actionable information. The may include various types of interpretation layers, such as symbol substitution (e.g., translating hexadecimal codes into event names), keyword expansion (e.g., decoding abbreviations like "SEV" into "Severity"), or pattern recognition (e.g., identifying recurring sequences that denote specific attack signatures or fault types).

Further and as will be discussed below in greater detail, the cipher (e.g., cipher 3258) may be configured to enrich the raw data (e.g., raw data 3256) with supplemental information from external databases or internal ontologies, such as e.g., resolving an IP address to a known host within the enterprise network, identifying a process ID with an application name, or linking a memory address to a vulnerability. This enrichment transforms raw technical details into intelligence. For instance, the code 0x3F may be mapped through the cipher (e.g., cipher 3258) to mean "unauthorized file access," while PRCS:4210 may resolve to a running instance of a sensitive application.

Accordingly, the full interpretation might then read: "High Severity Event Detected-Unauthorized File Access Attempt from Process 4210 on Host 10.1.4.22. Refer to Log Pointer 2F1 for Detailed Traceback."

In cases where messages (e.g., message 3250) are encrypted or intentionally obfuscated for security reasons, the cipher (e.g., cipher 3258) may involve cryptographic operations such as decryption using symmetric or asymmetric keys, or decoding base64 or binary payloads embedded within log entries. In other cases, the cipher (e.g., cipher 3258) may be integrated into AI-driven analytics engines, which apply learned models to interpret sequences of sparse messages, classify them by threat level, and correlate them with known patterns of network behavior or past incidents.

Accordingly, a cipher (e.g., cipher 3258) used to decode cryptic messages in a computing platform (e.g., computing platform 60) acts as a multi-layered interpretive engine, which bridges the gap between low-level, encoded telemetry and high-level semantic understanding, enabling human operators or autonomous systems to detect, diagnose, and respond to technological events efficiently. Without such a cipher (e.g., cipher 3258), critical clues about system failures, security breaches, or anomalous behavior may remain hidden in plain sight, buried within terse, machine-generated messages (e.g., message 3250) that lack immediate clarity.

For example and when defining 3202 a cipher for the technology type (e.g., technology type 3254), threat mitigation process 10 may define 3204 the cipher (e.g., cipher 3258) for the technology type (e.g., technology type 3254) based, at least in part, upon a source of the message (e.g., message 3250) concerning the event (e.g., event 3252) within the computing platform (e.g., computing platform 60).

Continuing with the above-stated example, the source of the message (e.g., message 3250) in this example is Splunk, a security-relevant subsystems (e.g., security-relevant subsystems 226) executed within the computing platform (e.g., computing platform 60). As is known in the art, Splunk is a software platform used for collecting, indexing, searching, and analyzing machine-generated data, particularly from systems, applications, devices, and networks. Splunk is commonly employed by organizations to monitor IT operations, detect security threats, analyze application performance, and gain operational intelligence. Specifically, Splunk works by ingesting raw data from a wide variety of sources (e.g., system logs, server events, application logs, and cloud services) and indexing that data to make it searchable in real time.

Accordingly and in this situation, Splunk is the source of the message (e.g., message 3250), as that is where the message (e.g., message 3250) resides. Therefore, threat mitigation process 10 may obtain the message (e.g., message 3250) from Splunk (e.g., security-relevant subsystems 226) or Splunk (e.g., security-relevant subsystems 226) may provide the message to threat mitigation process 10.

Additionally/alternatively and when defining 3202 a cipher for the technology type (e.g., technology type 3254), threat mitigation process 10 may define 3206 the cipher (e.g., cipher 3258) for the technology type (e.g., technology type 3254) based, at least in part, upon an originator of the message (e.g., message 3250) concerning the event (e.g., event 3252) within the computing platform (e.g., computing platform 60).

As discussed above, Splunk is the source of the message (e.g., message 3250), as that is where the message (e.g., message 3250) resides. However, Splunk (e.g., security-relevant subsystems 226) is an aggregator of information concerning the computing platform (e.g., computing platform 60). But Splunk (e.g., security-relevant subsystems 226) did not generate the message (e.g., message 3250).

Accordingly, some other entity within the computing platform (e.g., computing platform 60) generated the message.

As will be discussed below in greater detail, threat mitigation process 10 may analyze the message (e.g., message 3250), or portions thereof, to identify the originator of the message (e.g., message 3250) as well as define supplemental data (e.g., supplemental data 3260) concerning the message (e.g., message 3250).

As discussed above, an example of the message (e.g., message 3250) is:

*Splunk*: source = *windlog*, event – login, code = 53, name = *BPM* wherein the technology type (e.g., technology type 3254) is "Splunk" and the raw data (e.g., raw data 3256) is "source=windlog, event=login, code=53, name=BPM". Accordingly, threat mitigation process 10 may utilize artificial intelligence/machine learning (e.g., AI/ML process 56) to analyze the raw data (e.g., raw data 3256). For example and by analyzing raw data from previously analyzed messages, threat mitigation process 10 may be able to sequentially analyze the raw data (e.g., raw data 3256) within the message (e.g., message 3250).

As the raw data (e.g., raw data 3256) defines that the "source=windlog", threat mitigation process 10 defines "windlog" as follows:

The vendor is: The Microsoft Corporation

The function is: an operating system

The product is: Windows

Accordingly and in the example, threat mitigation process 10 may define the originator of the message (e.g., message 3250) as Windows. Therefore, threat mitigation process 10 may define 3206 the cipher (e.g., cipher 3258) for the technology type (e.g., technology type 3254) based, at least in part, upon the originator of message 3250, which in this example was determined by threat mitigation process 10 to be Windows.

Threat mitigation process 10 may utilize artificial intelligence/machine learning (e.g., AI/ML process 56) to continue to analyze the raw data (e.g., raw data 3256). As discussed above, the raw data (e.g., raw data 3256) includes "event=login and code=53". By analyzing raw data from previously analyzed messages, threat mitigation process 10 may be able to sequentially analyze the raw data (e.g., raw data 3256) within the message (e.g., message 3250) to identify the meaning of "event=login and code=53".

Accordingly and through the analysis of such previously analyzed messages and the manner in which they apply to messages that have a source of Splunk and an originator of Microsoft Windows, threat mitigation process 10 may determine that "event=login" maps to a user logon event within the OS Microsoft Windows, while determining that "code=53" maps to a logon success within the OS Microsoft Windows.

Additionally, threat mitigation process 10 may process 3208 the raw data (e.g., raw data 3256) included within the message (e.g., message 3250) using the associated cipher (e.g., cipher 3258) to define supplemental data (e.g., supplemental data 3260) for the technology type (e.g., technology type 3254).

Examples of such supplemental data (e.g., supplemental data 3260) may include but is not limited to:

the originator of the message being Microsoft Windows; and the activity being a logon success.

The cipher (e.g., cipher 3258) defined 3202 by threat mitigation process 10 for the technology type (e.g., technology type 3254) may include an analysis tree (e.g., analysis tree 3262).

As is known in the art, an analysis tree (e.g., analysis tree 3262) is a structured, hierarchical diagram or model used to enable analysis of complex problems, systems, or events into smaller, more manageable components for the purpose of analysis. Each node in the analysis tree (e.g., analysis tree 3262) represents a specific element, event, decision point, or cause, and branches represent the relationships or dependencies between them. Analysis trees (e.g., analysis tree 3262) are often used in fields such as cybersecurity, systems engineering, risk management, and forensic analysis to help identify root causes, predict outcomes, or support decision-making.

In the context of computing or network analysis, an analysis tree (e.g., analysis tree 3262) might be used to trace an intrusion back through several steps, such as identifying the initial vulnerability exploited, the methods of lateral movement used, and the ultimate payload or damage caused. By visualizing these relationships, an analysis tree (e.g., analysis tree 3262) may help analysts understand complex scenarios, detect weaknesses, evaluate alternatives, and plan mitigation or response strategies.

Accordingly and when processing 3208 the raw data (e.g., raw data 3256) included within the message (e.g., message 3250) using the associated cipher (e.g., cipher 3258) to define supplemental data (e.g., supplemental data 3260) for the technology type (e.g., technology type 3254), threat mitigation process 10 may process 3210 the raw data (e.g., raw data 3256) included within the message (e.g., message 3250) using the analysis tree (e.g., analysis tree 3262) to define supplemental data (e.g., supplemental data 3260) for the technology type (e.g., technology type 3254).

Threat mitigation process 10 may form 3212 enriched data (e.g., enriched data 3264) for the technology type (e.g., technology type 3254) based, at least in part, upon the raw data (e.g., raw data 3256) and the supplemental data (e.g., supplemental data 3260). For example and when forming 3212 enriched data (e.g., enriched data 3264) for the technology type (e.g., technology type 3254) based, at least in part, upon the raw data (e.g., raw data 3256) and the supplemental data (e.g., supplemental data 3260), threat mitigation process 10 may combine 3214 at least a portion of the raw data (e.g., raw data 3256) and at least a portion of the supplemental data (e.g., supplemental data 3260) to form the enriched data (e.g., enriched data 3264) for the technology type (e.g., technology type 3254).

As discussed above, the cipher (e.g., cipher 3258) defined 3202 by threat mitigation process 10 for the technology type (e.g., technology type 3254) may include an analysis tree (e.g., analysis tree 3262). Accordingly, this analysis tree (e.g., analysis tree 3262) may be based upon such enriched data 3264. Additionally, this analysis tree (e.g., analysis tree 3262) may be amended/modified/updated based upon this enriched data (e.g., enriched data 3264)

Threat mitigation process 10 may effectuate 3216 a query on at least a portion of the enriched data (e.g., enriched data 3264). Accordingly and through the use of such an analysis tree (e.g., analysis tree 3262), efficient searching of messages (e.g., message 3250) may be enabled. Accordingly, if a user of threat mitigation process 10 wanted to identify all logon success events that occurred within the Microsoft Windows operating system (i.e., the originator) for messages that resided on (or were made available via) Splunk, threat mitigation process 10 may effectuate 3216 a query on at least a portion of the enriched data (e.g., enriched data 3264) utilizing the analysis tree (e.g., analysis tree 3262) to search such messages to look for "event=login" (which indicates a logon event in such messages) and "code=53" (which indicates that the logon event was successful in such messages).

Threat mitigation process 10 may form 3218 additional enriched data (e.g., additional enriched data 3266) for additional technology types (e.g., additional technology types 3268) based, at least in part, upon additional raw data (e.g., additional raw data 3270) and additional supplemental data (e.g., additional supplemental data 3272), thus defining a plurality of enriched data sets (e.g., plurality of enriched data sets 3274) that span a plurality of technology types. Threat mitigation process 10 may combine 3220 the plurality of enriched data sets (e.g., plurality of enriched data sets 3274) to form an enriched data repository (e.g., enriched data repository 3276) that spans the plurality of technology types, wherein threat mitigation process 10 may effectuate 3222 a query on at least a portion of the enriched data repository (e.g., enriched data repository 3276) that spans the plurality of technology types.

As discussed above, the technology type (e.g., technology type 3254) for the message (e.g., message 3250) is "Splunk". Further, assume that other messages (e.g., other messages 3278) processed by threat mitigation process 10 may concern other technology types (e.g., QRadar, Cribl, etc.). Accordingly, threat mitigation process 10 may process these messages (e.g., other messages 3278) in the manner defined above. For example, threat mitigation process 10 may process the raw data (e.g., additional raw data 3270) included in these messages (e.g., other messages 3278) to generate supplemental data (e.g., additional supplemental data 3272).

Threat mitigation process 10 may then form 3218 additional enriched data (e.g., additional enriched data 3266) for the additional technology types 3268 (e.g., QRadar, Cribl, etc.) based, at least in part, upon additional raw data (e.g., additional raw data 3270) and additional supplemental data (e.g., additional supplemental data 3272) to define a plurality of enriched data sets (e.g., plurality of enriched data sets 3274) that span a plurality of technology types (e.g., Splunk and QRadar, Cribl, etc.). This plurality of enriched data sets (e.g., plurality of enriched data sets 3274) that span a plurality of technology types (e.g., Splunk and QRadar, Cribl, etc.) may be used to generate ciphers/analysis trees for these other technology types (e.g., Splunk and QRadar, Cribl, etc.).

Threat mitigation process 10 may then combine 3220 the plurality of enriched data sets (e.g., plurality of enriched data sets 3274) to form the enriched data repository (e.g., enriched data repository 3276) that spans the plurality of technology types (e.g., Splunk and QRadar, Cribl, etc.).

Once formed, threat mitigation process 10 may effectuate 3222 a query (e.g., query 3280) on at least a portion of the enriched data repository (e.g., enriched data repository 3276) that spans the plurality of technology types (e.g., Splunk and QRadar, Cribl, etc.). Specifically, being the enriched data repository (e.g., enriched data repository 3276) spans the plurality of technology types (e.g., Splunk and QRadar, Cribl, etc.), queries (e.g., query 3280) may be defined that e.g., identify:

- all unsuccessful logins for any users of computing platform 60 over the past 24 hours;
- all successful login for user BPM over the past 30 days; and
- all downloads of files over 20 mb in size by user JTP.

Iterative Investigation Using Language Models #1

Figure 49:
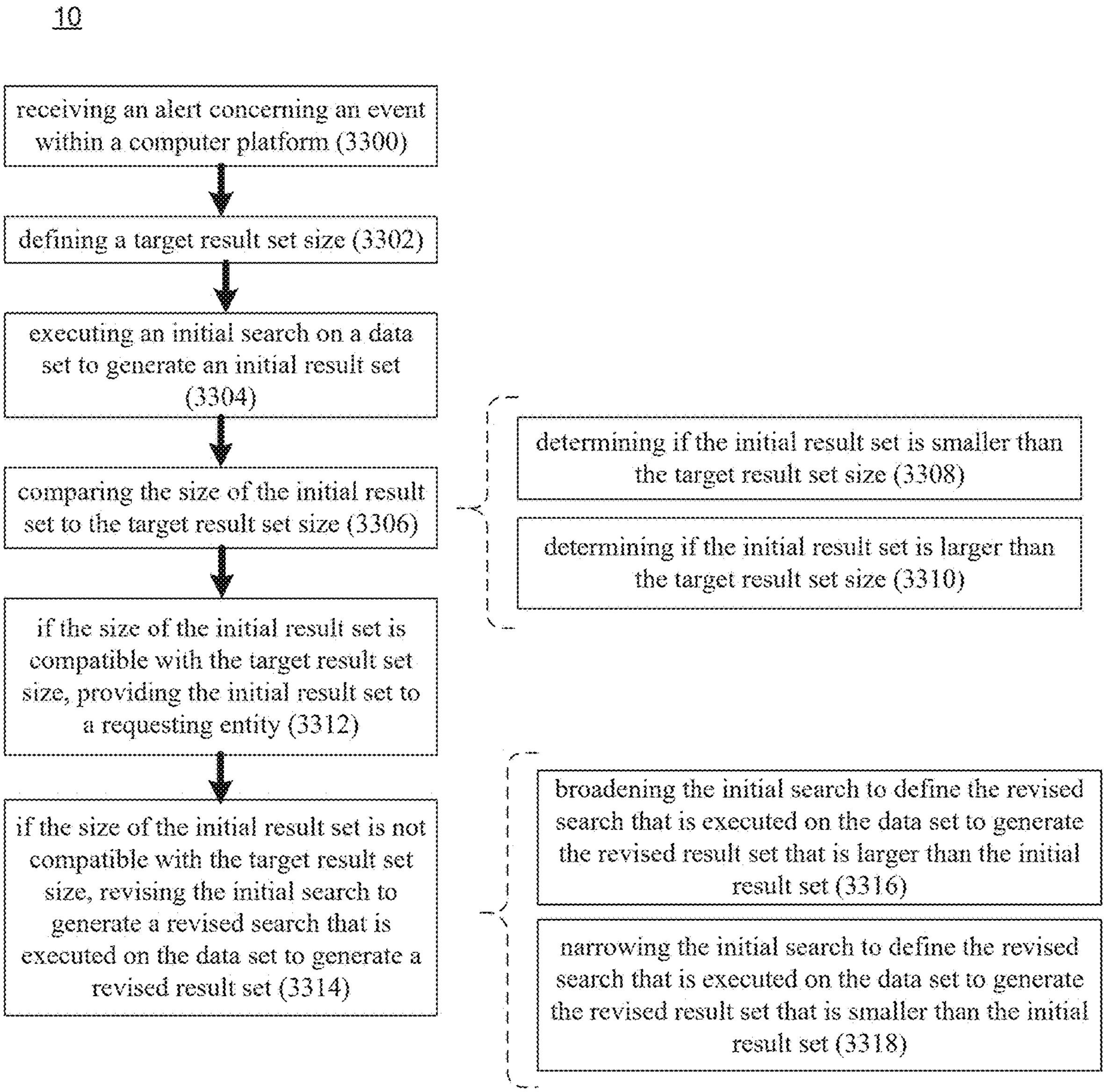
FIG. 49 is a flowchart of another implementation of the threat mitigation process of FIG. 1 according to an embodiment of the present disclosure.
Figure 50:
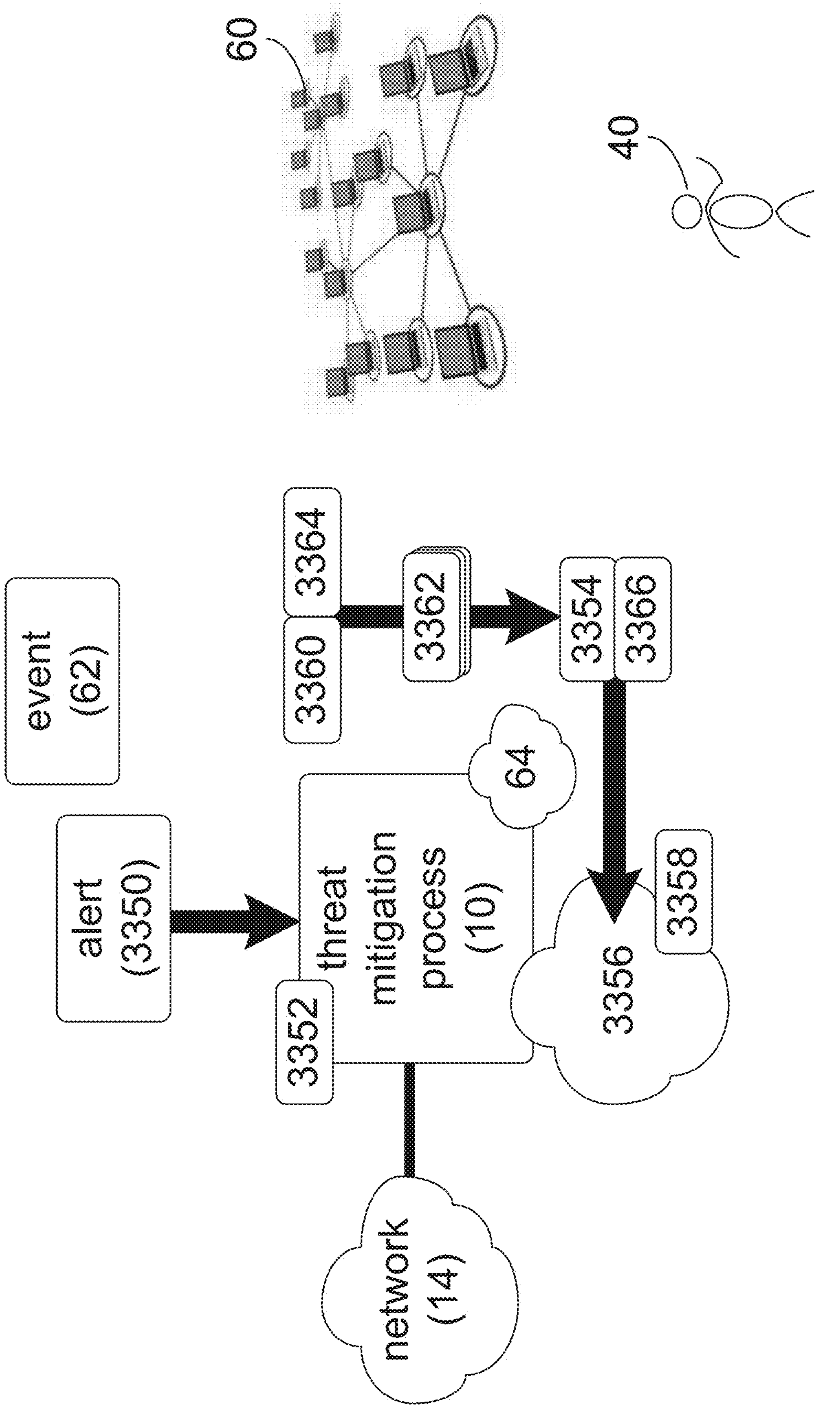
FIG. 50 is a diagrammatic view of a threat mitigation platform for effectuating the threat mitigation process of FIG. 1 according to an embodiment of the present disclosure.

Referring also to FIG. 49-50, the following discussion concerns the manner in which threat mitigation process 10 may define a query to generate a result set, wherein the size of the result set may be compared to a target result set size so that the query cane be broaden (or narrowed) to increase (or decrease) the size of the result set.

Threat mitigation process 10 may receive 3300 an alert (e.g., alert 3350) concerning an event (e.g., event 62) within a computing platform (e.g., computing platform 60).

As discussed above, various events (e.g., event 62) may occur as part of both normal operations and potential security incidents. Non-problematic (i.e., routine) network events (e.g., event 62) are expected and typically do not pose a threat. These include activities such as users logging into their email or cloud accounts, systems performing scheduled software updates, employees accessing shared files, internal communication between servers and databases, DNS queries to resolve domain names, and interactions with network-connected devices like printers. These events are part of the daily functioning of an organization's IT environment and usually require no intervention.

On the other hand, network security events (e.g., event 62) are actions that may indicate malicious activity or a breach. These include multiple failed login attempts, which may suggest a brute-force attack, or a user accessing the network from an unusual location or outside of normal hours, possibly indicating a compromised account. Other examples include unexpected large data transfers to external destinations, which may point to data exfiltration, and communications with known malicious servers, suggesting malware activity. Scanning the network for open ports, unauthorized attempts to access restricted services, or executing unfamiliar programs are also considered security events. Additionally, low-level attacks like ARP spoofing or MAC flooding may disrupt network communication and may be signs of potential intrusions. Distinguishing between normal and suspicious events may be essential for effective network security monitoring and intrusion detection by threat mitigation process 10.

Specifically, the alert (e.g., alert 3350) may concern a network entity (e.g., one or more network entities 64) on the computing platform (e.g., computing platform 60).

Generally speaking and as discussed above, the network entity (e.g., one or more network entities 64) may include one or more of: a network device; a computing device; a network user; a service; a container; a pod; and a virtual machine. Each of the following network entities (e.g., one or more network entities 64) may either be a target of attack, a source of malicious activity, or play a role in detecting and defending against threats:

A network device may be any hardware that facilitates data communication within a computer platform (e.g., computing platform 60). Examples include routers, switches, firewalls, and wireless access points. These devices are responsible for directing traffic, connecting different segments of a network, and often enforcing security rules. In intrusion detection, they are crucial observation points where malicious traffic or abnormal behavior may be first detected, such as unusual port scanning or traffic from blacklisted IPs.

A computing device refers to any device capable of processing data and performing computations. This includes desktop computers, laptops, servers, smartphones, and tablets. In a computer platform (e.g., computing platform 60), these devices can be both targets and sources of attacks. For instance, a compromised laptop could become a foothold for an attacker to move laterally across the network. Intrusion detection systems (e.g., threat mitigation process 10) may monitor these devices for signs of unauthorized access, malware infections, or anomalous behavior.

A network user is an individual or system that accesses resources within a computer platform (e.g., computing platform 60), typically authenticated through credentials. Users interact with computing devices and network services to perform tasks. In intrusion detection, monitoring user behavior is critical. Anomalies such as accessing sensitive files outside of business hours, logging in from unusual locations, or repeated failed login attempts could indicate compromised accounts or insider threats.

A service is a software process that performs a specific function and is accessible over a computer platform (e.g., computing platform 60), such as web servers (HTTP), email servers (SMTP), or file-sharing services (FTP). Services are common targets for attackers, who may exploit vulnerabilities or misconfigurations to gain unauthorized access. Intrusion detection systems (e.g., threat mitigation process 10) monitor traffic to and from services to identify potential exploits, unauthorized access, or abuse (e.g., DDoS attacks against a web service).

A container is a lightweight, portable unit that packages an application and its dependencies into a single runtime environment. Containers run isolated from one another on a shared operating system kernel. In intrusion detection systems (e.g., threat mitigation process 10), containers may be monitored for unusual behavior, such as unexpected outbound connections or privilege escalation attempts, since they can be used to deploy and scale applications quickly, but may also be exploited if not secured properly.

A pod is the smallest deployable unit in a container orchestration platform and typically contains one or more tightly coupled containers. Pods may share resources such as storage and network interfaces. From an intrusion detection perspective, monitoring pods may be essential in cloud-native environments, as attacks may target vulnerabilities in containerized applications or the container infrastructure itself.

A virtual machine is a software-based emulation of a physical computer that runs its own operating system, wherein multiple VMs can run on a single physical host using a hypervisor. In network intrusion detection systems (e.g., threat mitigation process 10), VMs may be treated like physical hosts and may be monitored for signs of compromise. They may also be isolated and analyzed to contain threats, and are commonly used in sandboxing techniques to study malware behavior without risking real systems.

In response to receiving 3300 such an alert (e.g., alert 3350) concerning an event (e.g., event 62) within a computing platform (e.g., computing platform 60), threat mitigation process 10 may define a query (e.g., query 3352) for researching the alert (e.g., alert 3350). For example, assume that the alert (e.g., alert 3350) concerns an event (e.g., event 62) in which a user (e.g., 42) is e.g., downloading a large quantity of files to an IP address in Russia, wherein these files are highly confidential and are being downloaded in the middle of the night. Accordingly and in response to this alert (e.g., alert 3350), threat mitigation process 10 may to define a query (e.g., query 3352) that inquires into the specifics of the email traffic of the user (e.g., user 42) who is the subject of this alert (e.g., alert 3350). The result set (e.g., result set 3354) generated by this query (e.g., query 3352) may be provided to a generative AI model (e.g., generative AI model 3356) for subsequent processing. Accordingly, threat mitigation process 10 may be configured to ensure that the result set (e.g., result set 3354) produced in response to the query (e.g., query 3352) is sized so that it is processable (i.e., not too big and not too small) by the generative AI model (e.g., generative AI model 3356).

Accordingly, threat mitigation process 10 may define 3302 a target result set size (e.g., target result set size 3358), wherein this target result size (e.g., target result set size 3358) may define an upper limit and a lower limit. For example, such a lower limit may be defined to ensure that the result set (e.g., result set 3354) is broad enough in scope to provide a desired level of breadth (e.g., a minimum of one result . . . or five results . . . or ten results). Further, such an upper limit may be defined to ensure that the result set (e.g., result set 3354) does not overwhelm the generative AI model (e.g., generative AI model 3356) (e.g., a maximum of five-hundred results). Accordingly, the target result set size (e.g., target result set size 3358) may be based, at least in part, upon one or more input limitations associated with a generative AI model (e.g., generative AI model 3356).

Threat mitigation process 10 may execute 3304 an initial search (e.g., initial search 3360) on a data set (e.g., data set 3362) to generate an initial result set (e.g., result set 3354). An example of such a data set (e.g., data set 3362) may include a data set that defines events (e.g., event 62) that occurred within the computing platform (e.g., computing platform 60).

Continuing with the above-stated example, assume that in light of the user (e.g., 42) downloading a large quantity of files to an IP address in Russia, threat mitigation process 10 may execute 3304 an initial search (e.g., initial search 3360) on a data set (e.g., data set 3362) to identify all parties with which user 42 exchanged email. Accordingly, the initial search (e.g., initial search 3360) on a data set (e.g., data set 3362) may request a list of all email that user 42 has sent/received over the past thirty days. In this example, the data set (e.g., data set 3362) being queried by threat mitigation process 10 may be an email repository/system that identifies all emails sent/received within the computing platform (e.g., computing platform 60).

As discussed above, threat mitigation process 10 may define 3302 a target result set size (e.g., target result set size 3358). For this example, assume that target result set size 3358 has a lower limit of ten results and an upper limit of one hundred results.

Once the initial result set (e.g., result set 3354) is generated, threat mitigation process 10 may compare 3306 size of the initial result set (e.g., result set 3354) to the target result set size (e.g., target result set size 3358). For example and when comparing 3306 the size of the initial result set (e.g., result set 3354) to the target result set size (e.g., target result set size 3358), threat mitigation process 10 may:

- determine 3308 the initial result set (e.g., result set 3354) is smaller than the target result set size (e.g., target result set size 3358); and
- determine 3310 the initial result set (e.g., result set 3354) is larger than the target result set size (e.g., target result set size 3358).

For example, if the size of the initial result set (e.g., result set 3354) is compatible with the target result set size (e.g., target result set size 3358), threat mitigation process 10 may provide 3312 the initial result set (e.g., result set 3354) to a requesting entity. For this example, assume that the requesting entity is user 40 who is investigating the event (e.g., event 62).

Alternatively, if the size of the initial result set (e.g., result set 3354) is not compatible with the target result set size (e.g., target result set size 3358), threat mitigation process 10 may revise 3314 the initial search (e.g., initial search 3360)

to generate a revised search (e.g., revised search 3364) that is executed on the data set (e.g., data set 3362) to generate a revised result set (e.g., revised result set 3366).

For example and when revising 3314 the initial search (e.g., initial search 3360) to generate a revised search (e.g., revised search 3364) that is executed on the data set (e.g., data set 3362) to generate the revised result set (e.g., revised result set 3366), threat mitigation process 10 may broaden 3316 the initial search (e.g., initial search 3360) to define the revised search (e.g., revised search 3364) that is executed on the data set (e.g., data set 3362) to generate the revised result set (e.g., revised result set 3366) that is larger than the initial result set (e.g., result set 3354).

Further and when revising 3314 the initial search (e.g., initial search 3360) to generate a revised search (e.g., revised search 3364) that is executed on the data set (e.g., data set 3362) to generate the revised result set (e.g., revised result set 3366), threat mitigation process 10 may narrow 3318 the initial search (e.g., initial search 3360) to define the revised search (e.g., revised search 3364) that is executed on the data set (e.g., data set 3362) to generate the revised result set (e.g., revised result set 3366) that is smaller than the initial result set (e.g., result set 3354).

For this example, assume that the initial result set (e.g., result set 3354) defines five-hundred-thirty-eight email. Accordingly and when comparing 3304 the size of the initial result set (e.g., result set 3354) to the target result set size (e.g., target result set size 3358), threat mitigation process 10 may determine 3308 that result set 3354 (which defines five-hundred-thirty-eight email) is larger than target result set size 3358 (which has an upper limit of one hundred results).

Accordingly, threat mitigation process 10 may revise 3314 the initial search (e.g., initial search 3360) to generate a revised search (e.g., revised search 3364) that is executed on the data set (e.g., data set 3362) to generate a revised result set (e.g., revised result set 3366). For this example, threat mitigation process 10 may narrow 3318 the initial search (e.g., initial search 3360) to define the revised search (e.g., revised search 3364) that is executed on the data set (e.g., data set 3362) to generate the revised result set (e.g., revised result set 3366) that is smaller than the initial result set (e.g., result set 3354). Assume for this example that revised search 3364 on data set 3362 requests a list of all email that user 42 has sent/received over the past 24 hours (which is substantially narrower than 30 days).

For this example, assume that the revised result set (e.g., revised result set 3366) defines seventy-six email. Accordingly, being the size of the revised result set (e.g., revised result set 3366) is compatible with target result set size 3358 (which has a lower limit of ten results and an upper limit of one hundred results), threat mitigation process 10 may provide 3312 the revised result set (e.g., revised result set 3366) to the requesting entity (e.g., event 62).

Iterative Investigation Using Language Models #2

Figure 51:
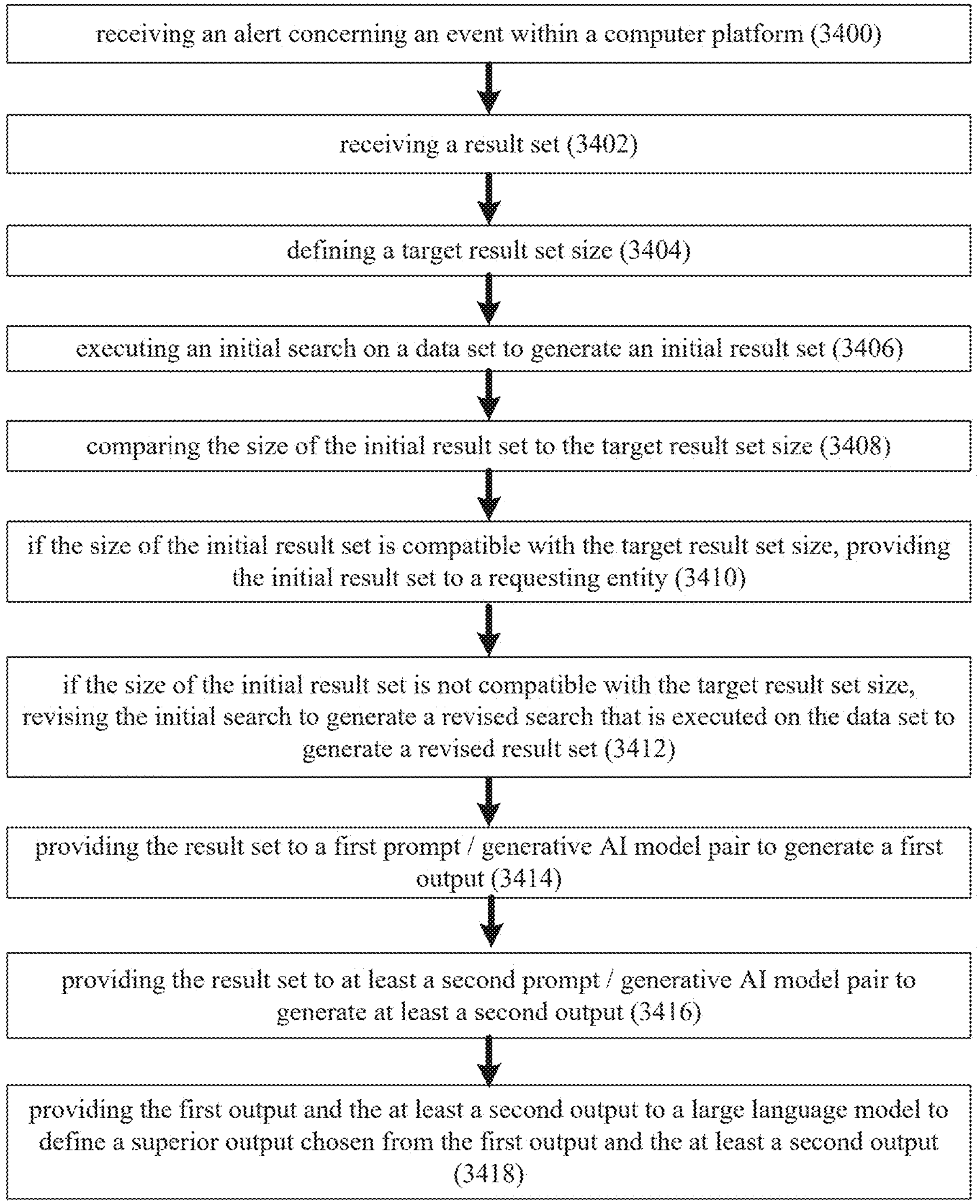
FIG. 51 is a flowchart of another implementation of the threat mitigation process of FIG. 1 according to an embodiment of the present disclosure.
Figure 52:
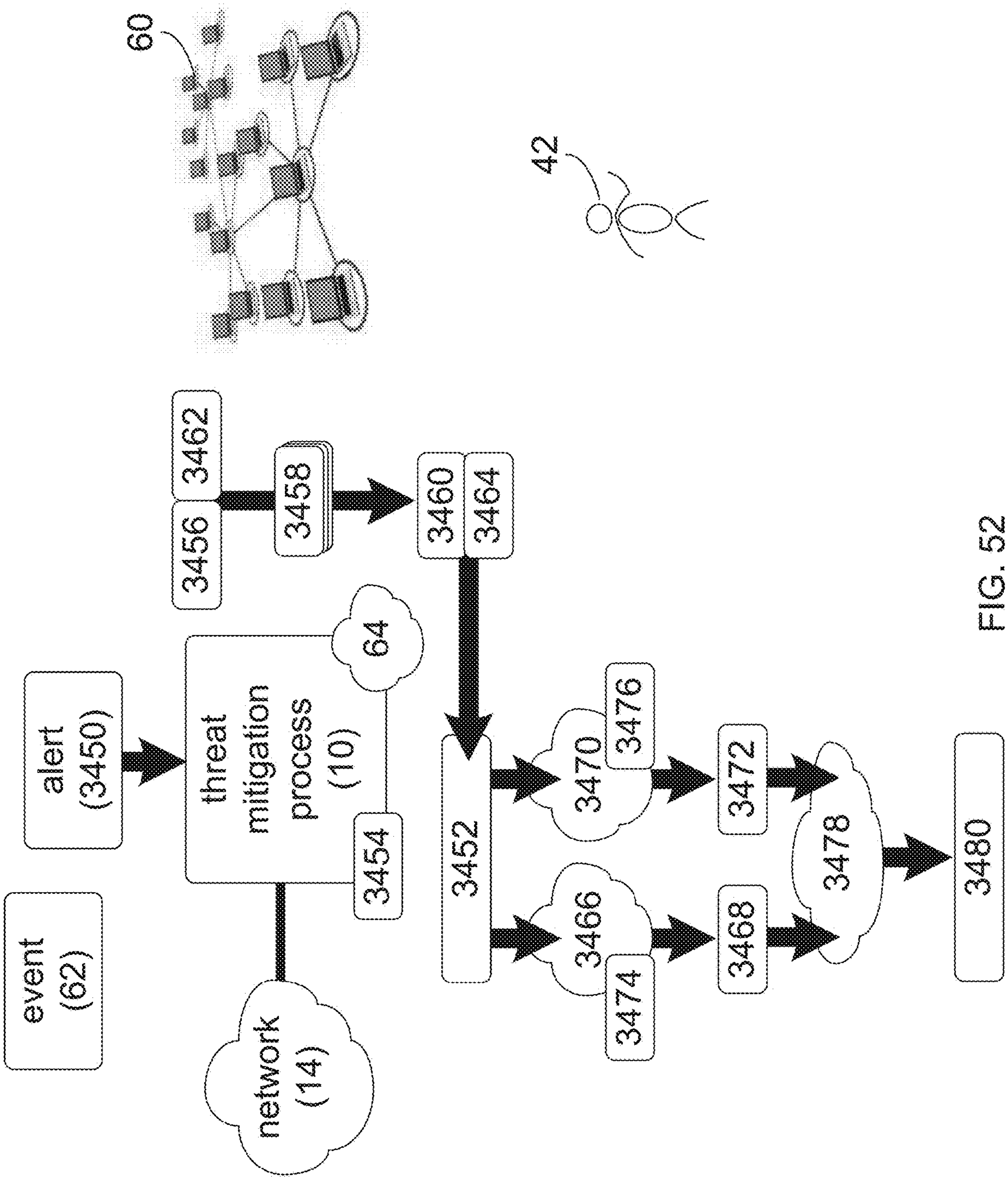
FIG. 52 is a diagrammatic view of a threat mitigation platform for effectuating the threat mitigation process of FIG. 1 according to an embodiment of the present disclosure.

Referring also to FIG. 51-52, the following discussion concerns the manner in which threat mitigation process 10 may provide a common result set to at least two prompt/generative AI pairs so that the outputs of these prompt/generative AI pairs may be compared to identify a superior result.

Threat mitigation process 10 may receive 3400 an alert (e.g., alert 3450) concerning an event (e.g., event 62) within a computing platform (e.g., computing platform 60).

As discussed above, various events (e.g., event 62) may occur as part of both normal operations and potential security incidents. Non-problematic (i.e., routine) network events (e.g., event 62) are expected and typically do not pose a threat. These include activities such as users logging into their email or cloud accounts, systems performing scheduled software updates, employees accessing shared files, internal communication between servers and databases, DNS queries to resolve domain names, and interactions with network-connected devices like printers. These events are part of the daily functioning of an organization's IT environment and usually require no intervention.

On the other hand, network security events (e.g., event 62) are actions that may indicate malicious activity or a breach. These include multiple failed login attempts, which may suggest a brute-force attack, or a user accessing the network from an unusual location or outside of normal hours, possibly indicating a compromised account. Other examples include unexpected large data transfers to external destinations, which may point to data exfiltration, and communications with known malicious servers, suggesting malware activity. Scanning the network for open ports, unauthorized attempts to access restricted services, or executing unfamiliar programs are also considered security events. Additionally, low-level attacks like ARP spoofing or MAC flooding may disrupt network communication and may be signs of potential intrusions. Distinguishing between normal and suspicious events may be essential for effective network security monitoring and intrusion detection by threat mitigation process 10.

Specifically, the alert (e.g., alert 3450) may concern a network entity (e.g., one or more network entities 64) on the computing platform (e.g., computing platform 60).

Generally speaking and as discussed above, the network entity (e.g., one or more network entities 64) may include one or more of: a network device; a computing device; a network user; a service; a container; a pod; and a virtual machine. Each of the following network entities (e.g., one or more network entities 64) may either be a target of attack, a source of malicious activity, or play a role in detecting and defending against threats:

A network device may be any hardware that facilitates data communication within a computer platform (e.g., computing platform 60). Examples include routers, switches, firewalls, and wireless access points. These devices are responsible for directing traffic, connecting different segments of a network, and often enforcing security rules. In intrusion detection, they are crucial observation points where malicious traffic or abnormal behavior may be first detected, such as unusual port scanning or traffic from blacklisted IPs.

A computing device refers to any device capable of processing data and performing computations. This includes desktop computers, laptops, servers, smartphones, and tablets. In a computer platform (e.g., computing platform 60), these devices can be both targets and sources of attacks. For instance, a compromised laptop could become a foothold for an attacker to move laterally across the network. Intrusion detection systems (e.g., threat mitigation process 10) may monitor these devices for signs of unauthorized access, malware infections, or anomalous behavior.

A network user is an individual or system that accesses resources within a computer platform (e.g., computing platform 60), typically authenticated through credentials. Users interact with computing devices and network services to perform tasks. In intrusion detection, monitoring user behavior is critical. Anomalies such as accessing sensitive files outside of business hours, logging in from unusual locations, or repeated failed login attempts could indicate compromised accounts or insider threats.

A service is a software process that performs a specific function and is accessible over a computer platform (e.g., computing platform 60), such as web servers (HTTP), email servers (SMTP), or file-sharing services (FTP). Services are common targets for attackers, who may exploit vulnerabilities or misconfigurations to gain unauthorized access. Intrusion detection systems (e.g., threat mitigation process 10) monitor traffic to and from services to identify potential exploits, unauthorized access, or abuse (e.g., DDoS attacks against a web service).

A container is a lightweight, portable unit that packages an application and its dependencies into a single runtime environment. Containers run isolated from one another on a shared operating system kernel. In intrusion detection systems (e.g., threat mitigation process 10), containers may be monitored for unusual behavior, such as unexpected outbound connections or privilege escalation attempts, since they can be used to deploy and scale applications quickly, but may also be exploited if not secured properly.

A pod is the smallest deployable unit in a container orchestration platform and typically contains one or more tightly coupled containers. Pods may share resources such as storage and network interfaces. From an intrusion detection perspective, monitoring pods may be essential in cloud-native environments, as attacks may target vulnerabilities in containerized applications or the container infrastructure itself.

A virtual machine is a software-based emulation of a physical computer that runs its own operating system, wherein multiple VMs can run on a single physical host using a hypervisor. In network intrusion detection systems (e.g., threat mitigation process 10), VMs may be treated like physical hosts and may be monitored for signs of compromise. They may also be isolated and analyzed to contain threats, and are commonly used in sandboxing techniques to study malware behavior without risking real systems.

Threat mitigation process 10 may receive 3402 a result set (e.g., result set 3452). The result set (e.g., result set 3452) that is received 3402 may increased or decreased in size to ensure that the result set (e.g., result set 3452) is an acceptable size for processing by a generative AI model.

Accordingly and as discussed above, threat mitigation process 10 may:

define 3404 a target result set size (e.g., target result set size 3454);

execute 3406 an initial search (e.g., initial search 3456) on a data set (e.g., data set 3458) to generate an initial result set (e.g., initial result set 3460);

compare 3408 the size of the initial result set (e.g., initial result set 3460) to the target result set size (e.g., target result set size 3454);

provide 3410 the initial result set (e.g., initial result set 3460) to a requesting entity (e.g., user 42) if the size of the initial result set (e.g., initial result set 3460) is compatible with the target result set size (e.g., target result set size 3454); and revise 3412 the initial search (e.g., initial search 3456) to generate a revised search (e.g., revised search 3462) that is executed on the data set (e.g., data set 3458) to generate a revised result set (e.g., revised result set 3464) if the size of the initial result set (e.g., initial result set 3460) is not compatible with the target result set size (e.g., target result set size 3454).

Accordingly, the above-referenced result set (e.g., result set 3452) that is received 3402 and processed by threat mitigation process 10 may include one or more of: the above-referenced initial result set (e.g., initial result set 3460) and the above-referenced revised result set (e.g., revised result set 3464).

Continuing with the above-stated example, again assume that the result set (e.g., result set 3452) identifies seventy-six email that user 42 has sent/received over the past 24 hours. Being the size of the result set (e.g., result set 3452) is appropriately sized for being processed by a generative AI model, threat mitigation process 10 may:

provide 3414 the result set (e.g., result set 3452) to a first prompt/generative AI model pair (e.g., first prompt/generative AI model pair 3466) to generate a first output (e.g., first output 3468); and provide 3416 the result set (e.g., result set 3452) to at least a second prompt/generative AI model pair (e.g., at least a second prompt/generative AI model pair 3470) to generate at least a second output (e.g., at least a second output 3472).

A script/generative AI model pair represents a technique for directing and refining the behavior of large language models to accomplish specific tasks. In this pairing, the generative AI model may serve as the computational engine capable of producing sophisticated and context-aware content, while the prompt may function as a programmable interface that shapes the generative AI model's response by providing it with detailed instructions, structure, and contextual framing. This approach may enable a general-purpose model (which may be capable of responding to a wide range of inputs) to be precisely focused on a particular role, workflow, or domain-specific problem.

The generative AI model may be a transformer-based neural network trained on diverse text and data to learn language patterns, reasoning strategies, and factual knowledge. These generative AI models may be capable of generating coherent, contextually relevant text, completing tasks, answering questions, solving problems, or creating entirely new content. However and without direction, the generative AI model's output may be too open-ended or inconsistent, which is where the prompt comes into play. The prompt may be more than just a simple instruction, in that it may define roles, goals, formatting requirements, expected input types, desired tone, and/or examples.

For instance, the prompt may instruct the generative AI model to "act as a medical documentation assistant" and then provide a structure where patient details, symptoms, and diagnoses are entered, prompting the model to generate a well-formatted clinical summary. In a more complex case, a prompt script may chain together multiple stages of processing, such as asking the model to extract key points from a technical document, rewriting them for a non-technical audience, and generating follow-up questions based on the summary. Accordingly, a prompt may be carefully crafted to leverage the generative AI model's internal capabilities in a predictable and repeatable way.

This pairing becomes especially powerful when the prompt script is programmatically generated or dynamically populated with data inputs at runtime. For example, in a cybersecurity monitoring system, real-time log data can be inserted into a predefined script that instructs the model to analyze threats, classify the type of event (such as malware or unauthorized access), and suggest appropriate mitigations. The generative model interprets the data in the context of the script and produces a structured, human-readable response, often far more quickly and flexibly than traditional rule-based systems.

In practical terms, this script/generative AI model pairing may enable reusability, modularity, and scalability. Accordingly, organizations may maintain libraries of prompt scripts tailored to different roles (e.g., legal assistant, financial analyst, customer service agent, etc.) and pair them with a general-purpose generative AI model to handle a wide array of use cases.

The first prompt/generative AI model pair (e.g., first prompt/generative AI model pair 3466) and the at least a second prompt/generative AI model pair (e.g., at least a second prompt/generative AI model pair 3470) may utilize the same generative AI model or may utilize different generative AI models.

There are many popular generative AI models today, each designed to create different types of content such as text, images, audio, or code. In the realm of language generation, models like OpenAI's GPT-4 and its multimodal variant GPT-4o are among the most advanced. These models power ChatGPT and are capable of tasks such as dialogue, summarization, translation, and reasoning. Another major player is Claude, developed by Anthropic, which emphasizes safe and constitutional AI behavior and excels in long-context reasoning. Google's Gemini series (formerly Bard), including the multimodal Gemini 1.5, integrates with Google tools and supports complex interactions across text and images. Meta's LLaMA models, particularly LLaMA 2 and LLaMA 3, are open-source and widely used by researchers and developers. Mistral AI also offers lightweight, high-performing open models like Mistral 7B and Mixtral, which are known for their efficiency. Additionally, Cohere's Command R is tailored for retrieval-augmented generation tasks, often used in enterprise document analysis.

For image generation, models like DALL•E 3 from OpenAI create high-quality visuals from text prompts and are integrated into ChatGPT. Midjourney is another well-known model popular for its artistic and stylized imagery, accessible via Discord. Stable Diffusion, developed by Stability AI, is an open-source image generation model that supports customization and has become a favorite in the AI art community. Google's Imagen also delivers photorealistic text-to-image results, although it remains less publicly accessible.

In the audio and music domain, models such as Google's MusicLM and Meta's AudioCraft (which includes MusicGen and AudioGen) enable AI-generated music and sound effects from textual descriptions. These models are particularly useful in creative and entertainment industries.

Multimodal models are designed to handle multiple input types such as text, images, and audio. GPT-4o, for example, can process and generate text, interpret visual inputs, and engage in spoken conversation, making it a unified multimodal solution. Gemini 1.5 from Google also supports multimodal tasks, including code and document understanding. Claude 3 Opus, while primarily text-focused, also supports text-based interpretation of visual information.

For code generation, OpenAI's Codex is widely used and powers GitHub Copilot, enabling developers to write code from natural language prompts. Meta's Code LLaMA is another specialized open-source model for software development tasks, supporting multiple programming languages. Additionally, StarCoder, developed by the BigCode community, is designed for code generation under an open and permissive license.

Overall, these generative AI models span a wide range of capabilities and use cases, from productivity and software development to creative media and enterprise automation. Each model offers unique strengths depending on the type of content to be generated and the level of control or customization required.

The first prompt/generative AI model pair (e.g., first prompt/generative AI model pair 3466) may utilize a first prompt script (e.g., first prompt script 3474) and the at least a second prompt/generative AI model pair (e.g., at least a second prompt/generative AI model pair 3470) may utilize at least a second prompt script (e.g., at least a second prompt script 3476).

A prompt script (e.g., first prompt script 3474 and at least a second prompt script 3476) may serve as a structured and intentional input that guides a generative AI model to perform a specific task or produce a desired type of output. While a generative AI model, such as a large language model, has broad capabilities learned from training on vast datasets, it does not inherently know what a user wants unless it is given clear instructions. This is where the prompt script becomes essential, as it functions as a blueprint that defines the model's role, sets the context, frames the task, and often includes constraints or formatting instructions. The prompt script can be as simple as a direct question or as complex as a multi-step set of commands with example inputs and outputs.

By crafting a well-designed prompt script (e.g., first prompt script 3474 and at least a second prompt script 3476), developers and users may reliably steer a generative AI model toward consistent, high-quality outputs that align with the intended use case. Generally speaking, a prompt script (e.g., first prompt script 3474 and at least a second prompt script 3476) may transform a general-purpose model into a specialized tool by controlling how a general-purpose model applies its reasoning and language generation capabilities.

Once the result set (e.g., result set 3452) is processed by the first prompt/generative AI model pair (e.g., first prompt/generative AI model pair 3466) and the at least a second prompt/generative AI model pair (e.g., at least a second prompt/generative AI model pair 3470) and the respective outputs (e.g., first output 3468 and at least a second output 3472 respectively) are generated, threat mitigation process 10 may provide 3418 the first output (e.g., first output 3468) and the at least a second output (e.g., at least a second output 3472) to a large language model (e.g., large language model 3478) to define a superior output (e.g., superior output 3480) chosen from the first output (e.g., first output 3468) and the at least a second output (e.g., at least a second output 3472).

A large language model (e.g., large language model 3478) is an advanced type of artificial intelligence system designed to understand and generate human-like language by learning from massive amounts of text data. These models, such as OpenAI's GPT series, are built using a deep learning architecture known as a transformer, which enables them to process input text with remarkable context awareness and linguistic fluency. The core function of a large language model (e.g., large language model 3478) is to predict the most likely next word in a sequence based on the surrounding context. During training, the model is exposed to a vast array of text, including books, websites, articles, and conversations, allowing it to learn statistical patterns, grammatical rules, reasoning structures, and even domain-specific knowledge. With billions or even trillions of parameters adjusted during this training process, the model becomes highly proficient at generating coherent and relevant text based on the input it receives.

Transformers, the underlying architecture of a large language model (e.g., large language model 3478), use a mechanism called self-attention, which allows the model to evaluate the relationship between every word in a sentence or paragraph simultaneously. This differs from traditional models that process language sequentially. The self-attention mechanism gives the large language model (e.g., large language model 3478) the ability to maintain coherence across longer passages and understand subtle dependencies between words and concepts, making it well-suited for tasks that involve reasoning, summarization, translation, and content creation.

Beyond generating text, LLMs can also compare multiple inputs and simulate evaluation or ranking. While LLMs are not explicitly designed to perform traditional comparisons like a mathematical algorithm would, they can be prompted in a way that leads them to evaluate, critique, or choose between different inputs using reasoning patterns learned during training.

For example, if you provide two versions of a paragraph and ask the model which one is clearer or more effective, the model can process both inputs and respond based on learned criteria such as sentence structure, clarity, tone, or factual accuracy. A prompt might look like: "Compare the following two inputs (e.g., first output 3468 and at least a second output 3472 respectively) and determine which one is clearer and more effective in explaining the concept of XYZ and why is it better?" The large language model (e.g., large language model 3478) will then simulate human-like evaluation, drawing on patterns observed in its training data where similar comparisons were made.

When it receives such a prompt, the large language model (e.g., large language model 3478) may first encode each input using a tokenizer, turning the input text into a numerical format it can process. The large language model (e.g., large language model 3478) may then apply its internal attention mechanisms to weigh the importance of each part of each input, identify meaningful patterns, and simulate reasoning. Although the large language model (e.g., large language model 3478) does not possess true understanding or consciousness, it stimulates human judgment by applying heuristics learned from training. This allows it to generate a response that explains which paragraph is preferable and why, often reflecting sound reasoning principles such as conciseness, clarity, or technical accuracy.

In more advanced systems, this decision making capability may be extended with reranker models or multi-stage prompt workflows. A reranker is a model specifically tuned to evaluate multiple generated responses or document summaries and then select (or rank) them based on relevance, accuracy, or other task-specific criteria. For instance and in a search engine or chatbot environment, several possible answers might be generated, and the reranker may pick the most appropriate answer. This workflow may involves chaining together multiple prompt/generative AI model interactions to simulate judgment, comparison, and refinement in stages.

Accordingly, a large language model is a highly capable system that uses deep neural networks and self-attention mechanisms to generate, interpret, and reason with human language. When guided by well-structured prompts, the large language model may perform not only text generation but also comparison tasks, simulating evaluative reasoning between multiple inputs, wherein this ability to interpret and rank inputs makes LLMs useful for applications such as content evaluation, writing assistance, decision support, and automated reasoning across a wide variety of fields.

Autonomous Agent-Based System for Cybersecurity Task Automation

Figure 53:
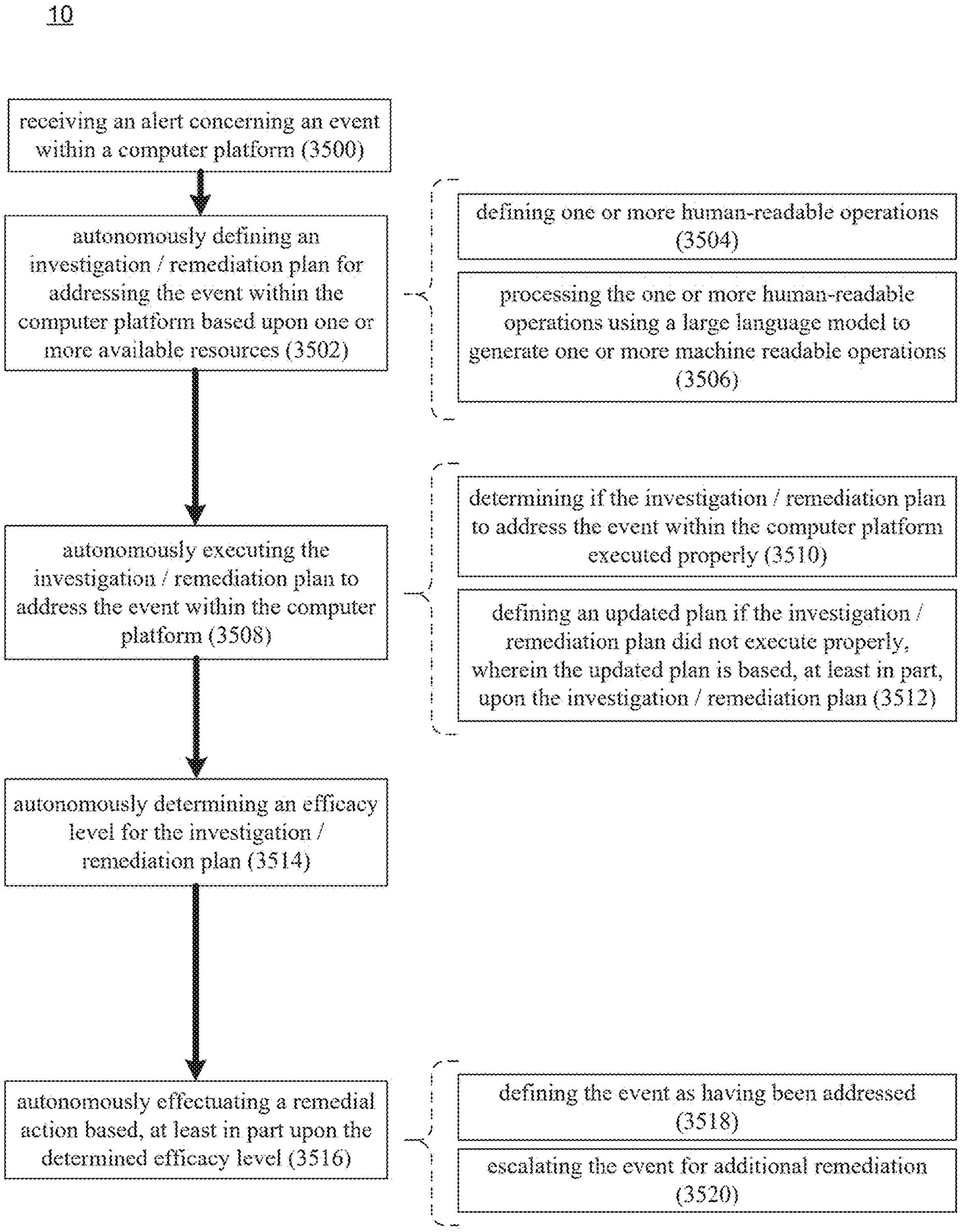
FIG. 53 is a flowchart of another implementation of the threat mitigation process of FIG. 1 according to an embodiment of the present disclosure.
Figure 54:
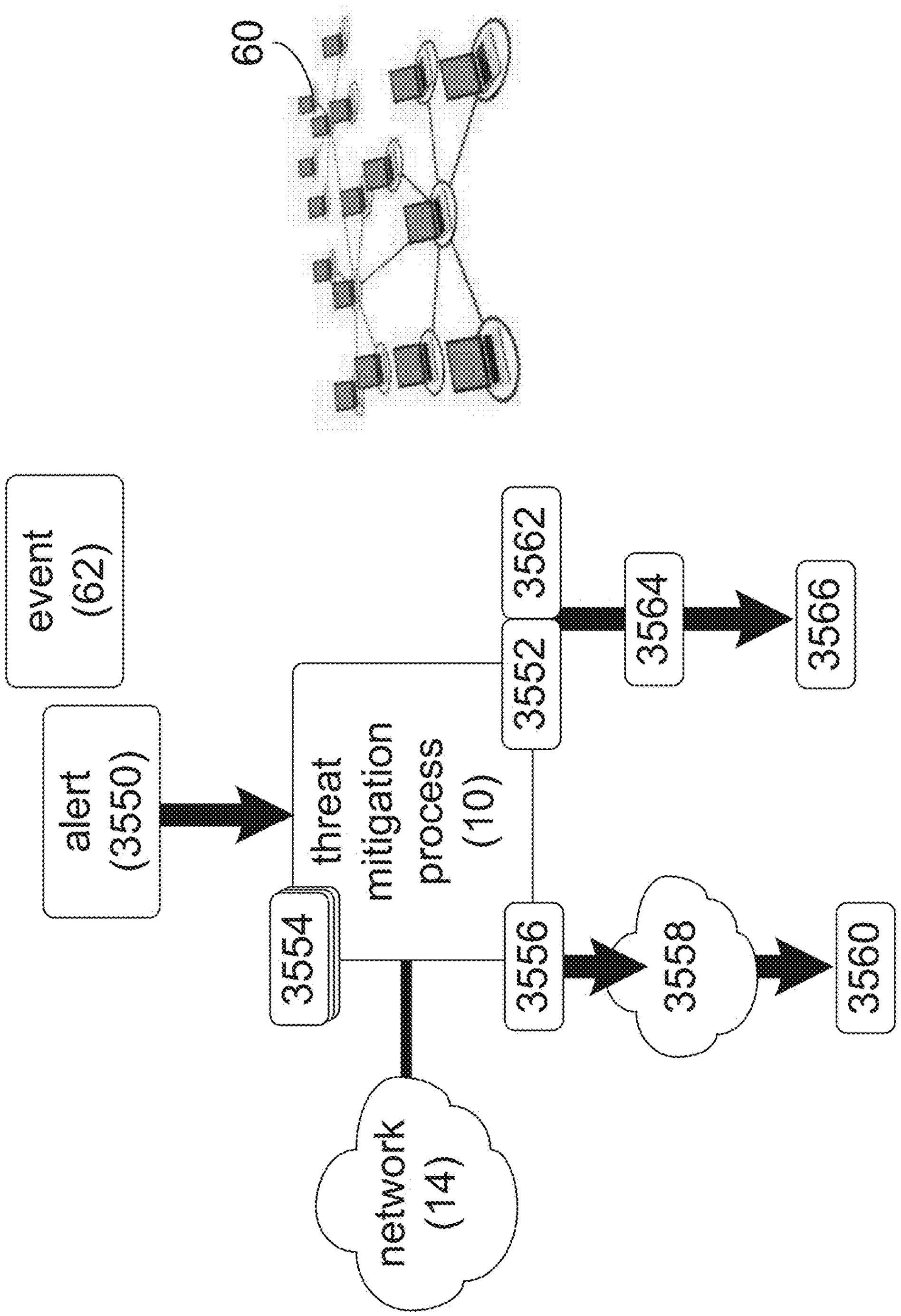
FIG. 54 is a diagrammatic view of a threat mitigation platform for effectuating the threat mitigation process of FIG. 1 according to an embodiment of the present disclosure.
Figure 55:
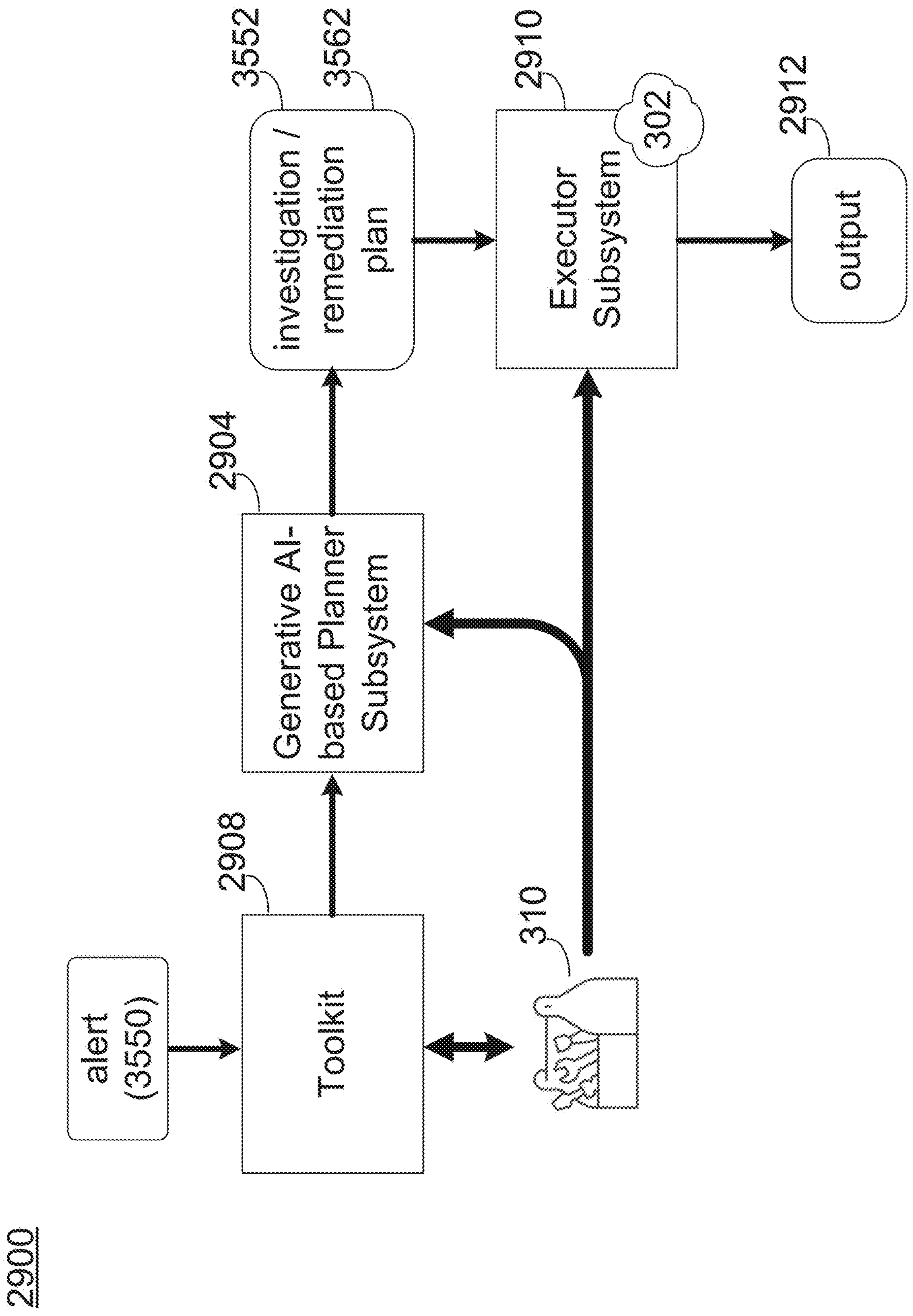
FIG. 55 is a diagrammatic view of a threat mitigation platform for effectuating the threat mitigation process of FIG. 1 according to an embodiment of the present disclosure.

Referring also to FIG. 53-55, the following discussion concerns the manner in which threat mitigation process 10 may autonomously define and execute an investigation/remediation plan concerning an event within a computing platform, wherein an efficacy level is determined for the investigation/remediation plan.

Threat mitigation process 10 may receive 3500 an alert (e.g., alert 3550) concerning an event (e.g., event 62) within a computing platform (e.g., computing platform 60), wherein the alert (e.g., alert 3550) may define a rule that was broken by the event (e.g., event 62) within the computing platform (e.g., computing platform 60).

As discussed above, various events (e.g., event 62) may occur as part of both normal operations and potential security incidents. Non-problematic (i.e., routine) network events (e.g., event 62) are expected and typically do not pose a threat. These include activities such as users logging into their email or cloud accounts, systems performing scheduled software updates, employees accessing shared files, internal communication between servers and databases, DNS queries to resolve domain names, and interactions with network-connected devices like printers. These events are part of the daily functioning of an organization's IT environment and usually require no intervention.

On the other hand, network security events (e.g., event 62) are actions that may indicate malicious activity or a breach. These include multiple failed login attempts, which may suggest a brute-force attack, or a user accessing the network from an unusual location or outside of normal hours, possibly indicating a compromised account. Other examples include unexpected large data transfers to external destinations, which may point to data exfiltration, and communications with known malicious servers, suggesting malware activity. Scanning the network for open ports, unauthorized attempts to access restricted services, or executing unfamiliar programs are also considered security events. Additionally, low-level attacks like ARP spoofing or MAC flooding may disrupt network communication and may be signs of potential intrusions. Distinguishing between normal and suspicious events may be essential for effective network security monitoring and intrusion detection by threat mitigation process 10.

The alert (e.g., alert 3550) may concern a network entity (e.g., one or more network entities 64) on the computing platform (e.g., computing platform 60). Generally speaking and as discussed above, the network entity (e.g., one or more network entities 64) may include one or more of: a network device; a computing device; a network user; a service; a container; a pod; and a virtual machine.

Each of the following network entities (e.g., one or more network entities 64) may either be a target of attack, a source of malicious activity, or play a role in detecting and defending against threats:

A network device may be any hardware that facilitates data communication within a computer platform (e.g., computing platform 60). Examples include routers, switches, firewalls, and wireless access points. These devices are responsible for directing traffic, connecting different segments of a network, and often enforcing security rules. In intrusion detection, they are crucial observation points where malicious traffic or abnormal behavior may be first detected, such as unusual port scanning or traffic from blacklisted IPs.

A computing device refers to any device capable of processing data and performing computations. This includes desktop computers, laptops, servers, smartphones, and tablets. In a computer platform (e.g., computing platform 60), these devices can be both targets and sources of attacks. For instance, a compromised laptop could become a foothold for an attacker to move laterally across the network. Intrusion detection systems (e.g., threat mitigation process 10) may monitor these devices for signs of unauthorized access, malware infections, or anomalous behavior.

A network user is an individual or system that accesses resources within a computer platform (e.g., computing platform 60), typically authenticated through credentials. Users interact with computing devices and network services to perform tasks. In intrusion detection, monitoring user behavior is critical. Anomalies such as accessing sensitive files outside of business hours, logging in from unusual locations, or repeated failed login attempts could indicate compromised accounts or insider threats.

A service is a software process that performs a specific function and is accessible over a computer platform (e.g., computing platform 60), such as web servers (HTTP), email servers (SMTP), or file-sharing services (FTP). Services are common targets for attackers, who may exploit vulnerabilities or misconfigurations to gain unauthorized access. Intrusion detection systems (e.g., threat mitigation process 10) monitor traffic to and from services to identify potential exploits, unauthorized access, or abuse (e.g., DDoS attacks against a web service).

A container is a lightweight, portable unit that packages an application and its dependencies into a single runtime environment. Containers run isolated from one another on a shared operating system kernel. In intrusion detection systems (e.g., threat mitigation process 10), containers may be monitored for unusual behavior, such as unexpected outbound connections or privilege escalation attempts, since they can be used to deploy and scale applications quickly, but may also be exploited if not secured properly.

A pod is the smallest deployable unit in a container orchestration platform and typically contains one or more tightly coupled containers. Pods may share resources such as storage and network interfaces. From an intrusion detection perspective, monitoring pods may be essential in cloud-native environments, as attacks may target vulnerabilities in containerized applications or the container infrastructure itself.

A virtual machine is a software-based emulation of a physical computer that runs its own operating system, wherein multiple VMs can run on a single physical host using a hypervisor. In network intrusion detection systems (e.g., threat mitigation process 10), VMs may be treated like physical hosts and may be monitored for signs of compromise. They may also be isolated and analyzed to contain threats, and are commonly used in sandboxing techniques to study malware behavior without risking real systems.

As discussed above, the threat mitigation platform (e.g., threat mitigation platform 2900) may include a generative AI-based planner subsystem (e.g., generative AI-based planner subsystem 2904) configured to receive the alert (e.g., alert 3550) and generate an investigation/remediation plan (e.g., investigation/remediation plan 3552) to address, in whole or in part, the event (e.g., event 62) within the computing platform (e.g., computing platform 60). The generative AI-based planner subsystem (e.g., generative AI-based planner subsystem 2904) may be configured to utilize one or more tools (e.g., tools 310) available via tool kit 2908 to process the alert (e.g., alert 3550). As discussed above, the one or more tools (e.g., tools 310) utilized by generative AI-based planner subsystem 2904 may include one or more of: a decoding tool to decode an encoded alert (e.g., alert 3550); a decompression tool to decompress a compressed alert (e.g., alert 3550); an identification tool to identify an owner of a domain associated with the alert (e.g., alert 3550); log aggregators and search engines like Splunk or ELK Stack for reviewing past activity; network monitoring tools such as Wireshark for analyzing traffic patterns; EDR (Endpoint Detection and Response) platforms for inspecting system-level behavior on affected machines; and forensic analysis tools that allow teams to capture memory snapshots or trace user actions.

Accordingly, threat mitigation process 10 may autonomously define 3502 an investigation/remediation plan (e.g., investigation/remediation plan 3552) for addressing the event (e.g., event 62) within the computing platform (e.g., computing platform 60) based upon one or more available resources (e.g., one or more available resources 3554). This may be accomplished via the generative AI-based planner subsystem (e.g., generative AI-based planner subsystem 2904) configured to receive the alert (e.g., alert 3550).

Examples of the one or more available resources (e.g., one or more available resources 3554) may include but are not limited to one or more of: information concerning a broken rule; a list of available tools; a customer context; and guidance concern how the broken rule was applied.

In a modern computing platform (e.g., computing platform 60), threat mitigation process 10 may maintain the security and integrity of operations within the platform. When a potential threat or anomalous activity (e.g., event 62) is detected, threat mitigation process 10 may do more than just generate an alert and may provide a structured, context-rich response to help assess, investigate, and act upon the event (e.g., event 62). Generally speaking, threat mitigation process 10 may provide information on the specific broken rule. This may be a predefined security rule within a SIEM (Security Information and Event Management) system, an automated policy within threat mitigation process 10, or a user-defined rule administered/monitored by threat mitigation process 10. For instance, a rule trigger may include a user attempting to access sensitive data outside of normal working hours, a high volume of data leaving the network unexpectedly, or a process attempting to execute code from an unauthorized location. Understanding which rule was broken (as well as the rationale behind the rule) may help in determining whether the event (e.g., event 62) represents a genuine threat or a false positive.

In parallel, threat mitigation process 10 may provide access to a list of available tools that are best suited to investigate the event (e.g., event 62). These may include but are not limited to log aggregators and search engines like Splunk or ELK Stack for reviewing past activity; network monitoring tools such as Wireshark for analyzing traffic patterns; EDR (Endpoint Detection and Response) platforms for inspecting system-level behavior on affected machines; and forensic analysis tools that allow teams to capture memory snapshots or trace user actions. By utilizing the most relevant resources, threat mitigation process 10 may accelerate the time to resolution and may help ensure a thorough investigation.

Threat mitigation process 10 may also define a customer context. Not all security events carry equal weight, and the potential impact of a breach depends heavily on where and how it occurs. For example, a security event (e.g., event 62) on a publicly accessible test server may not be as urgent as one involving a server tied to financial systems or patient records. To support effective triage, threat mitigation process 10 may provide e.g., contextual metadata such as the business unit or owner of the affected asset, the roles and recent behavior of the user(s) involved, the sensitivity level of the data at risk, and whether the asset is subject to compliance requirements (e.g., PCI-DSS or HIPAA). Such information may allow for the gauging of risk level and the prioritization of actions.

Additionally, threat mitigation process 10 may provide guidance concerning how rules were applied and what actions may be taken to address the event (e.g., event 62) going forward. For example, this may include a technical breakdown of how the rule was evaluated (e.g., thresholds for failed login attempts, timing constraints, data movement, or system behavior patterns). Additionally, the system may recommend follow-up actions, examples of which may include but are not limited to: applying patches, isolating affected systems, notifying stakeholders, or updating access controls.

When autonomously defining 3502 an investigation/remediation plan (e.g., investigation/remediation plan 3552) for addressing the event (e.g., event 62) within the computing platform (e.g., computing platform 60) based upon one or more available resources (e.g., one or more available resources 3554), threat mitigation process 10 may define 3504 one or more human-readable operations (e.g., human-readable operations 3556) and may process 3506 the one or more human-readable operations (e.g., human-readable operations 3556) using a large language model (e.g., large language model 3558) to generate one or more machine readable operations (e.g., machine readable operations 3560).

For example, threat mitigation process 10 may define 3504 one or more human-readable operations (e.g., human-readable operations 3556) as follows;

- Selective shutdown / suspension of user account(s);
- Selective shutdown of impacted port(s);
- Selective shutdown of suspicious stream(s); and
- Quarantining of inbound file(s).

Threat mitigation process 10 may then process 3506 the one or more human-readable operations (e.g., human-readable operations 3556) using a large language model (e.g., large language model 3558) to generate one or more machine readable operations (e.g., machine readable operations 3560) that are processable/digestible/effectuatible by threat mitigation process 10.

Such machine readable operations (e.g., machine readable operations 3560) may e.g., define the users to suspend (and the procedure for effectuating the same), define the specific ports to be shutdown (and the procedure for effectuating the same), define the specific streams to be shutdown (and the procedure for effectuating the same), and define the specific inbound files to be quarantined (and the procedure for effectuating the same).

As discussed above, a large language model (e.g., large language model 3558) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

The threat mitigation platform (e.g., threat mitigation platform 2900) may include an executor subsystem (e.g., executor subsystem 2910) configured to iteratively process the investigation/remediation plan (e.g., investigation/remediation plan 3552) using a generative AI model (e.g., generative AI model 302) to generate an output (e.g., output 2912). The executor subsystem (e.g., executor subsystem 2910) may be configured to utilize one or more tools (e.g., tools 310) available via tool kit 2908 to process the investigation/remediation plan (e.g., investigation/remediation plan 3552) and/or may be configured to utilize several loops and/or nested loops to generate the output (e.g., output 2912).

Threat mitigation process 10 may autonomously execute 3508 the investigation/remediation plan (e.g., investigation/remediation plan 3552) to address the event (e.g., event 62) within the computing platform (e.g., computing platform 60). This may be accomplished via the executor subsystem (e.g., executor subsystem 2910) configured to iteratively process the investigation/remediation plan (e.g., investigation/remediation plan 3552) using the generative AI model (e.g., generative AI model 302).

The investigation/remediation plan (e.g., investigation/remediation plan 3552) may define: one or more operations to be performed to address the event (e.g., event 62) and one or more tools (e.g., tools 310) to be utilized to address the event (e.g., event 62), wherein the one or more tools to be utilized may be selected from the list of available tools (e.g., available within tool kit 2908).

When autonomously executing 3508 the investigation/remediation plan (e.g., investigation/remediation plan 3552) to address the event (e.g., event 62) within the computing platform (e.g., computing platform 60), threat mitigation process 10 may: determine 3510 if the investigation/remediation plan (e.g., investigation/remediation plan 3552) to address the event (e.g., event 62) within the computing platform (e.g., computing platform 60) executed properly.

Further and when autonomously executing 3508 the investigation/remediation plan (e.g., investigation/remediation plan 3552) to address the event (e.g., event 62) within the computing platform (e.g., computing platform 60), threat mitigation process 10 may: define 3512 an updated plan (e.g., updated plan 3562) if the investigation/remediation plan (e.g., updated plan 3552) did not execute properly. This updated plan (e.g., updated plan 3562) may be based, at least in part, upon the investigation/remediation plan (e.g., investigation/remediation plan 3552).

As discussed above, such machine readable operations (e.g., machine readable operations 3560) may e.g., define the users to suspend (and the procedure for effectuating the same), define the specific ports to be shutdown (and the procedure for effectuating the same), define the specific streams to be shutdown (and the procedure for effectuating the same), and define the specific inbound files to be quarantined (and the procedure for effectuating the same).

Suppose, for this example, that the original investigation/remediation plan (e.g., investigation/remediation plan 3552) was defining the users to suspend and suspending the same. However, assume that threat mitigation process 10 determines 3510 that this investigation/remediation plan (e.g., investigation/remediation plan 3552) to address the event (e.g., event 62) DID NOT execute properly. Accordingly, threat mitigation process 10 may define 3512 an updated plan (e.g., updated plan 3562), wherein this updated plan (e.g., updated plan 3562) may define the specific ports to be shutdown (and the procedure for effectuating the same), define the specific streams to be shutdown (and the procedure for effectuating the same), and/or define the specific inbound files to be quarantined (and the procedure for effectuating the same).

Once executed 3508, threat mitigation process 10 may autonomously determine 3514 an efficacy level (e.g., efficacy level 3564) for the investigation/remediation plan (e.g., investigation/remediation plan 3552) and may autonomously effectuate 3516 a remedial action (e.g., remedial action 3566) based, at least in part upon the determined efficacy level (e.g., efficacy level 3564).

For example, assume that the event (e.g., event 62) within the computing platform (e.g., computing platform 60) concerns a suspicious file transfer event, wherein a confidential technology file is being transferred from a high security server in the middle of the night to an IP address in Russia.

Further assume that threat mitigation process 10 autonomously executes 3508 an investigation/remediation plan (e.g., investigation/remediation plan 3552) in which various ports utilized in the file transfer are shutdown. Once executed 3508, threat mitigation process 10 may autonomously determine 3514 an efficacy level (e.g., efficacy level 3564) for the investigation/remediation plan (e.g., investigation/remediation plan 3552). Assume that shutting down the ports stopped the file transfer. Accordingly, assume that threat mitigation process 10 autonomously determines 3514 that the efficacy level (e.g., efficacy level 3564) for the investigation/remediation plan (e.g., investigation/remediation plan 3552) is 100% (as it shut down the file transfer).

When autonomously effectuating 3516 a remedial action (e.g., remedial action 3566) based, at least in part, upon the determined efficacy level (e.g., efficacy level 3564), threat mitigation process 10 may: define 3518 the event (e.g., event 62) as having been addressed or escalate 3520 the event (e.g., event 62) for additional remediation.

For example and when autonomously effectuating 3516 a remedial action (e.g., remedial action 3566) based, at least in part, upon the determined efficacy level (e.g., efficacy level 3564), threat mitigation process 10 may (in this example) define 3518 the event (e.g., event 62) as having been addressed since the efficacy level (e.g., efficacy level 3564) for the investigation/remediation plan (e.g., investigation/remediation plan 3552) is 100%. Alternatively and if the efficacy level was below a desired threshold (e.g., 70%), threat mitigation process 10 may escalate 3520 the event (e.g., event 62) for additional remediation.

Flex #1

Figure 56:
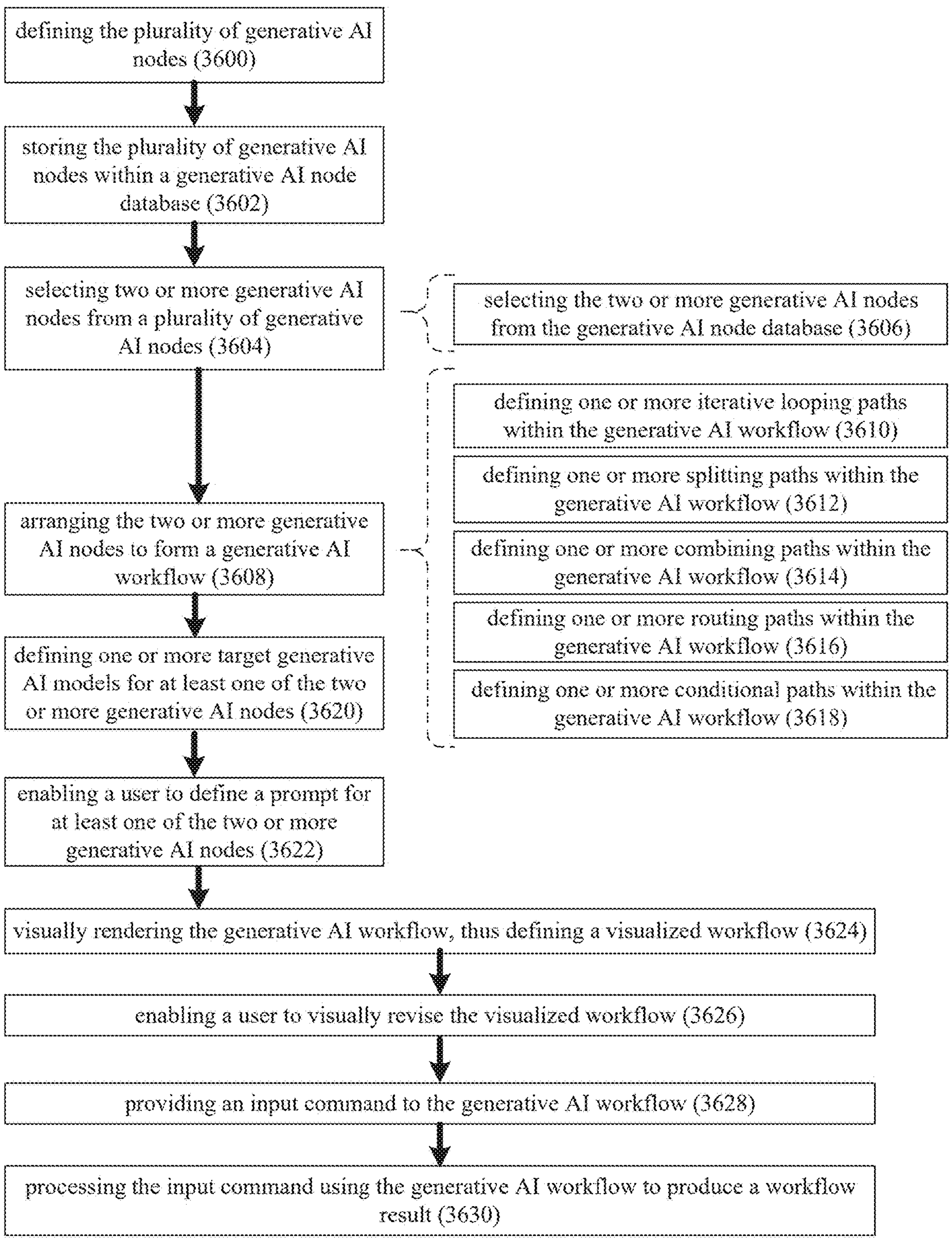
FIG. 56 is a flowchart of another implementation of the threat mitigation process of FIG. 1 according to an embodiment of the present disclosure.
Figure 57:
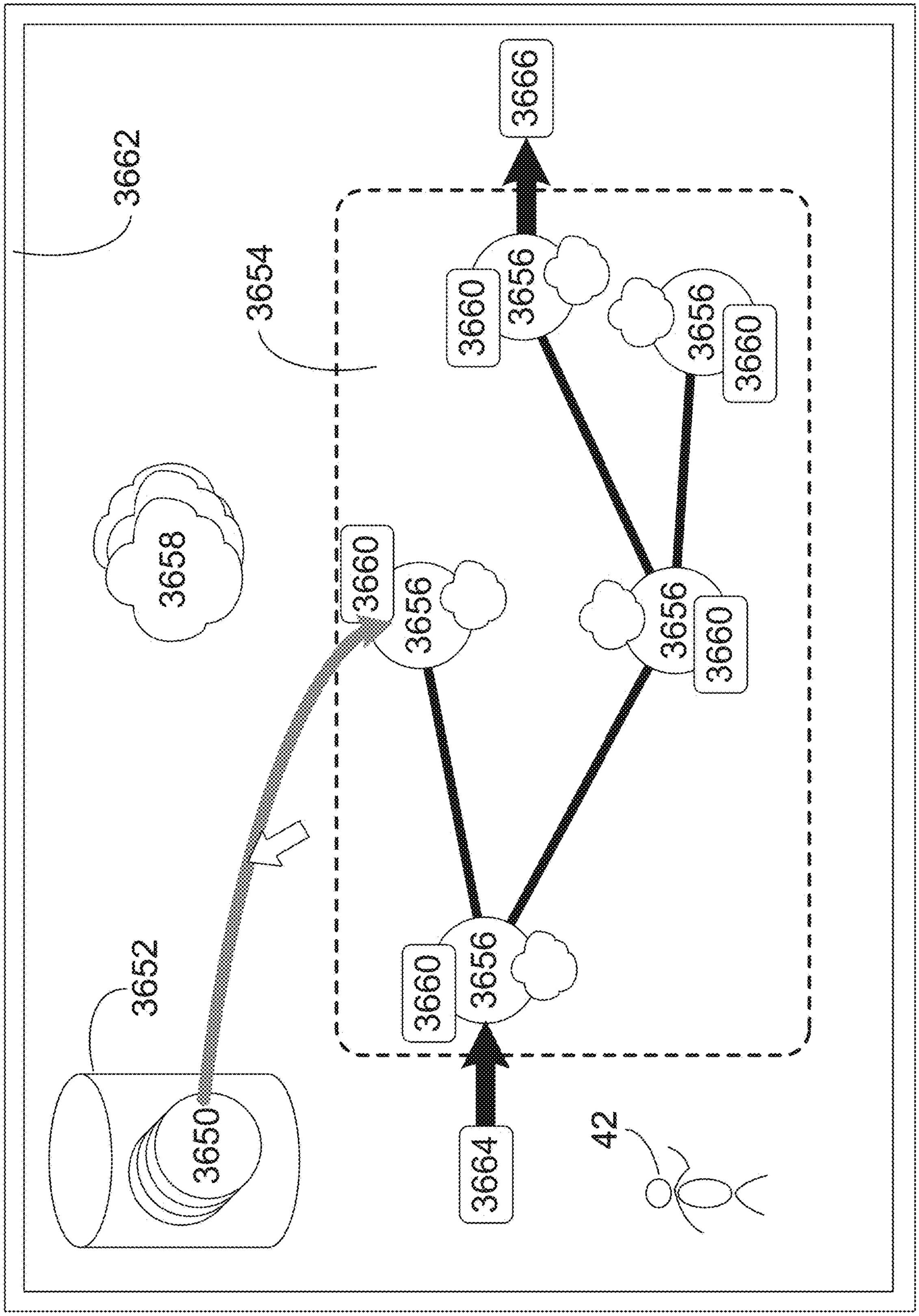
FIG. 57 is a diagrammatic view of a threat mitigation platform for effectuating the threat mitigation process of FIG. 1 according to an embodiment of the present disclosure.

Referring also to FIG. 56-57, the following discussion concerns the manner in which threat mitigation process 10 may be utilized to generate a workflow, wherein the workflow includes a plurality of generative AI nodes that may be positioned/linked together so that the output of one generative AI node may be provided as an input to another generative AI node.

While the workflow generated by threat mitigation process 10 may be used to analyze/process security events (e.g., access auditing; anomalies; authentication; denial of services; exploitation; malware; phishing; spamming; reconnaissance; and/or web attack) within a monitored computing platform (e.g., computing platform 60), it is understood that the workflow generated by threat mitigation process 10 may be used for analysis/processing purposes outside of the security event space.

Generative AI: As is known in the art, Generative AI is a subset of artificial intelligence focused on systems that can generate new and original content based on patterns learned from existing data. Unlike traditional AI, which is primarily concerned with recognizing patterns, classifying data, or making decisions, generative AI goes a step further, in that it creates content. This ability to generate content (e.g., text, images, code, music, video, and even synthetic data) has opened up new possibilities across industries and disciplines.

At the heart of generative AI are advanced machine learning models, particularly deep learning architectures such as transformers, Generative Adversarial Networks (GANs), and Variational Autoencoders (VAEs). These models are trained on vast datasets (e.g., text from books and websites, images from digital art databases, or sound from music libraries) to learn the statistical patterns, structures, and relationships inherent in the data. Once trained, these systems may produce new outputs that are often indistinguishable from those created by humans.

Examples of the manner in which Generative AI may generate content are as follows:

Text Generation: Generative AI models like OpenAI's GPT-4 can write essays, summarize articles, generate emails, translate languages, or assist in writing software code. Tools like ChatGPT and GitHub Copilot are used by millions for content creation and development tasks.

Image Generation: Tools like DALL•E, Midjourney, and Stable Diffusion allow users to generate images from text prompts, enabling the creation of digital art, product mockups, or visual storytelling elements. These systems can also edit existing images, change styles, or enhance quality.

Audio and Music: Generative AI can produce original music compositions, voiceovers, and sound effects. Some tools can replicate human voices or synthesize entirely new ones, offering potential for personalized media experiences and virtual assistants.

Video Generation: AI-generated video content is an emerging field with growing capabilities. From short animations to deepfake videos that mimic real people, these technologies are being explored for entertainment, training, and simulation purposes.

Code Generation: Generative AI models trained on programming languages can generate code snippets, complete functions, or even build entire applications from simple instructions. This has the potential to accelerate software development and lower the barrier to entry for non-programmers.

Synthetic Data Creation: In fields like healthcare, finance, or cybersecurity, generative AI can produce synthetic datasets that mimic real-world data without compromising privacy. This is useful for training AI models where real data is scarce, sensitive, or restricted.

Threat mitigation process 10 may define 3600 a plurality of generative AI nodes (e.g., plurality of generative AI nodes 3650), wherein threat mitigation process 10 may store 3602 the plurality of generative AI nodes (e.g., plurality of generative AI nodes 3650) within a generative AI node database (e.g., generative AI node database 3652).

As will be discussed below in greater detail, threat mitigation process 10 may enable a user (e.g., user 42) of threat mitigation process 10 to select and arrange various nodes chosen from this plurality of generative AI nodes (e.g., plurality of generative AI nodes 3650) to form a generative AI workflow (e.g., generative AI workflow 3654).

A generative AI workflow (e.g., generative AI workflow 3654) is a structured yet flexible process designed to create content with the help of AI models (e.g., ChatGPT, DALL•E, Midjourney, Stable Diffusion or Runway). Generative AI workflows (e.g., generative AI workflow 3654) are designed to achieve a specific goal, such as generating marketing copy, designing visuals, writing code, producing synthetic audio, or creating video content.

At the core of a generative AI workflow (e.g., generative AI workflow 3654) are generative AI nodes (e.g., chosen from plurality of generative AI nodes 3650), which represent discrete, functional units within the overall workflow (e.g., generative AI workflow 3654). These nodes (e.g., generative AI nodes 3650) may be connected in a sequence or network, where the output of one node may become the input of another node, allowing for complex, multi-step automation and content generation workflows (e.g., generative AI workflow 3654). Each of these generative AI nodes (e.g., within plurality of generative AI nodes 3650) may perform a specific task (e.g., formatting input text, filtering outputs based on quality or compliance, or transforming results into a usable format). These nodes (e.g., chosen from plurality of generative AI nodes 3650) may be arranged and interconnected in a variety of configurations, depending on the task requirements and system complexity.

As discussed above, threat mitigation process 10 may define 3600 a plurality of generative AI nodes (e.g., plurality of generative AI nodes 3650), wherein threat mitigation process 10 may store 3602 the plurality of generative AI nodes (e.g., plurality of generative AI nodes 3650) within a generative AI node database (e.g., generative AI node database 3652). For example, threat mitigation process 10 may enable a user (e.g., user 42) to define 3600 the plurality of generative AI nodes (e.g., plurality of generative AI nodes 3650) that are stored 3602 within a generative AI node database (e.g., generative AI node database 3652).

Accordingly, threat mitigation process 10 may enable the user (e.g., user 42) to define 3600 a plurality of generative AI nodes (e.g., plurality of generative AI nodes 3650), examples of which may include but are not limited to: text content generation generative AI nodes, video content generation generative AI nodes, image content generation generative AI nodes, language translation generative AI nodes, data analysis generative AI nodes, data manipulation generative AI nodes, report generation generative AI nodes, report generation generative AI nodes, and notification generative AI nodes.

Text Content Generation Generative AI Nodes: These nodes are responsible for creating written content based on prompts, templates, or data. They use large language models (LLMs) like GPT-4 to generate blog posts, emails, social media captions, product descriptions, and more. They can be fine-tuned for tone, format, or target audience. For example, such a node may generate a 100-word product description from a feature list.

Video Content Generation Generative AI Nodes: These nodes generate or synthesize video content from various inputs such as text scripts, audio narration, or image sequences. They might include sub-nodes for scene rendering, animation, background generation, or lip-syncing. Some use multimodal models like Runway or Sora. For example, such a node may create an explainer video from a written script and voiceover.

Image Content Generation Generative AI Nodes: These nodes generate images from text prompts (text-to-image), sketches (image-to-image), or a combination of inputs. They rely on models like DALL•E, Midjourney, or Stable Diffusion. Output can include illustrations, mockups, design assets, or photorealistic scenes. For example, such a node may generate a digital art poster from the prompt "cyberpunk city at night."

Language Translation Generative AI Nodes: These nodes convert content from one language to another, often preserving tone, context, and domain-specific terms. They may use specialized translation models or LLMs with multilingual capability, and often include post-translation refinement steps. For example, such a node may translate a technical manual from English to German with industry terminology intact.

Data Analysis Generative AI Nodes: These nodes analyze datasets and extract insights using natural language processing and statistical methods. They can summarize trends, find anomalies, and generate commentary in plain language. Some include visualizations or feed directly into report generation nodes. For example, such a node may analyze sales data and summarize performance trends for Q2.

Data Manipulation Generative AI Nodes: These nodes transform, clean, or reformat structured or unstructured data. Tasks may include column mapping, data validation, type conversion, unit normalization, or JSON-to-CSV transformation. They are useful for prepping data before generation or analysis. For example, such a node may clean and standardize product listings scraped from various e-commerce sites.

Report Generation Generative AI Nodes: These nodes generate structured reports that compile and summarize data, often with narrative text, tables, charts, and headings. They can merge inputs from data analysis, user prompts, and external documents. Reports may be exported to formats like PDF, DOCX, or HTML. For example, such a node may generate a weekly marketing performance report including visuals and executive summary.

Notification Generative AI Nodes: These nodes generate and dispatch notifications, alerts, or messages triggered by specific events or conditions. The content may be dynamically generated (e.g., using an LLM to write an alert) and delivered via email, SMS, push notification, or system log. For example, such a node may send a smart Slack message when generated content is flagged for human review.

These generative AI nodes (e.g., generative AI nodes 3650) may be categorized and stored 3602 within the generative AI node database (e.g., generative AI node database 3652) for subsequent use when developing generative AI workflows (e.g., generative AI workflow 3654).

In its simplest form, a generative AI workflow (e.g., generative AI workflow 3654) may follow a linear path, where each node (e.g., each of generative AI nodes 3650) passes its output directly to the next node. For example, a user prompt may feed an input into a text generation generative AI node, whose output is fed into a post-processing generative AI node that cleans up (e.g., formatted, spellchecked) the output of the text generation generative AI node. This cleaned up output may then be fed into a third generative AI node that produces a report. Such a linear node structure may be ideal for straightforward use cases with minimal variation. However, more advanced workflows may include branching paths, where content is routed differently depending upon its type or performance. For instance, a generative AI node may classify an output as either text or image, thus triggering a separate downstream process depending upon the classification. Similarly, looping structures may be used for iterative refinement, where content is automatically reprocessed until it meets a specified quality threshold.

Generally speaking and in a generative AI workflow (e.g., generative AI workflow 3654), these paths may define how data and control signals move between generative AI nodes (e.g., generative AI nodes 3650). Different types of paths (e.g., iterative looping, splitting, combining, routing, and conditional) may allow the workflow (e.g., generative AI workflow 3654) to handle complexity, refine outputs, and adapt dynamically to varying inputs.

Iterative Looping Paths may be used when the workflow (e.g., generative AI workflow 3654) must repeat certain steps until a specific condition is met (e.g., a quality threshold, a style alignment, a validation result). In this setup, output from a generative AI node may be evaluated. And if the output doesn't meet the required criteria, the output may be sent back to an earlier node (e.g., the generation/transformation step) for revision/reprocessing. This looping may continue until the output satisfies the required criteria. For example, a text generation generative AI node may repeatedly loop with a content filter until the generated content is free from bias or grammatical errors. A use case may include generating a product description that must pass a readability score or brand tone check before moving to deployment.

Splitting Paths may divide a single stream of data/content into multiple branches within the workflow (e.g., generative AI workflow 3654), wherein each branch is processed in parallel or along different logic paths. Such a methodology may be useful when different types of processing are required for different aspects of the same input or when multiple outputs are needed from a common source. For example, after generating an article, one path may summarize it, another may translate it, and a third may extract metadata like keywords. A use case may include taking a single long-form article and creating social media snippets, translated versions, and an optimized summary simultaneously.

Combining Paths (also known as converging or merging paths) may take outputs from multiple different branches within the workflow (e.g., generative AI workflow 3654) and unify them into a single downstream process. Such a configuration may be useful when multiple forms of content need to be integrated (e.g., combining generated text, synthesized voice, and AI-created video into one multimedia presentation). This merging process may require synchronization of formats and timing (especially in audio-visual applications). A use case may include generating a promotional video by combining an AI-written script, AI-generated narration, and AI-animated visualizations.

Routing Paths may dynamically direct content within the workflow (e.g., generative AI workflow 3654) based upon logic or metadata, sending such content to different generative AI nodes based on properties (e.g., file type, language, category, or detected sentiment). Unlike simple branching, routing can involve more complex decision-making and often uses classifier or rule-based nodes and may be useful for workflows handling diverse inputs that require different handling paths. A use case may include routing English text to a summarizer, Spanish text to a translator, and malformed text to an error-handling node.

Conditional Paths may be determined by specific if-then logic within the workflow (e.g., generative AI workflow 3654). The workflow may check a condition (e.g., whether a quality score is above a threshold or whether a keyword is present) and may choose a path accordingly. This is similar to routing but is usually binary and, therefore, simpler in logic. A use case may include submitting an AI-generated email for human review if the AI-generated email contains sensitive content and, if it does not, automatically publishing the AI-generated email.

In summary, such a node-based architecture within a generative AI workflow (e.g., generative AI workflow 3654) may offer significant advantages, examples of which may include but are not limited to:

- Modularity: Such a node-based structure is modular in nature and allows for easy updates and/or replacements of individual components.
- Scalability: Such a node-based structure is scalable in nature, wherein the number of generative AI nodes may be increased/decreased depending upon need, thus supporting everything from small personal projects to large enterprise pipelines.
- Transparency: Such a node-based structure is scalable in nature transparent, enabling various teams to monitor and optimize each step within a workflow.

Generally speaking, a generative AI workflow (e.g., generative AI workflow 3654) may be a dynamic, reconfigurable system built on interconnected generative AI nodes that each contribute to the generation, refinement, and delivery of AI-powered content.

Threat mitigation process 10 may select 3604 two or more generative AI nodes (e.g., generative AI nodes 3656) from the plurality of generative AI nodes (e.g., plurality of generative AI nodes 3650). For example and when selecting 3604 two or more generative AI nodes (e.g., generative AI nodes 3656) from a plurality of generative AI nodes (e.g., plurality of generative AI nodes 3650), threat mitigation process 10 may: select 3606 the two or more generative AI nodes (e.g., generative AI nodes 3656) from the generative AI node database (e.g., generative AI node database 3652). As discussed above, these generative AI nodes (e.g., generative AI nodes 3650) may be categorized and stored 3602 within the generative AI node database (e.g., generative AI node database 3652) for subsequent use when developing generative AI workflows (e.g., generative AI workflow 3654). Accordingly, threat mitigation process 10 may enable a user (e.g., user 42) to select 3606 the two or more generative AI nodes (e.g., generative AI nodes 3656) from the generative AI node database (e.g., generative AI node database 3652) and utilize them within generative AI workflow (e.g., generative AI workflow 3654).

Threat mitigation process 10 may arrange 3608 the two or more generative AI nodes (e.g., generative AI nodes 3656) to form a generative AI workflow (e.g., generative AI workflow 3654). For example, threat mitigation process 10 may enable a user (e.g., user 42) to select 3606 generative AI nodes (e.g., generative AI nodes 3656) from generative AI node database 3652 and arrange 3608 the same to form generative AI workflow 3654.

As discussed above, different types of paths (e.g., iterative looping, splitting, combining, routing, and conditional) may allow a generative AI workflow (e.g., generative AI workflow 3654) to handle complexity, refine outputs, and adapt dynamically to varying inputs. Accordingly and when arranging 3608 the two or more generative AI nodes (e.g., generative AI nodes 3650) to form a generative AI workflow (e.g., generative AI workflow 3654), threat mitigation process 10 may:

- define 3610 one or more iterative looping paths (as defined above) within the generative AI workflow (e.g., generative AI workflow 3654);
- define 3612 one or more splitting paths (as defined above) within the generative AI workflow (e.g., generative AI workflow 3654);
- define 3614 one or more combining paths (as defined above) within the generative AI workflow (e.g., generative AI workflow 3654);
- define 3616 one or more routing paths (as defined above) within the generative AI workflow (e.g., generative AI workflow 3654); and/or
- define 3618 one or more conditional paths (as defined above) within the generative AI workflow (e.g., generative AI workflow 3654).

Threat mitigation process 10 may define 3620 one or more target generative AI models (e.g., generative AI models 3658) for at least one of the two or more generative AI nodes (e.g., generative AI nodes 3656) utilized within the generative AI workflow (e.g., generative AI workflow 3654).

As is known in the art, certain generative AI models may generate one type of content, while other generative AI models may generate another type of content. Accordingly, a first generative AI node (e.g., within generative AI nodes 3656) may have a first generative AI model defined 3620 for it, while a second generative AI node (e.g., within generative AI nodes 3656) may have a second generative AI model defined 3620 for it. As could be imagined, the generative AI model defined 3620 for a particular generative AI node may be highly influenced by the type of data that the particular generative AI node may be processing or producing.

Examples of such data/content types and the popular generative AI models (e.g., generative AI models 3658) associated with the same may include but are not limited to:

Text Generation (LLMs): These models may be trained to generate, summarize, translate, and analyze text.

GPT-4/GPT-4 Turbo—OpenAI

Claude 3—Anthropic

Gemini 1.5 (formerly Bard)—Google DeepMind

Command R/Command R+—Cohere (focused on RAG and reasoning)

LLaMA 3—Meta (open-weight model)

Mistral/Mixtral—Mistral AI (open-weight, fast and efficient)

PaLM 2/Gemini 1—Google

XGen/Falcon/BLOOM—Hugging Face/TII (open models)

Image Generation: These models may create images from text prompts or modify existing images.

DALL•E 3—OpenAI

Midjourney (v6)—Midjourney

Stable Diffusion (v1.5/XL)—Stability AI (open source)

Ideogram—Ideogram AI (strong at typography and text in images)

Adobe Firefly—Adobe (integrated into Photoshop and Illustrator)

DreamStudio—Stability AI (UI for Stable Diffusion)

Video Generation: These models may be used to generate video from text, images, or motion inputs.

Sora—OpenAI (limited access, text-to-video)

Runway Gen-2—Runway ML (video from text, image, or video input)

Pika—Pika Labs (creative AI video generation)

Synthesia—Avatar-based video generation

Kaiber—Style-driven music video creation

Luma AI—3D video and scene generation

Multimodal Models (Text+Image+More): These models may handle multiple input types (e.g., text, image, audio).

GPT-4o ("Omni")—OpenAI (multimodal: text, image, video, audio input)

Gemini 1.5—Google (multimodal and high context window)

Claude 3 Opus—Anthropic (handles charts, images, large files)

Kosmos-2/Florence-2—Microsoft Research (vision-language models)

LLaVA/Fuyu/MiniGPT-4—Open-source multimodal models

Audio/Speech Generation: These models may generate or clone voices, synthesize music, or create sound effects.

Whisper—OpenAI (speech recognition, not generation)

ElevenLabs—Realistic voice cloning and speech synthesis

Voicemod/Descript Overdub—Voice generation/editing

Bark/Tortoise TTS—Open-source text-to-speech

MusicGen/AudioCraft—Meta AI (music and sound generation)

Riffusion—AI music generation from text

Code Generation: These model may generate, explain, and refactor code across languages.

Codex/GPT-4—OpenAI (powers GitHub Copilot)

CodeWhisperer—Amazon

StarCoder—Hugging Face & ServiceNow

Code LLaMA—Meta

Claude 3/Gemini 1.5—Strong in code understanding and generation

Cursor AI—AI-powered coding environment with agent support

Threat mitigation process 10 may enable 3622 a user (e.g., user 42) to define a prompt (e.g., prompt 3660) for at least one of the two or more generative AI nodes (e.g., generative AI nodes 3650).

In generative AI models (e.g., generative AI models 3658), prompts (e.g., prompt 3660) are the fundamental mechanism by which users communicate their intentions to a generative AI model (e.g., one or more of generative AI models 3658). Acting as both a command and a creative brief, a prompt (e.g., prompt 3660) sets the stage for how the AI model interprets and responds to a task. These prompts can range from simple questions to complex, multi-part instructions, and they may be crafted to request specific content types (e.g., essays, poems, reports, code snippets, images, audio clips, videos). A well-constructed prompt (e.g., prompt 3660) may not only tell the generative AI model what to generate, but may also influence e.g., how the content should be structured, what tone it should carry, what style or persona it should adopt, and which constraints it must follow.

Prompts (e.g., prompt 3660) may include additional context to improve output relevance (e.g., data points, sample inputs and outputs, formatting preferences, audience specifications, or quality criteria). In advanced use cases, users may employ techniques like zero-shot prompting (e.g., asking the generative AI model to perform a task without examples), few-shot prompting (e.g., providing examples of desired behavior to the generative AI model), or chain-of-thought prompting (e.g., encouraging the generative AI model to reason step-by-step before giving a final answer). Such strategies may help enhance output accuracy, reliability, and transparency, especially in high-stakes or logic-driven tasks.

Ultimately, prompts (e.g., prompt 3660) may be the creative and functional blueprint of a generative AI model (e.g., one of generative AI models 3658), as they convert user goals into machine-understandable instructions, unlocking the capacity of the generative AI model (e.g., one or generative AI models 3658) to generate outputs that are coherent, relevant, and contextually aligned. As such, prompt engineering (i.e., the practice of crafting precise, effective prompts) has become an important skill for maximizing the power and utility of generative AI models (e.g., generative AI models 3658).

Threat mitigation process 10 may visually render 3624 the generative AI workflow (e.g., generative AI workflow 3654), thus defining a visualized workflow (e.g., generative AI workflow 3654). For example, threat mitigation process 10 may render a graphical user interface (e.g., graphical user interface 3662) that may enable drag-n-drop workflow design, wherein the user (e.g., user 42) may select generative AI nodes (e.g., generative AI nodes 3656) from the plurality of generative AI nodes (e.g., plurality of generative AI nodes 3650) defined within generative AI node database 3652 and visually arrange/configure the same to generate generative AI workflow 3654, which may be visually rendered 3624 for the user (e.g., user 42).

Accordingly and in such a configuration, threat mitigation process 10 may enable 3626 the user (e.g., user 42) to visually revise the visualized workflow (e.g., generative AI workflow 3654).

Once configured, threat mitigation process 10 may provide 3628 an input command (e.g., input command 3664) to the generative AI workflow (e.g., generative AI workflow 3654), wherein threat mitigation process 10 may process 3630 the input command (e.g., input command 3664) using the generative AI workflow (e.g., generative AI workflow 3654) to produce a workflow result (e.g., workflow result 3666). Accordingly and as discussed above, a user (e.g., user 42) may provide an input (e.g., input command 3664) into a text generation generative AI node, whose output may be fed into a post-processing generative AI node that cleans up (e.g., formats, spellchecks) the output of the text generation generative AI node, which is fed into a third generative AI node that produces a report (e.g., workflow result 3666).

Flex #2

Figure 58:
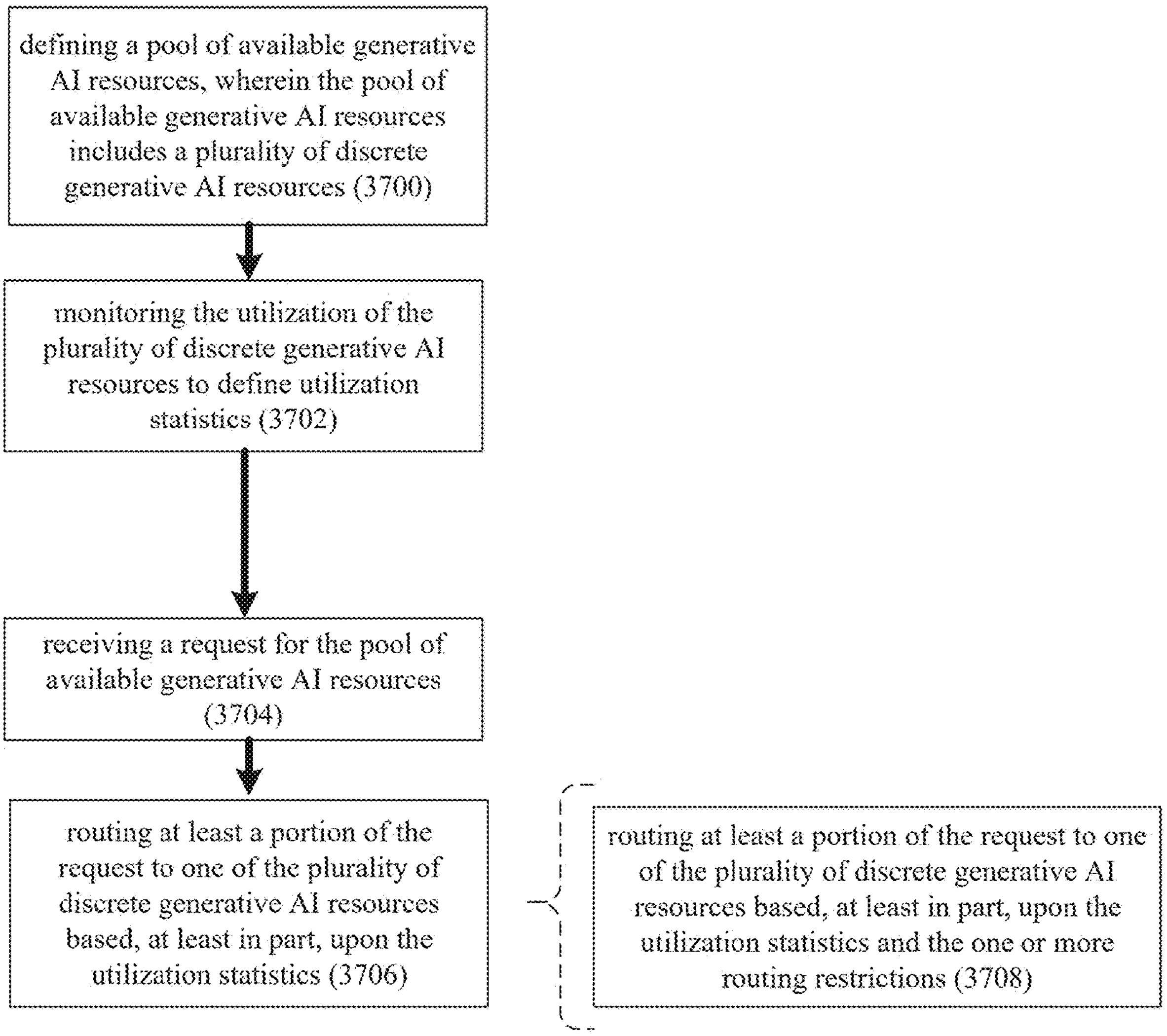
FIG. 58 is a flowchart of another implementation of the threat mitigation process of FIG. 1 according to an embodiment of the present disclosure.
Figure 59:
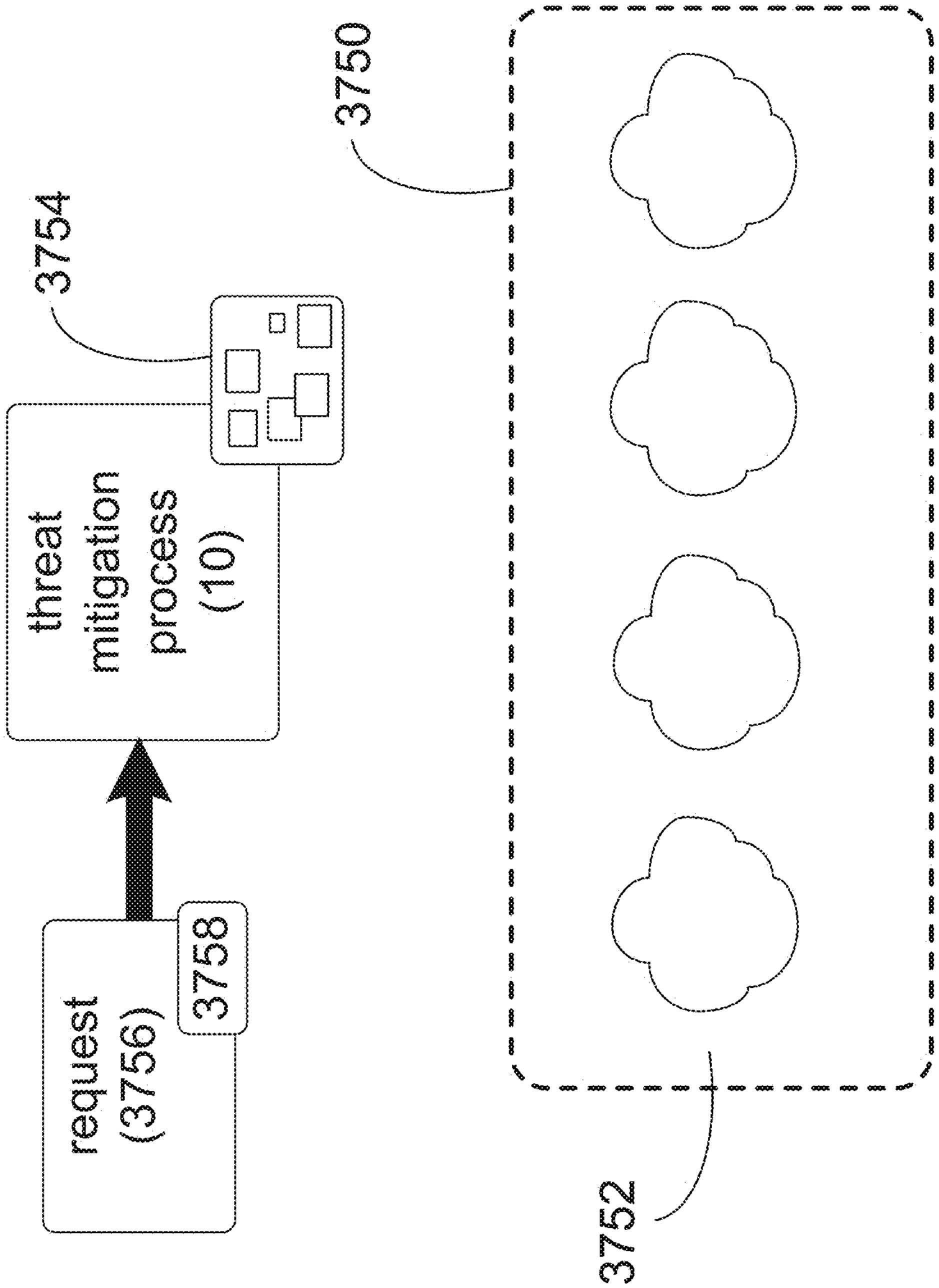
FIG. 59 is a diagrammatic view of a threat mitigation platform for effectuating the threat mitigation process of FIG. 1 according to an embodiment of the present disclosure.

Referring also to FIG. 58-59, the following discussion concerns the manner in which threat mitigation process 10 may receive requests for services from a pool of available generative AI resources and may route these requests to discrete generative AI resources defined within the pool of available generative AI resources based, at least in part, upon utilization statistics.

While the requests for services received by threat mitigation process 10 may concern the analysis/processing of security events (e.g., access auditing; anomalies; authentication; denial of services; exploitation; malware; phishing; spamming; reconnaissance; and/or web attack) within a monitored computing platform (e.g., computing platform 60), it is understood that these requests for services may be used for analysis/processing purposes outside of the security event space.

Threat mitigation process 10 may define 3700 a pool of available generative AI resources (e.g., pool of resources 3750), wherein the pool of available generative AI resources (e.g., pool of resources 3750) includes a plurality of discrete generative AI resources (e.g., discrete generative AI resources 3752).

Examples of such discrete generative AI resources (e.g., discrete generative AI resources 3752) may include but are not limited to various generative AI models and resources. For example, the plurality of discrete generative AI resources (e.g., discrete generative AI resources 3752) may include but is not limited to one or more of: a reasoning generative AI resource; a chat generative AI resource; a text completion generative AI resource; an embedding generative AI resource; an image generation generative AI resource; and a reranker generative AI resource.

A reasoning generative AI resource is designed to simulate logical inference, problem-solving, and multi-step thinking. This AI resource may analyze complex inputs (text, data, or code), identify patterns or causal relationships, and generate outputs that require deductive, inductive, or abductive reasoning. Examples may include AI models used for scientific hypothesis generation, legal argument construction, or advanced decision-making tasks.

A chat generative AI resource may enable interactive, conversational communication with users. This AI resource may be optimized for understanding dialogue context, maintaining coherence across turns, and generating human-like responses. These systems may answer questions, offer suggestions, and hold fluid conversations in natural language. Common examples may include virtual assistants, customer service bots, and large language models like ChatGPT in chat mode.

A text completion generative AI resource is focused on predicting and generating the next segment of text based on a given prompt or partial input. This AI resource may be trained to complete sentences, paragraphs, code snippets, or documents in a coherent and contextually appropriate way. Common examples may include writing assistance tools, auto-fill features, or code autocompletion environments.

An embedding generative AI resource may convert text (or other data types like images or audio) into dense numerical representations (i.e., embeddings) that capture semantic meaning. These vectorized forms may allow machines to compare, search, or cluster content based on conceptual similarity rather than surface-level features. Embeddings are foundational for recommendation systems, semantic search engines, and classification tasks.

An image generation generative AI resource may produce visual content from non-visual inputs, such as text descriptions, sketches, or other images. This AI resource may be capable of synthesizing realistic, stylized, or abstract imagery using generative models like GANs (Generative Adversarial Networks), VAEs (Variational Autoencoders), or diffusion models. Applications include design prototyping, concept art, medical imaging simulation, and more.

A reranker generative AI resource may take a list of generated or retrieved outputs (e.g., search results, answer candidates) and reorder them by evaluating their relevance, quality, or alignment with a given query or context. This may be done using a model trained to score or prioritize items, often improving accuracy in information retrieval, summarization, or response selection tasks.

The pool of available AI resources (e.g., pool of resources 3750) may span a single generative AI model. For example, the pool of available AI resources (e.g., pool of resources 3750) may include multiple generative AI accounts (e.g., ChatGPT 4.0-1 and ChatGPT 4.0-2) that are all associated with a single generative AI model, namely ChatGPT 4.0.

Additionally/alternatively, the pool of available AI resources (e.g., pool of resources 3750) may span a plurality of generative AI models. For example, the pool of available AI resources (e.g., pool of resources 3750) may include multiple generative AI accounts (e.g., ChatGPT 4.0 and Gemini) that are associated with a plurality of generative AI models, namely ChatGPT 4.0 and Gemini.

Additionally/alternatively, the pool of available AI resources (e.g., pool of resources 3750) may span a plurality of accounts/regions for a single generative AI model. For example, the pool of available AI resources (e.g., pool of resources 3750) may include multiple generative AI accounts (e.g., ChatGPT 4.0-East and ChatGPT 4.0-West) that are all associated with a single generative AI model, namely ChatGPT 4.0.

Additionally/alternatively, the pool of available AI resources (e.g., pool of resources 3750) may span a plurality of accounts/regions for a plurality of generative AI models. For example, the pool of available AI resources (e.g., pool of resources 3750) may include multiple generative AI accounts (e.g., ChatGPT 4.0-East, ChatGPT 4.0-West, Gemini-East and Gemini-West) that are associated with a plurality of generative AI models, namely ChatGPT 4.0 and Gemini.

Threat mitigation process 10 may monitor 3702 the utilization of the plurality of discrete generative AI resources (e.g., discrete generative AI resources 3752) to define utilization statistics (e.g., utilization statistics 3754). These utilization statistics (e.g., utilization statistics 3754) may define one or more of: a number of requests made to each of the plurality of discrete generative AI resources during a given period of time; a throughput/token count for each of the plurality of discrete generative AI resources during a given period of time; a cost count for each of the plurality of discrete generative AI resources during a given period of time; and a compute count for each of the plurality of discrete generative AI resources during a given period of time.

Generally speaking, monitoring the usage of generative AI resources (e.g., discrete generative AI resources 3752) may be essential for ensuring efficient, cost-effective, and scalable operations across AI-driven systems. Such monitoring may involve systematically collecting and analyzing multiple usage statistics that offer granular insights into how various AI models and services are being used over time. Four metrics, namely number of requests, throughput/token count, cost count, and compute count, may enable administrators and system architects to manage performance, control expenditures, and optimize infrastructure.

The number of requests made to each generative AI resource during a specified period reveals how often each model or service is invoked. This statistic may be foundational for understanding user engagement patterns, model popularity, and load distribution across a fleet of AI resources. High request volumes may signal the need for load balancing, model scaling, or request throttling, while low volumes might point to underutilized assets that could be reconfigured or retired. This metric may also be valuable for identifying spikes in demand due to events like product launches, system errors, or abusive usage patterns.

The throughput/token count, namely the total number of tokens processed (input and/or output), may provide a deeper layer of insight into usage intensity. While request counts show frequency, token counts reflect the size and complexity of the tasks being processed. For example, a few requests that involve summarizing lengthy documents or generating extensive reports can yield higher token counts than hundreds of short queries. This metric helps optimize model selection, as smaller models may suffice for low-token tasks while larger ones are reserved for high-throughput operations. Monitoring token flow may also assist with rate-limiting strategies and identifying performance bottlenecks.

Cost count measures the monetary expense associated with using each discrete generative AI resource, often derived from usage-based pricing models set by AI service providers. Different models carry different costs depending on their size (e.g., GPT-3.5 vs. GPT-4), latency, and quality of output. By monitoring cost counts per time window, organizations can enforce budget limits, forecast monthly AI spend, compare return on investment across models, and implement cost-reduction strategies such as prompt optimization or model substitution. Cost awareness is especially critical in systems with high usage or when offering AI services at scale to customers.

Finally, the compute count quantifies the computational effort consumed, typically measured in metrics such as GPU time, FLOPs, or energy use. This is important for infrastructure management, particularly in environments where AI models are deployed on shared compute clusters or cloud instances with usage caps. Compute counts may help track model efficiency, identify wasteful processes, and schedule jobs to avoid contention during peak hours.

Taken together, these metrics may enable a holistic view of generative AI system usage. By correlating them, system designers and administrators may detect inefficiencies. Sophisticated monitoring platforms may automate the collection and visualization of these metrics, generate real-time alerts, and support adaptive workload routing and resource allocation strategies.

Threat mitigation process 10 may receive 3704 a request (e.g., request 3756) for the pool of available generative AI resources (e.g., pool of resources 3750). Specifically, this request (e.g., request 3756) is directed toward the pool of available generative AI resources (e.g., pool of resources 3750), and not any specific AI resource within the plurality of discrete generative AI resources (e.g., discrete generative AI resources 3752).

As discussed above, threat mitigation process 10 may define 3700 a pool of available generative AI resources (e.g., pool of resources 3750) that includes a plurality of discrete generative AI resources (e.g., discrete generative AI resources 3752). As also discussed above, threat mitigation process 10 may monitor 3702 the utilization of the plurality of discrete generative AI resources (e.g., discrete generative AI resources 3752) to define utilization statistics (e.g., utilization statistics 3754). Accordingly, threat mitigation process 10 may route 3706 at least a portion of the request (e.g., request 3756) to one of the plurality of discrete generative AI resources (e.g., discrete generative AI resources 3752) based, at least in part, upon the utilization statistics (e.g., utilization statistics 3754). Examples of such a request (e.g., request 3756) may include but are not limited to any request typically asked of a generative AI resource (e.g., generating content, processing content, analyzing an event, predicting an outcome, researching an issue, etc.).

Accordingly, being the request (e.g., request 3756) is directed toward the pool of available generative AI resources (e.g., pool of resources 3750), threat mitigation process 10 may route 3706 request 3756 (or a portion thereof) to selected discrete generative AI resources (e.g., chosen from discrete generative AI resources 3752) based, at least in part, upon the utilization statistics (e.g., utilization statistics 3754) to e.g., avoid over use of a particular AI resource, to distribute loads across a plurality of AI resources. to balance the utilization of multiple AI resources, to use lower-cost AI resources when such resources can handle the task, etc.

The request (e.g., request 3756) may include one or more routing restrictions (e.g., routing restrictions 3758) concerning the plurality of discrete generative AI resources (e.g., discrete generative AI resources 3752). Such routing restrictions (e.g., routing restrictions 3758) may include a preference toward a specific AI resource and/or a preference away from another AI resource. The one or more routing restrictions may define one or more of: a preferred generative AI model (e.g., ChatGPT versus Gemini); a preferred type of generative AI model (e.g. reasoning versus chat); a preferred account for a generative AI model (e.g., ChatGPT 4.0-1 versus ChatGPT 4.0-2); and a preferred region for a generative AI model (e.g., ChatGPT 4.0-East versus ChatGPT 4.0-West).

When routing 3706 at least a portion of the request (e.g., request 3756) to one of the plurality of discrete generative AI resources (e.g., discrete generative AI resources 3752) based, at least in part upon the utilization statistics (e.g., utilization statistics 3754), threat mitigation process 10 may: rout 3708 at least a portion of the request (e.g., request 3756) to one of the plurality of discrete generative AI resources (e.g., discrete generative AI resources 3752) based, at least in part, upon the utilization statistics (e.g., utilization statistics 3754) and the one or more routing restrictions (e.g., routing restrictions 3758).

For example, assume that the request (e.g., request 3756) directed toward the pool of available generative AI resources (e.g., pool of resources 3750) concerns the generation of a specific type of content that (in the past) was successfully generated using ChatGPT 4.0 but had less favorable results when ChatGPT 3.5 was utilized. Accordingly, such routing restrictions (e.g., routing restrictions 3758) may specify a preference toward ChatGPT 4.0 and/or a preference away from ChatGPT 3.5. Assume for this example that ChatGPT 3.5-East, ChatGPT 3.5-West, ChatGPT 4.0-East and ChatGPT 4.0-West are all included and available within the plurality of discrete generative AI resources (e.g., discrete generative AI resources 3752) defined within the pool of available generative AI resources (e.g., pool of resources 3750). Further assume that the utilization statistics (e.g., utilization statistics 3754) indicate that ChatGPT 3.5-East is the least utilized, ChatGPT 4.0-West is the third most utilized, ChatGPT 3.5-West is the second most utilized, and ChatGPT 4.0-East is the most utilized. Accordingly and in such a situation, threat mitigation process 10 may rout 3708 request 3756 (or a portion thereof) to ChatGPT 4.0-West (which is the third most utilized). Specifically, while ChatGPT 3.5-East is the least utilized, the routing restrictions (e.g., routing restrictions 3758) specify a preference away from ChatGPT 3.5. Accordingly, only ChatGPT 4.0-East and ChatGPT 4.0-West are viable targets for request 3756. And being ChatGPT 4.0-West is utilized less than ChatGPT 4.0-East, request 3756 may be routed 3708 toward ChatGPT 4.0-West.

Flex #3

Figure 60:
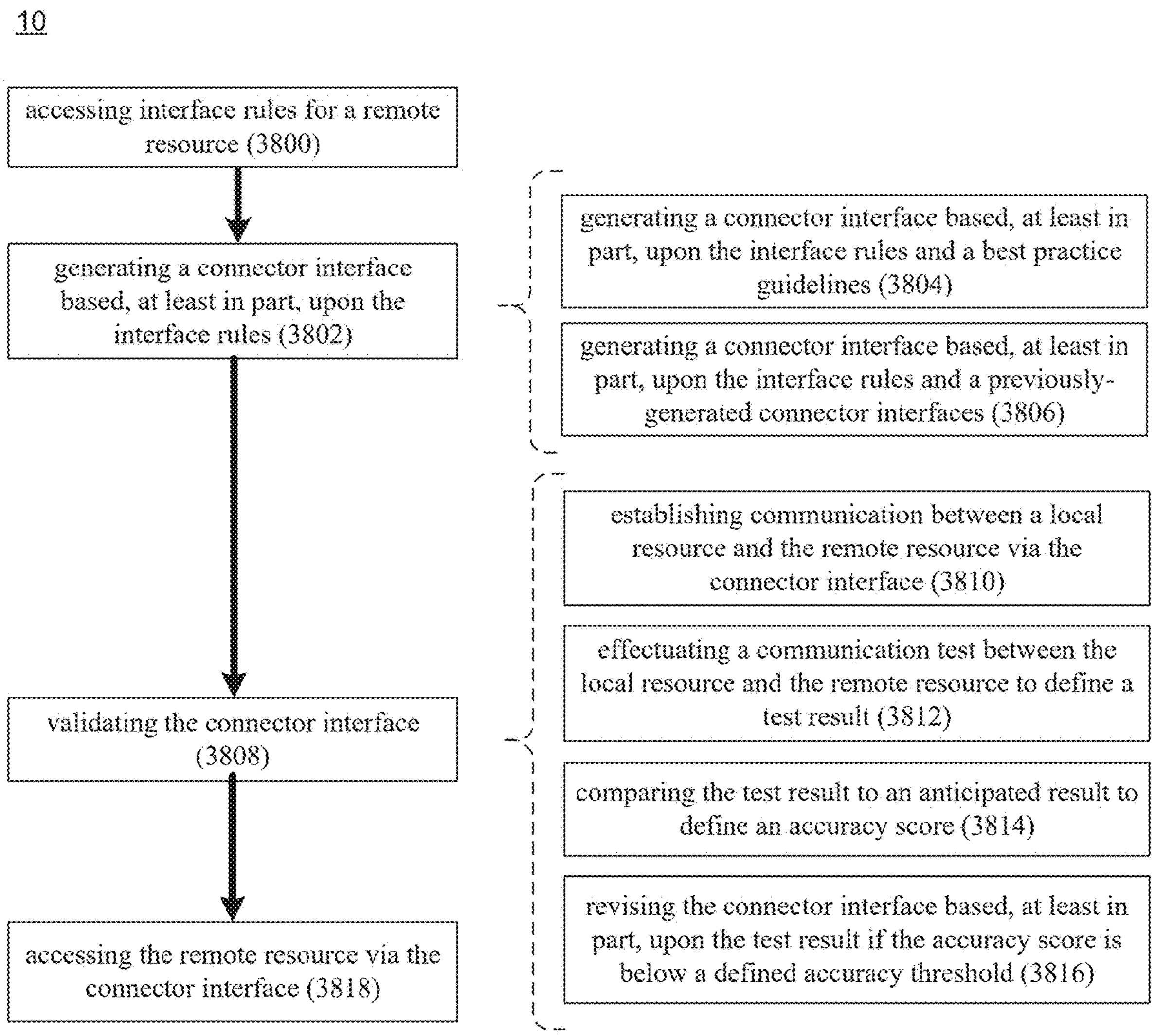
FIG. 60 is a flowchart of another implementation of the threat mitigation process of FIG. 1 according to an embodiment of the present disclosure.
Figure 61:
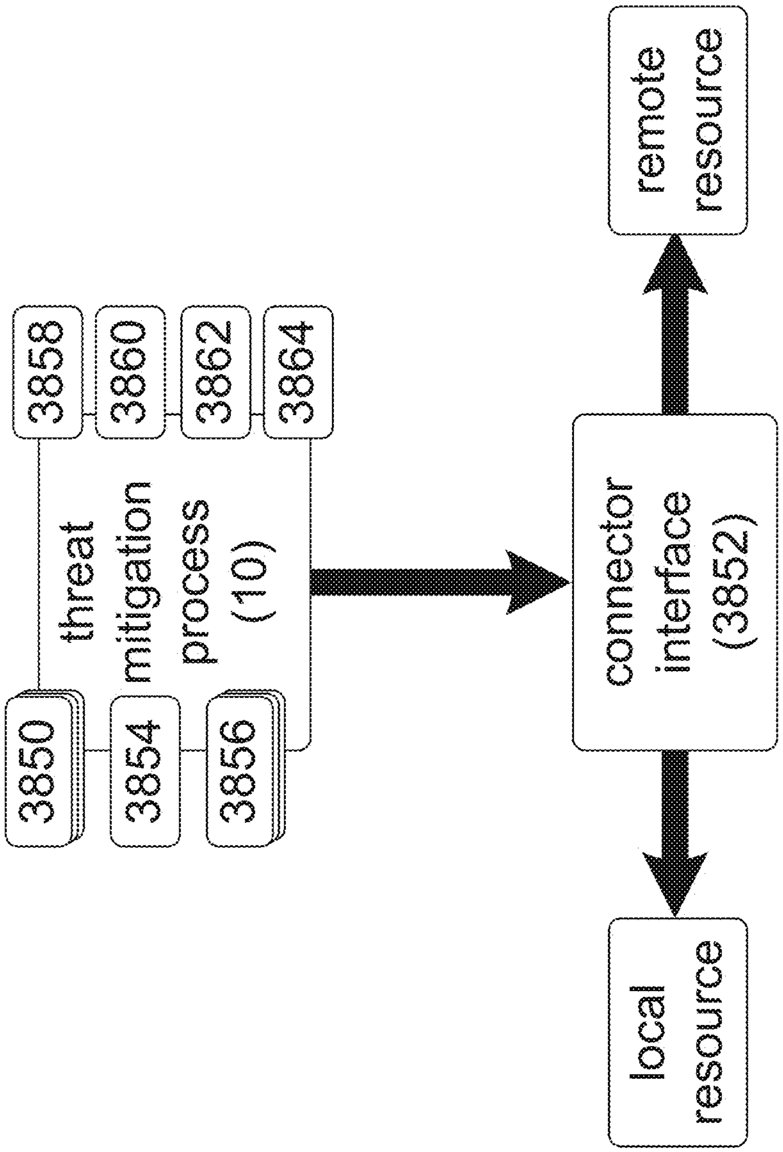
FIG. 61 is a diagrammatic view of a threat mitigation platform for effectuating the threat mitigation process of FIG. 1 according to an embodiment of the present disclosure.

Referring also to FIG. 60-61, the following discussion concerns the manner in which threat mitigation process 10 may obtain and analyze interface rules for a remote resource so that a connector interface may be generated (based upon such interface rules) that enables access to this remote resource.

While the interface rules accessed and the connector interface generated by threat mitigation process 10 may concern remote resources utilized for the detection of security events (e.g., access auditing; anomalies; authentication; denial of services; exploitation; malware; phishing; spamming; reconnaissance; and/or web attack) within a monitored computing platform (e.g., computing platform 60), it is understood that these remote resources may be utilized for analysis/processing purposes outside of the security event space.

Threat mitigation process 10 may access 3800 interface rules (e.g., interface rules 3850) for a remote resource. Once accessed, threat mitigation process 10 may generate 3802 a connector interface (e.g., connector interface 3852) based, at least in part, upon the interface rules (e.g., interface rules 3850).

Interface rules (e.g., interface rules 3850) may play a foundational role in the design and functionality of connector interfaces (e.g., connector interface 3852) that are programmed to interact with remote resources (e.g., external APIs, cloud services, or distributed systems). These rules (e.g., interface rules 3850) may serve as an "instruction manual" that defines how the local system should structure its requests, what types of inputs and outputs are acceptable, and how communication and data exchange must be handled. These rules (e.g., interface rules 3850) may define several key components, including endpoint definitions, supported methods (e.g., GET, POST, PUT, or DELETE), required authentication mechanisms, input/output data schemas, and conventions for error handling and retries).

When a connector interface (e.g., connector interface 3852) is being programmed, the interface rules (e.g., interface rules 3850) may act as a blueprint that guides the development process. For instance, the interface rules (e.g., interface rules 3850) may specify that e.g., all requests to a particular remote resource must include an OAuth2 token in the authorization header and that data must be serialized in JSON with strict adherence to a predefined schema. Accordingly and through the use of the interface rules (e.g., interface rules 3850), the connector interface (e.g., connector interface 3852) may be programmed to not only gather and format the required data but also to validate that the data matches the expected structure before sending it. Similarly, upon receiving a response, the connector interface (e.g., connector interface 3852) may e.g., deserialize the output, check for errors, and extract relevant information in a usable format.

Ultimately, interface rules (e.g., interface rules 3850) ensure interoperability between systems, providing a predictable and standardized method for accessing remote resources. By utilizing these rules (e.g., interface rules 3850) when programming/designing a connector interface (e.g., connector interface 3852), developers may generate a robust bridge between local and remote systems that can scale, adapt to changes, and uphold operational integrity across distributed environments.

As discussed above, various security-relevant subsystems (e.g., security-relevant subsystems 226) may be deployed within computing platform 60 to monitor the operation of (and the activity within) computing platform 60. Examples of security-relevant subsystems 226 may include but are not limited to: CDN (i.e., Content Delivery Network) systems; DAM (i.e., Database Activity Monitoring) systems; UBA (i.e., User BehaviorAnalytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform. Each of security-relevant subsystems 226 may monitor and log their activity with respect to computing platform 60, resulting in the generation of platform information 228.

As also discussed above, a SEIM (i.e., Security Information and Event Management) system 230 may be deployed within computing platform 60 that may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

As also discussed above, threat mitigation process 10 may be configured to enable the querying of these multiple separate and discrete subsystems (e.g., security-relevant subsystems 226). Accordingly the manner in which threat mitigation process 10 interfaces/interacts with these remote resources (e.g., security-relevant subsystems 226) may be defined by the interface rules (e.g., interface rules 3850). Accordingly, threat mitigation process 10 may access 3800 the interface rules (e.g., interface rules 3850) for a remote resource (e.g., a Mobile Device Management system) and may utilize the same to generate 3802 a connector interface (e.g., connector interface 3852) that enables access to (and communication with) the remote resource (e.g., a Mobile Device Management system). wherein the connector interface (e.g., connector interface 3852) is based, at least in part, upon the interface rules (e.g., interface rules 3850)

The connector interface (e.g., connector interface 3852) may be a bidirectional connector interface, wherein such a bidirectional connector interface (e.g., connector interface 3852) may enable bidirectional communication between the remote resource (e.g., a Mobile Device Management system) and a local resource (e.g., any portion of threat mitigation process 10 and/or any system or subsystem connected thereto).

As is known in the art, Generative AI is a subset of artificial intelligence focused on systems that can generate new and original content based on patterns learned from existing data. Unlike traditional AI, which is primarily concerned with recognizing patterns, classifying data, or making decisions, generative AI goes a step further, in that it creates content. This ability to generate content (e.g., text, images, code, music, video, and even synthetic data) has opened up new possibilities across industries and disciplines.

At the heart of generative AI are advanced machine learning models, particularly deep learning architectures such as transformers, Generative Adversarial Networks (GANs), and Variational Autoencoders (VAEs). These models are trained on vast datasets (e.g., text from books and websites, images from digital art databases, or sound from music libraries) to learn the statistical patterns, structures, and relationships inherent in the data. Once trained, these systems may produce new outputs that are often indistinguishable from those created by humans.

Accordingly and when generating 3802 a connector interface (e.g., connector interface 3852) based, at least in part, upon the interface rules (e.g., interface rules 3850), threat mitigation process 10 may utilize such generative AI to obtain and digest the interface rules (e.g., interface rules 3850) and generate any resulting connector interface (e.g., connector interface 3852).

When generating 3802 a connector interface (e.g., connector interface 3852) based, at least in part, upon the interface rules (e.g., interface rules 3850), threat mitigation process 10 may: generate 3804 a connector interface (e.g., connector interface 3852) based, at least in part, upon the interface rules (e.g., interface rules 3850) and best practice guidelines (e.g., best practice guidelines 3854). Examples of such best practice guidelines (e.g., best practice guidelines 3854) may include but are not limited to any rules or guidelines that define the manner in which a connector interface (e.g., connector interface 3852) may be configured. For example, such best practice guidelines (e.g., best practice guidelines 3854) may define a preferred nomenclature for any elements defined within the connector interface (e.g., connector interface 3852). Further, such best practice guidelines (e.g., best practice guidelines 3854) may define the preferred language (such as JSON) for scripting the connector interface (e.g., connector interface 3852).

Additionally and when generating 3802 a connector interface (e.g., connector interface 3852) based, at least in part, upon the interface rules (e.g., interface rules 3850), threat mitigation process 10 may: generate 3806 a connector interface (e.g., connector interface 3852) based, at least in part, upon the interface rules (e.g., interface rules 3850) and previously-generated connector interfaces (e.g., previously-generated connector interfaces 3856). Such previously-generated connector interfaces (e.g., previously-generated connector interfaces 3856) may include but are not limited to an assortment of previously generated connector interfaces (e.g., previously-generated connector interfaces 3856) that threat mitigation process 10 may use as examples when generating 3806 the new connector interface that (in this example) enables communication with the remote resource (e.g., mobile device management system).

Being the connector interface (e.g., connector interface 3852) essentially acts as a translator that allows communication with the remote resource, it is of paramount importance that the connector interface (e.g., connector interface 3852) operate properly. Accordingly, threat mitigation process 10 may validate 3808 the connector interface (e.g., connector interface 3852) upon it being generated 3802 and prior to actual use/implementation.

For example and when validating 3808 the connector interface (e.g., connector interface 3852), threat mitigation process 10 may:

- establish 3810 communication between a local resource (e.g., any portion of threat mitigation process 10 and/or any system or subsystem connected thereto) and the remote resource (e.g., a Mobile Device Management system) via the connector interface (e.g., connector interface 3852);
- effectuate 3812 a communication test between the local resource (e.g., any portion of threat mitigation process 10 and/or any system or subsystem connected thereto) and the remote resource (e.g., a Mobile Device Management system) to define a test result (e.g., test result 3858);
- compare 3814 the test result (e.g., test result 3858) to an anticipated result (e.g., anticipated result 3860) to define an accuracy score (e.g., accuracy score 3862); and
- revise 3816 the connector interface (e.g., connector interface 3852) based, at least in part, upon the test result if the accuracy score (e.g., accuracy score 3862) is below a defined accuracy threshold (e.g., defined accuracy threshold 3864).

Threat mitigation process 10 may access 3818 the remote resource (e.g., a Mobile Device Management system) via the connector interface (e.g., connector interface 3852). For example and upon threat mitigation process 10 validating 3808 the connector interface (e.g., connector interface 3852), threat mitigation process 10 may enable access 3818 to the remote resource (e.g., a Mobile Device Management system) via the connector interface (e.g., connector interface 3852).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

accessing interface rules for a remote resource;

generating a connector interface based, at least in part, upon the interface rules, including using generative AI to obtain and digest the interface rules, and using generative AI to generate the connector interface;

accessing the remote resource via the connector interface; and validating the connector interface prior to use, including:

establishing communication between a local resource and the remote resource via the connector interface; and effectuating a communication test between the local resource and the remote resource to define a test result.

2. The computer-implemented method of claim 1 wherein the connector interface is a bidirectional connector interface.

3. The computer-implemented method of claim 2 wherein the bidirectional connector interface enables bidirectional communication between the remote resource and a local resource.

4. The computer-implemented method of claim 1 wherein generating a connector interface based, at least in part, upon the interface rules includes:

generating a connector interface based, at least in part, upon the interface rules and a best practice guidelines.

5. The computer-implemented method of claim 1 wherein generating a connector interface based, at least in part, upon the interface rules includes:

generating a connector interface based, at least in part, upon the interface rules and a previously-generated connector interfaces.

6. The computer-implemented method of claim 1 wherein validating the connector interface further includes:

comparing the test result to an anticipated result to define an accuracy score.

7. The computer-implemented method of claim 6 wherein validating the connector interface further includes:

revising the connector interface based, at least in part, upon the test result if the accuracy score is below a defined accuracy threshold.

8. A computer program product residing on a non-transitory computer readable medium having a plurality of instructions stored thereon which, when executed by a processor, cause the processor to perform operations comprising:

accessing interface rules for a remote resource;

generating a connector interface based, at least in part, upon the interface rules, including using generative AI to obtain and digest the interface rules, and using generative AI to generate the connector interface;

accessing the remote resource via the connector interface; and validating the connector interface prior to use, including:

establishing communication between a local resource and the remote resource via the connector interface; and effectuating a communication test between the local resource and the remote resource to define a test result.

9. The computer program product of claim 8 wherein the connector interface is a bidirectional connector interface.

10. The computer program product of claim 9 wherein the bidirectional connector interface enables bidirectional communication between the remote resource and a local resource.

11. The computer program product of claim 8 wherein generating a connector interface based, at least in part, upon the interface rules includes:

generating a connector interface based, at least in part, upon the interface rules and a best practice guidelines.

12. The computer program product of claim 8 wherein generating a connector interface based, at least in part, upon the interface rules includes:

generating a connector interface based, at least in part, upon the interface rules and a previously-generated connector interfaces.

13. The computer program product of claim 8 wherein validating the connector interface further includes:

comparing the test result to an anticipated result to define an accuracy score.

14. The computer program product of claim 13 wherein validating the connector interface further includes:

revising the connector interface based, at least in part, upon the test result if the accuracy score is below a defined accuracy threshold.

15. A computing system including a processor and memory configured to perform operations comprising:

accessing interface rules for a remote resource;

generating a connector interface based, at least in part, upon the interface rules, including using generative AI to obtain and digest the interface rules, and using generative AI to generate the connector interface;

accessing the remote resource via the connector interface; and validating the connector interface prior to use, including:

establishing communication between a local resource and the remote resource via the connector interface; and effectuating a communication test between the local resource and the remote resource to define a test result.

16. The computing system of claim 15 wherein the connector interface is a bidirectional connector interface.

17. The computing system of claim 16 wherein the bidirectional connector interface enables bidirectional communication between the remote resource and a local resource.

18. The computing system of claim 15 wherein generating a connector interface based, at least in part, upon the interface rules includes:

generating a connector interface based, at least in part, upon the interface rules and a best practice guidelines.

19. The computing system of claim 15 wherein generating a connector interface based, at least in part, upon the interface rules includes:

generating a connector interface based, at least in part, upon the interface rules and a previously-generated connector interfaces.

20. The computing system of claim 5 wherein validating the connector interface further includes:

comparing the test result to an anticipated result to define an accuracy score.

21. The computing system of claim 20 wherein validating the connector interface further includes:

revising the connector interface based, at least in part, upon the test result if the accuracy score is below a defined accuracy threshold.

* * * * *